(12) United States Patent
Sheredy et al.

(10) Patent No.: US 12,413,179 B1
(45) Date of Patent: Sep. 9, 2025

(54) SYSTEMS AND METHODS FOR SOLAR MODULE ASSEMBLY

(71) Applicant: Planted Solar, Inc., Oakland, CA (US)

(72) Inventors: Colin Sheredy, Redondo Beach, CA (US); Richard Erb, Oakland, CA (US); Nathan Beckett, Los Altos, CA (US)

(73) Assignee: Planted Solar, Inc., Oakland, CA (US)

( * ) Notice: Subject to any disclaimer, the term of this patent is extended or adjusted under 35 U.S.C. 154(b) by 0 days.

(21) Appl. No.: 18/898,366

(22) Filed: Sep. 26, 2024

Related U.S. Application Data

(60) Provisional application No. 63/661,449, filed on Jun. 18, 2024, provisional application No. 63/562,654, filed on Mar. 7, 2024.

(51) Int. Cl.
  *H02S 20/32* (2014.01)
(52) U.S. Cl.
  CPC .................................. *H02S 20/32* (2014.12)
(58) Field of Classification Search
  CPC ....................................................... H02S 20/32
  See application file for complete search history.

(56) References Cited

U.S. PATENT DOCUMENTS

| | | | |
|---|---|---|---|
| 8,186,120 B2 | 5/2012 | Beck | |
| 8,646,227 B2 | 2/2014 | Zahuranec | |
| 9,020,636 B2 | 4/2015 | Tadayon | |
| 9,074,797 B2 | 7/2015 | Miller et al. | |
| D738,820 S | 9/2015 | Beck et al. | |
| 9,457,463 B2 | 10/2016 | Tadayon | |
| 10,020,411 B2 | 7/2018 | Beck et al. | |
| 10,232,505 B2 | 3/2019 | Tadayon | |
| 10,289,757 B2 | 5/2019 | McClure et al. | |
| 10,439,550 B1 | 10/2019 | Goodman | |
| 10,926,401 B2 | 2/2021 | Tadayon | |
| 11,245,353 B2 | 2/2022 | Di et al. | |
| 11,750,148 B2 | 9/2023 | Erb et al. | |
| 12,119,782 B2 | 10/2024 | Erb et al. | |
| 2010/0237028 A1 | 9/2010 | Cusson | |

(Continued)

FOREIGN PATENT DOCUMENTS

| | | |
|---|---|---|
| DE | 202013105120 U1 | 11/2013 |
| DE | 102013006530 A1 | 10/2014 |

(Continued)

OTHER PUBLICATIONS

Araymond Energies Sas. PowAR Wing Cinch. Fastening Clip for Framed Modules. 4 pages (2023). Retrieved from: https://media.araymond.com/raygroup/image/upload/Collections/ARaymond_Energies_PowAR-Wing-Cinch_1008_EN.pdf.

(Continued)

*Primary Examiner* — Jayne L Mershon
(74) *Attorney, Agent, or Firm* — Wilson Sonsini Goodrich & Rosati

(57) ABSTRACT

The present disclosure describes systems and methods for autonomous and rapid post installation and post-solar module assembly. In an aspect, the present disclosure provides a solar module array comprising: a plurality of solar modules; and a plurality of posts configured to support the plurality of solar modules, wherein at least one solar module of the plurality of solar modules is configured to be supported by two or more posts at a plurality of non-corner positions along a first longitudinal side of the at least one solar module.

21 Claims, 167 Drawing Sheets

(56) References Cited

U.S. PATENT DOCUMENTS

| | | |
|---|---|---|
| 2012/0023726 A1 | 2/2012 | Bellacicco et al. |
| 2012/0027550 A1 | 2/2012 | Bellacicco et al. |
| 2012/0198682 A1 | 8/2012 | Potter et al. |
| 2013/0019925 A1 | 1/2013 | Britcher et al. |
| 2014/0261642 A1 | 9/2014 | Beck et al. |
| 2015/0331972 A1 | 11/2015 | McClure et al. |
| 2016/0118927 A1 | 4/2016 | Zuritis |
| 2017/0229029 A1 | 8/2017 | Klinger et al. |
| 2017/0327091 A1 | 11/2017 | Capizzo |
| 2017/0373632 A1* | 12/2017 | Bauer .................. F16B 5/0072 |
| 2019/0134822 A1 | 5/2019 | Clemenzi et al. |
| 2019/0184544 A1 | 6/2019 | Tadayon |
| 2020/0052644 A1 | 2/2020 | Taha et al. |
| 2020/0304062 A1 | 9/2020 | Shugar |
| 2020/0350850 A1 | 11/2020 | Di Stefano et al. |
| 2021/0170571 A1 | 6/2021 | Tadayon |
| 2021/0205997 A1 | 7/2021 | Zhou et al. |
| 2021/0206003 A1 | 7/2021 | Zhou et al. |
| 2021/0211096 A1 | 7/2021 | Clemenzi et al. |
| 2021/0291255 A1 | 9/2021 | Wu |
| 2022/0038044 A1 | 2/2022 | Russell |
| 2022/0392640 A1* | 12/2022 | Salahudeen ...... G01N 33/57415 |
| 2022/0393640 A1* | 12/2022 | Erb ....................... G01L 5/0033 |
| 2024/0106388 A1 | 3/2024 | Erb et al. |

FOREIGN PATENT DOCUMENTS

| | | |
|---|---|---|
| DE | 102019102177 A1 | 7/2020 |
| DE | 102011102624 B4 | 10/2020 |
| EP | 2681772 B1 | 9/2016 |
| EP | 2771913 B1 | 12/2017 |
| EP | 3021056 B1 | 4/2020 |
| EP | 3810997 A1 | 4/2021 |
| WO | WO-2019242925 A1 | 12/2019 |
| WO | WO-2021188874 A1 | 9/2021 |
| WO | WO-2021188875 A1 | 9/2021 |
| WO | WO-2022187264 A1 | 9/2022 |
| WO | WO-2024050449 A2 | 3/2024 |

OTHER PUBLICATIONS

Co-pending U.S. Appl. No. 18/819,835, inventors ERB; Richard et al., filed on Aug. 29, 2024.
PCT/US2022/018368 International Search Report and Written Opinion dated Aug. 2, 2022.
PCT/US2023/073205 International Search Report and Written Opinion dated Feb. 14, 2024.
U.S. Appl. No. 17/821,087 Notice of Allowance dated Jun. 1, 2023.
U.S. Appl. No. 17/821,087 Notice of Allowance dated May 17, 2023.
U.S. Appl. No. 17/821,087 Office Action dated Jan. 20, 2023.
U.S. Appl. No. 18/053,687 Notice of Allowance dated Jun. 5, 2024.
U.S. Appl. No. 18/053,687 Office Action dated Nov. 7, 2023.
EP20220763912.7 Extended European Search Report dated Jan. 20, 2025.
PCT/US2023/073205 International Preliminary Report on Patentability dated Mar. 13, 2025.
U.S. Appl. No. 18/231,057 Office Action dated Jan. 30, 2025.
PCT/US2025/018798 Invitation to Pay Additional Fees dated May 20, 2025.

* cited by examiner

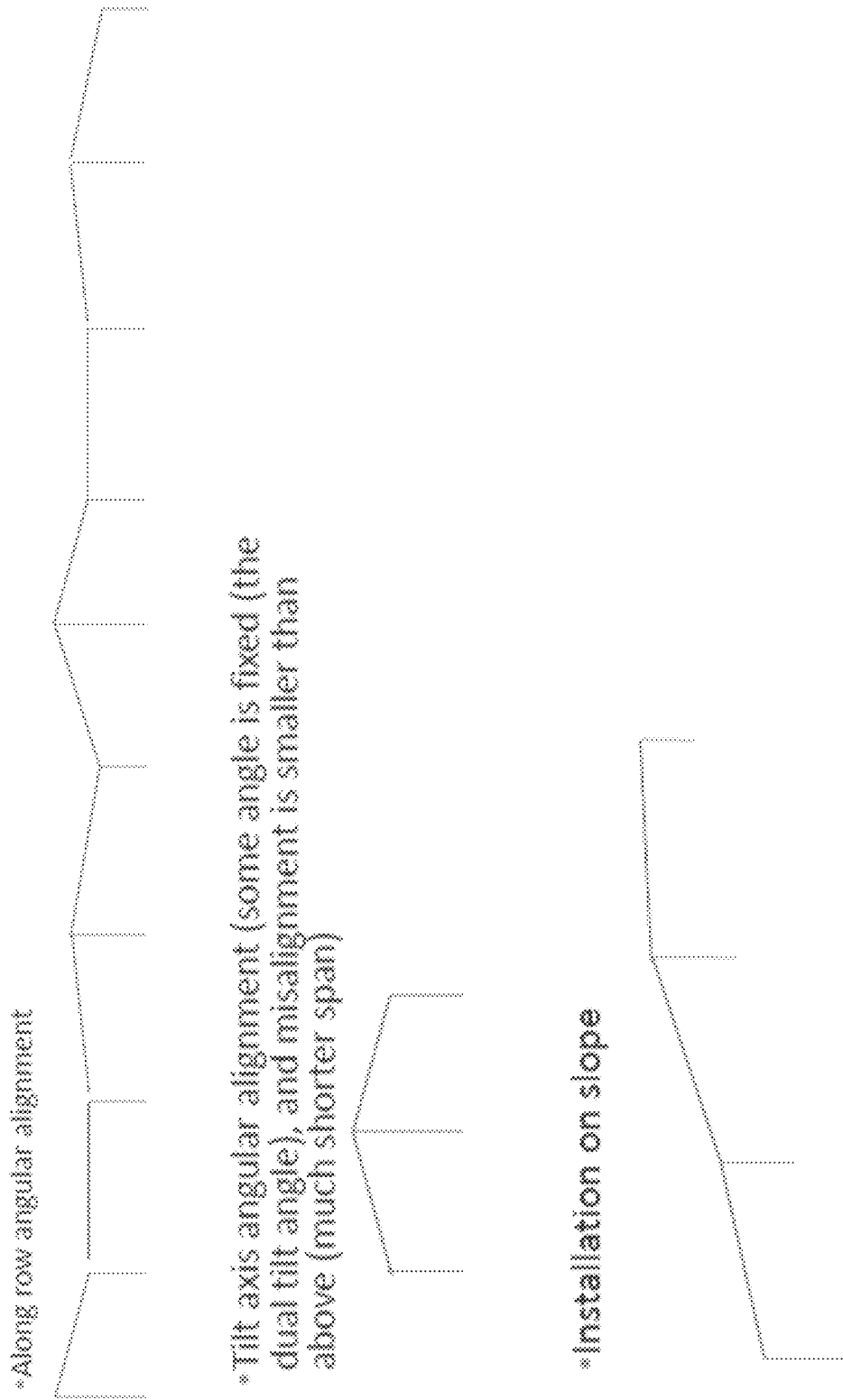

Clinching Joint

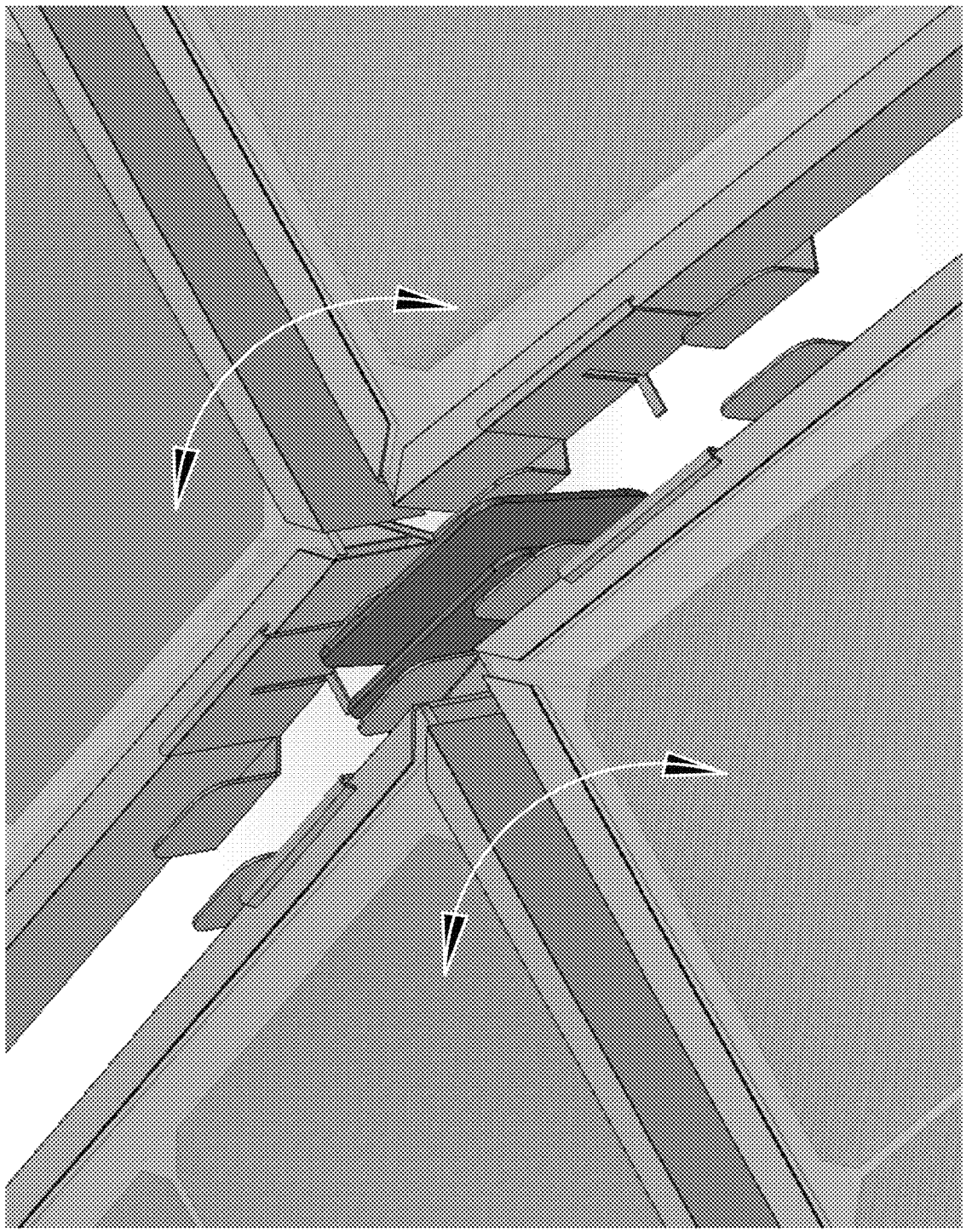

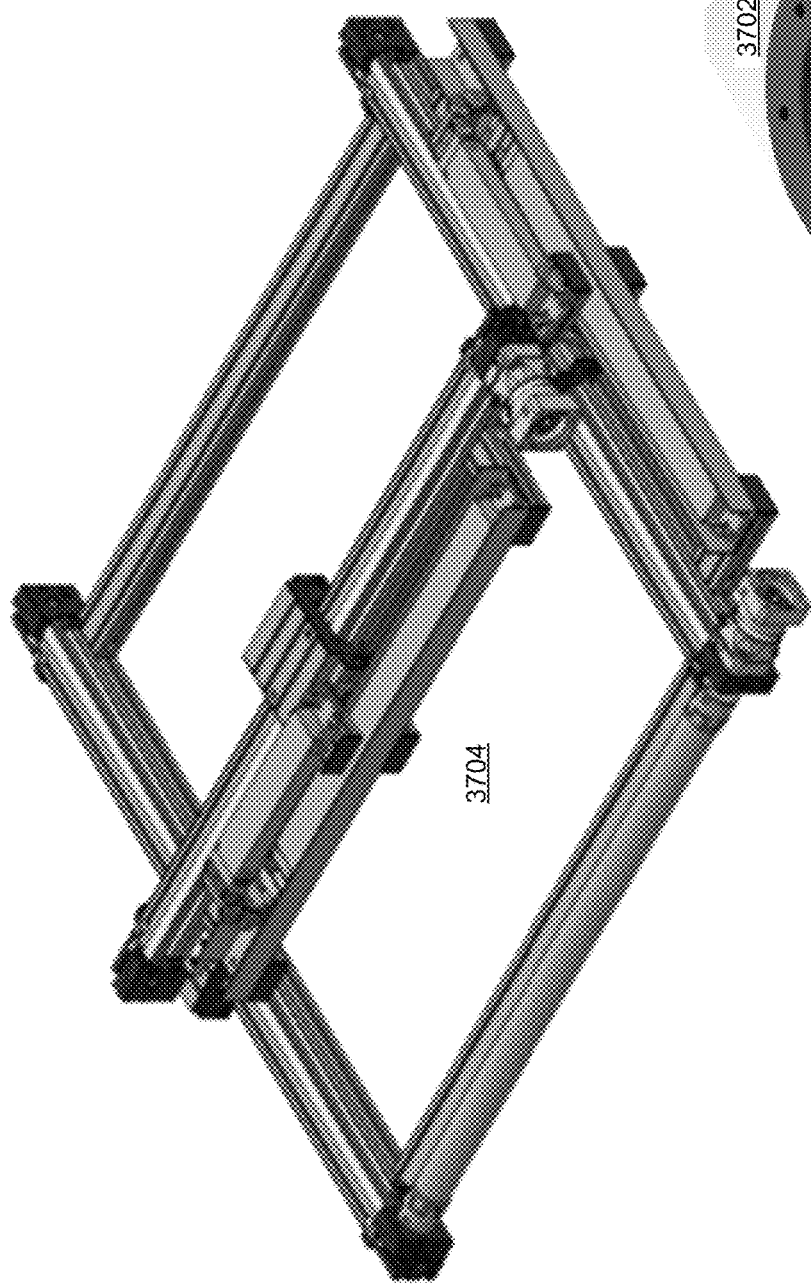
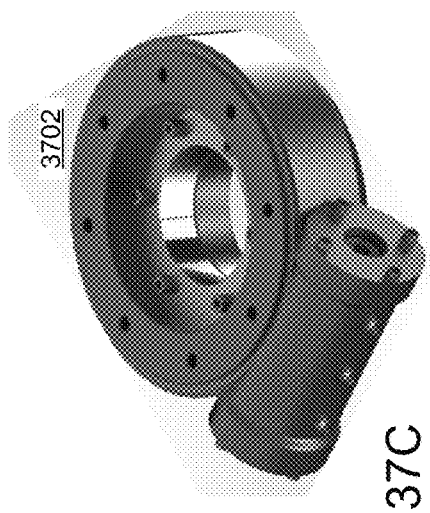
FIG. 37B
FIG. 37C

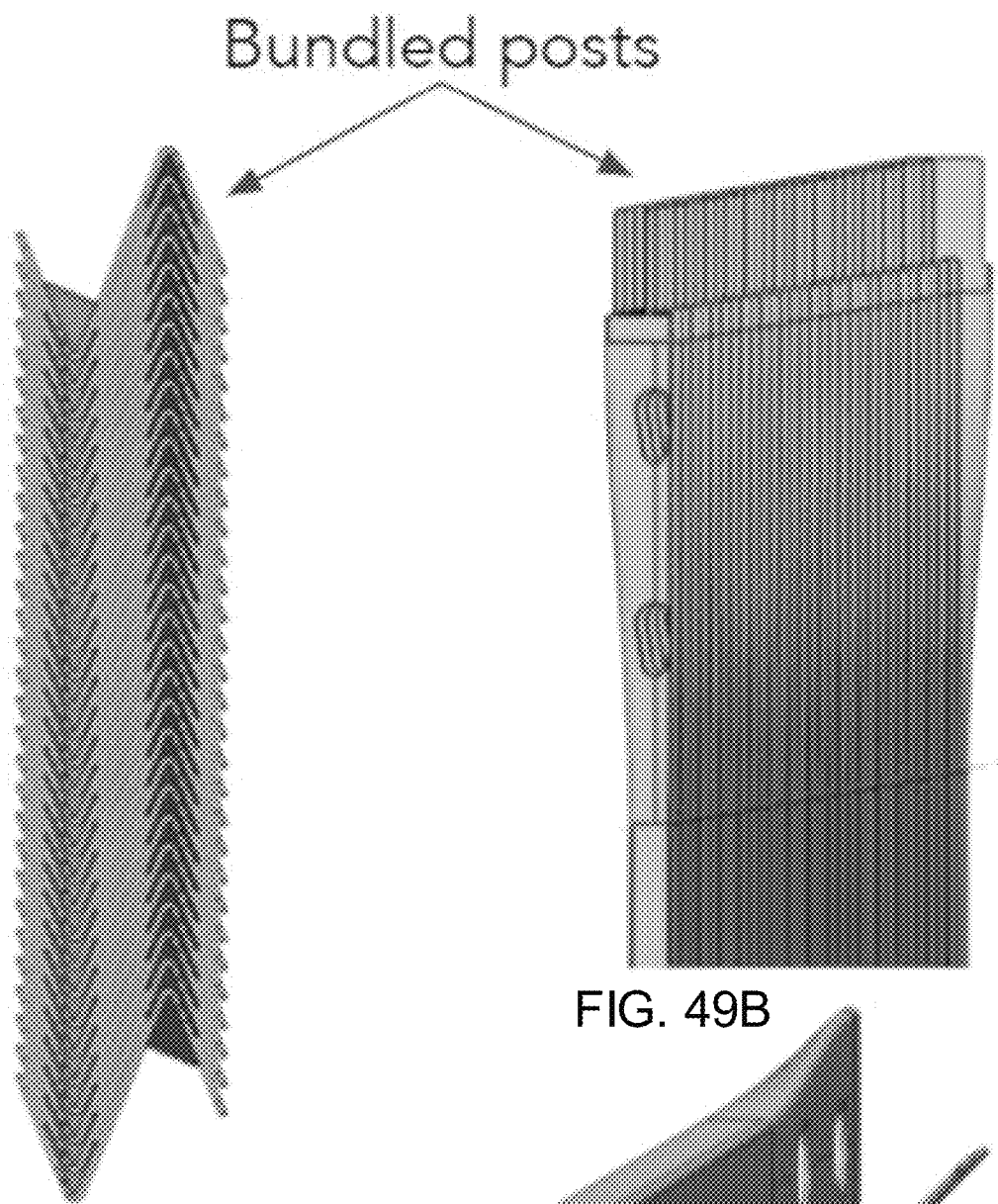
FIG. 49A
FIG. 49B
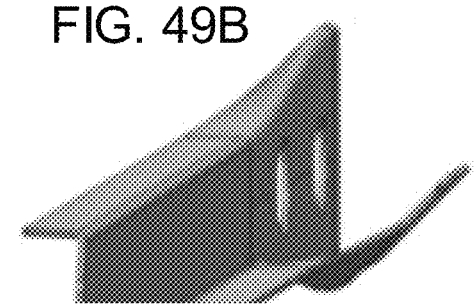
FIG. 49C

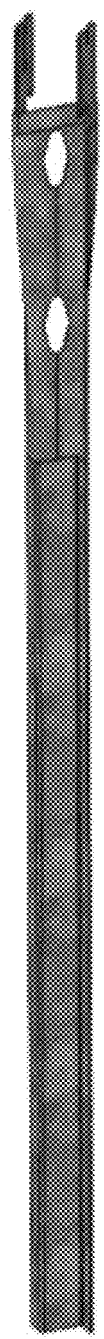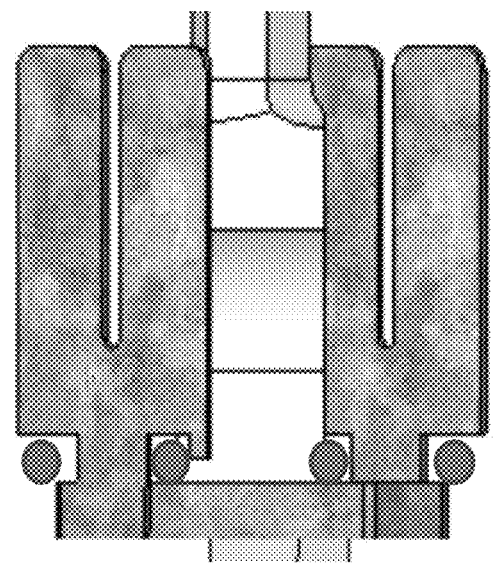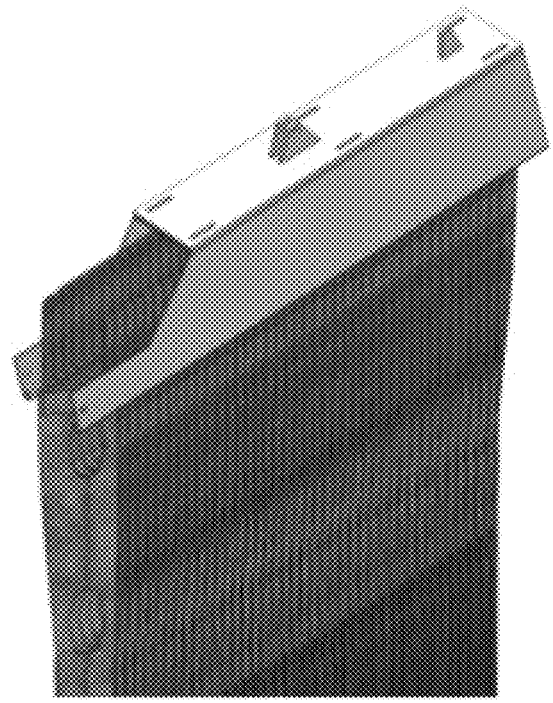
FIG. 50B
FIG. 50A  FIG. 50C

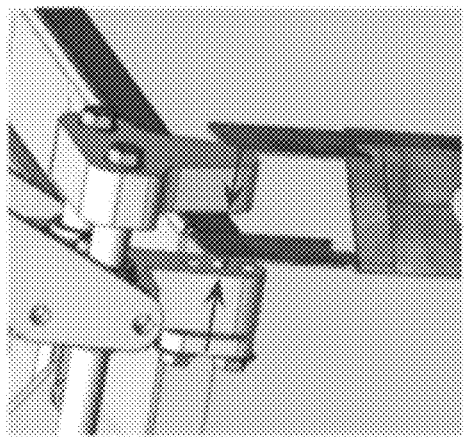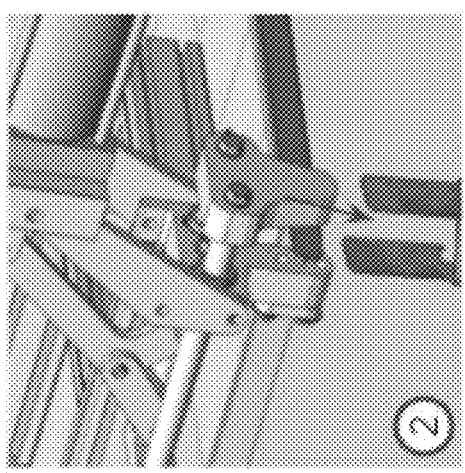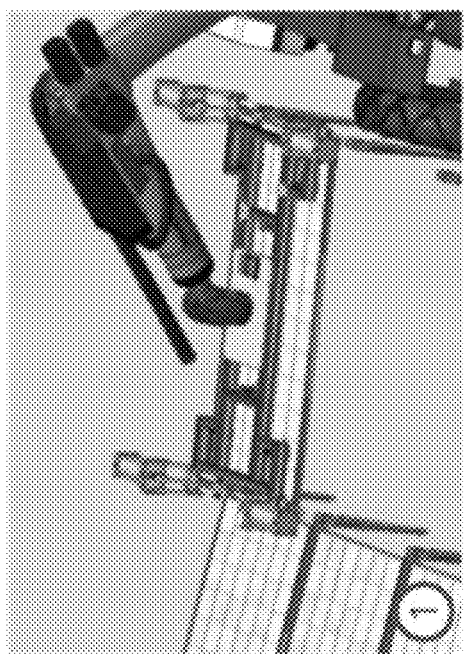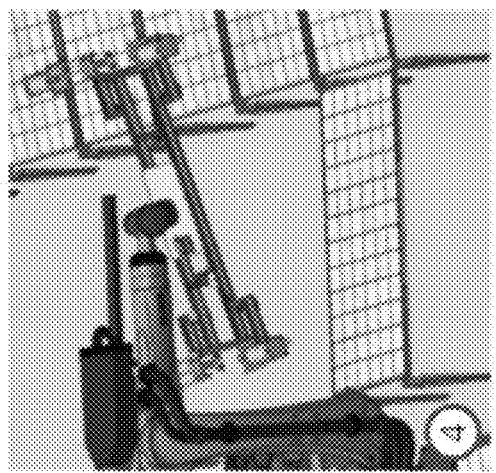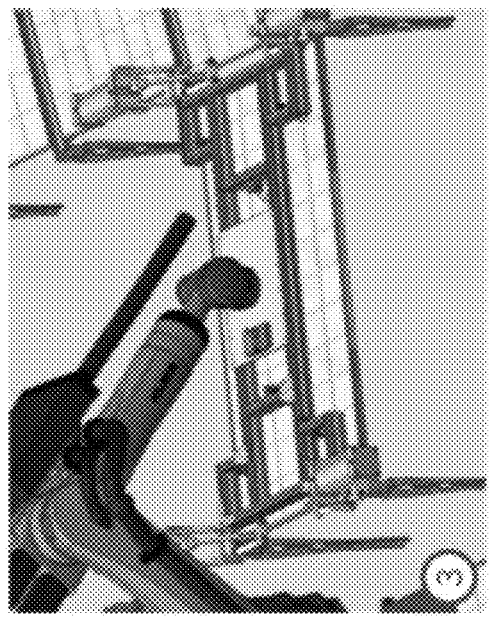
FIG. 52

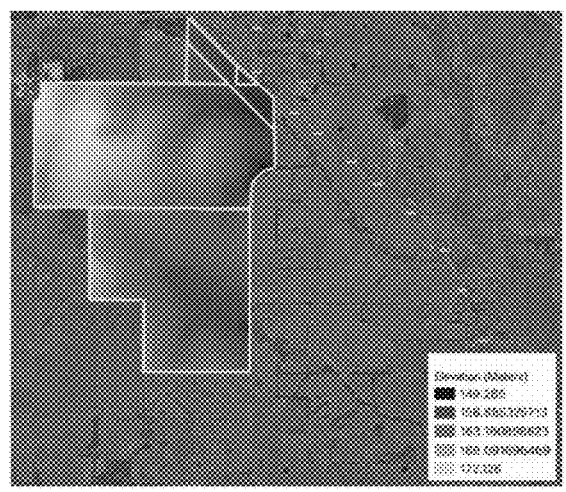
FIG. 54A
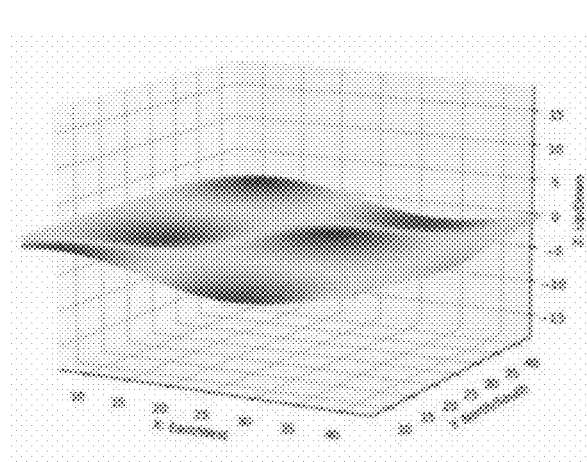 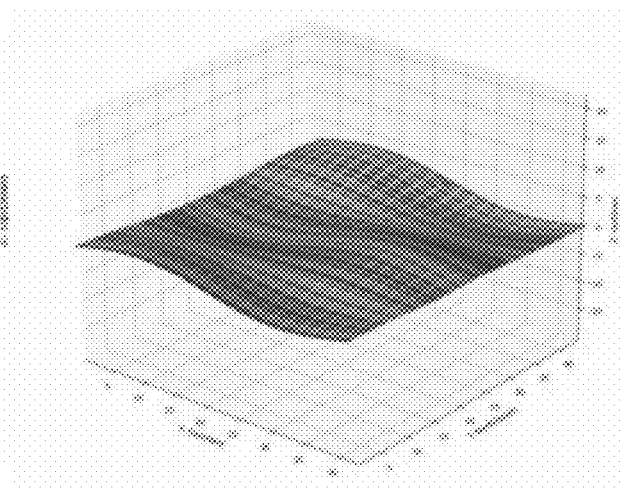
FIG. 54B FIG. 54C

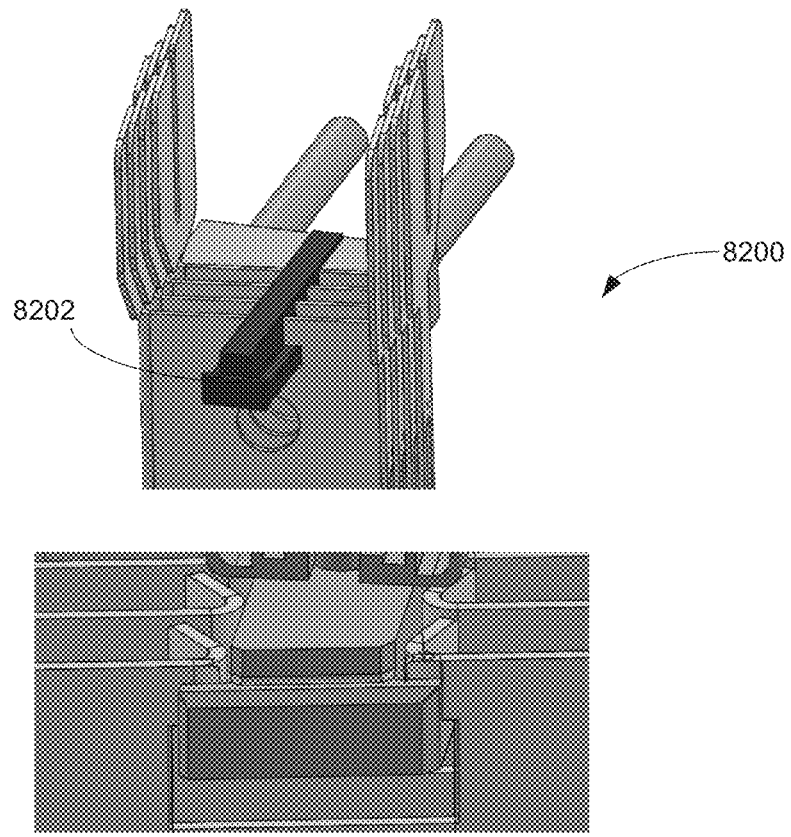
FIG. 82A
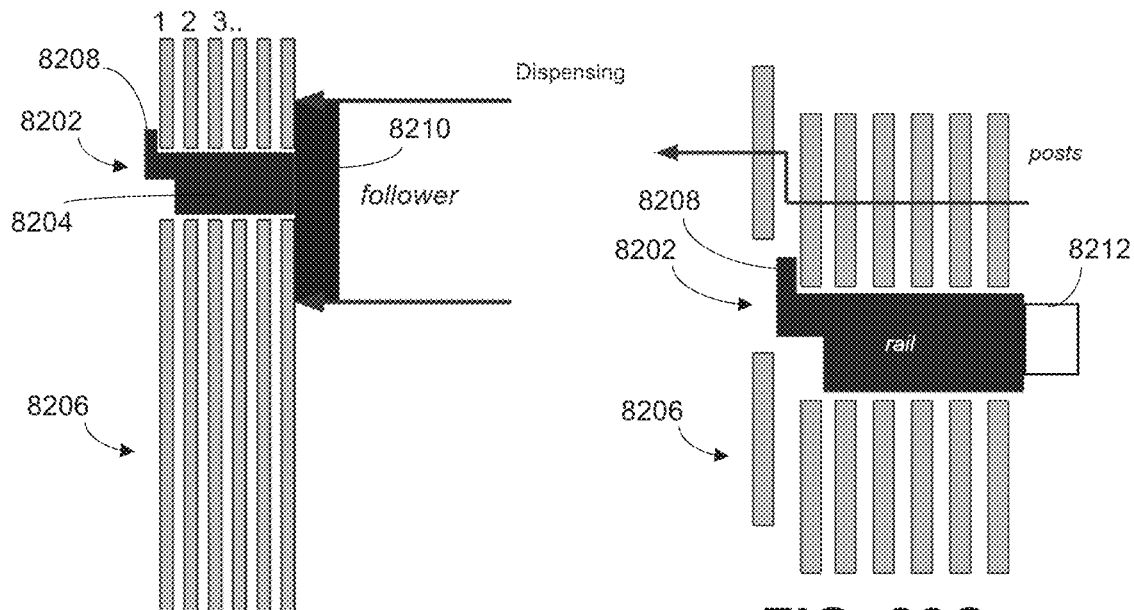
FIG. 82B
FIG. 82C

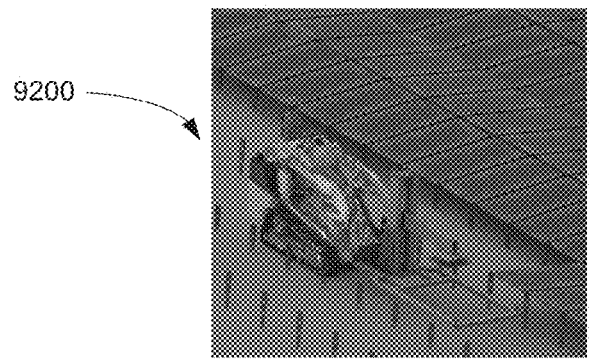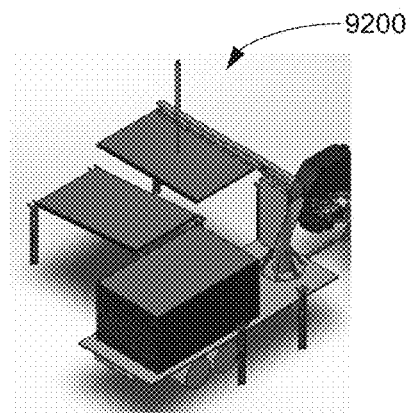
FIG. 93A  FIG. 93B
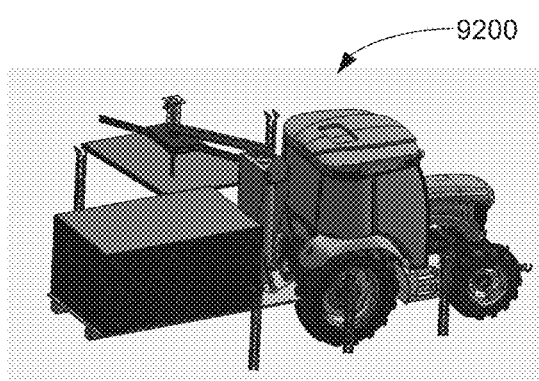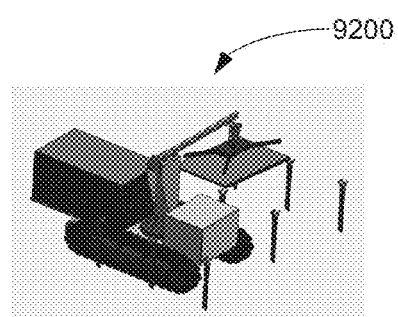
FIG. 93C  FIG. 93D

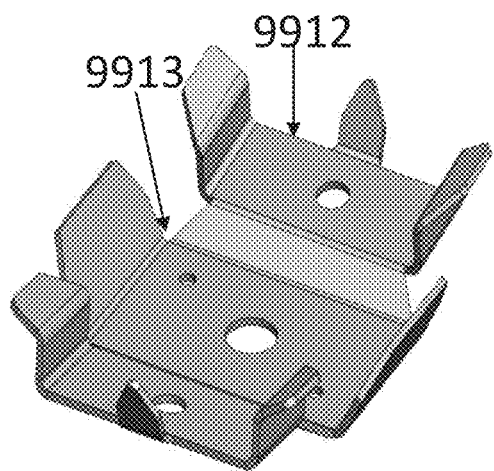
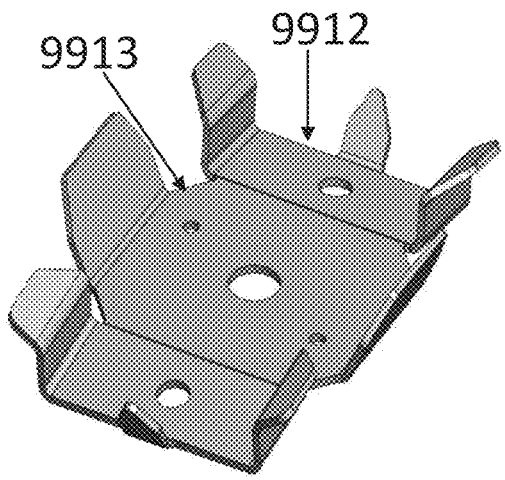
FIG. 99C  FIG. 99D
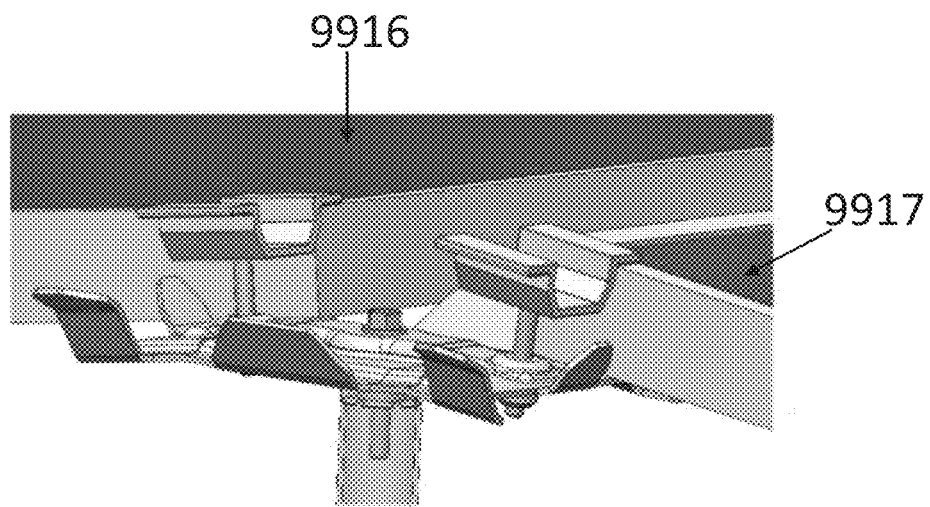
FIG. 99E

10000

10004
10003
10005

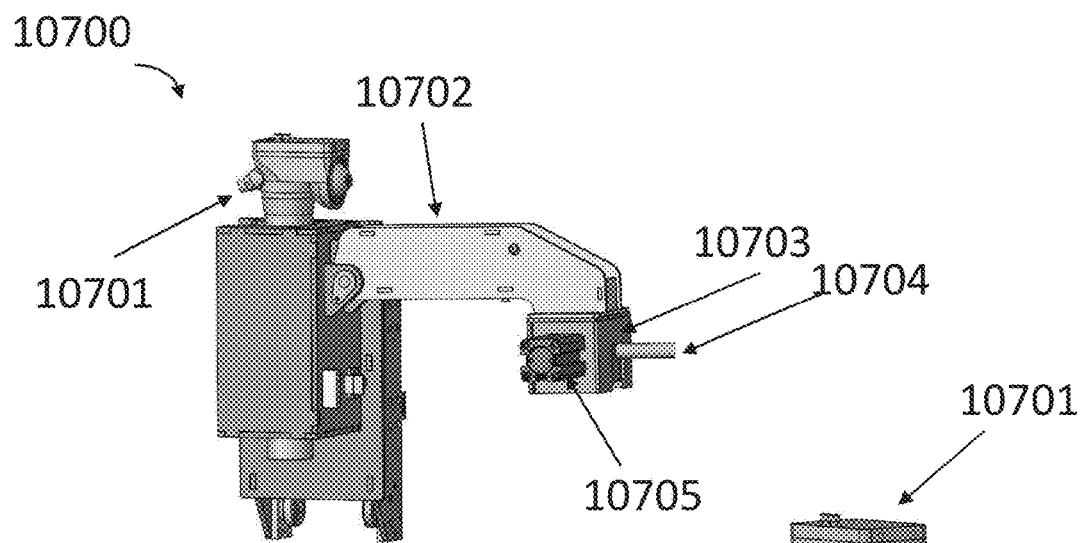
FIG. 107A
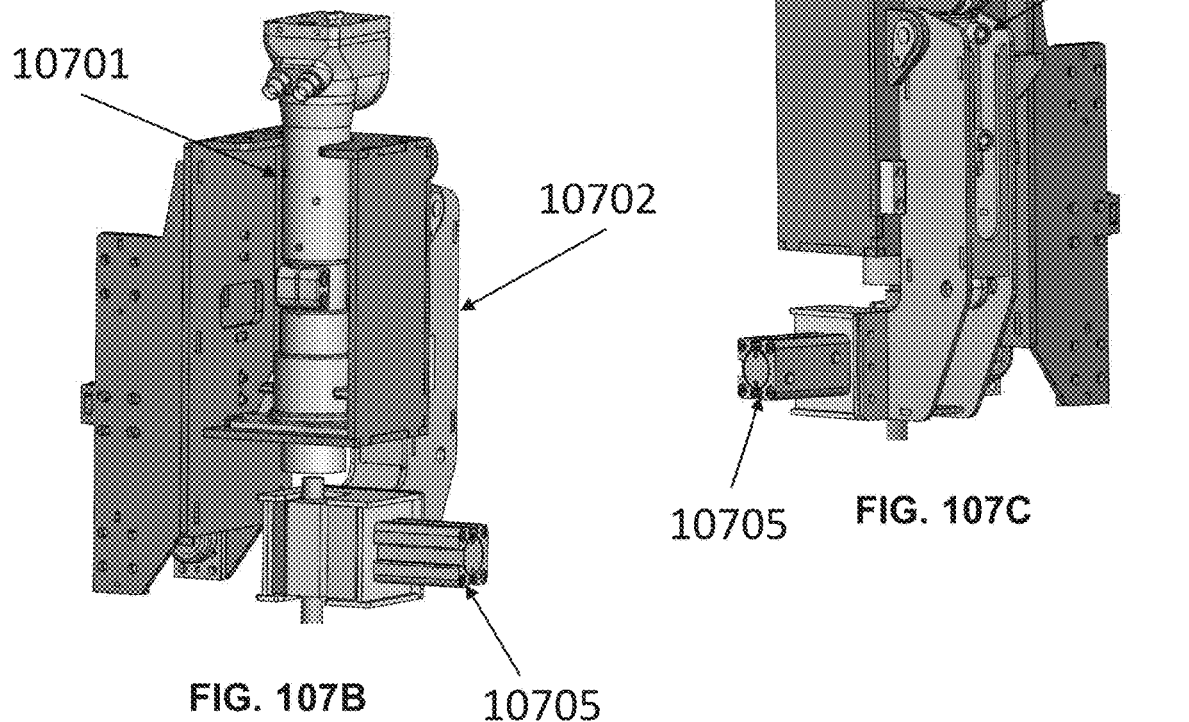
FIG. 107B
FIG. 107C

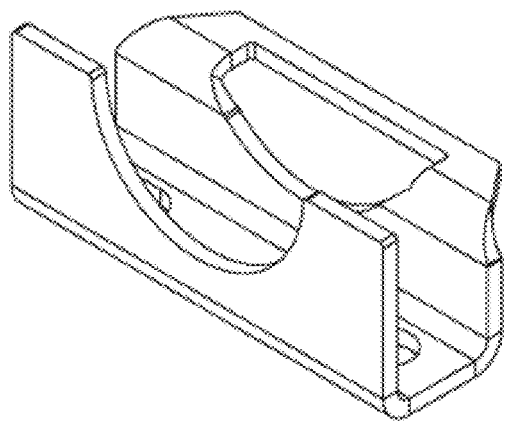 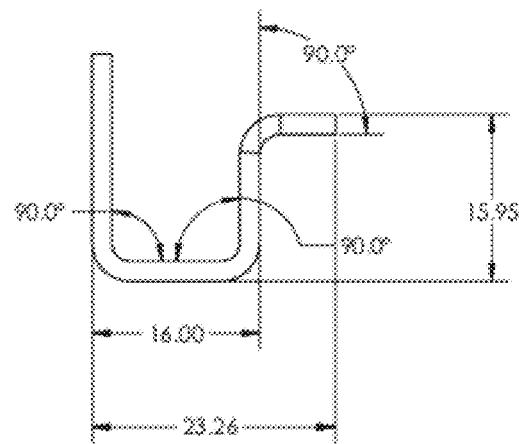
FIG. 119A                    FIG. 119B
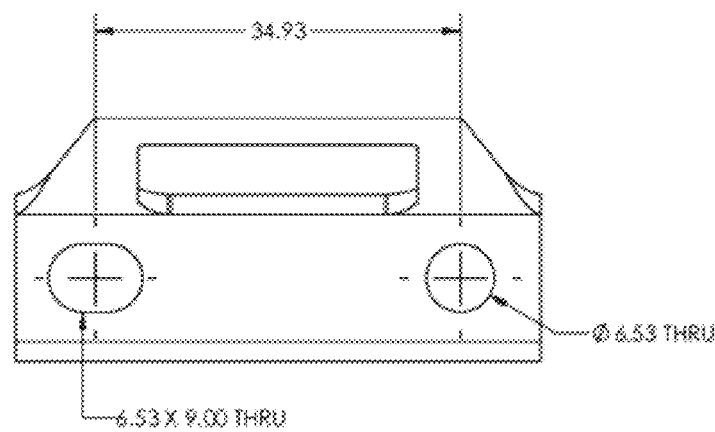
FIG. 119C
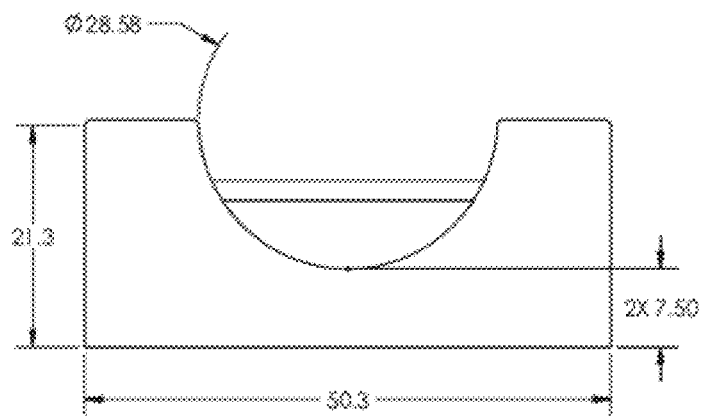
FIG. 119D

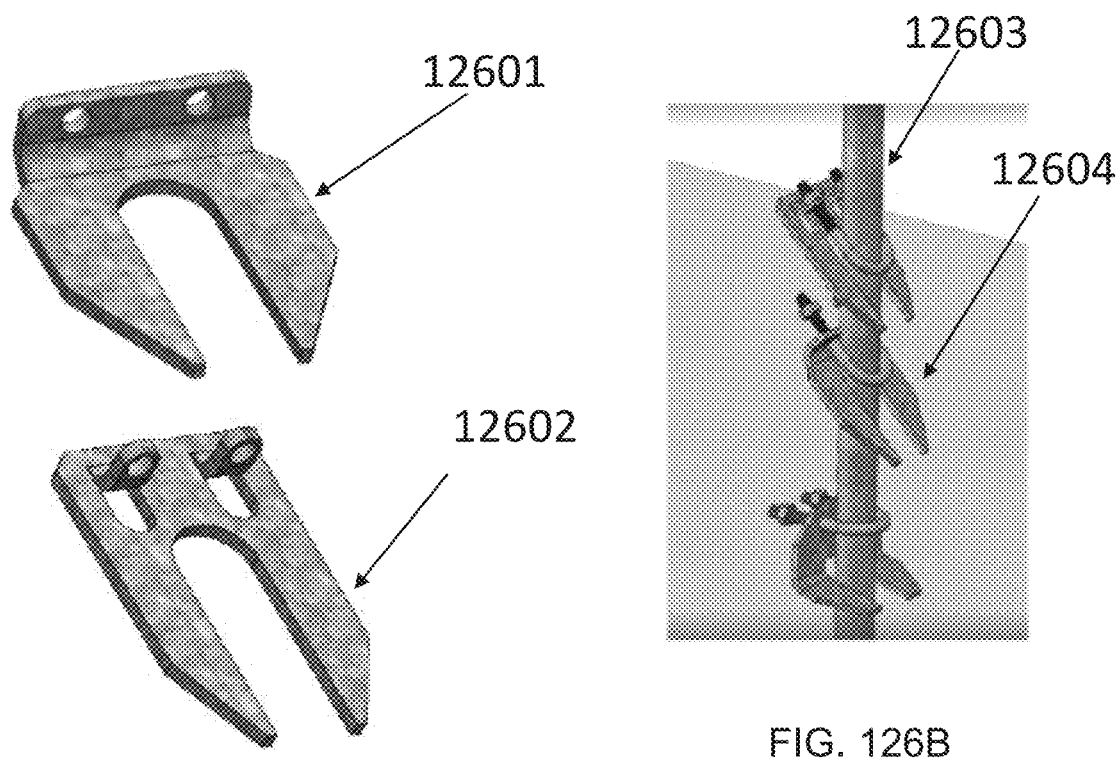
FIG. 126B
FIG. 126A
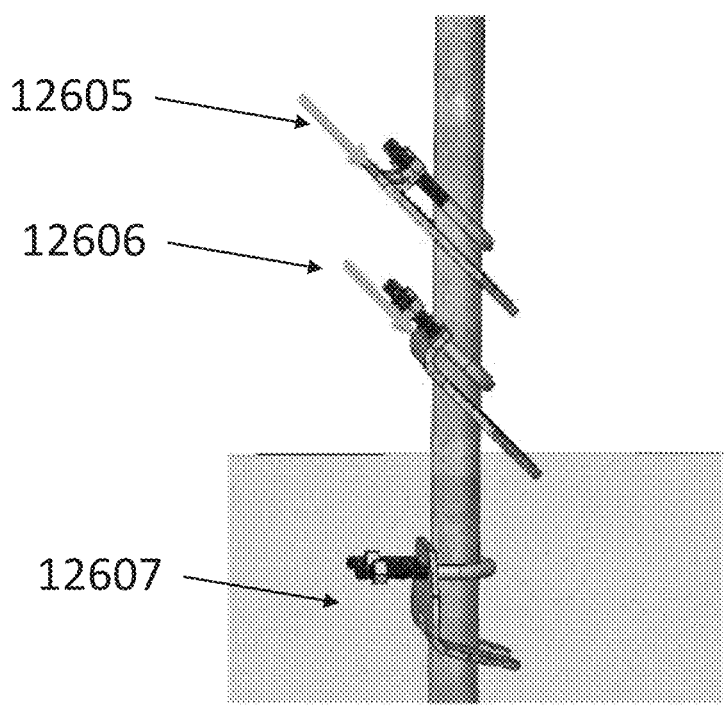
FIG. 126C

SYSTEMS AND METHODS FOR SOLAR MODULE ASSEMBLY

CROSS REFERENCE

This application claims the benefit of U.S. Provisional Application No. 63/661,449, filed Jun. 18, 2024, and U.S. Provisional Application No. 63/562,654, filed Mar. 7, 2024, each of which is entirely incorporated herein by reference.

BACKGROUND

With the recognition of the harmful effects of global warming, the generation of usable power from solar energy is gaining increased acceptance. Large areas of vacant land can offer an attractive location for the deployment of solar panels. However, such open area solar installations may be accompanied by significant effort in securing the solar panels to the ground in such a way that the solar panels are resistant to external loading forces such as wind. The creation of separate beam and post structures to accomplish this goal can also add significant costs to the installation of solar panels.

SUMMARY

Recognized herein is a need for methods and systems for high density solar module arrays, and high throughput post installation and rapid assembly of solar modules onto posts. The present disclosure provides systems and methods for post and solar module assembly.

In some aspects, the present disclosure provides a solar module array comprising: a plurality of solar modules; and a plurality of posts configured to support the plurality of solar modules, wherein at least one solar module of the plurality of solar modules is configured to be supported by two or more posts at a plurality of non-corner positions along a first longitudinal side of the at least one solar module.

In some embodiments, the first longitudinal side of the at least one solar module may comprise a first end and a second end. In some embodiments, the two or more posts may be located away from the first end and the second end. In some embodiments, the two or more posts may be located at least 1 inch away from the first end and the second end. In some embodiments, at least one post of the two or more posts may be located between the first end and a center of the first longitudinal side, and at least one additional post of the two or more posts may be located between the second end and the center of the first longitudinal side. In some embodiments, the at least one solar module may be configured to be further supported by two or more additional posts along a second longitudinal side of the at least one solar module. In some embodiments, the two or more additional posts may be spaced along the second longitudinal side away from a first end and a second end of the second longitudinal side. In some embodiments, the first longitudinal side and the second longitudinal side may be opposite to each other. In some embodiments, the first longitudinal side and the second longitudinal side may be substantially parallel to each other. In some embodiments, each solar module of the plurality of solar modules may be configured to be supported by at least two posts located on a first side of the solar module and at least two additional posts located on a second side of the solar module, wherein the first side and the second side correspond to different sides of the each solar module. In some embodiments, at least one post of the plurality of posts may be configured to support no more than two solar modules of the plurality of solar modules. In some embodiments, each post of the plurality of posts may be configured to support no more than two solar modules of the plurality of solar modules. In some embodiments, at least one post of the plurality of posts may be configured to support two solar modules of the plurality of solar modules.

In some embodiments, a post of the plurality of posts may be configured to be coupled to a solar module of the plurality of solar modules via a post-module interface. In some embodiments, the solar module array may comprise the post-module interface, and the post-module interface may be configured to align and contour the solar module of the plurality of solar modules to a terrain on which the solar module array is constructed. In some embodiments, the post-module interface may be configured to be connected to the post of the plurality of posts via a bolt. In some embodiments, the solar module array comprises a dual tilt array. In some embodiments, the solar module array may have a solar module density that is at least about 10% higher than a single tilt array. In some embodiments, the solar module array may have a ground coverage ratio of at least about 0.6. In some embodiments, the solar module array may have a peak spacing that ranges from about 1 inch to about 18 inches. In some embodiments, the solar module array may have a valley spacing that ranges from about 1 inch to about 18 inches. In some embodiments, the solar module array may comprise an east-west facing dual tilt array.

In some aspects, the present disclosure provides a solar module array, comprising a plurality of solar modules, wherein each solar module of the plurality of solar modules is supported by a weighted number of 2 or more posts.

In some aspects, the present disclosure provides a solar module array, comprising a plurality of solar modules and a plurality of posts, wherein each post of the plurality of posts that is installed at a non-side position of the solar module array supports no more than two solar modules of the plurality of solar modules.

In some aspects, the present disclosure provides a solar module array, comprising a plurality of solar modules and a plurality of posts, wherein each post of the plurality of posts that is installed at a non-side position of the solar module array supports no more than ½ of a solar module of the plurality of solar modules.

In some aspects, the present disclosure provides an apparatus comprising a conveyance unit and a dispensing unit. The conveyance unit may be configured to support and transport a plurality of posts. The dispensing unit may be configured to dispense one or more posts among the plurality of posts from the conveyance unit, for installation onto a terrain.

In some aspects, the present disclosure describes a carrier comprising a rail and a follower. The rail may be configured to support a plurality of posts, wherein the rail may comprise a gate located at a distal portion of the rail. The gate may be configured to prevent the plurality of posts from sliding off the rail. The follower may be configured to move or press the plurality of posts along the rail towards or against the gate. The gate and the follower may be configured to enable each post of the plurality of posts to be sequentially removable from the distal portion of the rail for installation onto a terrain.

In some aspects, the present disclosure describes a system comprising a post installation machine. The post installation machine may comprise an extraction device configured to remove the one or more posts from the carrier for installation onto the terrain.

In some aspects, the present disclosure describes a post installation machine comprising a load driving mechanism and a positioning device. The load driving mechanism may comprise a load head configured to drive one or more posts onto a terrain. The positioning device may be configured to control a location of the load head in three or more degrees of freedom relative to the one or more posts and an altitude of the terrain, prior to the one or more posts being driven onto the terrain.

In some aspects, the present disclosure describes an apparatus comprising a compliant mechanism. The compliant mechanism may be operably coupled to a distal portion of a movable arm. The compliant mechanism may be configured to (1) pick up one or more solar modules from a plurality of solar modules and (2) place the one or more solar modules onto a plurality of posts that have been installed onto a terrain. The compliant mechanism may be further configured to rotate and/or flex relative to the movable arm during placement of the one or more solar modules onto the plurality of posts.

In some aspects, the present disclosure provides a method for constructing an array of solar modules, comprising: (a) autonomously positioning a plurality of posts over a terrain; and (b) autonomously assembling a plurality of solar modules with the plurality of posts over the terrain, thereby constructing the array of solar modules, wherein the plurality of posts comprises a row of posts wherein two adjacent posts in the row of posts are each tilted toward one another, wherein a third post adjacent to the two adjacent posts is tilted away.

In some embodiments, the array may comprise a dual tilt array. In some embodiments, a solar module of the plurality of solar modules may be coupled to a post of the plurality of posts via a post-module interface. In some embodiments, the post-module interface may comprise a substantially non flat surface such that an angle between the module and the post is variable. In some embodiments, the post-module interface may comprise a plurality of tabs. In some embodiments, the plurality of tabs may be bendable or deformable. In some embodiments, the post-module interface may comprise a non-flat pivot feature. In some embodiments, the method may comprise tilting a solar module via the non-flat pivot feature. In some embodiments, the plurality of posts may be installed at alternating angles. In some embodiments, the two adjacent posts may be installed at a first angle and a second angle relative to a vertical axis, and the third post may be installed at a third angle. In some embodiments, the first, the second, and the third angles may be substantially same. In some embodiments, at least two of the first, the second, and the third angles may be different.

In some aspects, the present disclosure provides a method for constructing an array of solar modules, comprising: (a) autonomously positioning a plurality of posts over a terrain; and (b) autonomously assembling a plurality of solar modules with the plurality of posts over the terrain, thereby constructing the array of solar modules, wherein a solar module of the plurality of solar modules is supported by variable number of posts.

In some embodiments, a side of the solar module may be supported by at least three posts. In some embodiments, a side of the solar module may be supported by at least four posts. In some embodiments, the array may comprise a dual tilt array. In some embodiments, the solar module of the plurality of solar modules may be coupled to a post of the plurality of posts via a post-module interface. In some embodiments, the post-module interface may comprise a substantially non flat surface such that an angle between the module and the post is variable. In some embodiments, the post-module interface may comprise a plurality of tabs. In some embodiments, the plurality of tabs may be bendable or deformable. In some embodiments, the post-module interface may comprise a non-flat pivot feature. In some embodiments, the method may comprise tilting a solar module via the non-flat pivot feature. In some embodiments, the plurality of posts may be installed at alternating angles.

In some aspects, the present disclosure provides a method for solar module assembly, comprising (a) providing an algorithm configured to identify a location for autonomous positioning and assembly of a plurality of posts and a plurality of solar modules; and (b) creating a set of executable software instructions for controlling one or more mobile platforms to autonomously position and assemble the plurality of posts and the plurality of solar modules over a terrain to construct an array of solar modules without requiring aid or involvement from a user.

In some embodiments, the method may comprise using a digital surface model of the terrain to determine the location. In some embodiments, the method may comprise determining a location of a post by the algorithm that uses the post-clip interface angles. In some embodiments, the method may comprise using the algorithm to minimize a depth of a post. In some embodiments, the method may comprise using a digital surface model of the terrain to minimize the depth of the post. In some embodiments, the algorithm may use soil properties. In some embodiments, the algorithm may use the array geometry and tolerances. In some embodiments, the method may comprise exporting or displaying an output of the algorithm in a digital representation. In some embodiments, the method may comprise using the digital representation to modify the location of the post or module based on a measurement of a nearby post or module. In some embodiments, the method may comprise using the digital representation to predict an electrical power produced by the array. In some embodiments, the method may comprise using the digital representation to predict the components required in the array. In some embodiments, the method may comprise using the digital representation to create construction plan drawings. In some embodiments, the method may comprise using the digital representation to generate an analysis for construction operations. In some embodiments, the method may comprise comprising providing a graphic user interface (GUI) configured to display an output of the algorithm. In some embodiments, the method may comprise displaying a digital representation of an output of the algorithm on the GUI. In some embodiments, the method may comprise using a sensor to record data of the terrain, a post, and/or module. In some embodiments, the method may comprise displaying the recorded data in a digital representation. In some embodiments, the method may comprise modifying the algorithm and/or a digital surface model of the terrain based on the recorded data.

In some embodiments, the present disclosure provides a design software to design, optimize, engineer, and/or build high density arrays. In some embodiments, the design software may be in communication with an installation machinery (e.g., post installer and/or module installer). In some embodiments, the design software can comprise information with user tools to accomplish one or more tasks. In some embodiments, the one or more tasks may comprise design and terrain analysis, construction planning, and/or build directions.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings (also "Figure" and "FIG." herein), of which:

FIG. 10 shows main tolerances of concern for a ground mount installation.

FIG. 16 shows a simplified view showing a corner of four modules that join to one post.

FIG. 37B shows an enlarged view of a gantry. FIG. 37C shows an enlarged view of a rotational gear.

FIGS. 49A-49C show posts, in accordance with some embodiments.

FIGS. 50A-50C show coupling mechanisms between posts and a rack, in accordance with some embodiments.

FIG. 52 illustrates a method for autonomously positioning and assembling solar modules, in accordance with some embodiments.

FIGS. 54A-54C illustrates a method for determining a landscape topology for positioning and assembling solar modules, in accordance with some embodiments.

FIGS. 82A-82C illustrate an example of a magazine and rail system of the conveyer apparatus, in accordance with some embodiments.

FIGS. 93A-93D illustrate different example configurations of the module installation machine, in accordance with some embodiments.

FIG. 99C shows an exemplary configuration of a bracket, in accordance with some embodiments. FIG. 99D shows another exemplary configuration of a bracket, in accordance with some embodiments. FIG. 99E shows two adjacent solar modules 9916 and 9917 that are not on the same flat surface, in accordance with some embodiments.

FIG. 107A shows an exemplary post pounder, in accordance with some embodiments. FIG. 107B shows a post pounder configuration after a post is gripped and transported to a vertical position, in accordance with some embodiments. FIG. 107C shows a perspective view of a post pounder configuration after a post is gripped and transported to a vertical position, in accordance with some embodiments.

FIGS. 119A-119D show an isometric view, side view, back side view, and front side view of a muffler clamp.

FIG. 120A shows a solar module array that the posts are coupled to the corner positions of the solar modules. FIG. 120B shows a solar module array with posts coupled to sides of the solar modules.

FIG. 121 shows an exemplary solar module array with reinforcement devices 12103 and 12104 installed at the base of two posts.

FIG. 122A shows an exemplary reinforcement device. FIG. 122B shows an exemplary reinforcement device that is installed on a post and onto the ground.

Figure 123A:
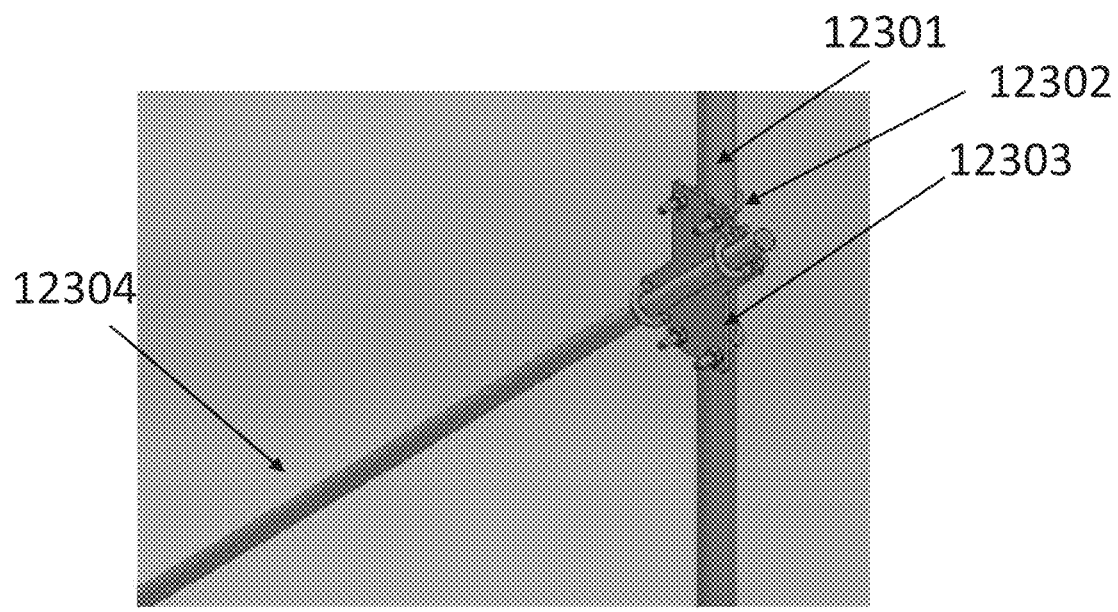
Figure 123B:
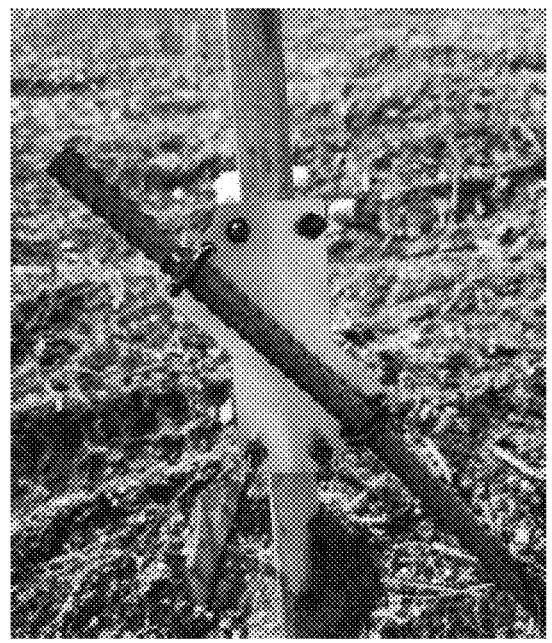
Figure 123C:
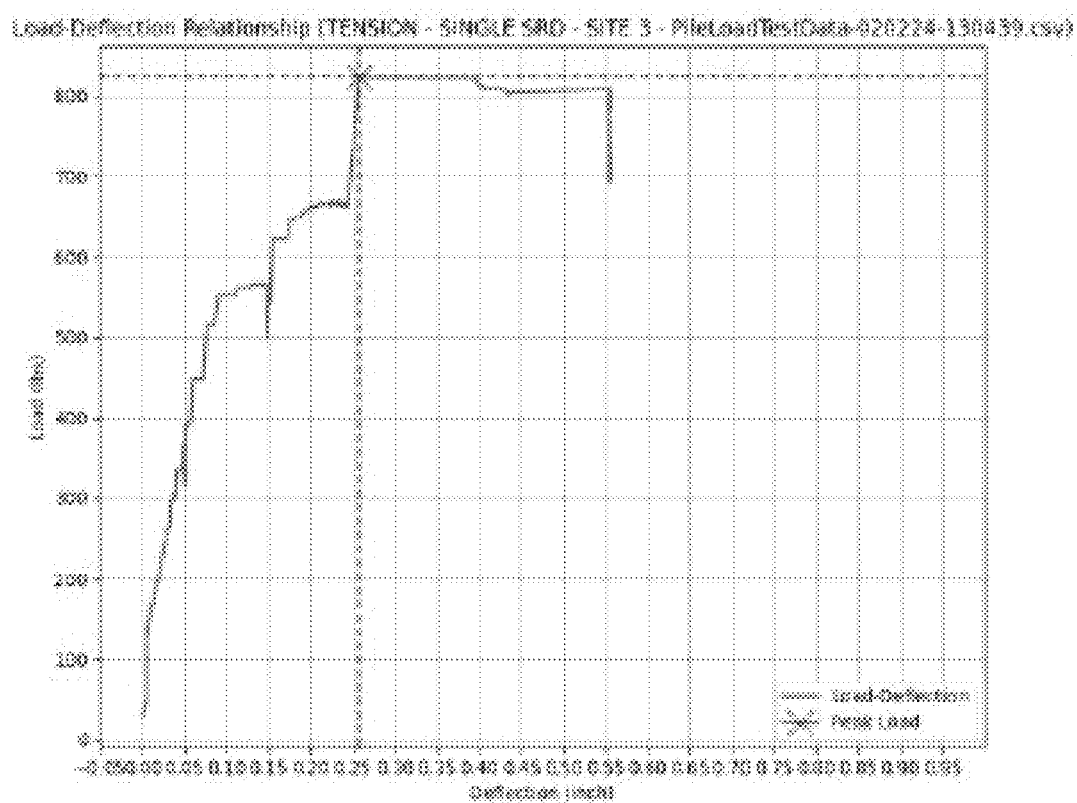
Figure 123D:
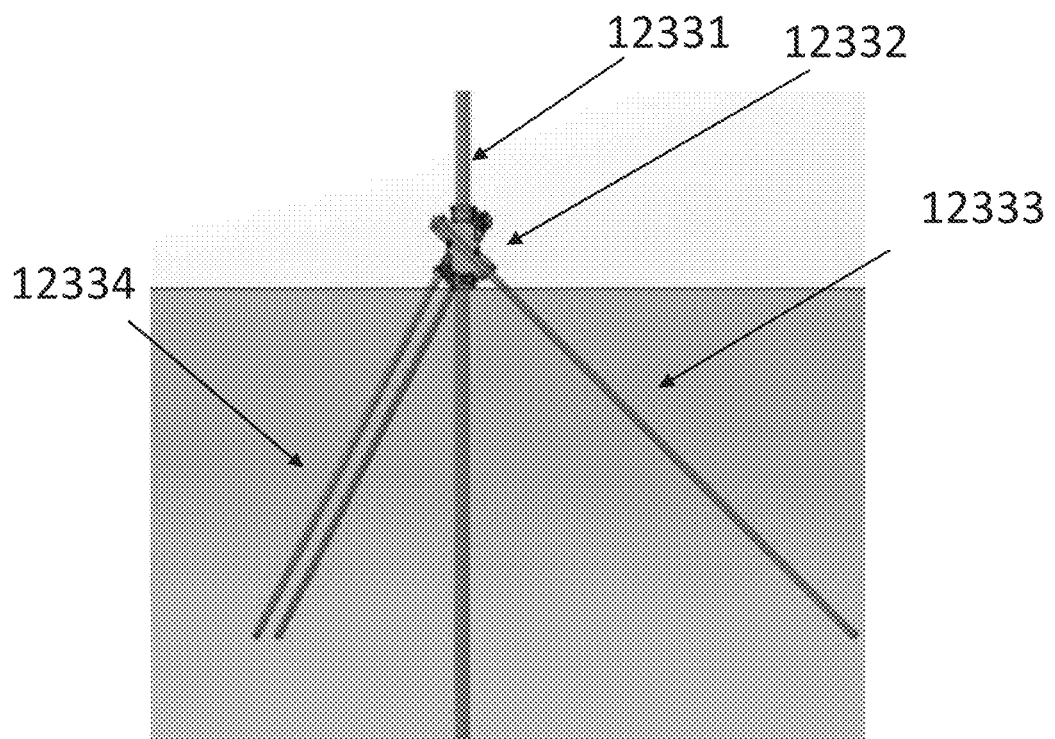
Figure 123E:
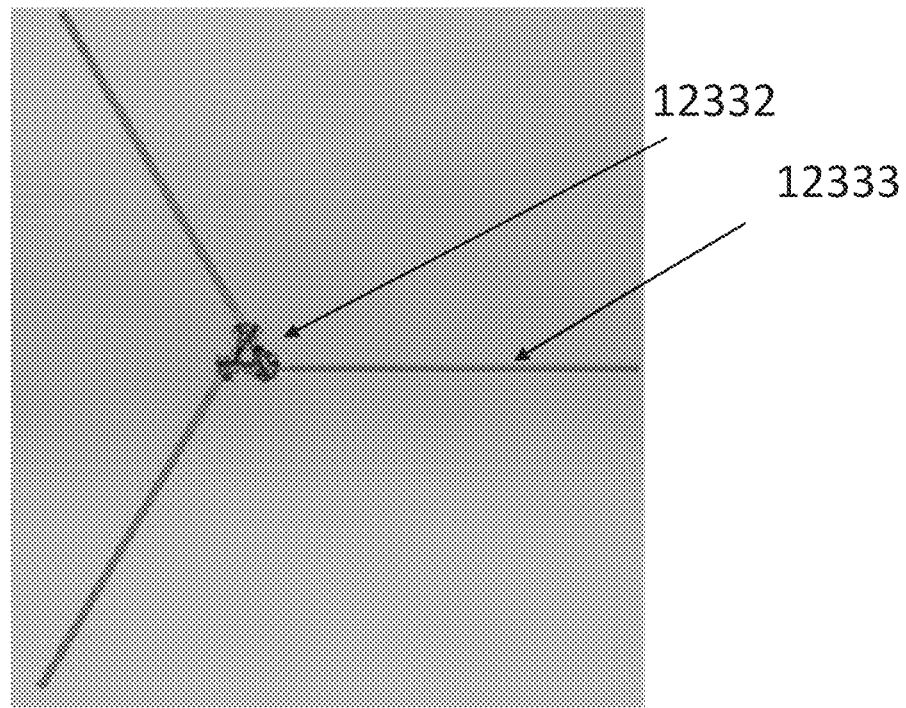
Figure 123F:
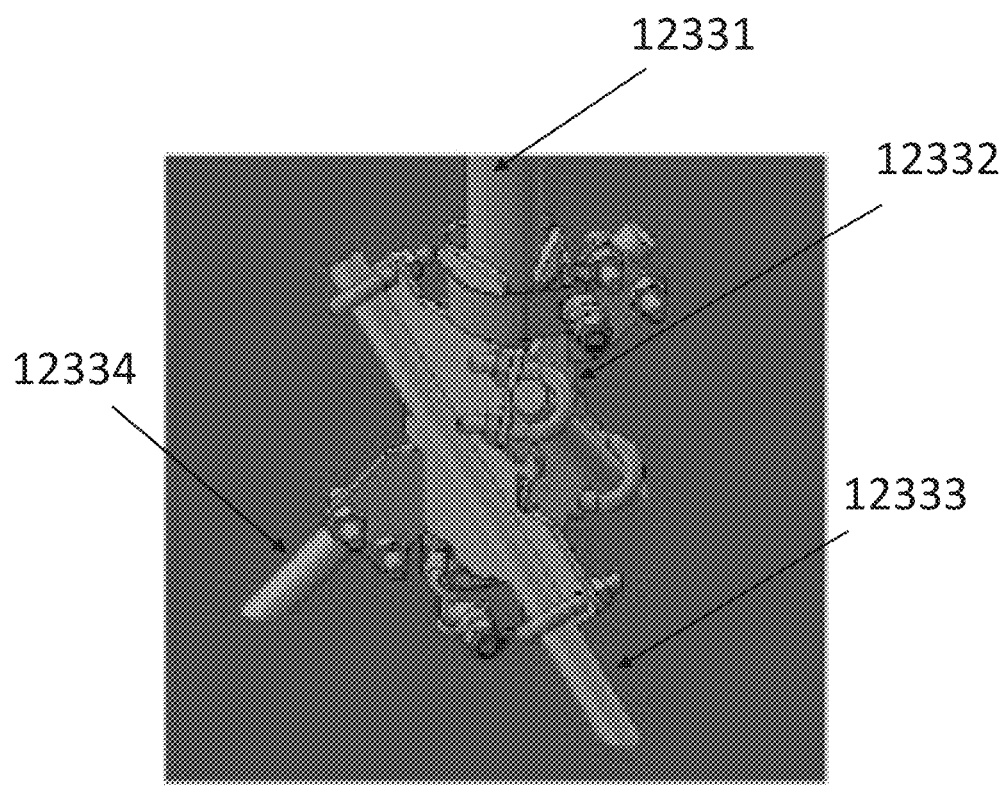
Figure 123G:

FIG. 123A shows an exemplary reinforcement device or structural repair device (SRD). FIG. 123B shows an image of an exemplary SRD that is installed on a post and onto the ground. FIG. 123C shows the increased force capability of the post and SRD structure. FIG. 123D shows an exemplary SRD with three rods. FIG. 123E shows a top view of the SRD of FIG. 123D. FIG. 123F shows an expanded view of the SRD of FIG. 123D. FIG. 123G shows an image of an exemplary SRD that is installed on a post and onto the ground.

Figure 124A:
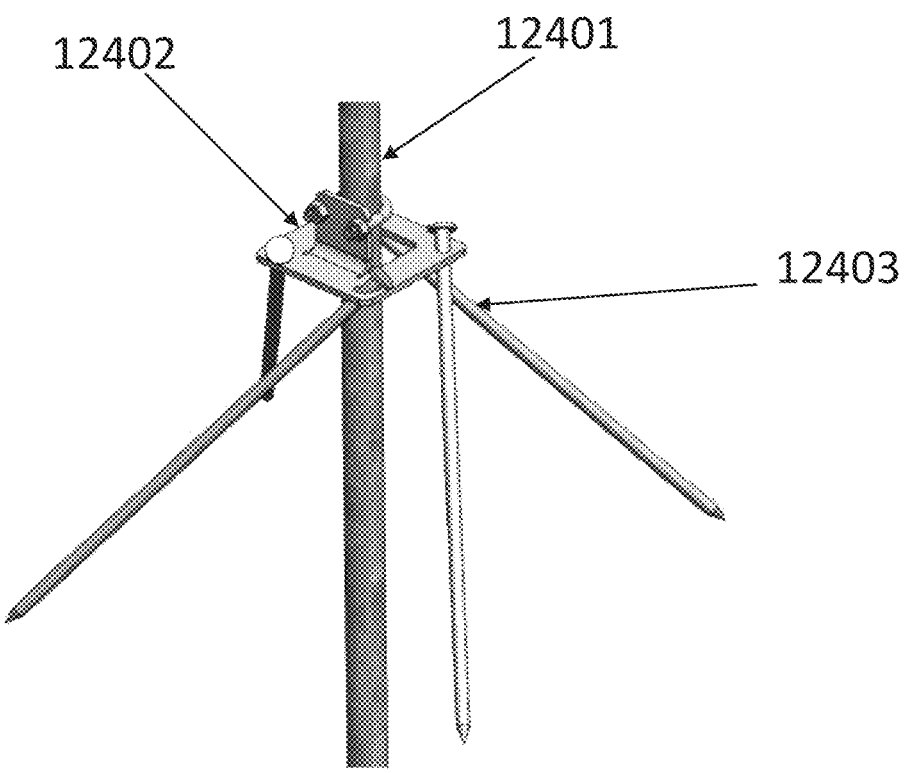
Figure 124B:
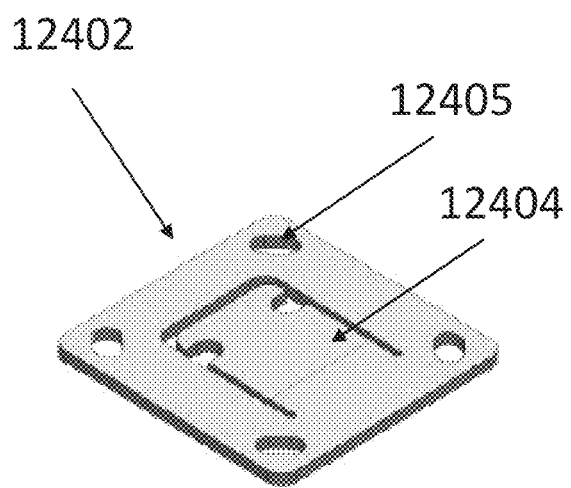
Figure 124C:
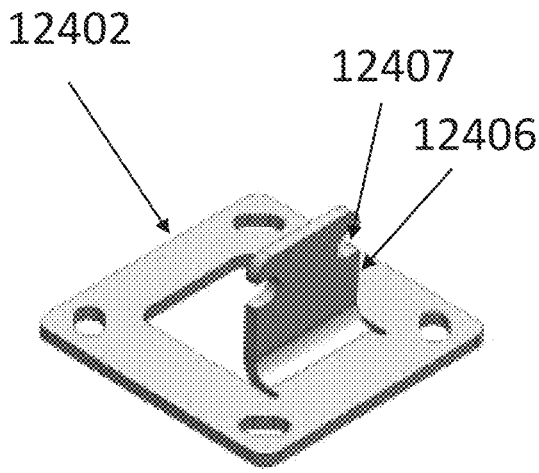
Figure 124D:
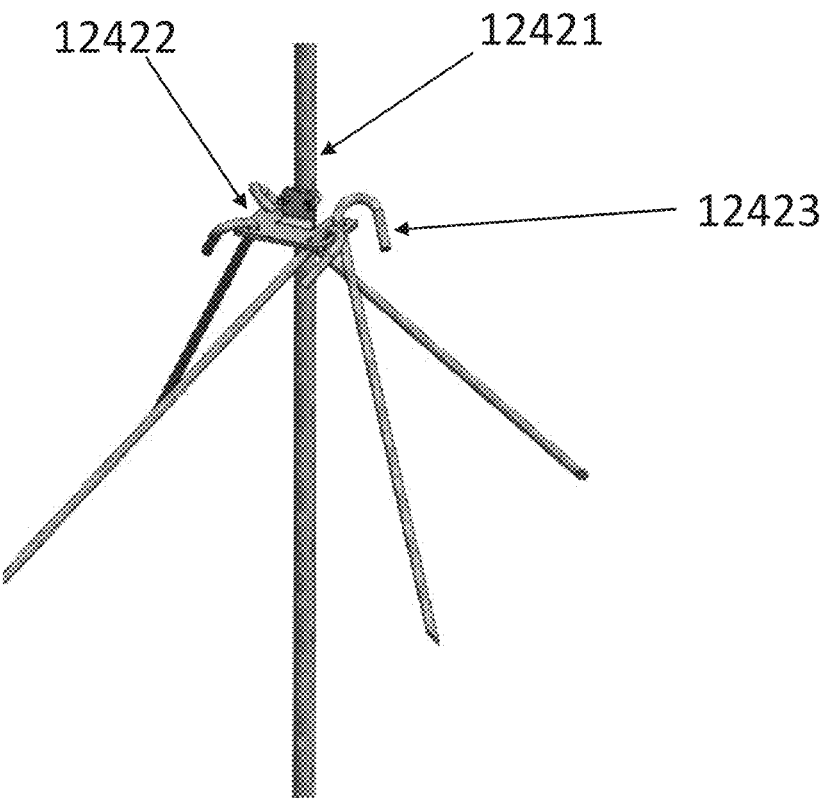
Figure 124E:
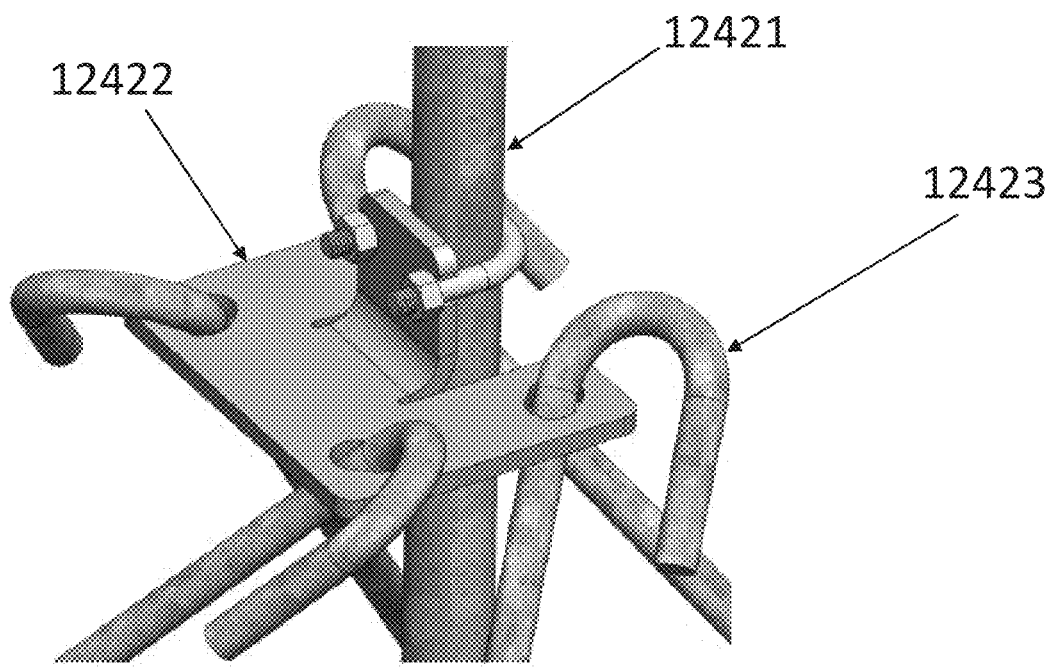

FIG. 124A shows an exemplary reinforcement device with a horizontal bracket. FIGS. 124B and 124C show exemplary reinforcement devices with a tab. FIG. 124D shows another exemplary reinforcement device with a horizontal bracket. FIG. 124E shows an expanded view of the reinforcement device of FIG. 124D that is installed on the post.

Figure 125A:
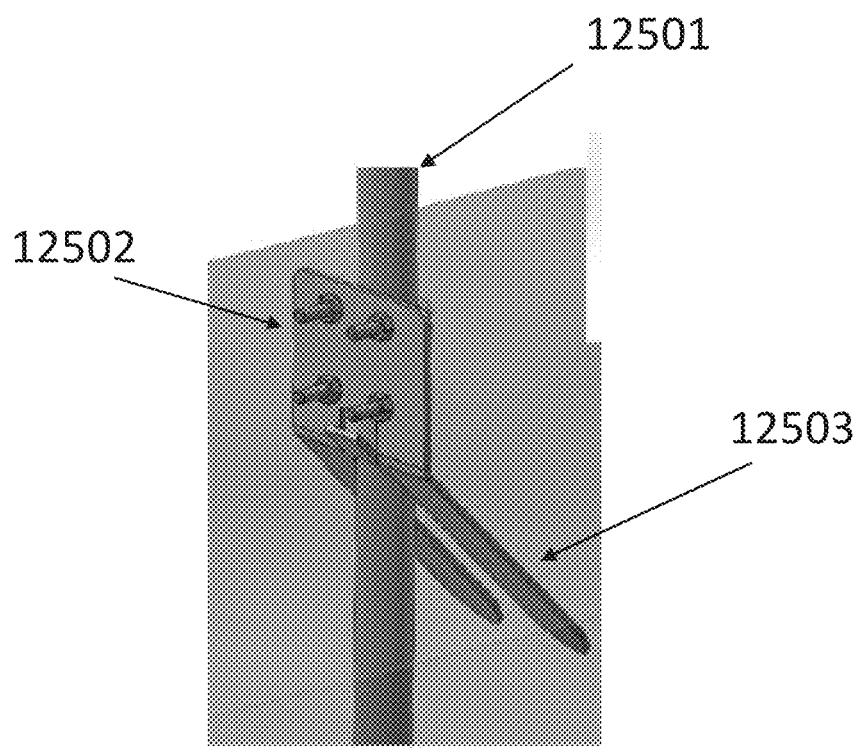
Figure 125B:
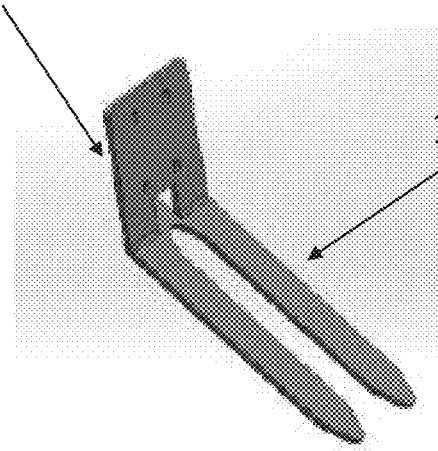
Figure 125C:
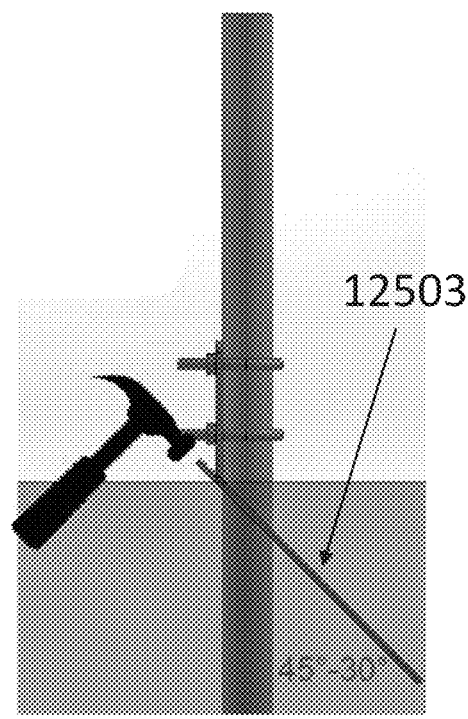

FIG. 125A shows an exemplary reinforcement device with tabs. 125B shows a perspective view of the reinforcement device of FIG. 125A. FIG. 125C shows a side view of the reinforcement device of FIG. 125A.

FIG. 126A shows exemplary reinforcement devices with tabs 12601 or 12602. FIG. 126B shows the reinforcement devices installed on a post 12603. FIG. 126C shows a side view of the installed reinforcement device.

DETAILED DESCRIPTION

While various embodiments of the disclosure have been shown and described herein, it will be obvious to those skilled in the art that such embodiments are provided by way of example only. Numerous variations, changes, and substitutions may occur to those skilled in the art without departing from the disclosure. It should be understood that various alternatives to the embodiments of the disclosure described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The term "real time" or "real-time," as used interchangeably herein, generally refers to an event (e.g., an operation, a process, a method, a technique, a computation, a calculation, an analysis, a visualization, an optimization, etc.) that is performed using recently obtained (e.g., collected or received) data. In some cases, a real time event may be performed almost immediately or within a short enough time span, such as within at least 0.0001 millisecond (ms), 0.0005 ms, 0.001 ms, 0.005 ms, 0.01 ms, 0.05 ms, 0.1 ms, 0.5 ms, 1 ms, 5 ms, 0.01 seconds, 0.05 seconds, 0.1 seconds, 0.5 seconds, 1 second, or more. In some cases, a real time event may be performed almost immediately or within a short enough time span, such as within at most 1 second, 0.5 seconds, 0.1 seconds, 0.05 seconds, 0.01 seconds, 5 ms, 1 ms, 0.5 ms, 0.1 ms, 0.05 ms, 0.01 ms, 0.005 ms, 0.001 ms, 0.0005 ms, 0.0001 ms, or less.

In an aspect, the present disclosure provides systems and methods for handling and deploying energy modules. The energy modules may comprise a solar module (or module or solar panel, as used interchangeably) or a plurality of solar modules. The solar modules may comprise a deployable device that is configured to generate energy using one or more resources. In some cases, the one or more resources may comprise solar energy, heat energy, radiation energy, or any other type of energy.

In an aspect, the present disclosure provides a method for handling or deploying a solar module. The method may comprise using at least one robot to position and install at least one supporting structure, e.g., at least one post, fully autonomously. The method may comprise using at least one robot to fully autonomously position and assemble (i) at least one solar module and (ii) its supporting structure, e.g., at least one post, at a sensed geolocation, without aid from a user. In some cases, a plurality of robots may be used to autonomously position and deploy, install, and/or assemble a plurality of solar modules and/or one or more supporting structures for the plurality of solar modules.

In some cases, a robot may refer to any machine capable of performing one or more tasks. In some cases, the robot may perform the one or more tasks autonomously (e.g., without human intervention or without external intervention from another entity) or semi-autonomously (e.g., with minimal external supervision, instruction, or intervention).

In some cases, a task may comprise transporting various components to be used for deploying an energy module as disclosed herein, for example, an energy module or a post. In some cases, a task may comprise installing various components for building an energy module disclosed herein, for example, installing a post on the ground or connecting an energy module to a given post. In some cases, a task may comprise handling and deploying an energy module.

In some cases, the robot may comprise one or more movable members. In some cases, the movable members may comprise an arm or an end effector. The movable members may be configured to handle, move, or deploy the energy modules.

In some cases, the robot may comprise one or more energy storage devices (e.g., a battery). In some cases, the one or more energy storage devices may be chargeable by a renewable energy system. In some embodiments, one or more electric charging stations may be provided and distributed across a terrain for enabling charging of one or more robots. The one or more robots may comprise, for example, a mobile platform, a vehicle, or any other machine as described elsewhere herein. In some embodiments, the one or more electric charging stations can be mobile. In such cases, the electric charging stations may be configured to travel to a robot or vehicle that needs to be charged. In other embodiments, the one or more electric charging stations can be stationary. In such cases, one or more robots or vehicles may be configured to travel to the one or more electric charging stations for charging.

In some cases, the robot may comprise a vehicle. In some cases, the vehicle may comprise one or more wheels, one or more legs, or any other member configured to transport the robot on flat or non-flat terrain. In some cases, the vehicle may be autonomous. In some cases, the vehicle may be semi-autonomous.

In some cases, the robot may comprise one or more sensors. In some cases, the robot may comprise one or more vision sensors. In some cases, the robot may perform a task based at least in part on information provided through the one or more sensors, e.g., vision sensors.

In some cases, the robot may comprise one or more computers, processors, or logic circuits in operable communication with one or more computers, processors, or logic circuits of another robot, or one or more servers (e.g., a cloud server).

Figure 4A:
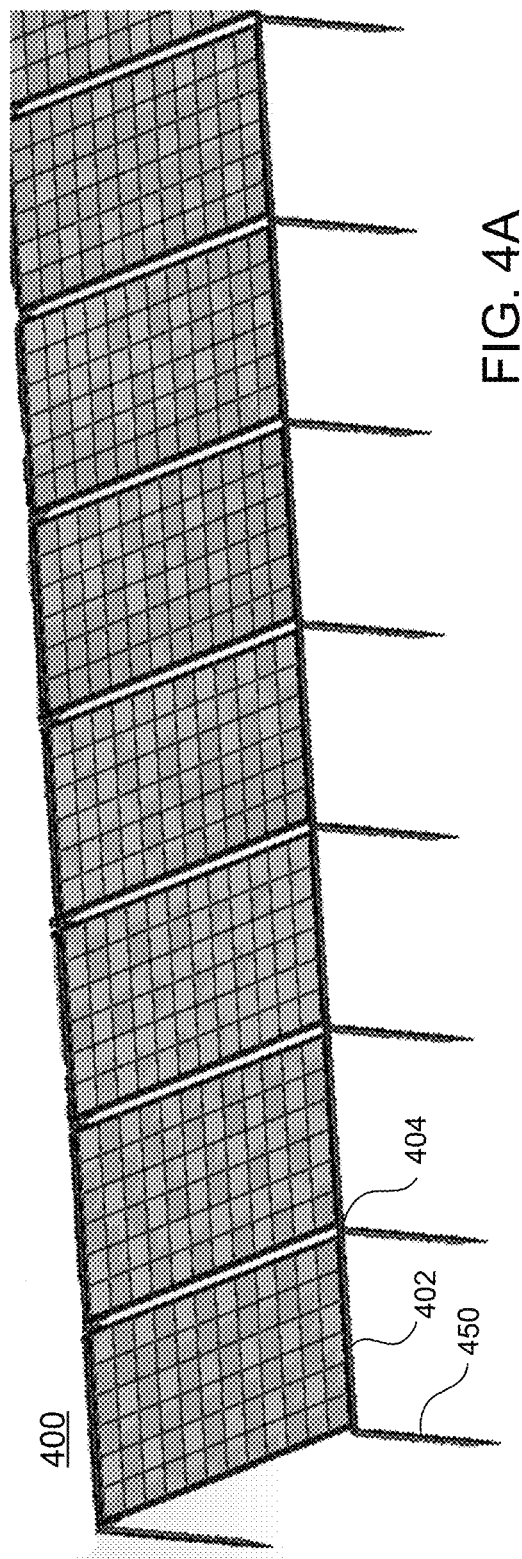
FIG. 4A shows a perspective view of a ground mount system according to an embodiment.

In some cases, a plurality of robots may be used to autonomously position and deploy supporting structures, e.g., a plurality of posts configured to support the plurality of solar modules. The solar modules may be affixed to one or more posts. FIG. 4C shows an enlarged view of a post 450 according to some embodiments. In some cases, the post may comprise a flat top interface 452 to offer a clinching surface for the clip. In some cases, the post may comprise any suitable cross section shape. In some cases, the post may comprise a cross section shape of circular, triangular, hexagonal, pentagonal, rectangular, or square. In some cases, the post may comprise a top surface. In some cases, the top surface may be flat. In some cases, the top surface may be non-flat. In some cases, a post-module interface (e.g., a bracket) may be coupled to or connected to the post. In some cases, the post may be fabricated from sheet metal (e.g., provided in a coil). In some cases, a lower portion of the post may include a sawtooth pattern 454 that is cut to impart resistance from being pulled out from the ground. In some cases, a lower portion of the post may not include a sawtooth pattern. In some non-limiting embodiments, the post may have a length ranging from about 1 foot (ft) or 0.30 meters (m) to about 10 ft (or 3.05 m). In some cases, the post may have a portion above the ground surface. In some cases, the post may have an additional portion projecting into the ground. In some embodiments, the portion above the ground surface may be about ⅙ to about ⅔ of the length of the post. In some embodiments, the portion projecting into the ground surface may be about ⅓ to about ⅚ of the length of the post. In some cases, an exemplary post may be about 3 ft (or 0.91 m) long, with 1 ft (or 0.30 m) exposed out of ground, and 2 ft (or 0.61 m) projecting into the ground. In some cases, an exemplary post may be about 10 ft (or 3.05 m) long, with about 3 ft (or 0.91 m) to 5 ft (or 1.52 m) exposed out of ground, and 5 ft (or 1.52 m) to 7 ft (or 2.13 m) projecting into the ground. In some cases, an exemplary post may be about 10 ft (or 3.05 m) long, with about 4 ft (or 1.22 m) exposed out of ground, and 6 ft (or 1.83 m) projecting into the ground.

In some embodiments, the post may comprise a pointed end 456 for efficient driving into the ground, e.g., by (hydraulic) pushing. In some cases, the degree of tapering of this end can be determined to accommodate the shape of a corresponding tip of a next post in the coil, thereby conserving sheet metal material and reducing cost. In some cases, the degree of tapering may be determined based on the hardness, softness, or density of the ground. In some cases, the degree of tapering may be from about 5° to about 60°.

In some cases, the presently disclosed embodiments may allow for vertical adjustment of the dimension of the post protruding above ground. In some cases, the vertical adjustment may be accomplished by pushing deeper or by adding an upper attachment to increase post height.

In some embodiments, a post supporting the solar module can be at a corner of the solar module. In some embodiments, a post supporting the solar module can be at a side (e.g., edge) of the solar module. In some cases, a post supporting the solar module can be along a longitudinal side of the solar module. In some embodiments, a post supporting the solar module can be at a non-corner and non-edge position of the solar module. In some embodiments, a solar module can be supported by at least 2, at least 3, at least 4, at least 5, or more posts at one side of the solar module. In some embodiments, a solar module can be supported by at least 2, at least 3, at least 4, at least 5, at least 6, at least 7, at least 8, at least 9, at least 10, at least 15, at least 20, or more posts.

In an aspect, the present disclosure provides a solar module array. In some cases, the solar module array can comprise a plurality of solar modules and a plurality of posts configured to support the plurality of solar modules. In some cases, at least one solar module of the plurality of solar modules may be supported by two or more posts at a plurality of non-corner positions along a first longitudinal side of the at least one solar module.

In some cases, the first longitudinal side of the at least one solar module may comprise a first end and a second end. In some cases, the two or more posts may be located away from the first end and the second end. In some cases, the two or more posts may not be located at the first end and/or the second end. In some cases, the two or more posts may be located at least about 0.5 inch (in) away from the first end and the second end. In some cases, the two or more posts may be located at least about 1 inch (in) away from the first end and the second end. In some cases, the two or more posts may be located at least about 2 in, at least about 3 in, at least about 4 in, at least about 5 in, at least about 6 in, at least about 7 in, at least about 8 in, at least about 9 in, at least about 10 in, at least about 11 in, at least about 12 in, or more, away from the first end and the second end.

In some cases, at least one post of the two or more posts may be located between the first end and a center of the first longitudinal side, and at least one additional post of the two or more posts may be located between the second end and the center of the first longitudinal side. In some cases, the solar module may be coupled to or connected to one or more additional posts along the first longitudinal side. In some cases, the one or more additional posts may be located at an end, a center, or between an end and a center along the first longitudinal side.

In some cases, the at least one solar module may be further supported by two or more additional posts along a second longitudinal side of the at least one solar module. In some cases, the two or more additional posts may be spaced along the second longitudinal and at a plurality of non-corner positions. In some cases, the two or more additional posts may be spaced along the second longitudinal side away from a first end and a second end of the second longitudinal side. In some cases, the second longitudinal side of the at least one solar module may comprise a first end and a second end. In some cases, the two or more posts along the second longitudinal side may not be located at the first end and/or the second end of the second longitudinal side. In some cases, the two or more posts along the second longitudinal side may be located away from the first end and the second end of the second longitudinal side. In some cases, the two or more posts along the second longitudinal side may be located at least about 0.5 inch (in) away from the first end and the second end of the second longitudinal side. In some cases, the two or more posts along the second longitudinal side may be located at least about 1 inch (in) away from the first end and the second end of the second longitudinal side. In some cases, the two or more posts may be located at least about 2 in, at least about 3 in, at least about 4 in, at least about 5 in, at least about 6 in, at least about 7 in, at least about 8 in, at least about 9 in, at least about 10 in, at least about 11 in, at least about 12 in, or more, away from the first end and the second end of the second longitudinal side. In some cases, at least one post of the two or more additional posts may be located between the first end and a center of the second longitudinal side, and at least one additional post of the two or more additional posts may be located between the second end and the center of the second longitudinal side. In some cases, the solar module may be coupled to or connected to one or more additional posts along the second longitudinal side. In some cases, the one or more additional posts along the second longitudinal side may be located at an end, a center, or between an end and a center along the second longitudinal side. In some cases, the first longitudinal side and the second longitudinal side may be opposite to each other. In some cases, the first longitudinal side and the second longitudinal side may be substantially parallel to each other. In some cases, the first longitudinal side and the second longitudinal side may not be parallel to each other.

In some cases, each solar module of the plurality of solar modules may be supported by at least two posts located on a first side of the solar module and at least two additional posts located on a second side of the solar module. In some cases, at least about 1%, at least about 5%, at least about 10%, at least about 20%, at least about 30%, at least about 40%, at least about 50%, at least about 60%, at least about 70%, at least about 80%, at least about 90%, at least about 95%, or more, of the solar module of the plurality of solar modules may be supported by at least two posts located on a first side of the solar module and at least two additional posts located on a second side of the solar module.

In some cases, the first side and the second side may correspond to different sides of the solar module. In some cases, the first side and the second side may correspond to different sides of the each solar module. In some cases, the first side and the second side may be substantially parallel to each other. In some cases, the first side and the second side may not be parallel to each other.

In some cases, each solar module of the plurality of solar modules may be supported by at least two posts located at a plurality of non-corner positions on the first side and at least two additional posts located at a plurality of non-corner positions on the second side. In some cases, at least about 1%, at least about 5%, at least about 10%, at least about 20%, at least about 30%, at least about 40%, at least about 50%, at least about 60%, at least about 70%, at least about 80%, at least about 90%, at least about 95%, or more, of the solar module of the plurality of solar modules may be supported by at least two posts located at a plurality of non-corner positions on the first side and at least two additional posts located at a plurality of non-corner positions on the second side.

In some cases, at least one post of the plurality of posts may be configured to support no more than two solar modules of the plurality of solar modules. In some cases, each post of the plurality of posts may be configured to support no more than two solar modules of the plurality of solar modules. In some cases, at least about 1%, at least about 5%, at least about 10%, at least about 20%, at least about 30%, at least about 40%, at least about 50%, at least about 60%, at least about 70%, at least about 80%, at least about 90%, at least about 95%, or more, of the posts may be configured to support no more than two solar modules of the plurality of solar modules.

In some cases, at least one post of the plurality of posts may be configured to support two solar modules of the plurality of solar modules. In some cases, each post of the plurality of posts may be configured to support two solar modules of the plurality of solar modules. In some cases, at least about 1%, at least about 5%, at least about 10%, at least about 20%, at least about 30%, at least about 40%, at least about 50%, at least about 60%, at least about 70%, at least about 80%, at least about 90%, at least about 95%, or more, of the posts may be configured to support two solar modules of the plurality of solar modules.

In some cases, a post of the plurality of posts may be configured to be coupled to a solar module of the plurality of solar modules via a post-module interface. In some cases, the solar module array may comprise the post-module interface. In some cases, the post-module interface may be configured to align and contour the solar module of the plurality of solar modules to a terrain on which the solar module array is constructed. In some cases, the post-module interface may be configured to be connected to the post of the plurality of posts via a bolt, a cinch, or a rivet. In some cases, the bolt may comprise a U-bolt. In some cases, the post-module interface may be configured to be connected to the post of the plurality of posts via a clamp.

Figure 114A:
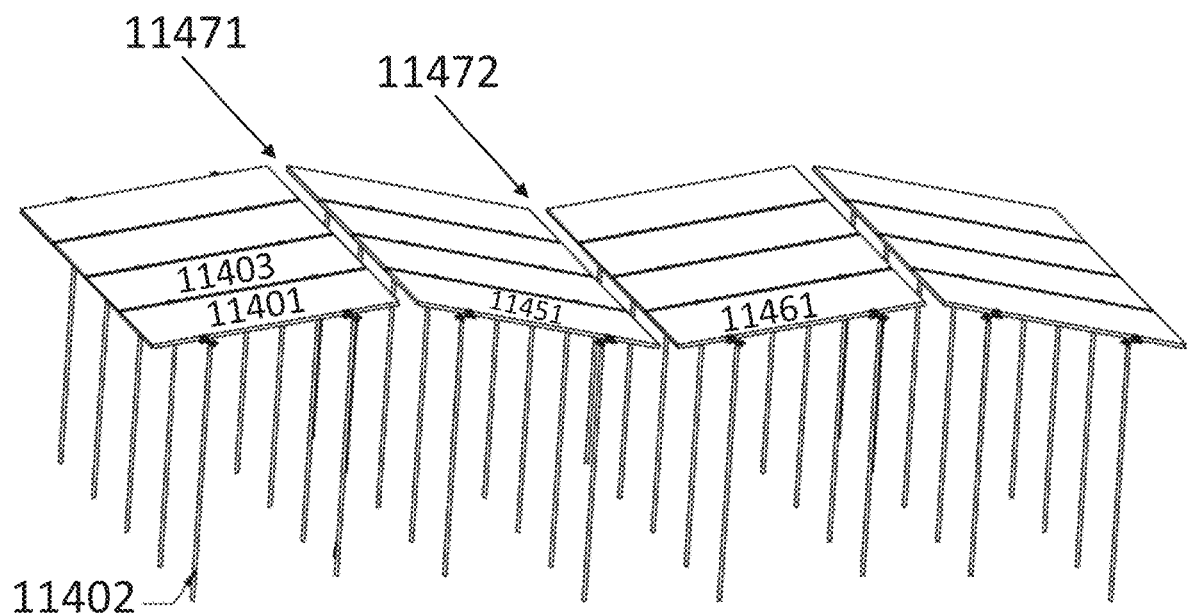
FIG. 114A shows an exemplary solar module array.

FIG. 114A shows a perspective view of an exemplary solar module array. The solar module array may comprise a plurality of solar modules (e.g., 11401, 11403, 11451, and 11461). A solar module (e.g., 11401) of the plurality of solar modules may be supported by a plurality of posts (e.g., 11402). In some embodiments, the post can have a shape of a cylinder. In some embodiments, the post can have a circular, triangular, hexagonal, pentagonal, rectangular, or square cross section.

In some embodiments, the post may be planted into the ground at a depth less than about 5 ft (or 1.52 m), less than about 1.5 m, less than about 1.4 m, less than about 1.3 m, less than about 1.2 m, less than about 1.1 m, less than about 1 m, less than about 0.9 m, less than about 0.8 m, less than about 0.7 m, less than about 0.6 m, less than about 0.5 m, or less. In some embodiments, the post may be planted into the ground at a depth greater than about 0.5 m, greater than about 0.6 m, greater than about 0.7 m, greater than about 0.8 m, greater than about 0.9 m, greater than about 1 m, greater than about 1.5 m, or more.

Figure 114B:
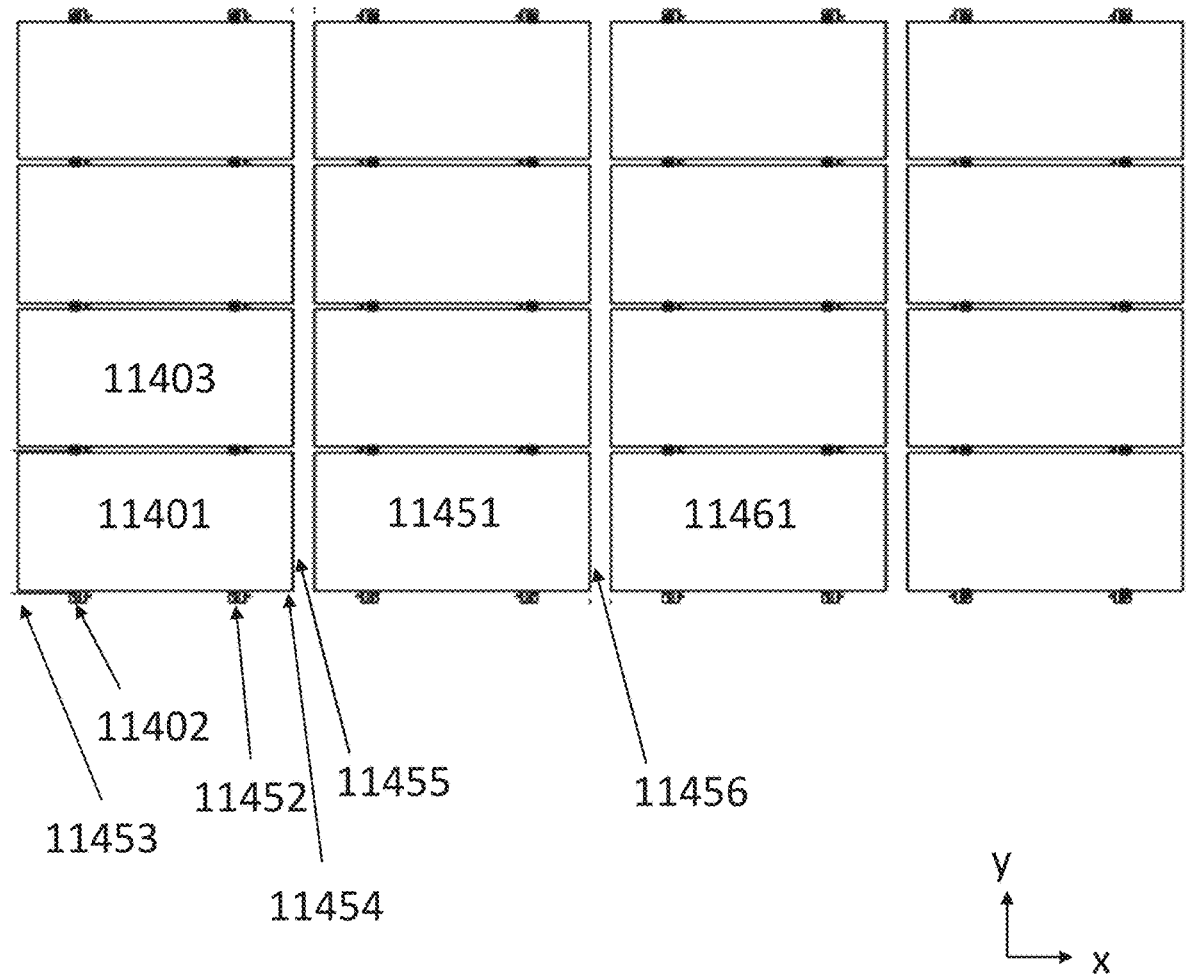
FIG. 114B shows a plan view of an exemplary solar module array assembly.

FIG. 114B shows a plan view of an exemplary solar module array assembly (e.g., solar module array of FIG. 114A). The solar module array assembly may comprise a plurality of solar modules (e.g., 11401, 11403, 11451, and 11461). In some embodiments, a solar module may be coupled to an adjacent solar module via a post and/or a post-module interface in a direction (e.g., y direction) while not coupled to an adjacent solar module in an additional direction (e.g., x direction).

In some embodiments, the direction and the additional direction can be substantially perpendicular or orthogonal to each other. In some cases, the direction and the additional direction may not be perpendicular to each other.

A solar module (e.g., 11401) may be supported by two or more posts (e.g., 11402 and 11452) along a longitudinal side. In some cases, the posts 11402 and 11452 may be located at non-corner positions. 11453 and 11454 in FIG. 114B show two corner positions of the solar module 11401 and/or two ends of the longitudinal side. The posts 11402 and 11452 may be away from the corner positions 11453 and 11454 of the solar module. In some embodiments, the post can have a shape of a cylinder. In some embodiments, the post can have a circular, triangular, hexagonal, pentagonal, rectangular, or square cross section.

The solar module 11401 may be coupled to an adjacent solar module 11403 via a post and/or a post module interface (e.g., in y direction). Solar module 11401 may not be coupled to an adjacent solar module 11451 in an additional direction (e.g., in x direction). Solar modules 11401 and 11451 may have a gap 11455. The solar module 11451 may have a gap 11456 with the adjacent solar module 11461. In some cases, the gap (e.g., 11455 and 11466) may be from about 1 inch to about 18 inches.

In some cases, the solar module array may have a peak spacing that ranges from about 1 inch to about 18 inches. In some cases, the solar module array may have a valley spacing that ranges from about 1 inch to about 18 inches.

In some cases, the solar module array may comprise a dual tilt array. In some cases, the solar module array may comprise a plurality of peaks (e.g., 11471 in FIG. 114A). In some cases, the solar module array may comprise a plurality of valleys (e.g., 11472 in FIG. 114A). In some cases, a peak of the plurality of peaks can have a gap or spacing (between adjacent solar modules) from about 1 in to 18 in. In some cases, a valley of the plurality of peaks can have a gap or spacing (between adjacent solar modules) from about 1 in to 18 in. In some cases, a solar module may have a width of about 45.7 in and a length of about 85.4 in. In some cases, the posts at one side of the solar module may be spaced by about 53.3 in. In some cases, a post at one side of the solar module and an adjacent post at the same side of the adjacent solar module may be spaced by about 38.1 in. In some cases, a solar module may be spaced from the adjacent non-coupled solar module by about 6 in. In some cases, a solar module may be spaced from the adjacent coupled solar module by about 1.1 in.

In some embodiments, a distance between adjacent posts can be from about 0.2 m to about 5 m. In some embodiments, adjacent rows of solar modules can have a gap from about 0.05 m to about 1 m.

Figure 114C:
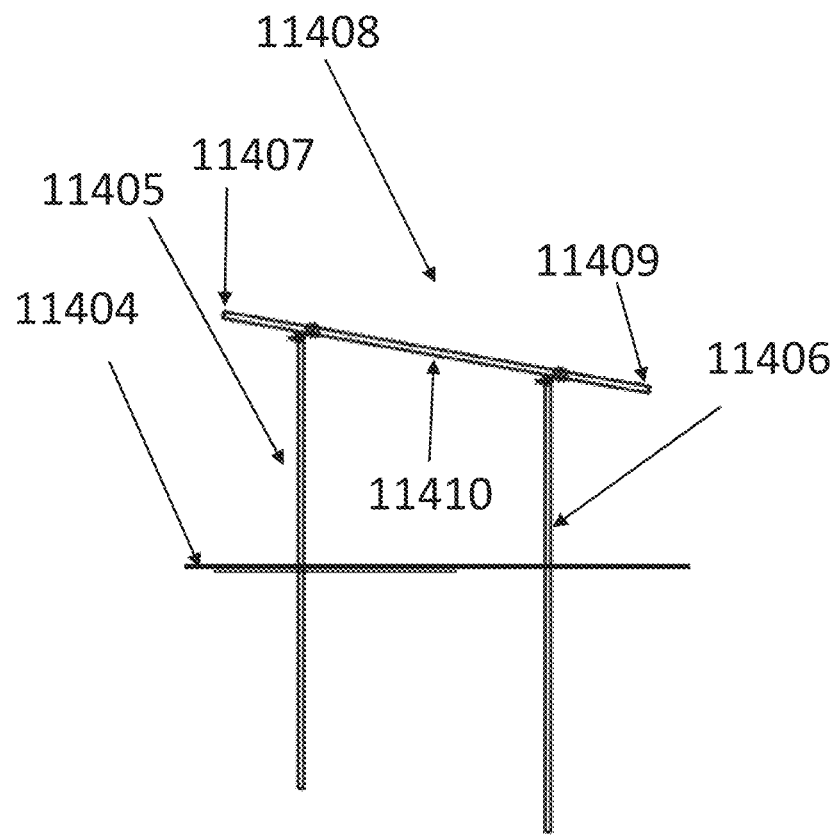
FIG. 114C shows a side view of a post-solar module assembly.

FIG. 114C shows a side view of a post-solar module assembly. In some cases, a solar module (e.g., 11408) may be supported by or coupled to at least two posts at a longitudinal side of the solar module. Posts 11405 and 11406 may be located along the longitudinal side of the solar module 11408. In some cases, posts 11405 and 11406 may not be located at a corner (e.g., 11407 or 11409) of the solar module 11408. In some cases, the solar module may have a first end (e.g., 11407) and a second end (e.g., 11409) along the longitudinal side of the solar module. In some cases, the posts 11405 and 11406 may not be located at the first end or the second end. In some cases, the posts 11405 and 11406 may be at least 0.5 inch away from the first end and the second end. In some cases, the posts 11405 and 11406 may be at least 1 inch away from the first end and the second end. In some cases, at least a post (e.g., 11405) may be located between the first end (e.g., 11407) and a center (11410) of the longitudinal side and at least an additional post (e.g., 11406) may be located between the second end (e.g., 11409) and the center of the longitudinal side. In some cases, the solar module may be coupled to one or more additional posts at the longitudinal side of the solar module. In some cases, the one or more additional posts may be located at the first end, the second end, the center, between the first end and the center, or between the second end and the center of the longitudinal side. The posts (e.g., 11405 and 11406) can be planted with different depths to the ground and different height above the ground (11404 shows the surface of the ground). In some cases, a taller post (e.g., 11405) may have a height above the ground that is at least about 1 in, at least about 2 in, at least about 3 in, at least about 4 in, at least about 5 in, at least about 6 in, at least about 7 in, at least about 8 in, at least about 9 in, at least about 10 in, at least about 11 in, at least about 12 in, at least about 13 in, at least about 14 in, at least about 15 in, at least about 16 in, at least about 17 in, at least about 18 in, at least about 19 in, at least about 20 in, at least about 21 in, at least about 22 in, at least about 23 in, at least about 24 in, or more, greater than a height above the ground of an adjacent post (e.g., 11406). The solar module e.g., 11408 can be tilted (non-horizontal). The solar module can be tilted for at least about 1°, at least about 5°, at least about 10°, at least about 15°, at least about 20°, at least about 25°, at least about 27°, at least about 30°, or more. In some cases, the taller post may have a height above the ground of about 45 in. In some cases, the shorter post may have a height above the ground of about 28 in. In some case, the solar module may be tilted for about 10°.

In some cases, a location wherein the post is connected to/coupled to the solar module may be adjustable. In some cases, a location wherein the post is connected to/coupled to the solar module may be adjustable along the longitudinal side of the solar module. In some cases, the number of posts supporting a solar module may be adjustable. In some cases, a distance between two adjacent posts may be adjustable. In some cases, the relative heights above the ground of the adjacent posts may be adjustable. In some cases, the location wherein the post is connected to/coupled to the solar module, the number of posts, the distance between two adjacent posts, and/or the heights or relative heights of the adjacent posts, may be adjusted based on a weight of the solar module, an environmental parameter, or a terrain condition. In some cases, the environmental parameter may comprise a wind force, a precipitation (rain or snow) frequency, an amount of precipitation (rain or snow). In some cases, the terrain condition may comprise soil density and slope of terrain. In some cases, more posts may be installed to support heavier solar modules. In some cases, more posts may be installed to support solar modules at an area or region having strong wind force and/or heavy precipitation (frequency and/or amount). In some cases, referring to FIG. 114C, when the slope of the solar module increases, the post 11405 may be adjusted to be closer to the first end 11407 and the post 11406 may be adjusted to be closer to the second end 11409. In some cases, referring to FIG. 114C, when the slope of the solar module decreases, the post 11405 may be adjusted to be closer to the center 11410 and the post 11406 may be adjusted to be closer to the center 11410. In some cases, when the soil is looser, a post may be planted deeper to increase a post-soil interaction. In some cases, for looser soil, the post 11405 may be adjusted to be closer to the first end 11407 and the post 11406 may be adjusted to be closer to the second end 11409. In some cases, when the soil is denser, a post may be planted shallower. In some cases, for denser soil, the post 11405 may be adjusted to be closer to the center 11410 and the post 11406 may be adjusted to be closer to the center 11410. Four posts supporting solar module 11401 may be in a rectangular arrangement if viewed from the top (FIG. 114B). In some cases, the posts may be located in any suitable arrangement if viewed from the top. In some cases, the posts may be located in a square arrangement if viewed from the top. In some cases, the posts may be located in a rectangular arrangement if viewed from the top. In some cases, the posts may be located in a hexagonal arrangement if viewed from the top.

Figure 114D:
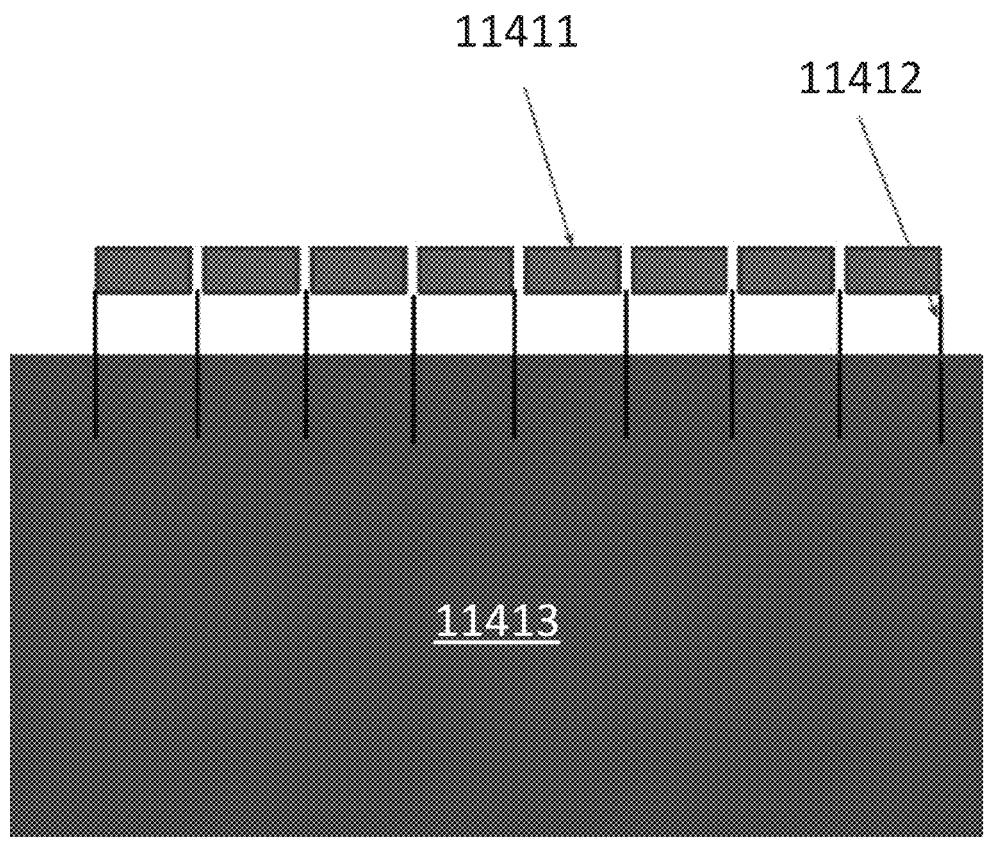
FIG. 114D shows a solar module array before ground heaving.
Figure 114E:
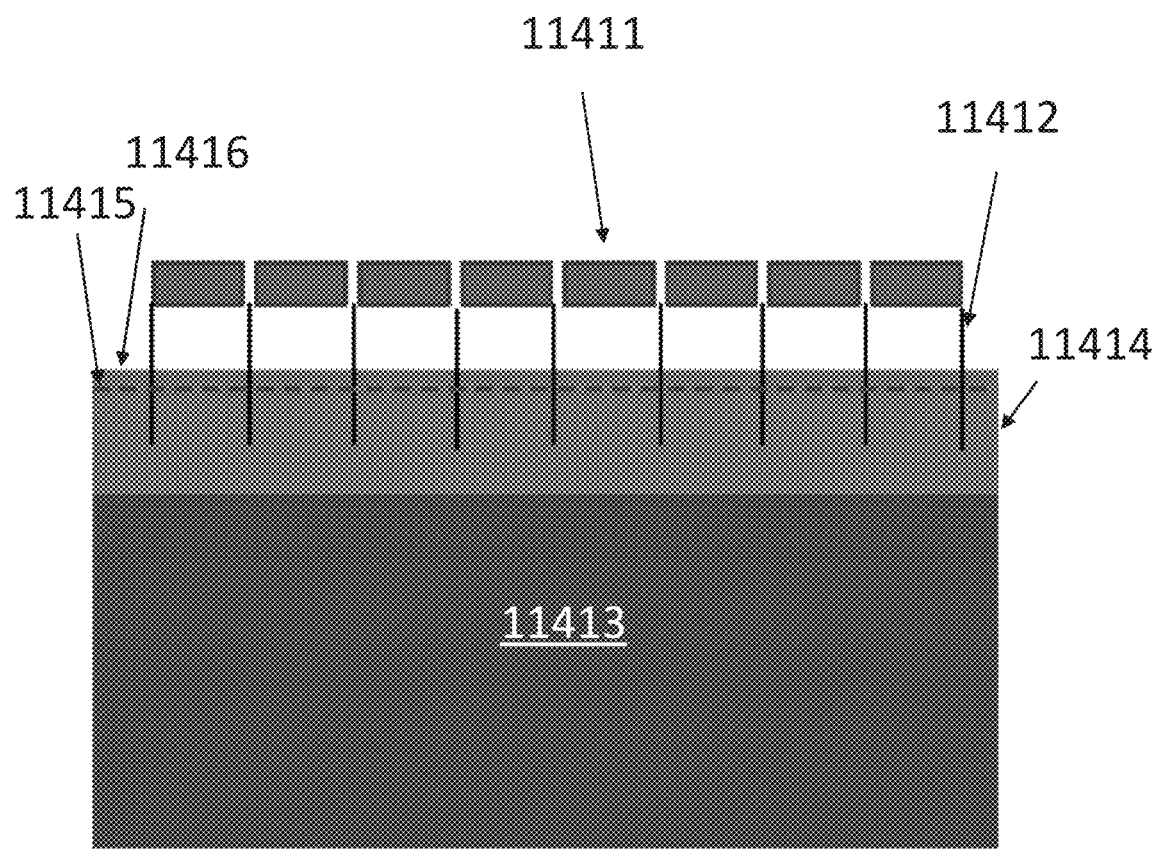
FIG. 114E shows a solar module array after ground heaving.

In some embodiments, a top layer of the ground may heave, e.g., upward. In some embodiments, a post that is planted substantially shallow in the ground (e.g., less than about 5 ft or 1.52 m) may heave with the ground as the ground heaves. In some embodiments, a post that is planted with a portion below the top layer the ground may resist the heaving and not heave as the ground heaves. FIG. 114D shows a solar module array before ground heaving. The solar module array comprises a plurality of solar modules e.g., 11411 supported by a plurality of posts e.g., 11412. The plurality of posts may be planted in the top layer of the ground 11413. FIG. 114E shows a solar module array after ground heaving. The top layer of the ground 11414 heaves upward, with the surface of the ground 11415 moves up to surface 11416. The plurality of posts e.g., 11412 are planted in the top layer of the ground e.g., 11414, and the plurality of posts heaves upward as the ground heaves. If the posts heave with the ground, the ground may exert significant shear force on the posts, which shear force may damage the integrity of the post-solar module assembly or affect post-soil interaction.

In some embodiments, the post can have a tipped spike or anchor at a distal end of the post that is driven to the ground.

In some embodiments, the solar modules can be supported by the posts directly. In some embodiments, no intermediate bridge structure is needed between posts to support the solar modules. In some embodiments, no superstructure is needed between posts to support the solar modules.

In some embodiments, a solar module array can comprise more than 4 solar modules, more than 10 solar modules, more than 20 solar modules, more than 50 solar modules, more than 100 solar modules, more than 200 solar modules, more than 500 solar modules, more than 1000 solar modules, more than 2000 solar modules, more than 5000 solar modules, more than 10000 solar modules, or more.

In some embodiments, a solar module array can comprise A*B solar modules, wherein A is the number of rows (or columns) and B is the number of columns (or rows). In some embodiments, A can be from 4 to 10, from 4 to 20, from 4 to 30, from 4 to 35, from 4 to 40, from 4 to 50, from 4 to 100, from 4 to 500, from 4 to 1000, or more. In some embodiments, B can be from 1 to 5, from 1 to 10, from 1 to 20, from 1 to 50, from 1 to 60, from 1 to 100, from 1 to 500, from 1 to 1000, or more.

Figure 120A:
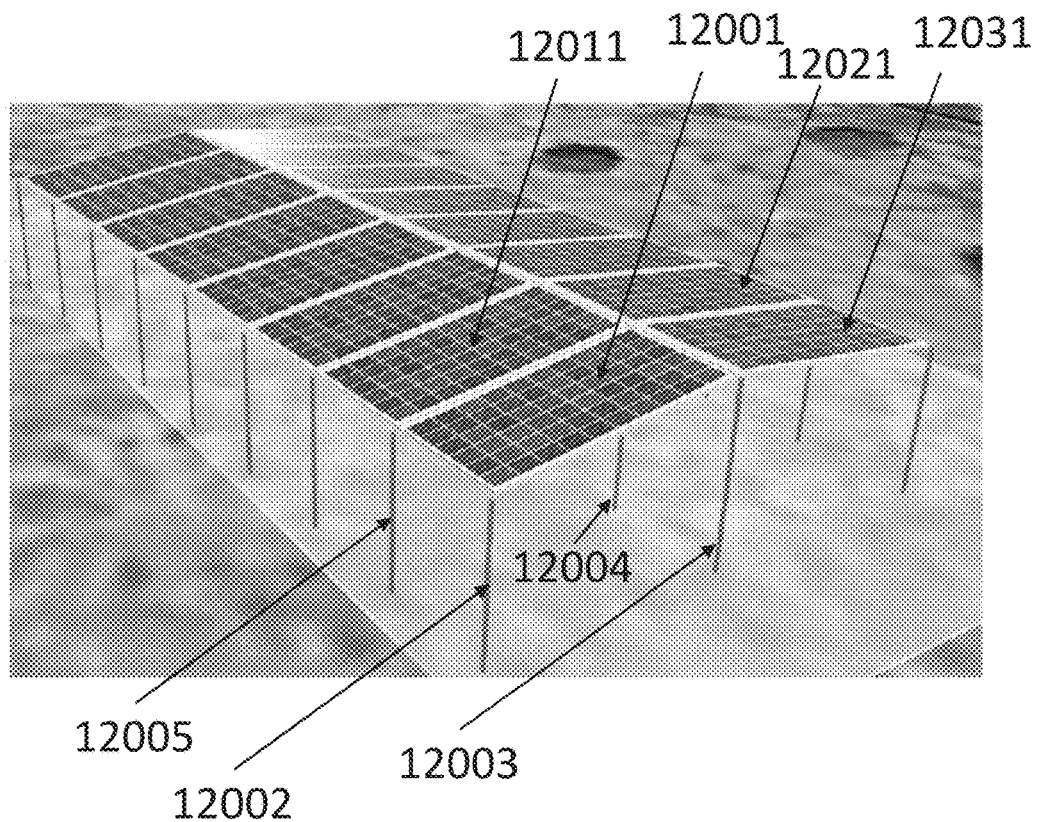

In some embodiments, posts can be coupled to a corner position of a solar module. In some embodiments, a post coupled to a corner position of a solar module at a corner of a solar module array may be coupled to only one solar module. In some embodiments, a post coupled to a corner position of a solar module at a side of a solar module array may be coupled to two solar modules. In some embodiments, a post coupled to a corner position of a solar module at a non-corner and non-side of a solar module array may be coupled to four solar modules. FIG. 120A shows a solar module array that the posts are coupled to the corner positions of the solar modules. A corner post 12002 only couples to and supports one solar module 12001. A side post 12005 couples to and supports two solar modules 12001 and 12011, i.e., the two solar modules 12001 and 12011 share the post 12005, each on average has support from ½ of post 12005 or having a weighted number of ½ of post 12005. A weighted number, as used herein, generally means that, if a post supports n solar modules, each solar module of the n solar modules has support of 1/n post from the post. For example, if a post supports 2 solar modules, each of the solar module has support of weighted number of ½ post from the post. If a post supports 3 solar modules, each of the solar module has support of weighted number of ⅓ post from the post. If a post supports 4 solar modules, each of the solar module has support of weighted number of ¼ post from the post. If a post supports 1 solar module, the solar module has support of weighted number of 1 post from the post (i.e., fully support by the 1 post). A side post 12003 couples to and supports two solar modules 12001 and 12031, i.e., the two solar modules 12001 and 12031 share the post 12003, each on average has support from ½ of post 12003 or having a weighted number of ½ of post 12003. A non-corner and non-side post 12004 couples to and supports four solar modules 12001, 12011 12021, and 12031, i.e., the four solar modules 12001, 12011 12021, and 12031 share the post 12004, each on average has support from ¼ of post 12004 or having a weighted number of ¼ of post 12004. The solar module 12001 has support from 100% of post 12002, ½ from posts 12005 and 12003, and ¼ from post 12004. By weighted summation, solar module 12001 is supported by 1+½+½+¼=2.25 posts. The solar module 12011 has support from two of ½ posts and two of ¼ posts. By weighted summation, solar module 12011 is supported by ½+½+¼+¼=1.5 posts. If another row of solar modules is installed adjacent to the row solar modules 12001 and 12011 are located at, solar module 12011 is a non-corner and non-side solar module, and may be supported by four of ¼ posts, as a weighted summation, supported by ¼+¼+¼+¼=1 post. A s*p solar module array with an array arrangement like FIG. 120A may be supported by (s+1)*(p+1) posts and a solar module of the array may be supported, on average, by [(s+1)*(p+1)]/(s*p) posts. For example, for a 4*4 array, a solar module of the array may be supported, on average, by a weighted number of 1.56 posts. For a 10*10 array, a solar module of the array may be supported, on average, by a weighted number of 1.21 posts. For a 100*20 array, a solar module of the array may be supported, on average, by a weighted number of 1.06 posts.

Figure 120B:
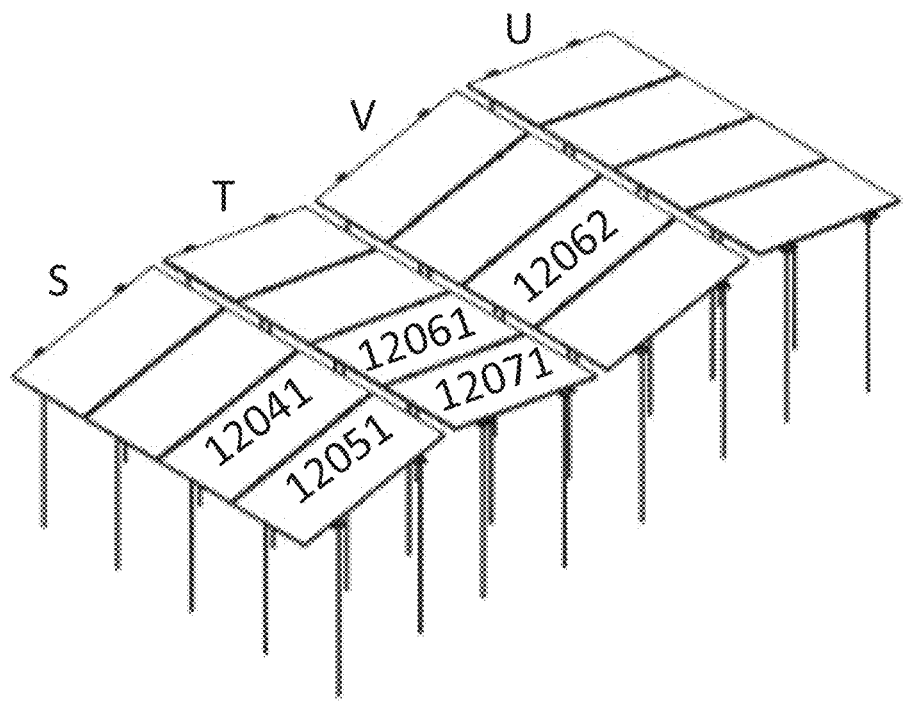

In some embodiments, posts can be coupled to a side position of a solar module. In some embodiments, a post at the side of a solar module may be shared by two posts. In some embodiments, a post at the side of a solar module may support one solar module or two solar modules. In some embodiments, a post at the non-corner and non-side of the solar module array supports two solar modules. In some embodiments, a solar module may be supported by two side posts at one side and two side posts at the opposite side. In some embodiments, if the solar module is a corner solar module of the solar module array, the solar module may be supported, as a weighted summation, by 3 posts. In some embodiments, if the solar module is a side solar module of the solar module array, the solar module may be supported, as a weighted summation, by 2 or 3 posts. In some embodiments, if the solar module is non-corner and non-side solar module of the solar module array, the solar module may be supported, as a weighted summation, by 2 posts. FIG. 120B shows a solar module array with posts coupled to sides of the solar modules (e.g., each solar module has two side posts on one side and two side posts on the opposite side). Solar module 12051 is supported by a weighted number of 3 posts. Solar modules 12041 and 12071 are supported by a weighted number of 2 posts. Solar module 12061 or 12062 is supported by a weighted number of 2 posts. FIG. 120B shows an exemplary 4*4 solar module array (16 solar modules) supported by 40 posts. On average, a solar module is supported by a weighted number of 2.5 posts. A a*b solar module array with an array arrangement like FIG. 120B may be supported by (a+1)*(2b) posts and a solar module of the array may be supported, on average, by [(a+1)*(2b)]/(a*b) =(2+1/a) post, which is 2 or more posts. For example, for a 10*10 array, a solar module of the array with an array arrangement like FIG. 120B may be supported, on average, by a weighted number of 2.2 posts. For a 100*20 array, a solar module of the array with an array arrangement like FIG. 120B may be supported, on average, by a weighted number of 2.02 posts.

In some embodiments, the present disclosure provides a solar module array, comprising a plurality of solar modules, wherein each solar module of the plurality of solar modules is supported by a weighted number of 2 or more posts.

In some embodiments, the present disclosure provides a solar module array, comprising a plurality of solar modules and a plurality of posts, wherein each post of the plurality of posts that is installed at a non-side position of the solar module array supports no more than two solar modules of the plurality of solar modules.

In some cases, the maximum amount that any post is supporting is ½ of a solar module. In some cases, no post is supporting more than ½ of a solar module. In some embodiments, the present disclosure provides a solar module array, comprising a plurality of solar modules and a plurality of posts, wherein each post of the plurality of posts that is installed at a non-side position of the solar module array supports no more than ½ of a solar module of the plurality of solar modules.

If the posts are coupled to the corner position of the solar modules, a c*d solar module array may be supported by (c+1)*(d+1) posts and a solar module of the array is supported, on average, by [(c+1)*(d+1)]/(c*d), which is 1 or more posts.

In some embodiments, posts can be coupled to a side position of a solar module and a solar module may be supported by one side post at each side. In some embodiments, if the solar module is a corner solar module of the solar module array, the solar module may be supported, as a weighted summation, by 3 posts. In some embodiments, if the solar module is a side solar module of the solar module array, the solar module may be supported, as a weighted summation, by 2.5 posts. In some embodiments, if the solar module is non-corner and non-side solar module of the solar module array, the solar module may be supported, as a weighted summation, by 2 posts.

In some embodiments, solar modules with posts coupled to the side and non-corner of the solar module can increase the weighted number of posts supporting the solar module in comparison to the solar modules with posts coupled to the corner position of the solar module.

In some embodiments, in the system disclosed herein, a solar module can be supported by a weighted number of 1 post (e.g., each post supporting 4 solar modules). In some embodiments, in the system disclosed herein, a solar module at the non-side and non-corner of the solar module array can be supported by a weighted number of 1 post (e.g., each post supporting 4 solar modules).

In some embodiments, a solar module can be supported by a mix of corner posts and side/non-corner posts to increase the weighted number of posts for each of solar module. In some embodiments, a solar module can be supported by a weighted number of 2 to 5 posts. In some embodiments, a solar module can be supported by a weighted number of more than 5 posts. In some embodiments, a solar module can be supported by a weighted number of 2 posts. In some embodiments, a solar module can be supported by a weighted number of 2.5 posts. In some embodiments, a solar module can be supported by a weighted number of 3 posts. In some embodiments, a solar module can be supported by a weighted number of 3.5 posts. In some embodiments, a solar module can be supported by a weighted number of 4 posts. In some embodiments, a solar module can be supported by a weighted number of 4.5 posts. In some embodiments, a solar module can be supported by a weighted number of 5 posts. In some embodiments, a solar module at the non-side and non-corner of the solar module array can be supported by a weighted number of 2 posts. In some embodiments, a solar module at the non-side and non-corner of the solar module array can be supported by a weighted number of 3 posts. In some embodiments, a solar module at the non-side and non-corner of the solar module array can be supported by a weighted number of 4 posts. In some embodiments, a solar module at the non-side and non-corner of the solar module array can be supported by a weighted number of 5 posts.

In some embodiments, the adjacent solar modules can have different tilt slopes (the angle relative to the horizontal plane). In some embodiments, the adjacent solar modules can have substantially same tilt slopes. In some embodiments, a solar module can have a different tilt slope than a solar module in a different row but with same orientation. In some embodiments, a solar module can have a different tilt slope than a solar module in a different row and with a different orientation. In some embodiments, a solar module can have a tilt slope of equal to or greater than about 5°, equal to or greater than about 10°, equal to or greater than about 15°, equal to or greater than about 20°, equal to or greater than about 25°, equal to or greater than about 27°, equal to or greater than about 30°, equal to or greater than about 35°, equal to or greater than about 40°, equal to or greater than about 45°, or larger. In some embodiments, the tilt angle can be from about 5° to about 20° or from about 5° to about 30°. In some embodiments, the tilt configuration may improve the alignment of the solar modules to the sun. FIG. 120B shows an exemplary dual tilt array. Row S and row T form a peak. Row T and row V form a valley. Row V and row U form a peak. Rows S and V may capture sunlight for a period of time during a day and rows T and U may capture sunlight in another period of time during the day, or vice versa, depending on the orientation of the solar module array. In some cases, row S, T, V, and U may capture sunlight in a period of time during the day with different efficiency, depending on the orientation of the solar module array and the angle of the sunlight. In some embodiments, the solar module array can be east-west facing. In some embodiments, a plurality of rows of the dual tilt array may capture sunlight in the morning and another plurality of rows of the dual tilt array may capture sunlight in the afternoon. In some embodiments, a plurality of rows of the dual tilt array may capture more sunlight in the morning than an additional plurality of rows of the dual tilt array. In some embodiments, a plurality of rows of the dual tilt array may capture more sunlight in the afternoon than an additional plurality of rows of the dual tilt array. In some embodiments, the solar module array can be north-south facing. In some embodiments, the solar module array may reduce or eliminate shading of the solar module array.

In some embodiments, a dual tilt array can have a peak or valley spacing (e.g., between 12041 and 12061 or between 12061 and 12062) from about 1 in to about 18 in. In some embodiments, a spacing between the solar modules in the same row (e.g., between 12041 and 12051) can be from about 0.25 in to about 6 in. In some embodiments, the dual tilt array may have solar module density (number of solar modules per area) that is at least about 10%, at least about 20%, at least about 30%, at least about 40%, at least about 50%, at least about 60%, at least about 70%, at least about 80%, at least about 90%, at least about 100%, or more than a single tilt array. In some embodiments, a solar module can have a length from about 0.5 m to about 5 m and a width from about 0.5 to about 4 m. In some embodiments, a solar module can have a length of 2.2 m and a width of 1.1 m.

In some embodiments, the increased weighted number of posts supporting a solar module can increase the number of solar modules that can be installed on a ground, therefore increasing the module density. In some embodiments, the increased weighted number of posts supporting a solar module can allow for installation of solar module array that does not require additional superstructure. In some embodiments, the increased weighted number of posts supporting a solar module can allow for installation of solar module array that does not require additional reinforcement structures. In some embodiments, increased module density can reduce the land use by at least about 10%, at least about 20%, at least about 30%, at least about 40%, at least about 50%, at least about 60%, at least about 70%, or more. In some embodiments, a system and method disclosed herein can have a ground coverage ratio (e.g., ratio of ground covered by solar panel/module to a total ground area) of equal to or greater than about 0.6, equal to or greater than about 0.7, equal to or greater than about 0.8, equal to or greater than about 0.85, equal to or greater than about 0.9, equal to or greater than about 0.95, or more. A traditional solar array may have a ground coverage ratio of 0.3 to 0.6. In some embodiments, the system and method disclosed herein can increase the ground coverage ratio by at least about 10%, at least about 20%, at least about 30%, at least about 40%, at least about 50%, at least about 60%, at least about 70%, at least about 80%, at least about 90%, at least about 100%, at least about 150%, at least about 200%, or more, in comparison to a system, e.g., without the dual tilt array. In some embodiments, an energy density (energy generated by the solar module array, e.g., per unit area) may be a function of the configuration, orientation, the ground coverage ratio, the angle, and/or the dimension of the solar module array, among others. In some embodiments, a system and method disclosed herein can increase energy density by at least about 10%, at least about 20%, at least about 30%, at least about 40%, at least about 50%, at least about 60%, at least about 70%, at least about 80%, at least about 90%, at least about 100%, at least about 150%, at least about 200%, at least about 300%, or more. In some embodiments, the system and method disclosed herein can have an energy density of at least about 0.3 MW per acre, at least about 0.35 MW per acre, at least about 0.4 MW per acre, at least about 0.45 MW per acre, at least about 0.5 MW per acre, at least about 0.55 MW per acre, at least about 0.6 MW per acre, at least about 0.65 MW per acre, at least about 0.7 MW per acre, at least about 0.75 MW per acre, at least about 0.8 MW per acre, at least about 0.9 MW per acre, at least about 1 MW per acre, at least about 1.1 MW per acre, at least about 1.2 MW per acre, at least about 1.3 MW per acre, at least about 1.4 MW per acre, at least about 1.5 MW per acre, or more.

Figure 115A:
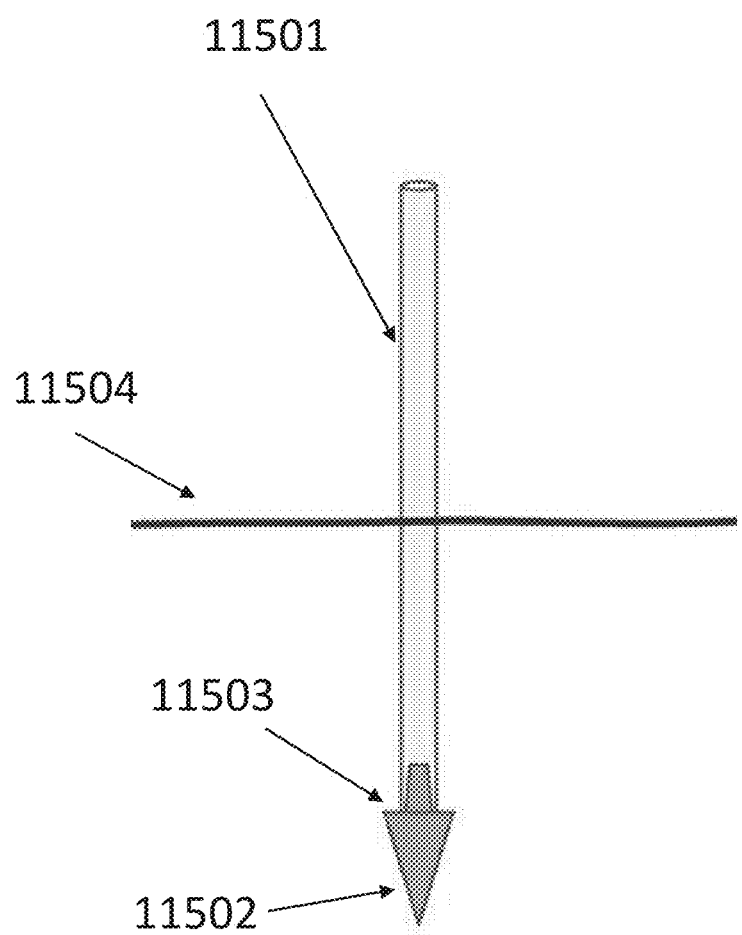
FIG. 115A shows an exemplary post with a tipped spike at a distal end.

In some cases, a post may comprise features to increase the post-soil interaction. The increase post-soil interaction may allow an increase of the solar module density in a solar module array. FIG. 115A shows an exemplary post with a tipped spike at a distal end. The post 11501 is driven to the ground (11504 showing the surface of the ground). The tipped spike has a surface (e.g., 11503) opposite to the distal end. The surface 11503 can be substantially flat or can have a concave or ridge. The surface leads to an increased area that is projected upwards, thereby making the post resist soil and be stronger in the uplift direction.

Figure 115B:
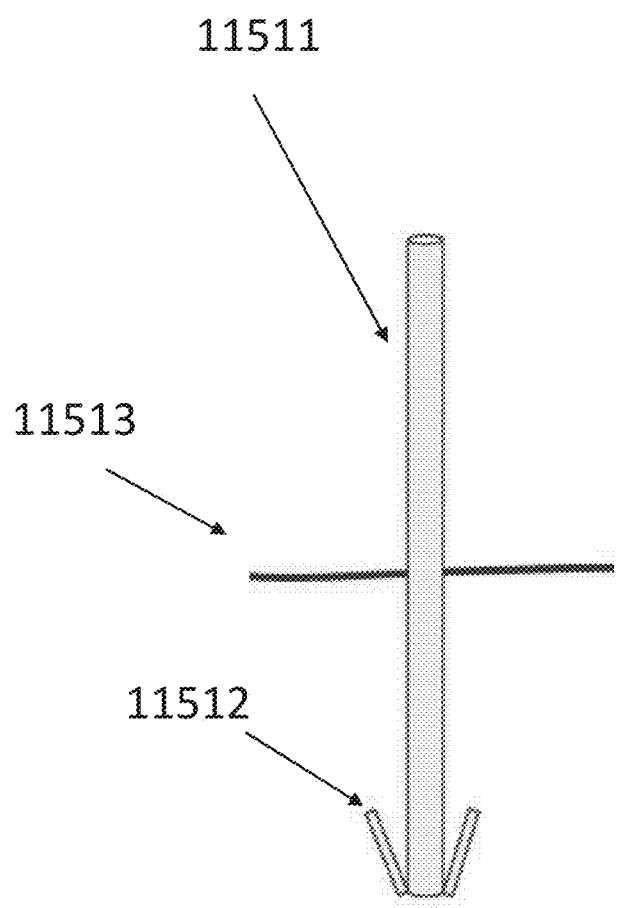
FIG. 115B shows an exemplary post with deployable barbs at a distal end.

In some embodiments, the post can have deployable barbs at a distal end of the post. The deployable barbs can drive the post to the ground. FIG. 115B shows an exemplary post with deployable barbs at a distal end. The post 11511 is driven to the ground (11513 showing the surface of the ground). The barbs 11512 can have an angle from about 10° to about 60° relative to the post. The barbs lead to an increased area that is projected upwards, thereby making the post resist soil and be stronger in the uplift direction. The barbs may also lead to an increased area that in projected down, thereby making the post resist soil and be stronger in the downforce direction.

Figure 115C:
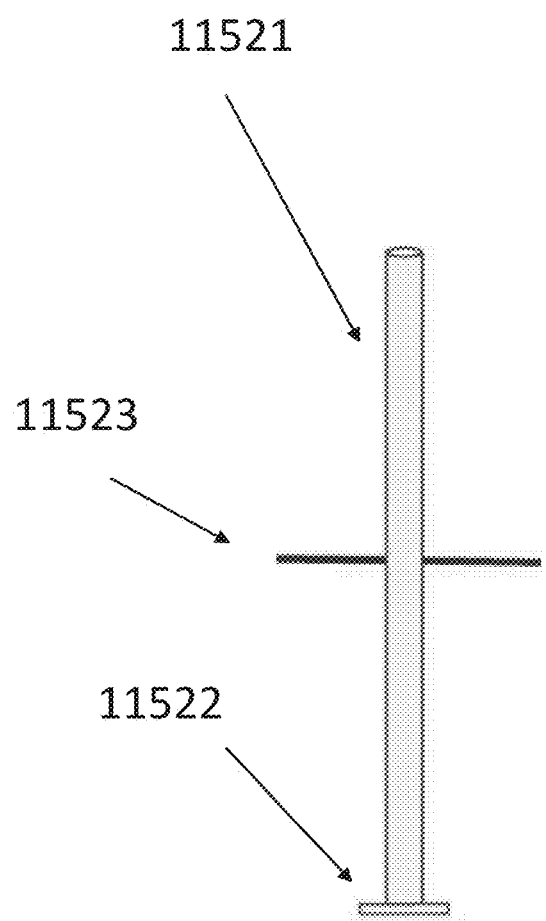
FIG. 115C shows an exemplary post with a substantially flat tip at a distal end of the post.

In some embodiments, the post can have a substantially flat tip at a distal end of the post that is driven to the ground. FIG. 115C shows an exemplary post with a substantially flat tip at a distal end of the post. The post 11521 is driven to the ground (11523 showing the surface of the ground). The substantially flat tip leads to an increased area that is projected upwards, thereby making the post resist soil and be stronger in the uplift direction. The substantially flat tip also leads to an increased area that in projected down, thereby making the post resist soil and be stronger in the downforce direction.

Figure 115D:
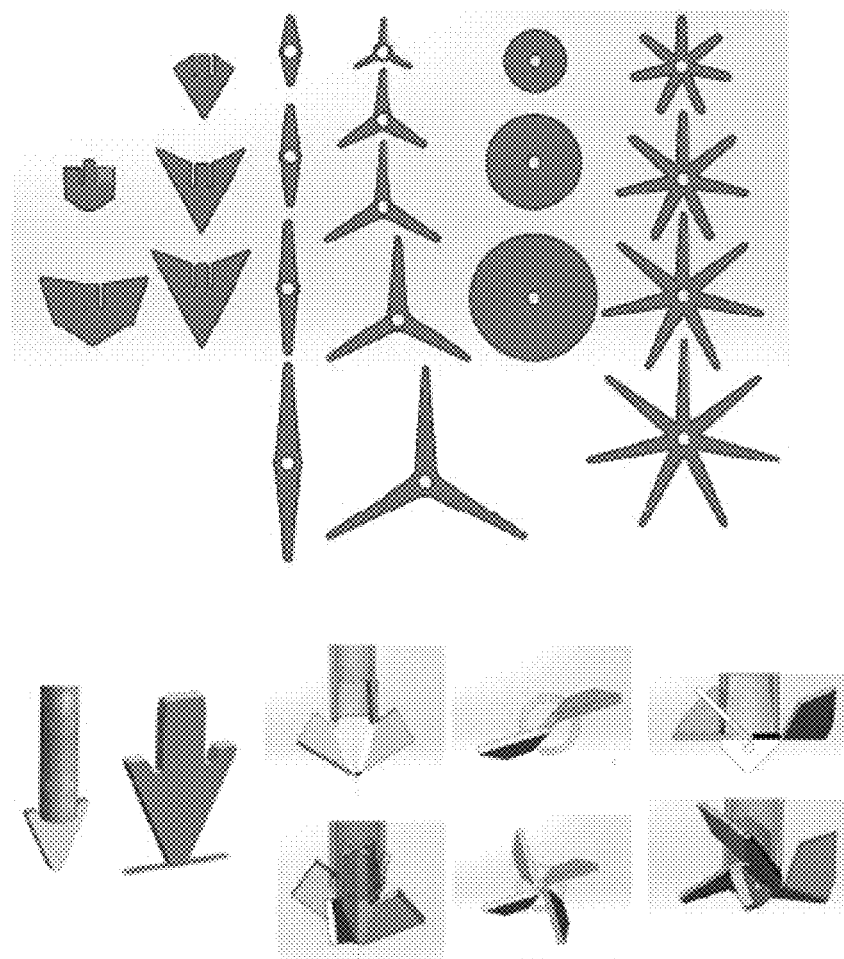
FIG. 115D shows exemplary tip or barb designs.

In some embodiments, the post can have a tip or barb with one or more pointed edges that helps drive the post into the soil. In some embodiments, the post can have a tip or barb with extended tabs and surfaces that increase the projected areas upwards or downwards and help the post resist soil. In some embodiments, the post can have a tip with tapered pattern. In some embodiments, the tapered pattern can have tabs to lock the post in soil as the post is driven or hammered into the ground (or soil). FIG. 115D shows exemplary tip or barb designs.

Figure 115E:
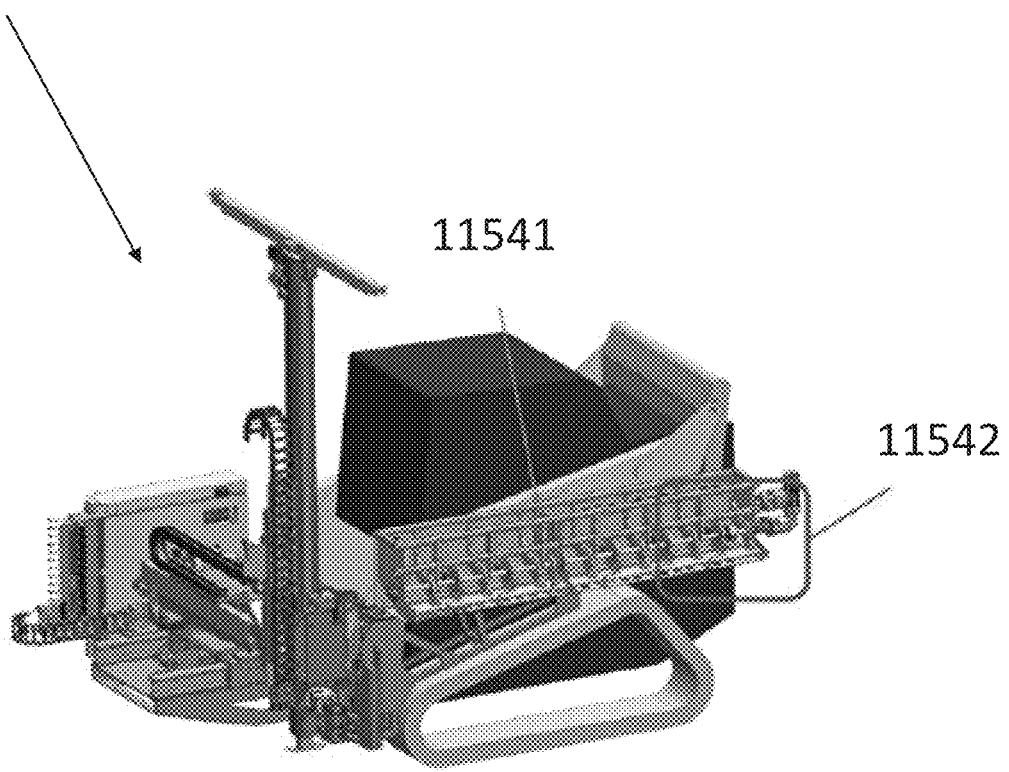
FIG. 115E shows an exemplary post installer.

In some embodiments, the tip or barb can be pre-attached to the post before the post is transported to the installation site. In some embodiments, the tip or barb can be attached to the post at the installation site. In some embodiments, the tip or barb can be attached to the post on the post installation machine (or post installer). FIG. 115E shows an exemplary post installer 11540. The post installer 11540 comprises a post feeder 11541. The post feeder 11541 can comprise a tip/bard installation area 11542 where the tip or barb can be attached to the post.

Figure 121:
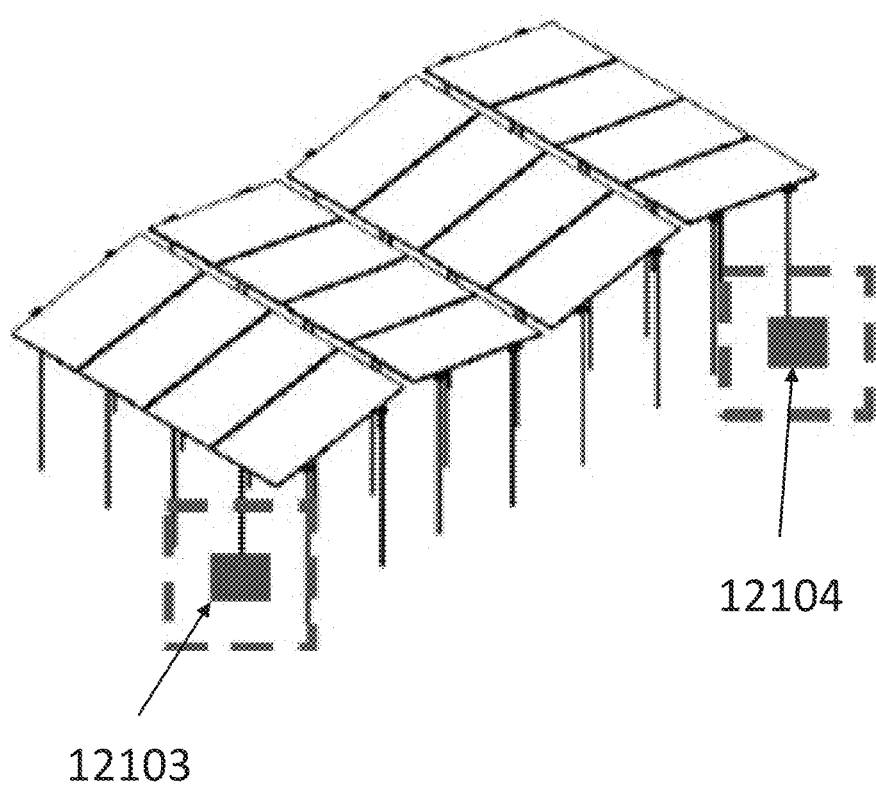

In some embodiments, the post can comprise a reinforcement device or component installed at the base of the post. In some embodiments, the reinforcement device may be at or around the ground level. In some embodiments, the reinforcement device can improve the anchoring or interaction of the post and the ground/soil. In some embodiments, the reinforcement device may be applied in weak soils. In some embodiments, the reinforcement device may be applied when the solar module load is high, e.g., from snow or wind. In some embodiments, a solar module array may have reinforcement device installed in at least one post. FIG. 121 shows an exemplary solar module array with reinforcement devices 12103 and 12104 installed at the base of two posts. In some embodiments, the reinforcement device can be installed at a corner post, a side post, and/or a center post.

Figure 122A:
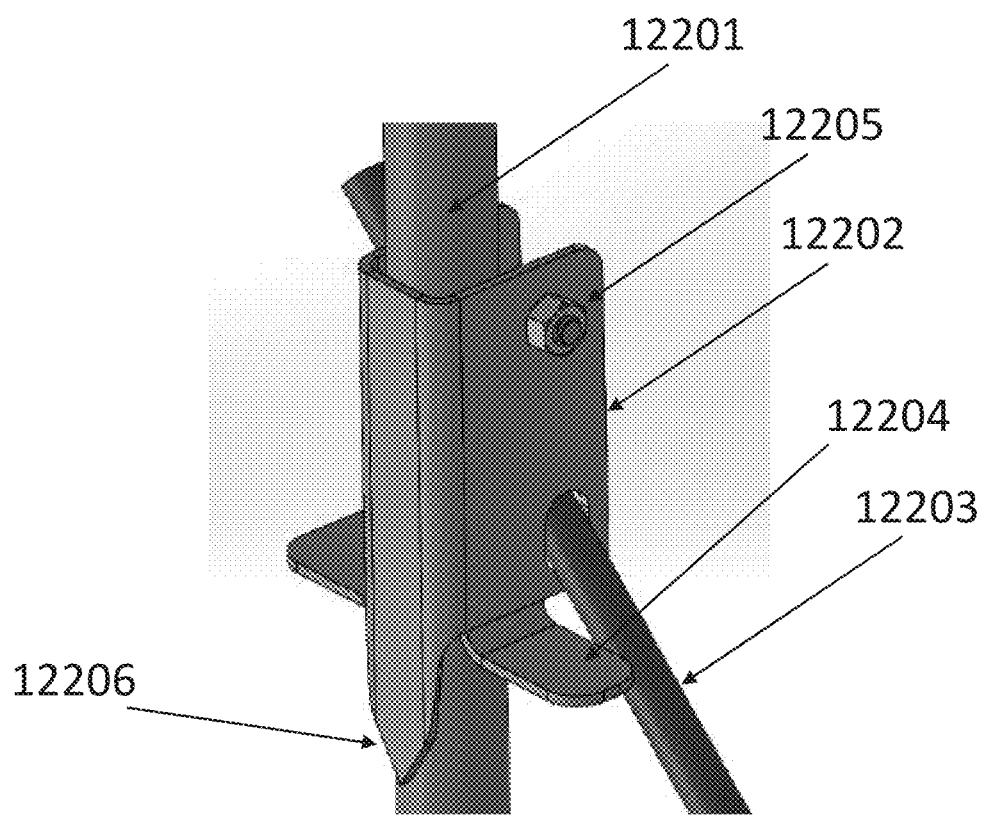
Figure 122B:
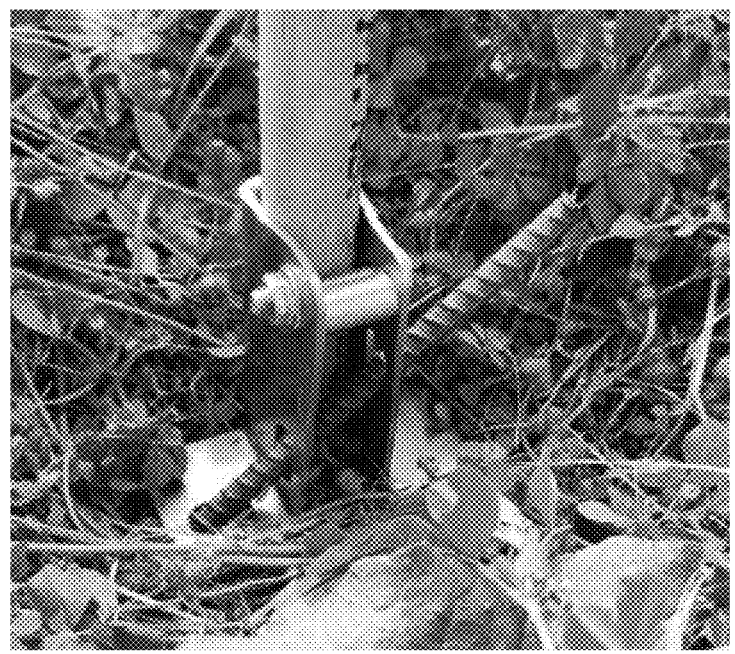

FIG. 122A shows an exemplary reinforcement device. The reinforcement device can comprise a metal bracket 12202 which houses a diagonal reinforcing rod 12203. The reinforcing rod can be driven into the ground. The reinforcement device can comprise a tip 12206 for guiding the bracket along the post 12201 into the soil. The reinforcement device can have a vertical interface and can be secured to the post 12201 by a fastener or a screw 12205. The reinforcement device can comprise a plurality of tabs for preventing the post from penetrating into the ground after installation. FIG. 122B shows an image of an exemplary reinforcement device that is installed on a post and onto the ground.

FIG. 123A shows an exemplary reinforcement device or structural repair device (SRD). The SRD can comprise a bracket 12303 which can interface with the post at any point above the soil. The SRD can interface with the post 12301 with a plurality of U-bolts, e.g., 12302. Other interfaces can be used. The SRD can comprise a second interface (e.g., U-bolts) for a ground rod 12304 or an additional post. The ground rod or additional post can be driven at any angle into the soil to increase the interaction of the post with the soil. FIG. 123B shows an image of an exemplary SRD that is installed on a post and onto the ground. FIG. 123C shows the increased force capability of the post and SRD structure. The rod can be driven into the ground by a manual hammer or an electric hammer. In some embodiments, the SRD can comprise interfaces for a plurality of rods. FIG. 123D shows an exemplary SRD with three rods (e.g., 12333 and 12334). The SRD can comprise a bracket 12332 to be secured to the posts, by e.g., U-bolts. The plurality of rods can be distributed around the post. FIG. 123E shows a top view of the SRD of FIG. 123D. The SRD comprises three rods e.g., 12333 that can be driven into the soil to provide reinforcement between the post and the soil. FIG. 123F shows an expanded view of the SRD of FIG. 123D. FIG. 123G shows an image of an exemplary SRD that is installed on a post and onto the ground.

FIG. 124A shows an exemplary reinforcement device with a horizontal bracket. The bracket 12402 can be secured to the post 12401 by a U-bolt. The bracket 12402 can comprise a plurality of holes for insertion of rods, e.g., 12403. The rods can be stakes. The rods can have a nail that is larger than the holes. In some embodiments, the rod can have a nail that is 0.65 inches in diameter and a stake that is 0.35 inches in diameter and 16 inches long. The stake can have a pointed tip for driving the rod into the ground. The rod can be driven into the ground by a hammer. FIG. 124B shows an exemplary reinforcement device with a tab. The bracket 12402 can comprise a tab 12404 that can be lifted to interface with the post, as shown in FIG. 124C. The bracket comprises a plurality of holes 12405 for insertion of rods. As shown in FIG. 124C, the tab 12404 is lifted to an open configuration 12406. The tab can comprise a plurality of recesses 12407 that can be used for securing the bracket to the post with a U-bolt. FIG. 124D shows another exemplary reinforcement device with a horizontal bracket. The bracket 12422 can be secured to the post 12401 by a U-bolt. The bracket 12402 can comprise a plurality of holes for insertion of hooked rebar, e.g., 12403. The hooked rebar can have a diameter of 0.5 inches and length of 24 inches. The hook can have a distance of 1 to 1.5 inches. The hooked rebar can be driven into the ground by a hammer. FIG. 124E shows an expanded view of the reinforcement device of FIG. 124D that is installed on the post.

In some embodiments, the reinforcement device can comprise tabs that can extend into the soil at an angle to engage with additional soil to increase the post-soil interface strength without the use of additional reinforcing rods or bars. FIG. 125A shows an exemplary reinforcement device with tabs. The reinforcement device 12502 comprises tabs 12503 that can extend into the soil. The reinforcement device 12502 can be secured to the post by U-bolts. FIG. 125B shows a perspective view of the reinforcement device of FIG. 125A. FIG. 125C shows a side view of the reinforcement device of FIG. 125A. The tab 12503 can be pound into the soil with a hammer. The tab 12503 can have an angle of about 30° to 45° relative to the horizontal plane.

In some embodiments, the tabs of the reinforcement device may be flexible and bendable. During installation, the tabs can be bended at different angles to provide more engagement with the soil to increase the post-soil interface strength. FIG. 126A shows exemplary reinforcement devices with tabs 12601 or 12602. FIG. 126B shows the reinforcement devices installed on a post 12603. The reinforcement device e.g., 12604 can be installed at different locations of the posts. FIG. 126C shows a side view of the installed reinforcement device. 12605 shows the bracket loaded to the post. 12606 shows the proximal end of the bracket is pushed to contact the post. The bracket can be secured or fixed by tightening the screws of the U-bolt. The tab of the bracket can be bended to a desired angle, shown as 12607.

In some cases, a robot may install a first post at a first location and a second post at a second location. In some cases, the first location and the second location may be sufficiently close such that an energy module may be installed to be supported by both the first post and the second post. In some cases, two separate energy modules may be installed to be supported by each of the first post and the second post, respectively. In some cases, the first post may be installed first, and the second post may be installed second. In some cases, the first post and the second post may be installed substantially at about the same time. In some cases, a first robot may install a first post at a first location and a second robot may install a second post at a second location. Various number of posts may be installed by a given robot. One or more posts may be installed at various locations by a given robot.

In some cases, the plurality of robots may be configured to operate as a fleet or a swarm. The plurality of robots may communicate with one or more servers configured to control an operation or a movement of the plurality of robots within an area or location comprising the sensed geolocation. The server may provide different commands to different robots, or command different robots to collaboratively perform one or more tasks. It shall be understood that the coordination of one or more robots may be implemented in various configurations to achieve a similar effect, for example, by using various number of robots, various types of robots, various number of posts, and various rulesets or algorithms for coordinating the robots.

In some cases, the plurality of robots may be configured to operate in a coordinated manner such that a time taken to perform the one or more tasks is optimized. For instance, a first set of robot(s) may coordinate to install one or more posts at a first location and then immediately at a second location. A second set of robot(s) may coordinate with the first set of robot(s) to install a solar module at the first location immediately as the one or more posts are installed at the first location. In some cases, the first location may be a region near the robot. In some cases, the first location may be a region near where the solar module is stored. In some cases, the second location may be near the first location. In some cases, the second location may be a geo-sensed location (e.g., a location that is determined or identified using one or more positions sensors and/or geographical or topological data). In some cases, the second location may be an approximate location, and the approximate location may be adjusted in real-time to be a more precise location.

In some cases, the method may comprise using the at least one robot to fully autonomously position and assemble the at least one solar module and its supporting structure in two or more different directions. The two or more different directions may comprise a first direction and a second direction. The first direction and the second direction may be parallel to each other. Alternatively, the first direction and the second direction may be disposed at an angle relative to each other. The angle may range from 0 degrees to 180 degrees.

In some cases, the at least one robot may use a movable member to handle the solar module or any components or supporting structures thereof. In some cases, the at least one robot may move the solar module or any components or supporting structures thereof by translating along one, two, or three Euclidean dimensions. In some cases, the at least one robot may move the solar module or any components or supporting structures thereof by rotating the solar module around one, two, or three axes of the solar module. In some cases, the at least one robot may translate and rotate the solar module simultaneously. In some cases, the at least one robot may translate the solar module and then rotate the solar module subsequently, or vice versa. In some cases, for a solar module that is substantially rectangular in shape, an axis of a solar module may be defined as the normal direction from the plane of the solar module having the largest area, the plane of the solar module having the second largest area, or the plane of the solar module having the third largest plane. The at least one robot may move the solar module in various ways, including changing a position and/or an orientation of the solar module or the components of the solar module.

In some cases, the solar module, supporting structures, and any components thereof may be repositioned and/or re-oriented to be more precise and/or ensure proper installation during deployment. In some cases, a given post may be repositioned and/or re-oriented to ensure a successful insertion of the post into the ground.

FIG. 52 illustrates an exemplary method for autonomously positioning and assembling solar modules, in accordance with some embodiments. In some cases, a module installer (e.g., a robot) may drive to a location. The location may be determined by a user or an operator of the robot, or based on sensor data. In some cases, a module installer may pick up an energy module (e.g., a solar module). In some cases, a module installer may position the module over 1, 2, 3, 4, or more posts. The posts may be installed autonomously by another robot.

In some cases, a clinch tool may be used to form a connection between the modules and the one or more posts, as described in greater detail below. In some cases, the clinch tool may fit between ears of a post and a clip. In some cases, the clinch tool may close to form a joint. In some cases, the module installer may release the clinch tool. In some cases, an end effector may be used to handle the tool and/or install the module. In some cases, a module installer may drive to another set (or next set) of one or more posts to install another module (or a next module).

In some embodiments, the method may comprise using the at least one robot to fully autonomously position and assemble a plurality of solar modules and associated supporting structures to construct a solar module array. In some cases, the plurality of solar modules and the associated supporting structures may comprise at least one solar module and a supporting structure for the at least one solar module.

In some cases, an array of modules, solar modules, energy modules, and the like may refer to an arrangement of a plurality of solar modules across an area or region. In some cases, the arrangement may be a lateral arrangement. In some cases, the arrangement may comprise a plurality of rows and/or columns. In some cases, the arrangement may comprise a circular pattern and/or a ring configuration. In some cases, the arrangement may comprise a hexagonal (e.g., honeycomb) pattern. In some cases, the arrangement may comprise a random configuration. In some cases, the arrangement may be based at least in part on the terrain or topology of the area or region in which the array is or will be deployed.

In some cases, the solar module arrays and/or various supporting structures (e.g., posts) can be constructed, deployed, or installed on a substantially flat terrain. In some cases, the solar module arrays can be constructed on a substantially non-flat terrain. The terrain on which the solar module arrays and/or the various supporting structures (e.g., posts) are constructed, deployed, or installed can comprise, for example, sand soil, rocks, water, ice, vegetation, grass, or any other manmade or natural surface. In some cases, the terrain may comprise a canyon, a desert, a forest, a glacier, a hill, a marsh, a mountain, a valley, an oasis, an ocean or other body of water, open terrain, a river terrain, a swamp terrain, or a tundra terrain.

In some cases, the terrain may comprise one or more flat portions and/or one or more inclined portions. In some embodiments, the inclined portions may have a slope ranging from about 1 degree to about 30 degrees or more.

Figure 60:
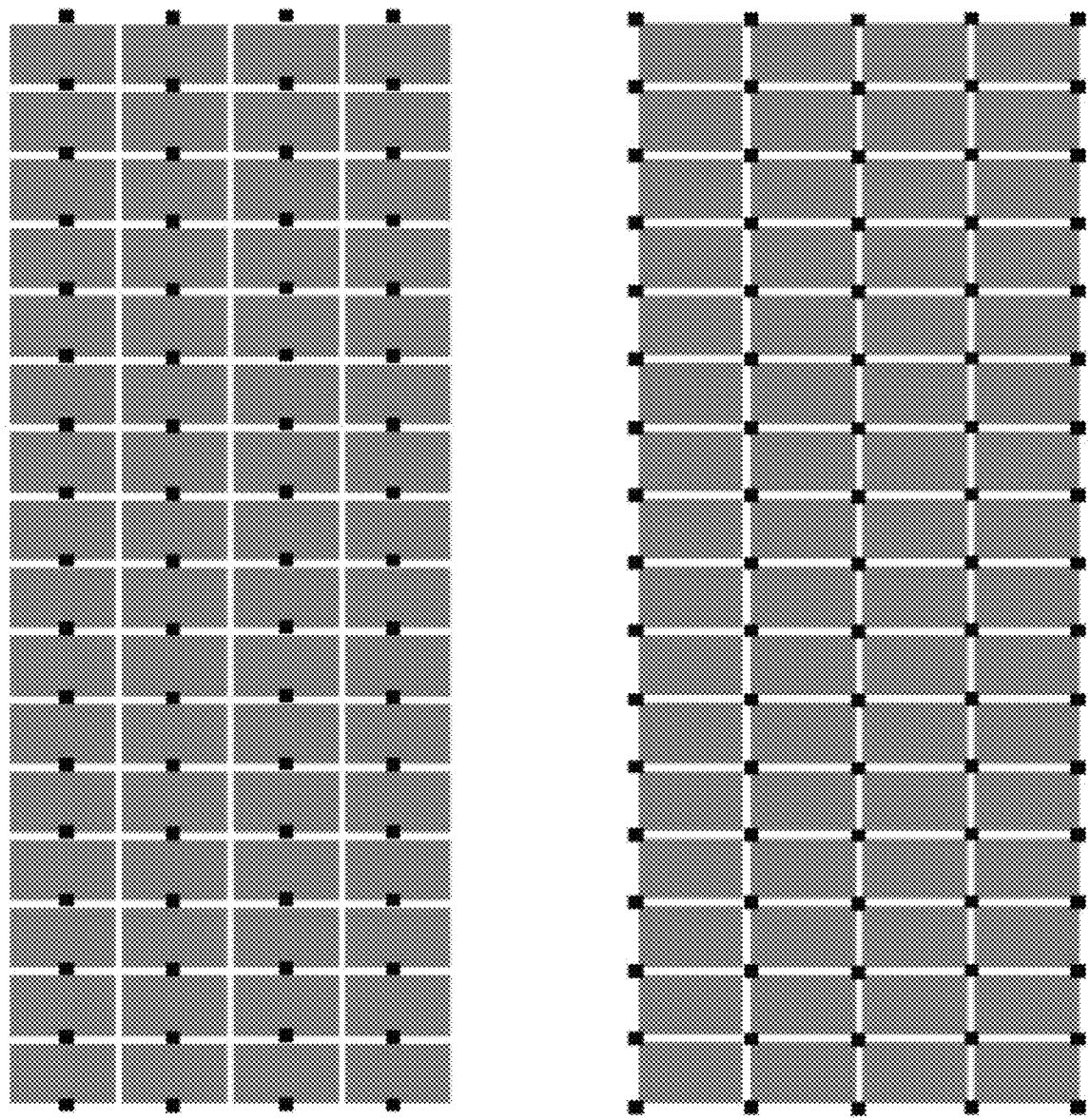
FIG. 60 illustrates solar module array configurations, in accordance with some embodiments. In some cases, a solar module array may comprise 4 posts for each corner of a module. In some cases, a solar module array may comprise 2 posts along a middle axis of a module.
Figure 72:
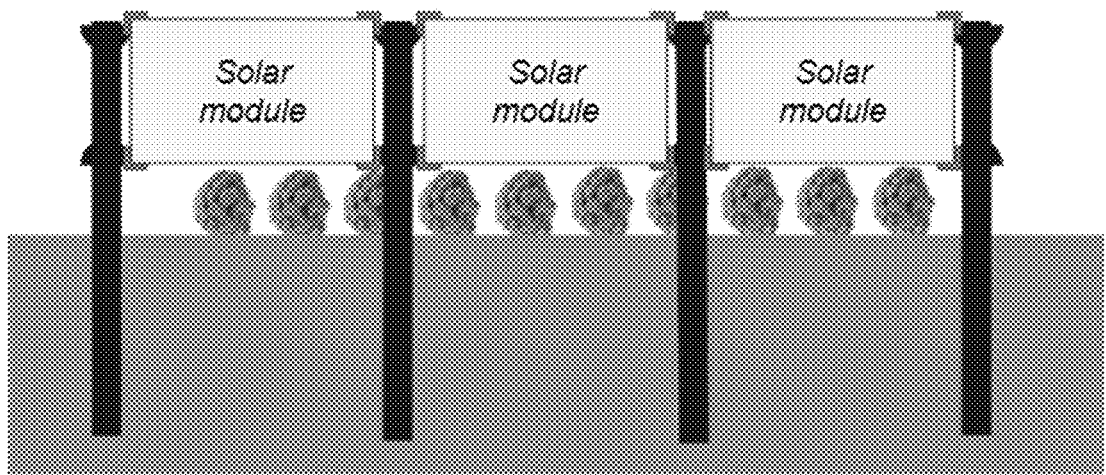
FIG. 72 and FIG. 73 illustrate an exemplary configuration in which a plurality of modules are positioned at a 90 degree orientation relative to the ground.
Figure 73:
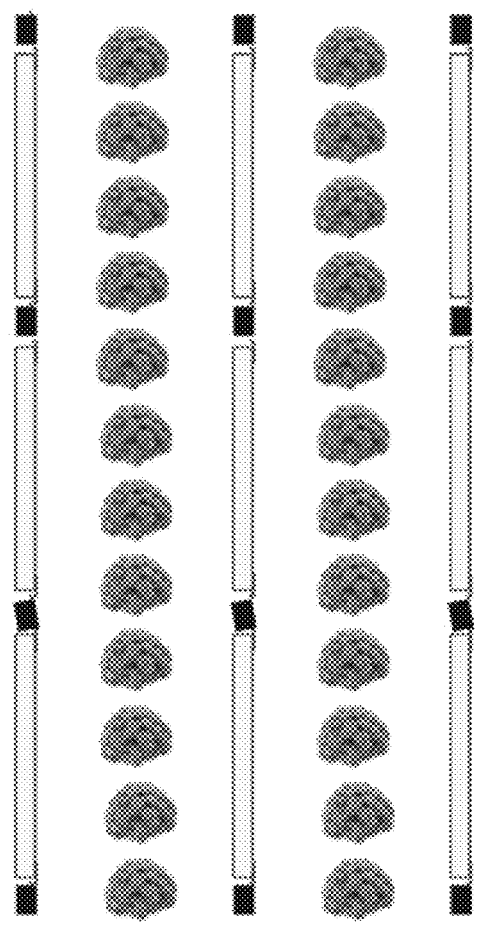
Figure 74:
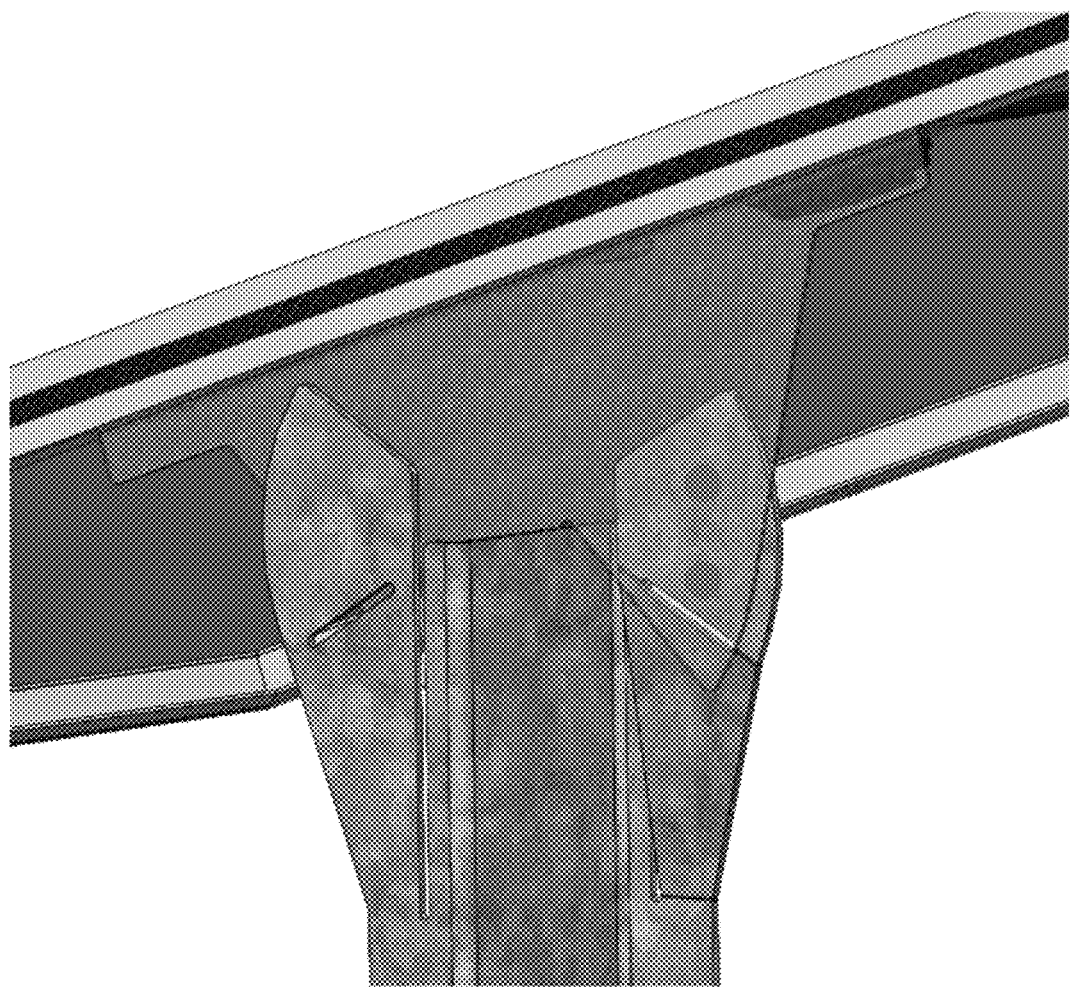
FIG. 74 illustrates an example of a middle clip, in accordance with some embodiments.

FIG. 60 illustrates various solar module array configurations, in accordance with some embodiments. In some cases, the solar module array may comprise 4 posts for each corner of a module. In some cases, the solar module array may comprise 2 posts along a middle axis of a module. In some cases, the solar module array may be a complete wired array. In some cases, the solar module array may be a dual-tilt array. In some cases, the solar module array may be a fixed tilt array. In some cases, one or more modules of the array may comprise a support bracket that is mounted directly to a post without requiring a spanning intermediate structure. In some cases, one or more modules may span two or more posts without the need for an intermediate structure between posts. FIG. 72 and FIG. 73 illustrate an exemplary configuration in which a plurality of modules are positioned at a 90 degree orientation relative to the ground. In some cases, the solar modules may be tilted to a full 90 degrees. In some cases, a plurality of posts may be affixed to one or more sides of the solar modules. In some cases, the arrangement and/or the configuration of the solar modules may permit access to the spaces between various rows in a solar module array. In some cases, the spaces between the various rows in the array may be used for growing crops. The posts, clips, post-module interfaces, and modules may be placed, installed, or deployed in accordance with any of the embodiments, methods, and/or system configurations shown and described herein.

In some cases, the modules may be configured to independently track the sun. Tracking the sun may comprise moving, repositioning, or reorienting the modules so that a working surface of the modules is able to receive one or more rays of light from the sun.

In some cases, the modules may track the sun based at least in part on a forecast, the location of the modules, or both. In some cases, the modules may track the sun based at least in part on a measured signal, e.g., amount of energy or power generated by the modules.

In some cases, the modules may each comprise an individual drive such that each module may independently track the sun. In some cases, the modules may be connected with a continuous wire or chain. The continuous wire or chain may be driven by a mechanism (e.g., one or more motors) to track the solar modules about one or more pivots on the posts. In some cases, the modules may be driven by a linkage (e.g., a 90 degree linkage) to a required angle, without requiring a tracking unit or a tracking table.

In some cases, one or more mechanisms may be disposed on one end of an array of solar modules. In some cases, one or more mechanisms may be disposed on two opposite ends of an array of solar modules. In some cases, one or more mechanisms may be disposed among the solar modules in the array. Any sufficient number of mechanisms may be disposed among the solar modules, and any sufficient arrangement of mechanisms may be disposed among the solar modules.

Figure 56:
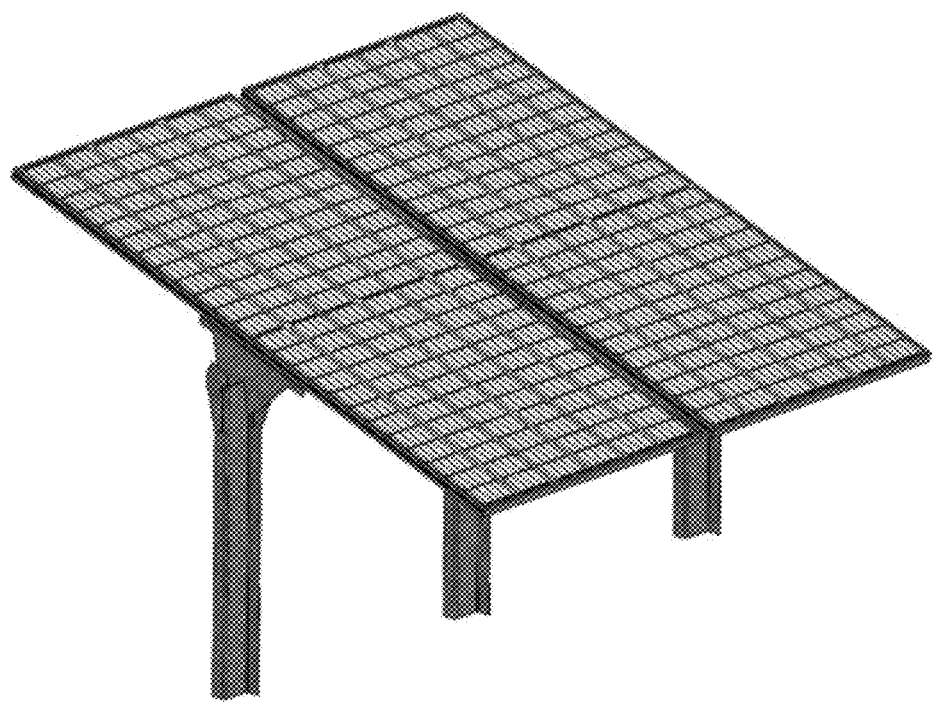
FIG. 56 illustrates a module comprising a fixed tilt array, in accordance with some embodiments.

FIG. 56 illustrates a module comprising a fixed tilt array, in accordance with some embodiments. In some cases, the module may be rigidly connected to two posts. In some cases, the module may comprise a small support bracket that is mounted directly to a post without requiring a spanning intermediate structure. In some cases, a module may be driven by a 90 degree linkage where each module may be driven to a required angle, for example, without requiring an entire tracker 'table' being driven together. In some cases, a module may span two or more posts without need for an intermediate structure between posts. In some cases, modules may be connected with a continuous wire or chain. In some cases, the continuous wire or chain may be driven by a mechanism to track the solar modules about one or more pivots on the posts. In some cases, the modules may each comprise an individual drive or drive unit such that each module may independently track the sun.

Figure 57:
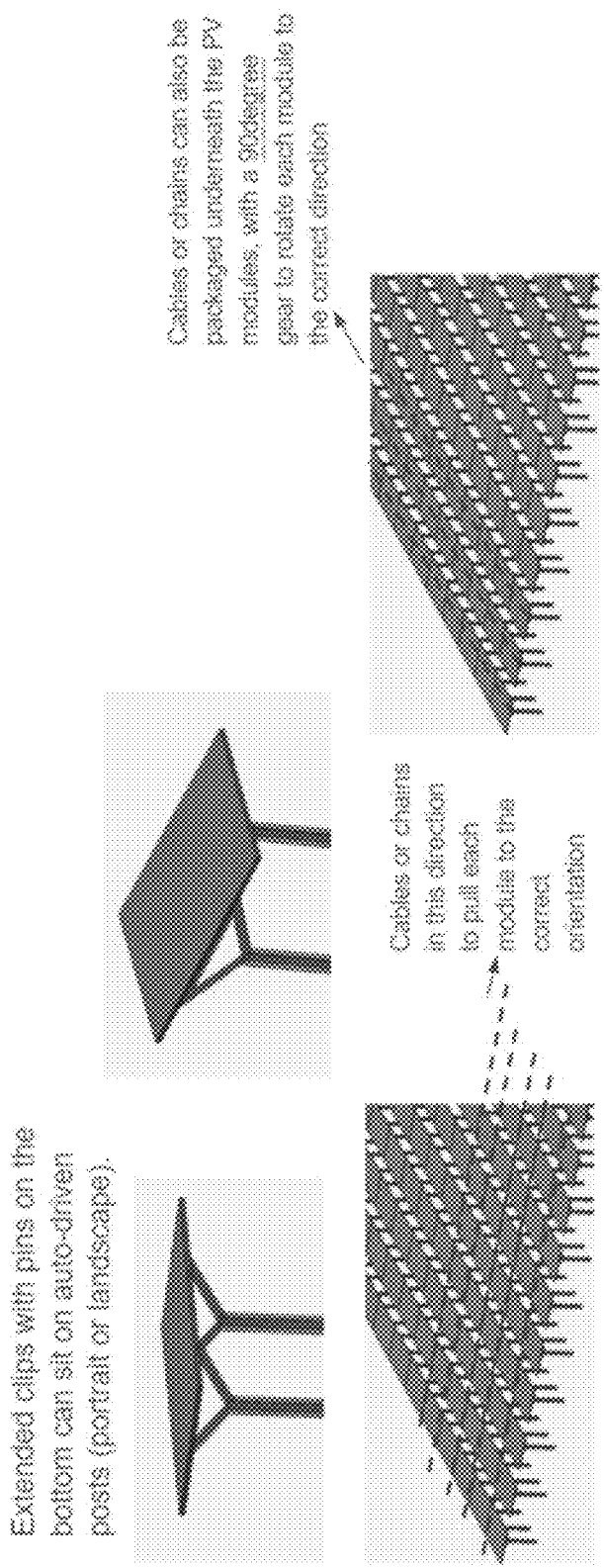
FIG. 57 illustrates a solar tracker, in accordance with some embodiments.

FIG. 57 illustrates a solar tracker, in accordance with some embodiments. The solar tracker may comprise a solar module sun tracking capabilities and/or a mechanism for moving one or more portions or components of a solar module to track the sun.

In some cases, an array of solar modules may comprise a plurality of solar modules disposed substantially linearly in at least one direction. In some cases, the linearly disposed plurality of solar modules may be coupled with one or more cables or chains along the linear direction. In some cases, the one or more cables or chains may be pulled along the linear direction, such that the plurality of solar modules are reoriented and/or repositioned.

In some cases, the plurality of solar modules may be disposed substantially linearly in at least two directions. In some cases, the plurality of solar modules may be coupled with at least two sets of one or more cables or chains along the at least two directions, respectively. In some cases, a first set of the one or more cables may be pulled along a first linear direction to reorient and/or reposition the plurality of solar modules in a first direction. In some cases, a second set of the one or more cables may be pulled along a second linear direction to reorient and/or reposition the plurality of solar modules in a second direction.

In some cases, the one or more cables or chains may be coupled above or below a given solar module. In some cases, the one or more cables or chains may be coupled to the side of a given solar module.

Figure 58:
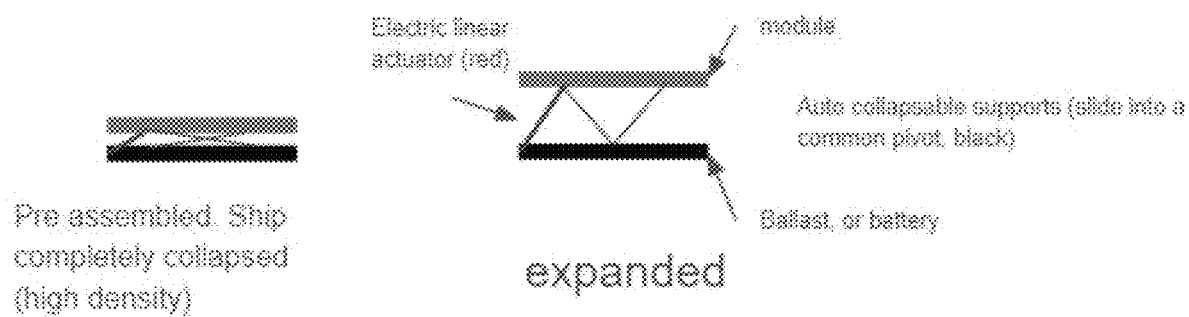
FIG. 58 illustrates a tracking unit, in accordance with some embodiments.

FIG. 58 illustrates a tracking unit, in accordance with some embodiments. The tracking unit may comprise a solar module with sun tracking capabilities and/or a mechanism for moving one or more portions or components of a solar module to track the sun.

In some cases, the tracking unit may be autonomously deployed. In some cases, the tracking unit may be pre-assembled, distributed, and placed on a field. In some cases, the tracking unit may be positioned, deployed, or wired autonomously using geolocation data and/or any machine or robot disclosed herein. In some cases, a tracking unit may be wired autonomously using geolocation data and/or any machine disclosed herein.

In some cases, the tracking unit may expand or be expandable to a single module solar track for tracking the sun in one, two, three, or more axes.

The methods disclosed herein may be implemented using a ground mount system for solar panels. The ground mount system may comprise a system, a structure, or a plurality of components configured to support or stabilize an energy module when the energy module is deployed.

Figure 1:
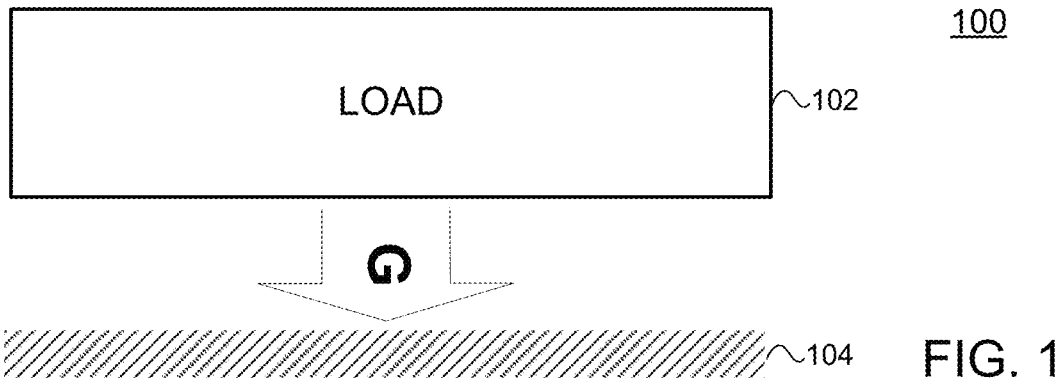
FIG. 1 is a simplified force diagram of a system for ground mount of solar panels.

FIG. 1 is a simplified force diagram of a system 100 for ground mounting solar panels, in accordance with some embodiments. Here, the active photovoltaic (PV) materials and any associated components (frames, beams, pillars, superstructure, junction boxes, wiring) represent a physical load G 102 that may be safely and reliably supported above the ground 104 against at least the force of gravity, as well as against possible external forces (e.g., wind, seismic).

Figure 2:
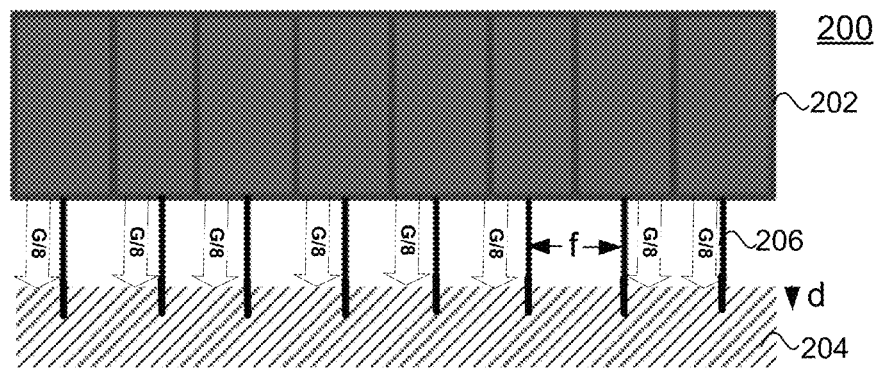
FIG. 2 shows a simplified view of an embodiment of a ground mount system.

FIG. 2 shows a simplified view of an embodiment 200 of a ground mount system for solar modules, in accordance with some embodiments. Here, a plurality of solar modules 202 are reliably supported above the ground 204 by a plurality of posts 206. In some cases, no separate and distinct superstructure may be needed. In some cases, these posts may be relatively small in size, and can be installed with a high frequency f. In some cases, each post may bear a much smaller portion of the overall load. Moreover, for the embodiment of FIG. 2, installation efficiencies may not require large blocks of solar modules distributed over large land areas. As a result, loads may be dictated by expected local peaks that are smaller in size. As a result of the reduced load required to be borne by each post, posts may penetrate the ground to a shallower depth. In some cases, additional supporting material (e.g., concrete) may not be required to secure the post within the ground. In some cases, this installation structure may allow for simpler, less expensive, and less invasive installation techniques, e.g., by (hydraulic) pushing or threading as described herein.

Figure 3:
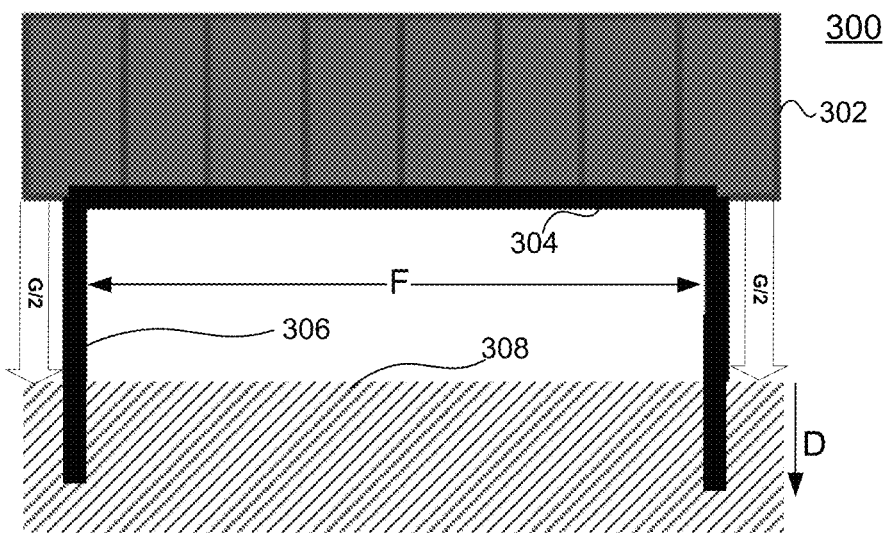
FIG. 3 shows a simplified view of a conventional ground mount installation.

FIG. 3 shows a conventional ground mount structure 300 for supporting solar modules 302, in accordance with some embodiments. This is a connected structure comprising a separate superstructure 304 and relatively massive pillars 306. These pillars occur at a relatively low frequency (F), and each bears a relatively large fraction of the entire load. In some cases, they are sunk to a substantial depth (D) within the earth 308—and may be secured therein with additional materials (not shown) such as concrete.

Instead of relying on separate, distinct, and massive superstructure components for structural stability, some embodiments of the present disclosure may utilize interconnectedness between modules in order to provide stability. FIG. 4A shows a perspective view of a ground mount system 400, in accordance with some embodiments. In some cases, many posts 450 may support a row of solar modules 402. In some cases, rectangular solar modules comprising seventy-two cells are shown. Various embodiments may support solar modules of various types. At each corner, the solar modules may be secured by a clip 404 to a respective post.

Figure 4B:
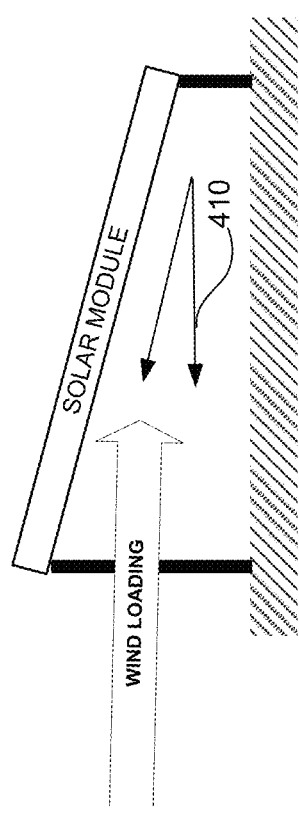
FIG. 4B shows an end view of the ground mount system of FIG. 4A, showing loading forces.
Figure 4C:
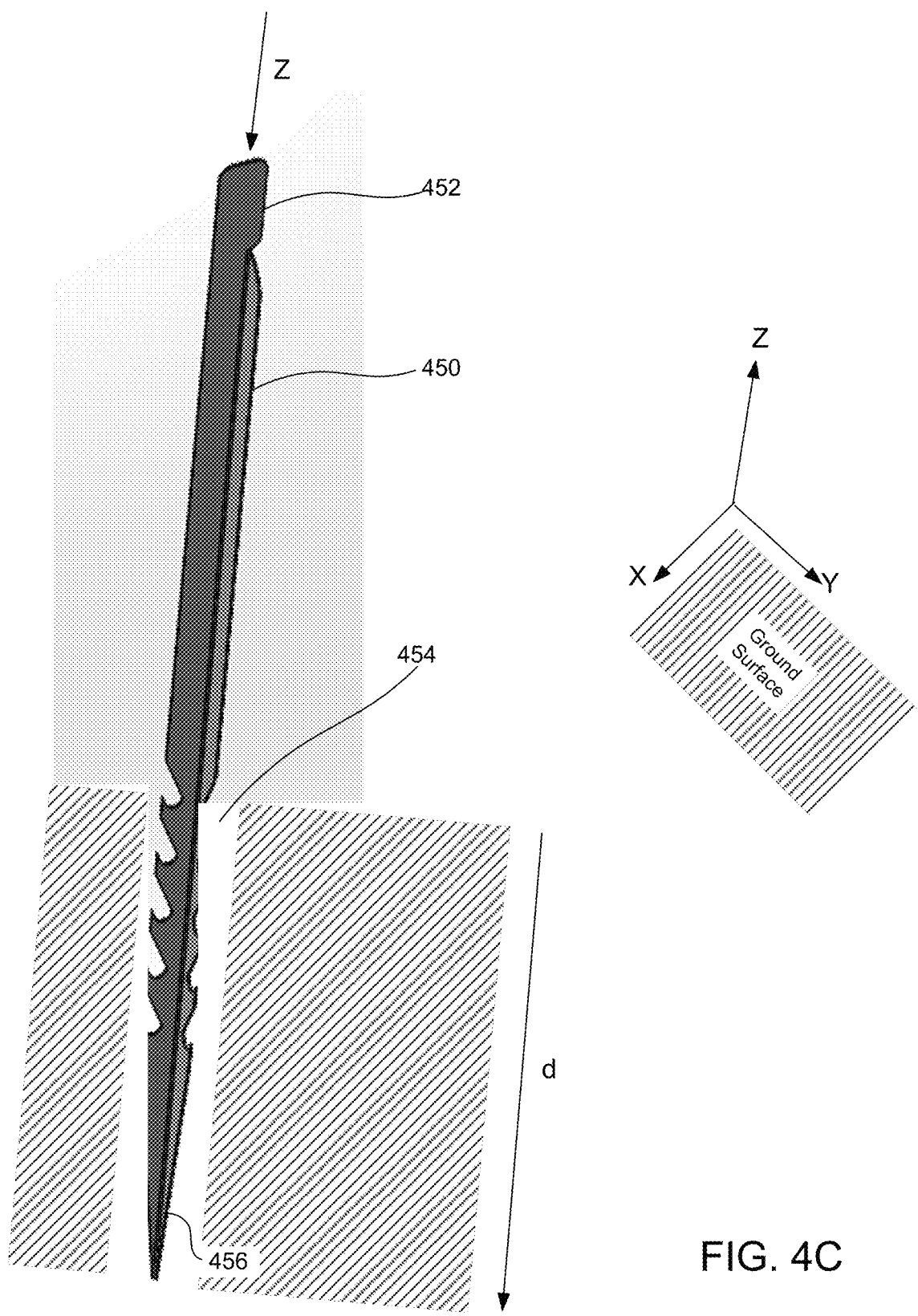
FIG. 4C shows an enlarged view of a post according to an embodiment.

FIG. 4B is an end view of the ground mount system of FIG. 4A, in accordance with some embodiments. FIG. 4B shows the tilt angle 410 provided by the ground mount, which orients the solar module to catch the sun's rays. FIG. 4B shows that wind can infiltrate the open side of the row, creating wind loading forces, in accordance with some embodiments.

Figure 5A:
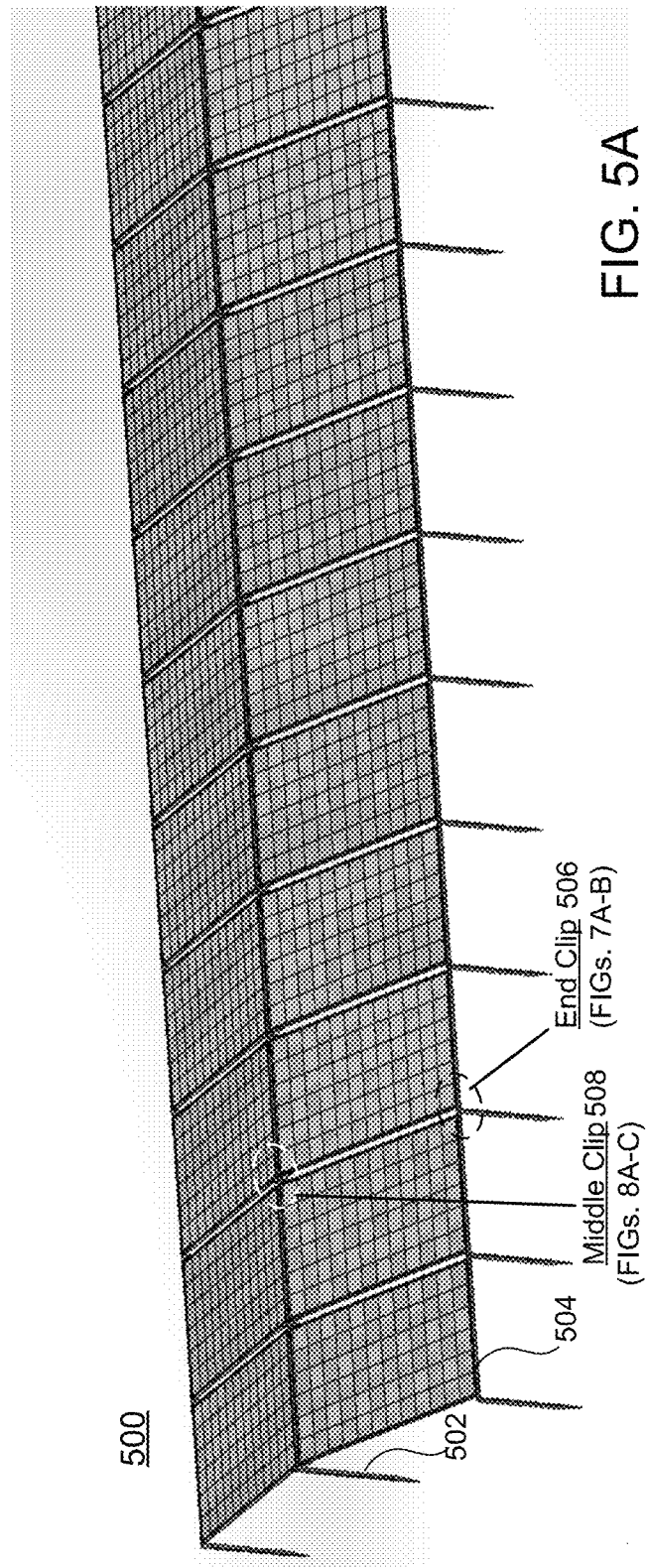
FIG. 5A shows a perspective view of a ground mount system according to an alternative embodiment.
Figure 7A:
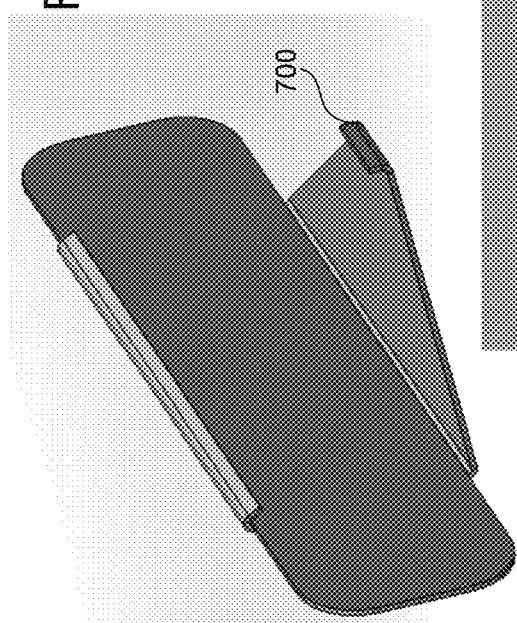
FIG. 7A shows a perspective view of an end clip according to an embodiment.
Figure 7B:
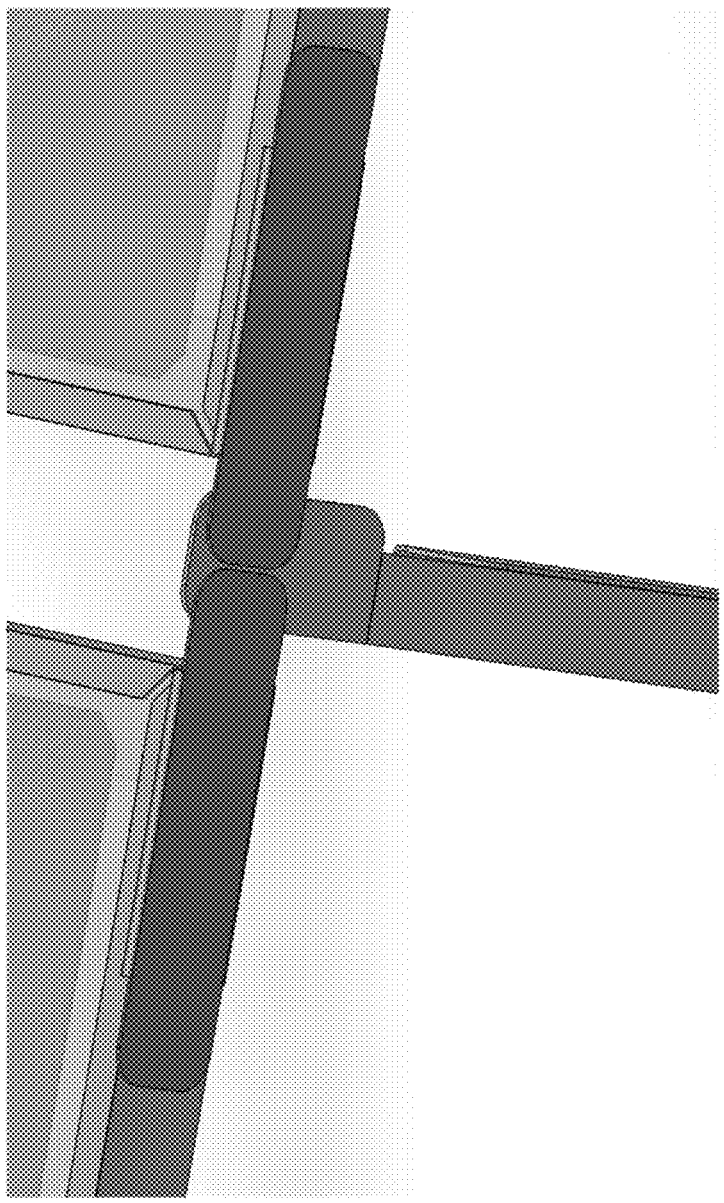
FIG. 7B shows a perspective view of an end clip with two modules attached.
Figure 8A:
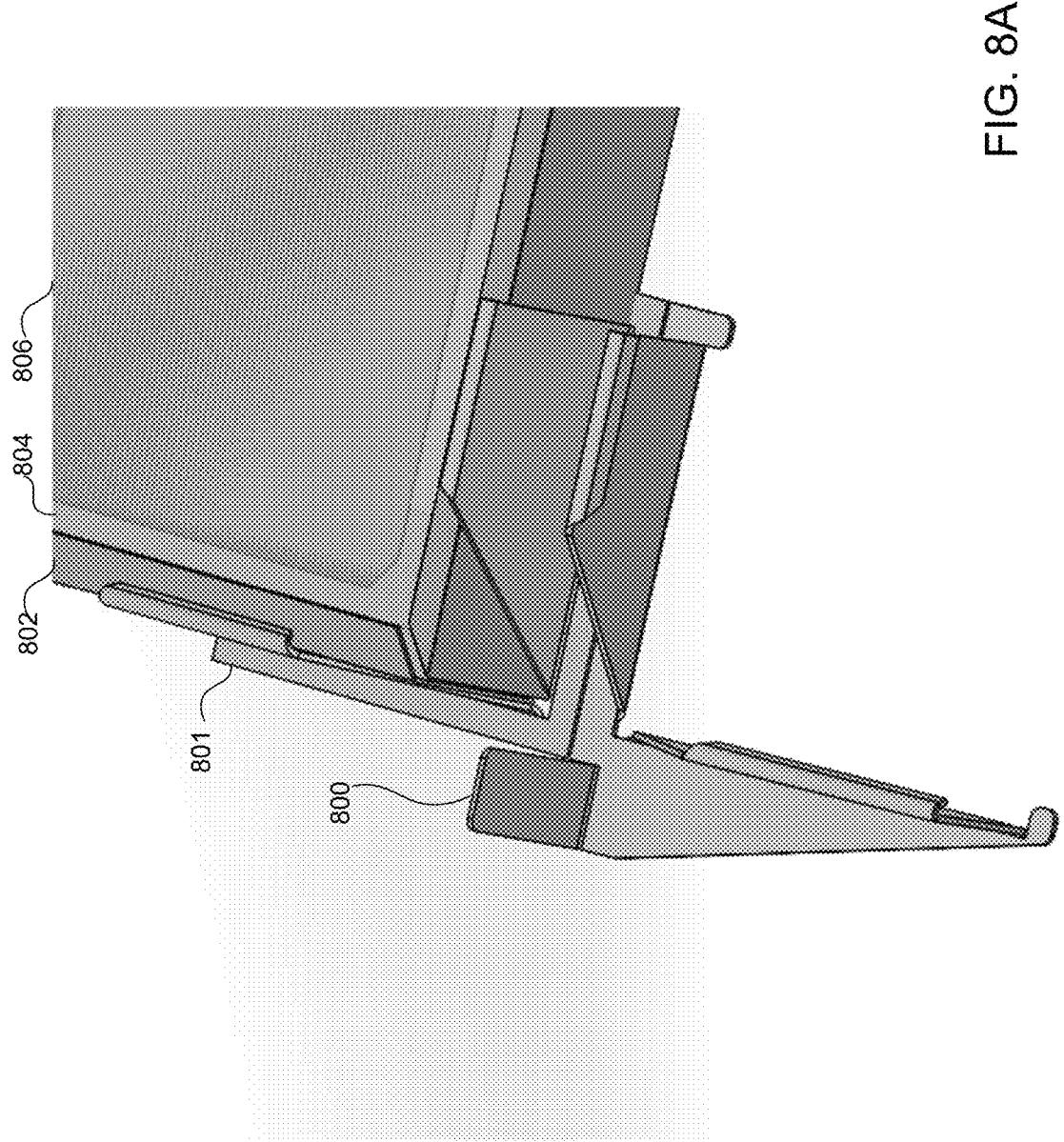
FIG. 8A shows a perspective view of a corner clip according to an embodiment.
Figure 8B:
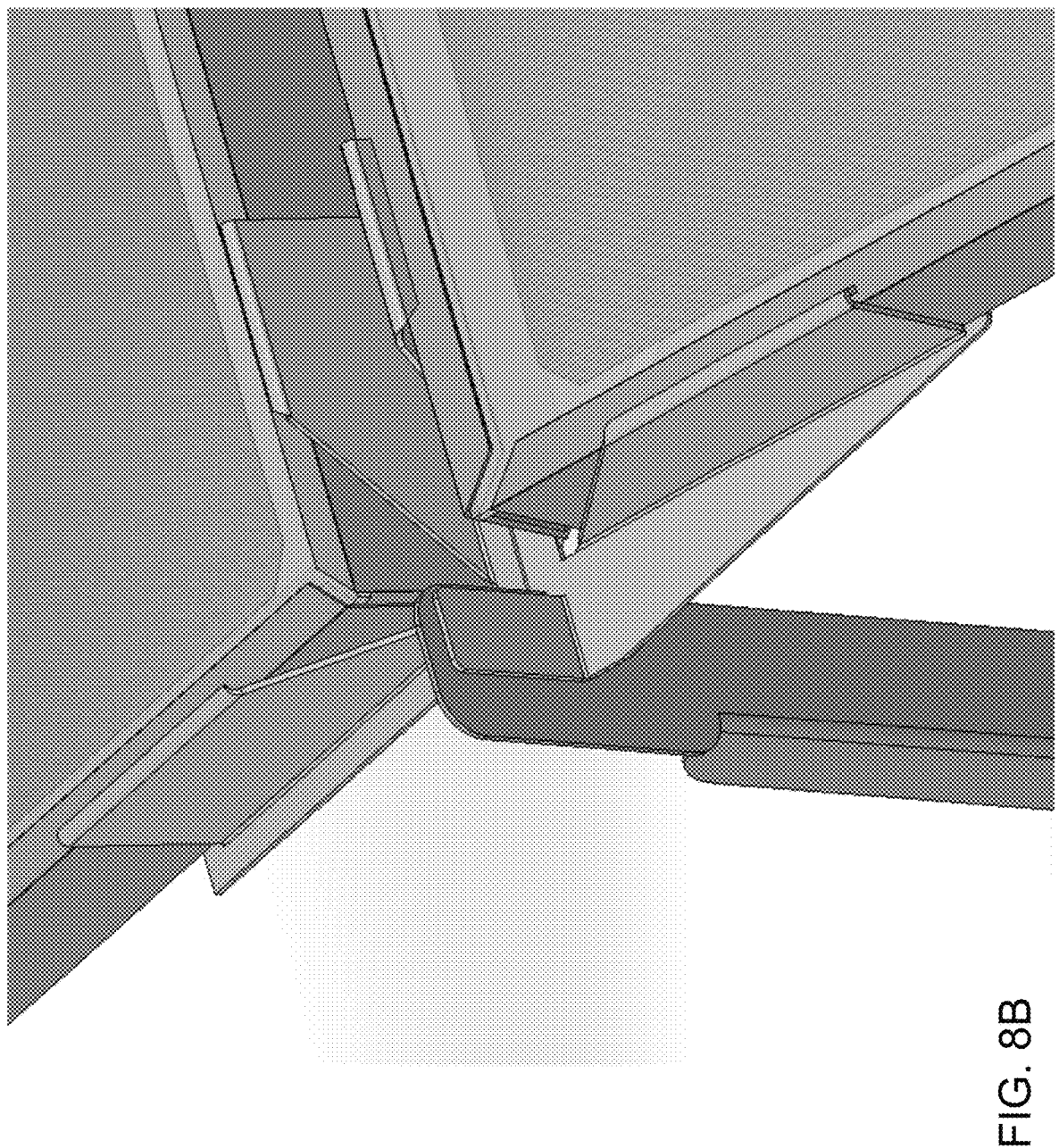
FIG. 8B shows a perspective view of the corner clip embodiment connected to two modules and a post.
Figure 8C:
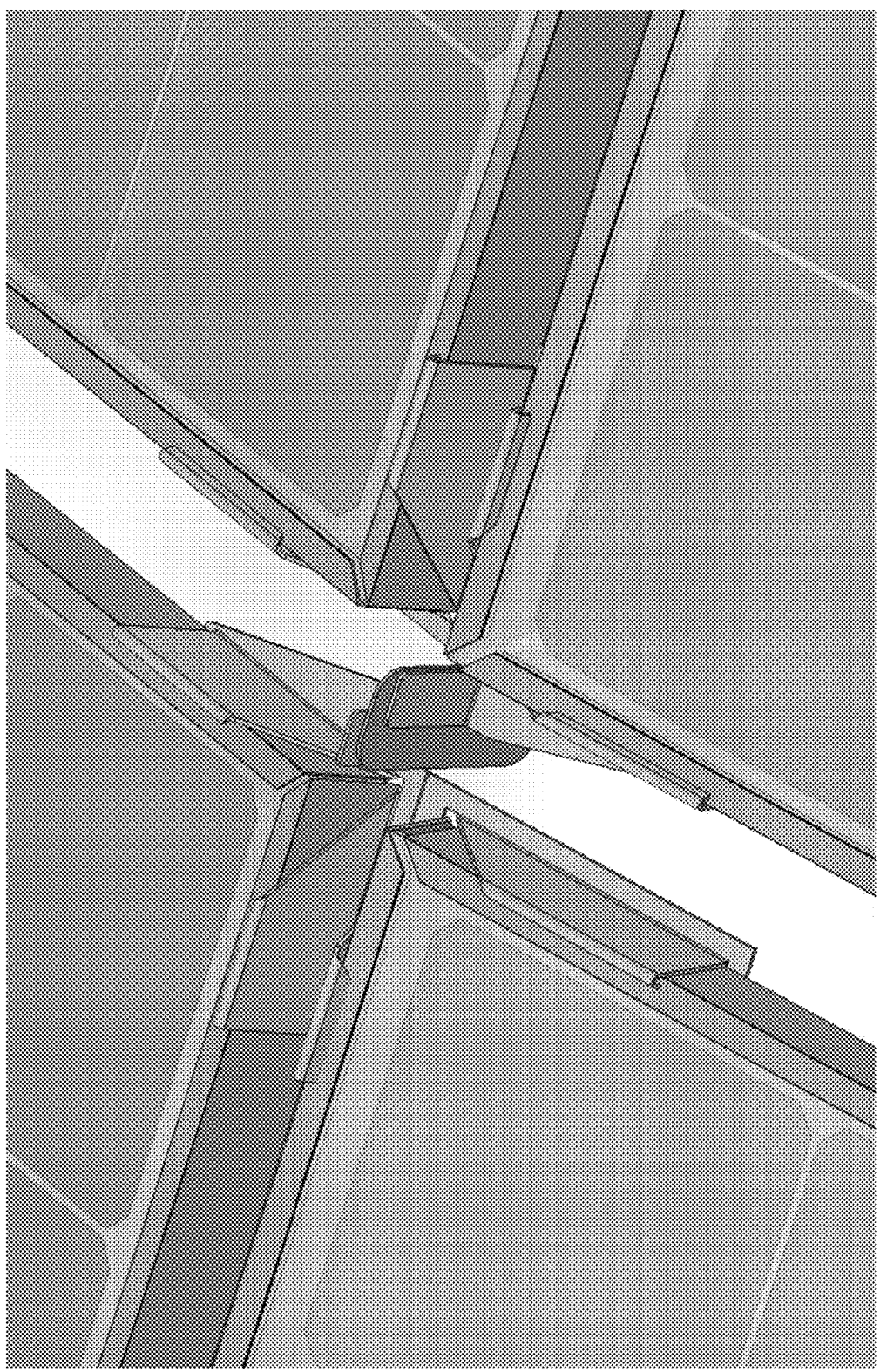
FIG. 8C shows a perspective view of a pair of corner clips and attached modules, connected to a post.

While the ground mount embodiments of FIGS. 4A and 4B show a single row of modules supported at a same tilt angle, alternative embodiments may feature rows with different tilt angle orientations. For instance, FIG. 5A shows a perspective view of a ground mount system 500, in accordance with some embodiments. In some cases, adjacent rows sharing common posts 502, may alternate in tilt angles to create a peaked structure. In some cases, solar modules 504 may be secured to posts by clips having different shapes. One type of clip may be an end clip 506 that is present on a side of a row having no adjacent row on one side. FIGS. 7A and 7B depict examples of end clips, in accordance with some embodiments. FIG. 7A shows a perspective view of an end clip according to an embodiment. As shown, the end clip is symmetric on both ends of module. The end clip captures bottom side of frame and top side of frame. FIG. 7B shows a perspective view of an end clip with two modules attached, in accordance with some embodiments. The center protrusion 700 may prevent the module sliding from laterally. According to an embodiment, the end clip may be fabricated from 1 mm sheet metal. Another type of clip may be a middle clip 508 that is present between adjacent rows. FIG. 7B illustrates an example of a middle clip. The middle clip may be used for solar modules that interface with a post in a middle region of the lateral sides of the module. In some cases, the clip may have an angular opening to accommodate multiple tilt angles, and to facilitate autonomous positioning or alignment of the clip and/or the module. In some cases, the post may have a flat face and a cutout such that the post flange can be bent in and clinched (dimpled) to the module clip in the locations corresponding to the green dots. The module clip may be mounted with a rivet or a bolt, or clinched to the module frame at its standard mounting points on the bottom flange. Another type of clip may be a corner clip. FIGS. 8A-8C depict examples of corner clips. FIG. 8A shows a perspective view of a corner clip 801 connected to a frame 802 of a solar module 804 that comprises photovoltaic material 806 (e.g., a plurality of solar cells). The clip may comprise a center tab 800. FIG. 8B shows a perspective view of the corner clip connected to two modules and a post, in accordance with some embodiments. The center tab 800 that mates (e.g., by clinching) with the face of the post tab, may be long enough to handle tolerances and imparts flexibility to accommodate tolerances in at least the row direction. FIG. 8C shows a perspective view of a pair of corner clips and attached modules, connected to a post, in accordance with some embodiments. In some cases, the clips may exhibit a single, mirrored design such that the tabs land on opposite sides of the post. The corner clips shown and described herein may not or need not require the use of a fastener to clip on to a module.

Figure 5B:
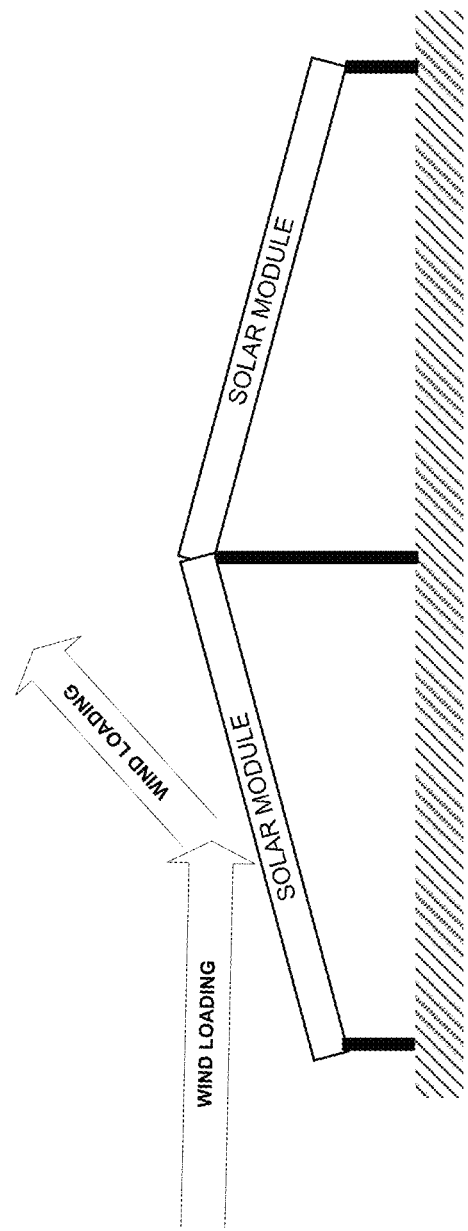
FIG. 5B shows is a simplified end view of the embodiment of FIG. 5A showing loading forces.

FIG. 5B shows is a simplified end view of the embodiment of FIG. 5A showing loading forces. In some cases, the inability of wind to flow underneath the raised side of the module rows, can substantially reduce wind loading forces to which the ground mount system is expected to be exposed.

Figure 6A:
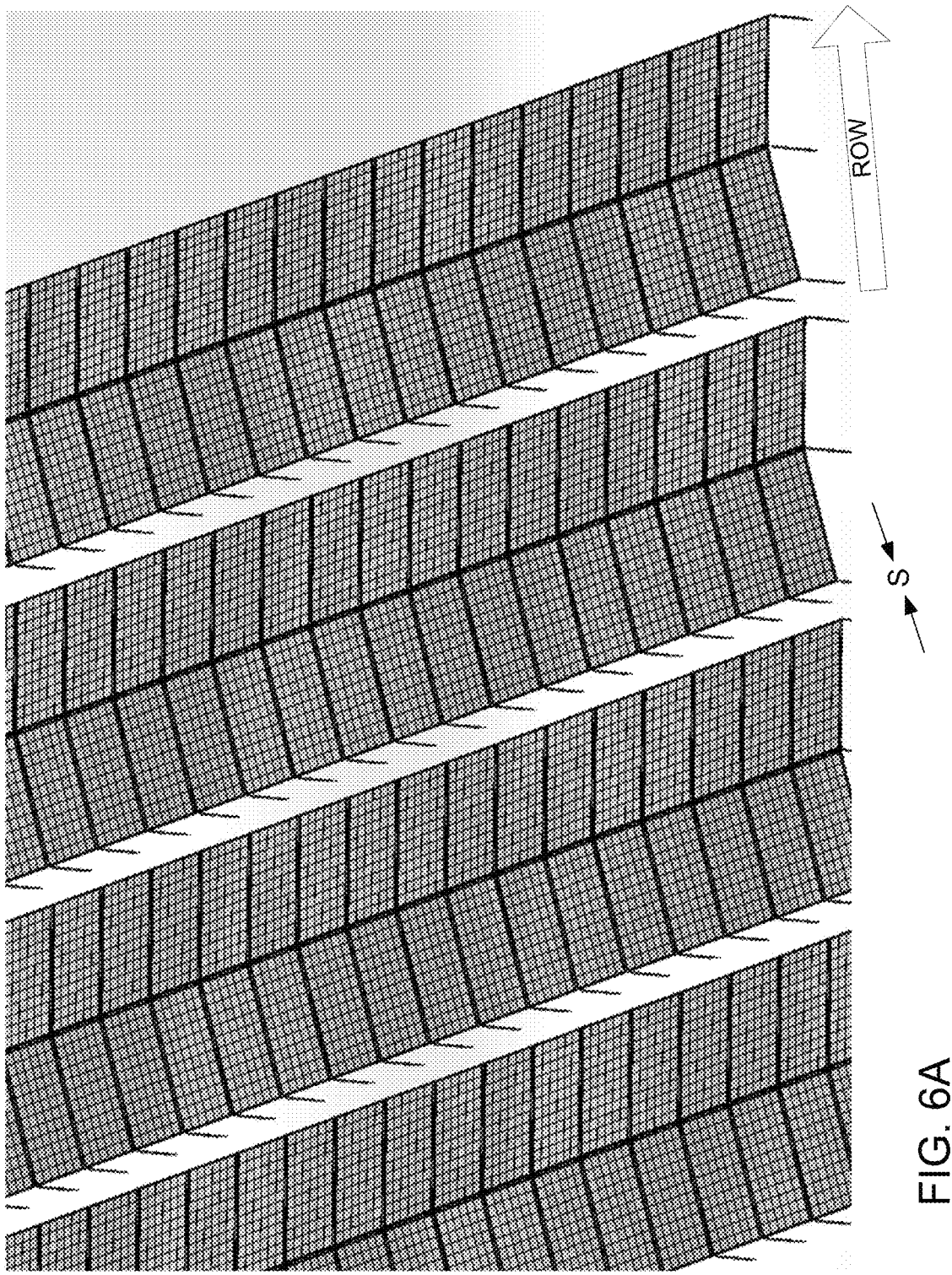
FIG. 6A shows a perspective of a solar module array resulting from a ground mount system according to an embodiment.

FIG. 6A is a perspective of a solar module array resulting from a ground mount system according to an embodiment. In some cases, the array may comprise a plurality of short (two module) rows, separated by a small spacing S. In some cases, many rows may be spaced closely together, conserving land area and increasing installation efficiency.

Figure 6B:
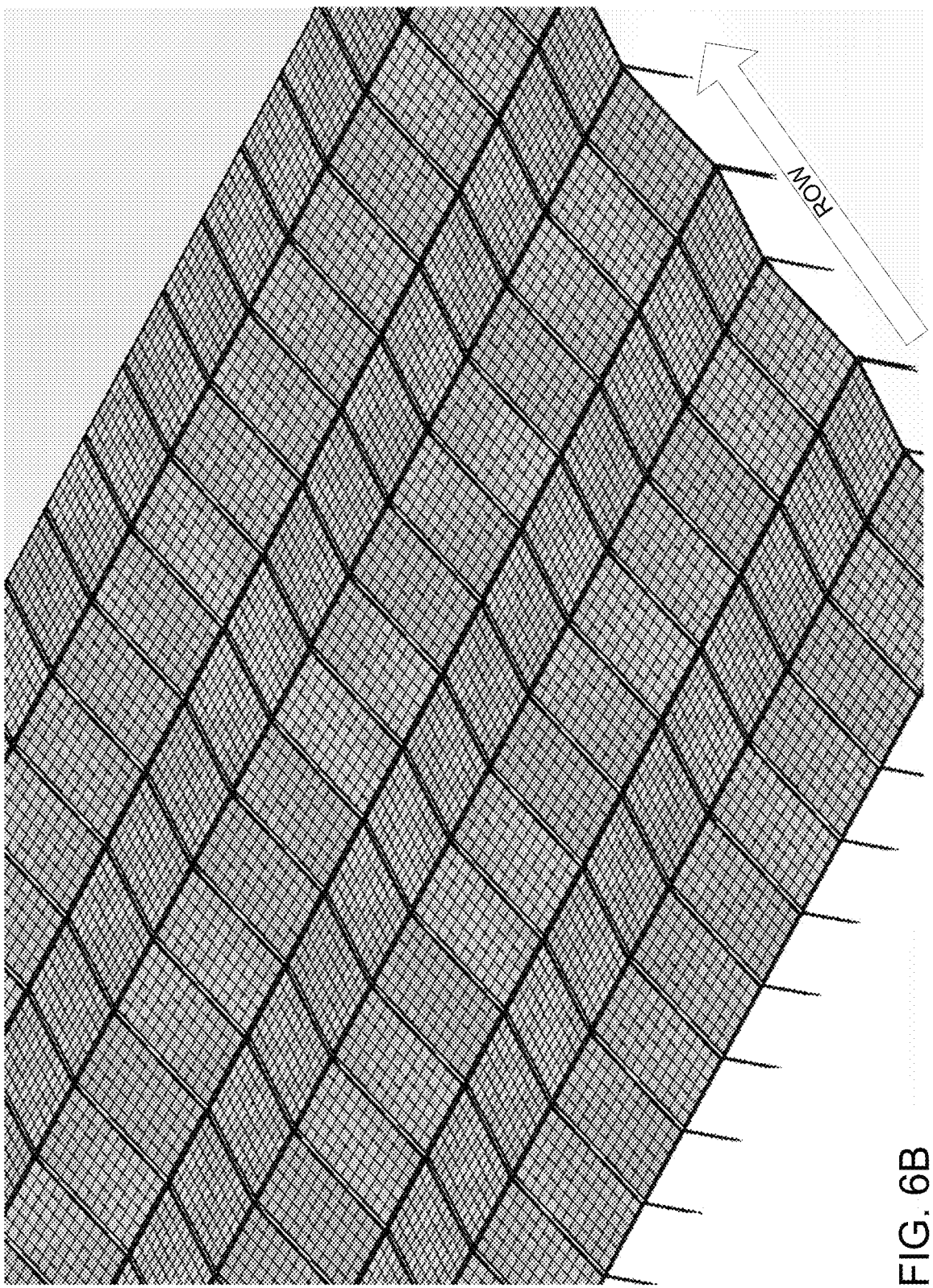
FIG. 6B shows a perspective view of another solar module array resulting from a ground mount system according to an embodiment.

FIG. 6B is a perspective view of another solar module array resulting from a ground mount system according to an embodiment. In some cases, the array may comprise longer rows of modules. In some cases, the corners of each row may be adjacent to the corners of the next row, and supported by the same post.

Figure 6C:
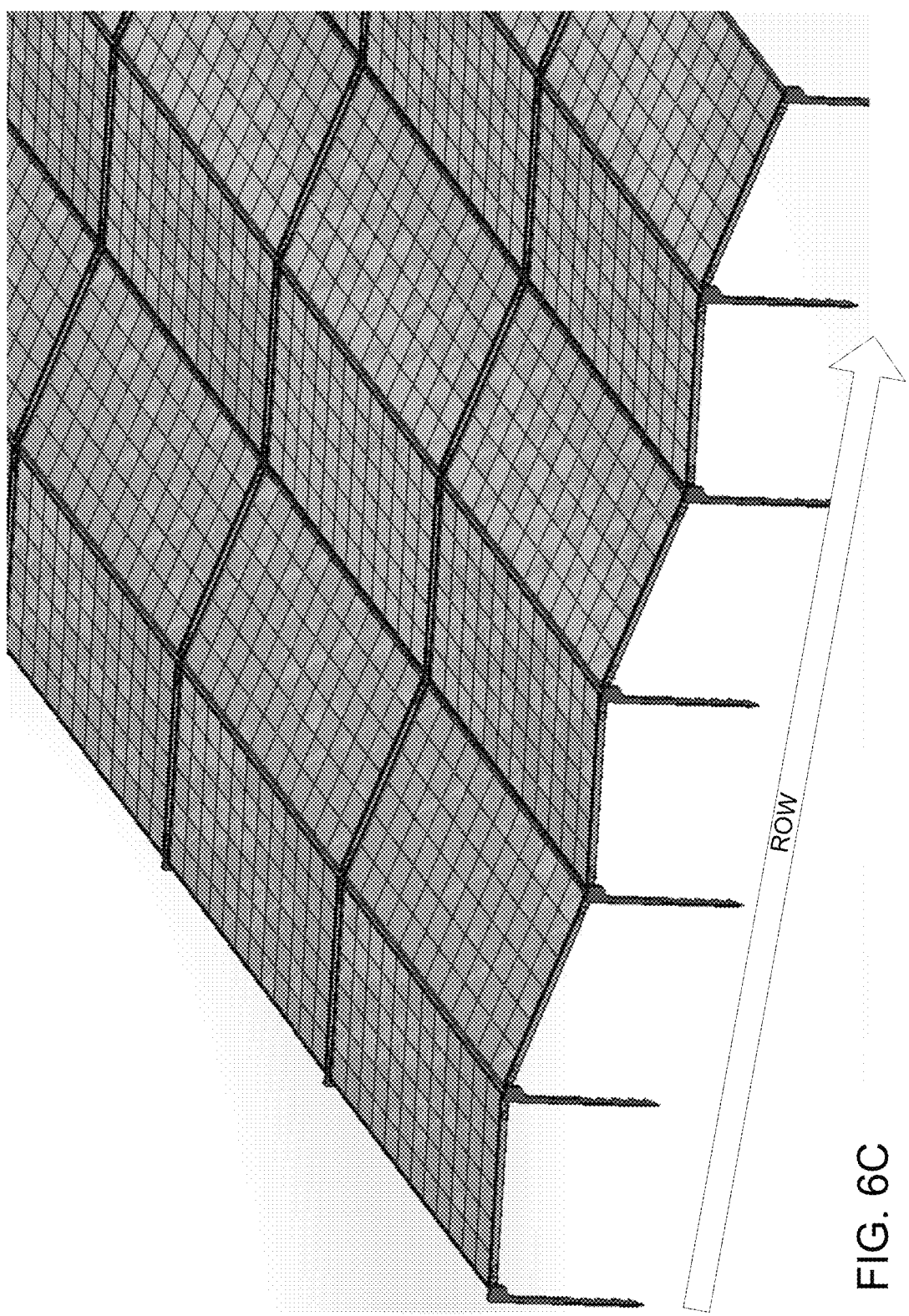
FIG. 6C shows a perspective view of an alternative embodiment with portrait-oriented solar modules with short ends aligned in the row direction.

While FIGS. 6A and 6B show solar arrays having rows of landscape-oriented solar modules with long ends aligned in the row direction, this is not required. FIG. 6C shows a perspective view of an alternative embodiment with portrait-oriented solar modules having their short ends aligned in the row direction.

Figure 9:
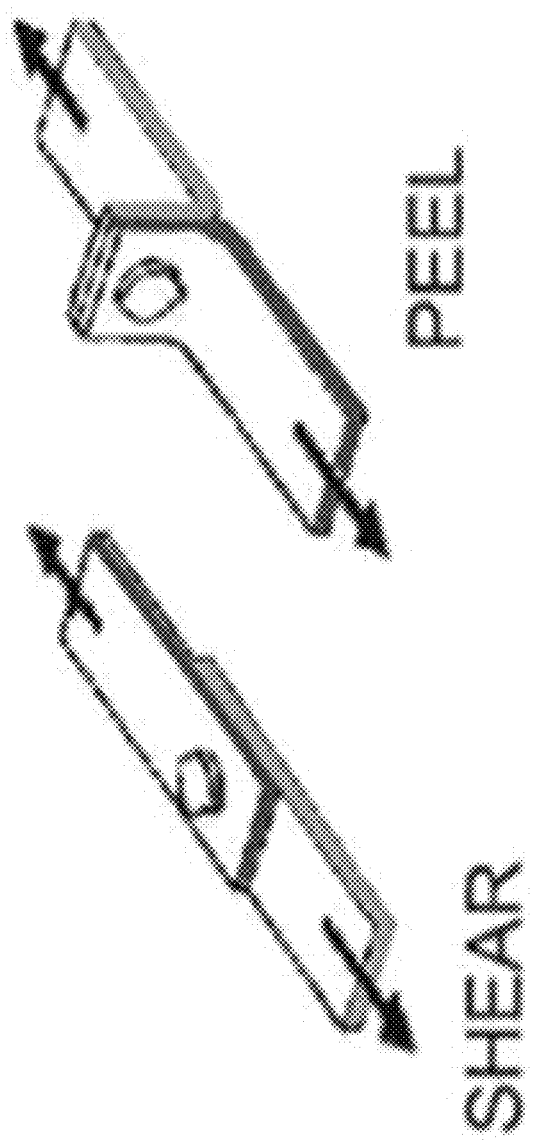
FIG. 9 illustrates forces to which a ground mount system may be subjected.

FIG. 9 illustrates peel and shear forces to which the ground mount system may be subjected. Particular embodiments may provide at least about 400 lbs shear strength, and/or at least about 200 lbs of peel strength.

In some embodiments, the posts can be installed substantially perpendicular to a flat surface. In some embodiments, the posts can be installed at an angle relative to a vertical axis that is perpendicular to a flat surface. In some embodiments, the angle can be from about 0° to about 5°, from about 0° to about 10°, from about 0° to about 20°, from about 0° to about 30°, from about 0° to about 40°, from about 5° to about 10°, from about 5° to about 20°, from about 5° to about 30°, from about 5° to about 40°, from about 10° to about 20°, from about 10° to about 30°, from about 10° to about 40°, from about 20° to about 30°, from about 20° to about 40°, or from about 30° to about 40°. In some embodiments, a first post can be installed at a first angle relative to a vertical axis that is perpendicular to a flat surface and a second post can be installed at a second angle relative to a vertical axis that is perpendicular to a flat surface. In some embodiments, the first angle and the second angle can be substantially same. In some embodiments, the first angle and the second angle can be different. In some embodiments, the posts are not parallel.

In some embodiments, the present disclosure provides a solar module array comprising: a plurality of solar modules, wherein the plurality of solar modules is supported by a plurality of posts, wherein the plurality of posts comprises a row of posts comprising a first post, a second post, and a third post, wherein the first post and the second post are tilted toward each other, and wherein the third post is tilted away from the first post or the second post.

In some cases, the first post may be installed at a first angle, the second post may be installed at a second angle, and the third post may be installed at a third angle. In some cases, each of the first angle, the second angle, and the third angle may be defined relative to a vertical axis.

In some cases, at least two of the first angle, the second angle, or the third angle may be different from each other. In some cases, the first angle, the second angle, and the third angle may be different from one another. In some cases, the first angle, the second angle, and the third angle may be substantially same as one another. In some cases, the first angle, the second angle, and the third angle may each range from about 0° to about 5°, from about 0° to about 10°, from about 0° to about 20°, from about 0° to about 30°, from about 0° to about 40°, from about 5° to about 10°, from about 5° to about 20°, from about 5° to about 30°, from about 5° to about 40°, from about 10° to about 20°, from about 10° to about 30°, from about 10° to about 40°, from about 20° to about 30°, from about 20° to about 40°, or from about 30° to about 40°. In some cases, the first post, the second post, and the third post may be configured to create an interlocking structure. In some cases, the row of posts may further comprise a fourth post that is tilted toward the third post. In some cases, the fourth post may be installed at a fourth angle defined relative to the vertical axis. In some cases, the fourth angle may be different from any one of the first angle, the second angle, and/or the third angle. In some cases, the fourth angle may be substantially same as any one of the first angle, the second angle, and/or the third angle. In some cases, the fourth angle may range from about 0° to about 5°, from about 0° to about 10°, from about 0° to about 20°, from about 0° to about 30°, from about 0° to about 40°, from about 5° to about 10°, from about 5° to about 20°, from about 5° to about 30°, from about 5° to about 40°, from about 10° to about 20°, from about 10° to about 30°, from about 10° to about 40°, from about 20° to about 30°, from about 20° to about 40°, or from about 30° to about 40°.

In some embodiments, the present disclosure provides a method for constructing a solar module array, the method comprising: positioning a plurality of posts over a terrain, wherein the plurality of posts comprises a row of posts comprising a first post, a second post, and a third post, wherein the first post and the second post are tilted toward each other, and wherein the third post is tilted away from the first post or the second post, wherein the plurality of posts is useable for assembling the solar module array. In some cases, the method may further comprise positioning a fourth post in the row of posts, wherein the fourth post is tilted toward the third post.

Figure 97A:
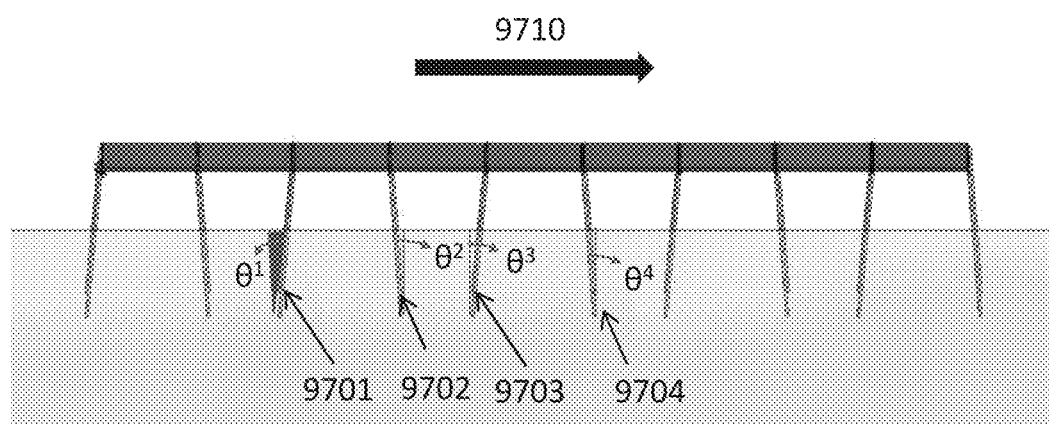
FIG. 97A shows an exemplary arrangement of a row of posts, in accordance with some embodiments.

In some embodiments, the plurality of posts comprises a row of posts wherein two adjacent posts in the row of posts are each tilted toward one another, wherein a third post adjacent to the two adjacent posts is tilted away. In some embodiments, the posts can be installed at alternating angles. In some embodiments, the non-parallel configuration of the posts, e.g., installation at alternating angles, creates an interlocking structure of the posts with regards to forces on the posts. FIG. 97A shows an exemplary arrangement of a row of posts. Post 9701 is adjacent to post 9702, post 9702 is adjacent to posts 9701 and 9703, and post 9703 is adjacent to posts 9702 and 9704. Post 9701 can be tilted forward (in the direction of arrow 9710) at an angle $\theta^1$ relative to the vertical axis. Post 9702 can be tilted backward (opposing to the direction of arrow 9710) at an angle $\theta^2$ relative to the vertical axis. Post 9703 can be tilted forward (in the direction of arrow 9710) at an angle $\theta^3$ relative to the vertical axis. Post 9704 can be tilted backward (opposing to the direction of arrow 9710) at an angle $\theta^4$ relative to the vertical axis. In some embodiments, the angles $\theta^1$-$\theta^4$ can be substantially same. In some embodiments, the angles $\theta^1$-$\theta^4$ can be different. The interlocking structure can engage better with the soil. In some embodiments, the interlocking structure can resist much higher forces. In some embodiments, at least a row of posts can be installed at alternating angles. In some embodiments, at least a portion of a row of posts can be installed at alternating angles. In some embodiments, the installation of posts at alternative angles can be determined by the location of installation, the environment of the location, the quality of the soil (e.g., soft or hard/dense soil layer), and the terrain surface (e.g., flat or non-flat).

In some embodiments, the post-module interfaces span multiple posts. In some embodiments, the angles of the posts can be determined to allow a shallow embedment. In some embodiments, the array uses posts that are angled to result in at least 2 different angles to result in a stiff structure. In some embodiments, the post can be connected to the standard mounting holes on a module.

Figure 97B:
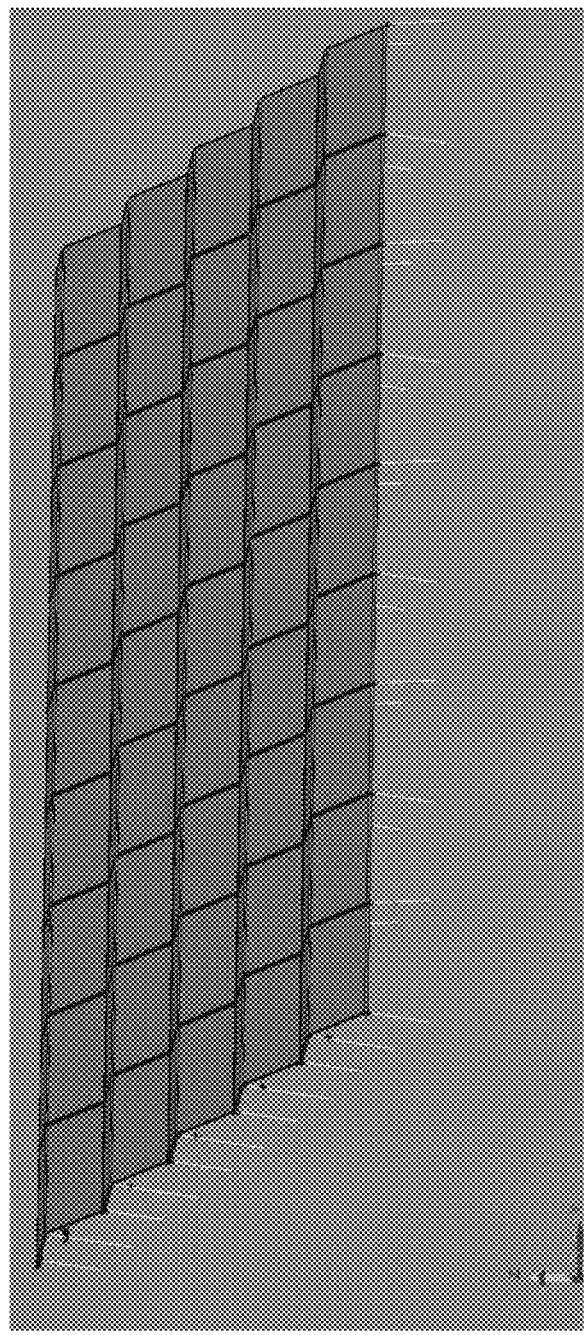
FIG. 97B shows an exemplary array of posts and solar panels/modules that are assembled with posts at alternating angles, in accordance with some embodiments.

FIG. 97B shows an exemplary array of posts and solar panels/modules that are assembled with posts at alternating angles.

In some embodiments, the angles are determined prior to the installation and loaded to the autonomous assembly system disclosed herein. The autonomous assembly system can read from instructions with predefined post angles and install precisely the posts at these predefined angles.

Figure 98A:
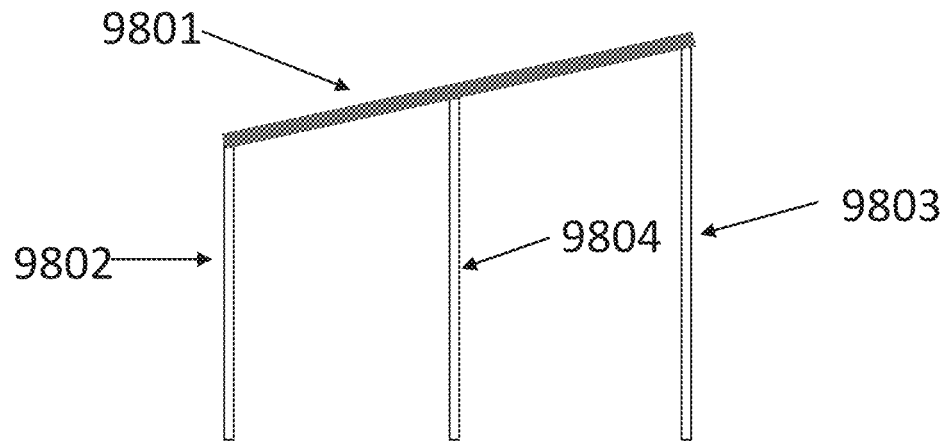
FIG. 98A shows an exemplary assembly of post and solar module, in accordance with some embodiments.
Figure 98B:
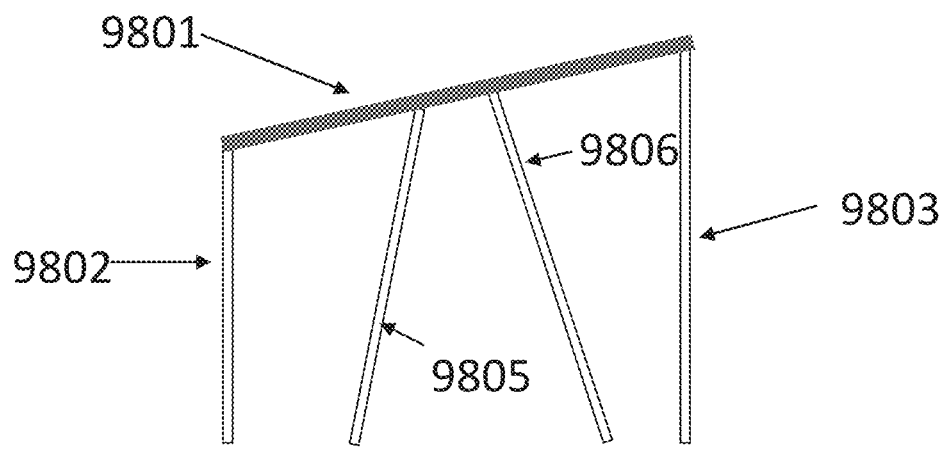
FIG. 98B shows another exemplary assembly of post and solar module, in accordance with some embodiments.
Figure 98C:
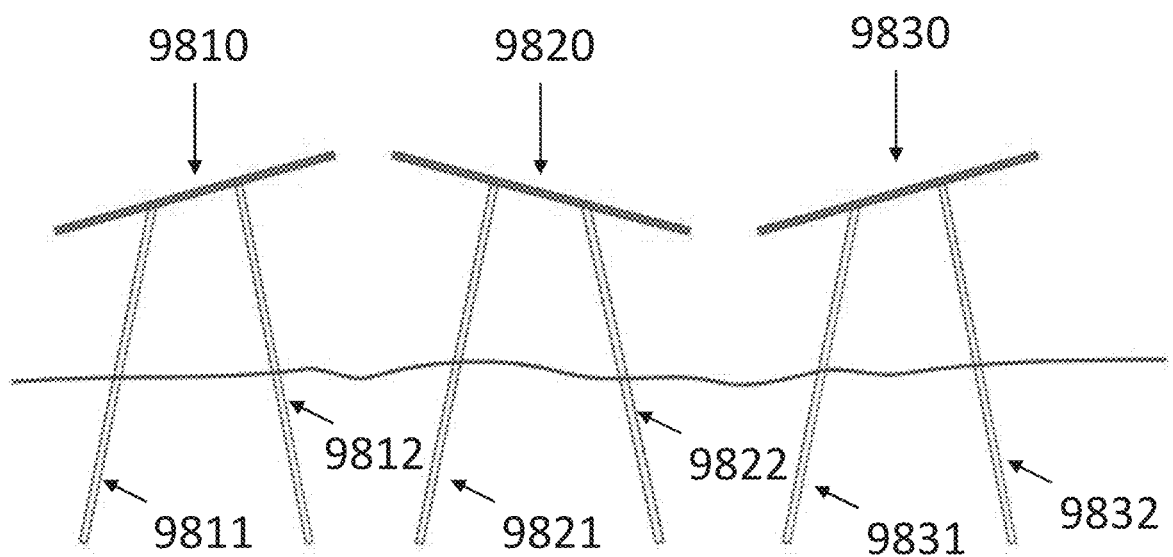
FIG. 98C shows another exemplary assembly of post and solar module, in accordance with some embodiments.

In some embodiments, in addition to the posts that support the solar modules at the corners of the solar modules, additional posts can be installed at the side of the solar module, to provide extra support. FIG. 98A shows an exemplary assembly of post and solar module. Solar module 9801 is supported by posts 9802 and 9803 at one side of the solar module. An additional post 9804 can be added at the one side of the solar module. In some embodiments, more than one posts can be installed at the one side of the solar module in between posts 9802 and 9803. FIG. 98B shows an exemplary assembly of post and solar module. In additional to the posts 9802 and 9803 which are at the corners of the solar module 9801, additional posts 9805 and 9806 are installed at the side of the solar module 9801. In some embodiments, the posts 9805 and 9806 can be installed at an angle relative to the vertical axis. In some embodiments, the posts 9805 and 9806 can be installed at alternating angles relative to the vertical axis, as disclosed above. FIG. 98C shows an exemplary assembly of post and solar module. In addition to the posts at the corners of solar modules (not shown in FIGS. 9810, 9820, and 9830, extra posts 9811 and 9812, 9821 and 9822, and 9831 and 9832 are installed for the modules 9810, 9820, and 9830 respectively, to provide extra support, especially in the region or area with higher loads and/or higher terrain tolerance.

FIG. 10 shows main tolerances of concern for a solar array installation, in accordance with some embodiments. In some cases, spacing between posts and/or angles of solar modules may be adjusted along a row, such that the solar array can be positioned or aligned in a desired orientation. FIG. 10 also shows a tilt axis angular alignment, in accordance with some embodiments. In some cases, the angular orientation of the solar modules may be fixed or movable. In some cases, the solar modules may have a dual tilt angle. In some embodiments, the solar module array comprises a dual tilt array. FIG. 10 further shows ground mount installation on a slope, in accordance with some embodiments. In some cases, a tracker may adjust an angle of a solar module from at least about 1° to about 10° or more in addition to the angle of the slope. FIG. 10B shows a side perspective view indicating the impact of uneven terrain upon installation, in accordance with some embodiments. FIG. 10C is an enlarged view showing the ability of the components of some embodiments disclosed herein, which may rotate relative to each other in order to accommodate tolerances.

While some embodiments have shown a post with the ground end having a sawtooth pattern, this is not required. Alternative embodiments may utilize posts in the form of ground screws. In some embodiments, the post may comprise two sections, with a screw portion going in first, and a top portion (allowing vertical adjustment) attached to the screw portion.

Figure 10A:
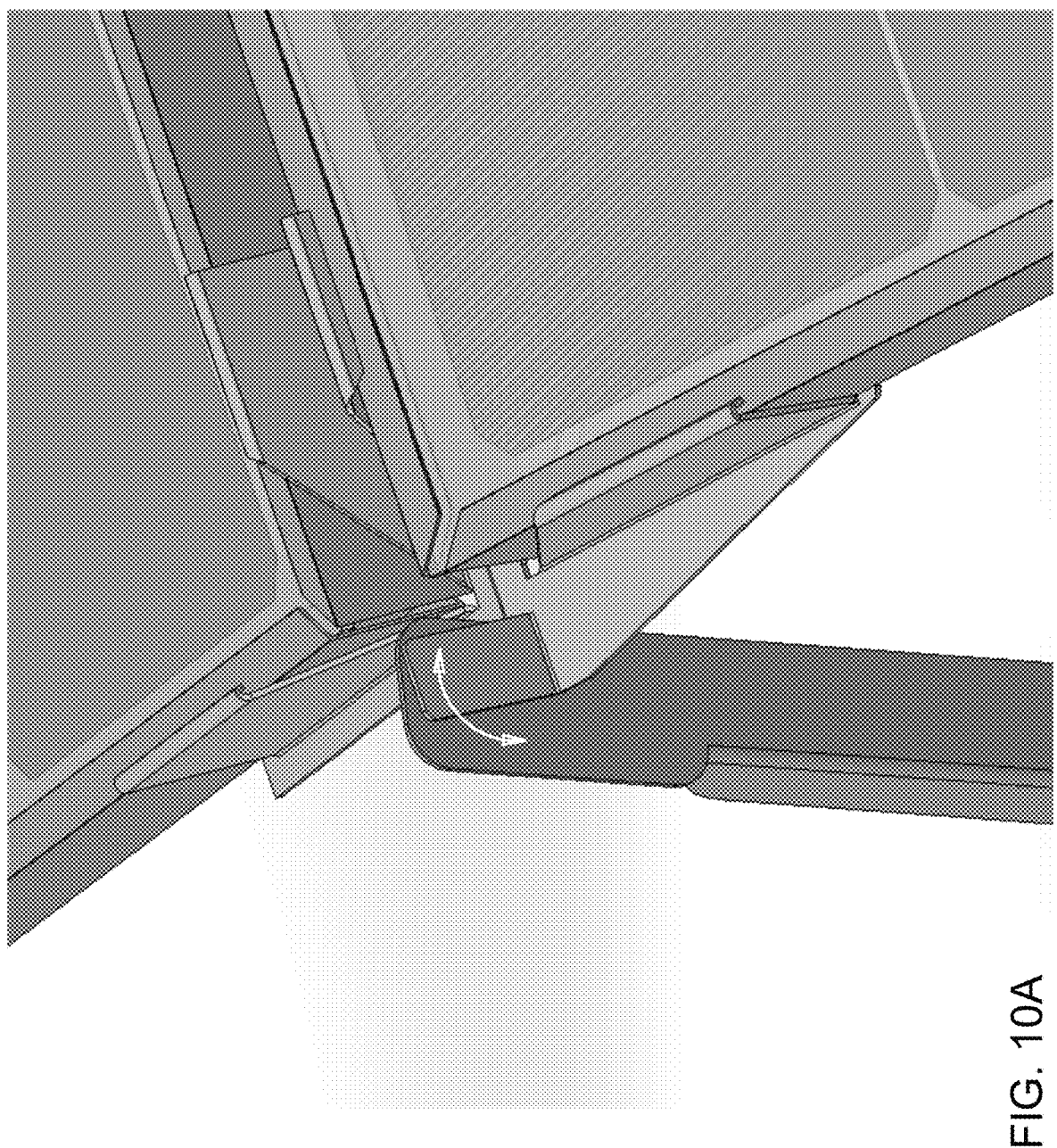
FIG. 10A shows a perspective view of two clips clinched in place onto a post.
Figure 10B:
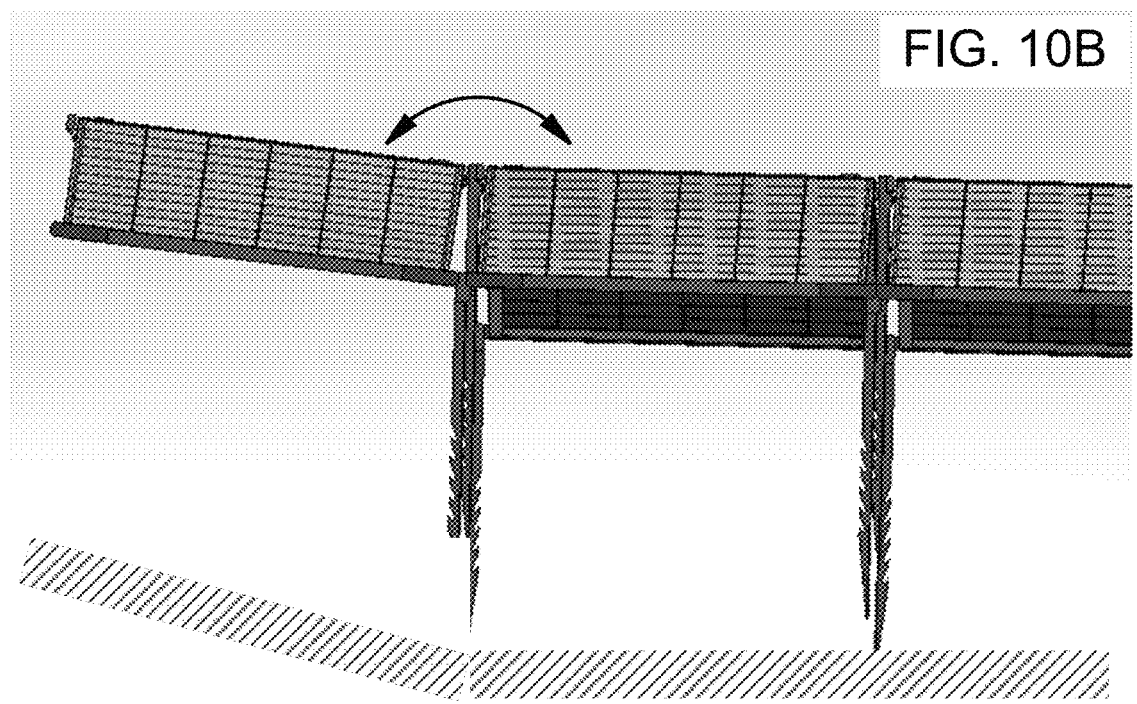
FIG. 10B shows a side perspective view showing the impact of terrain upon installation.
Figure 10C:
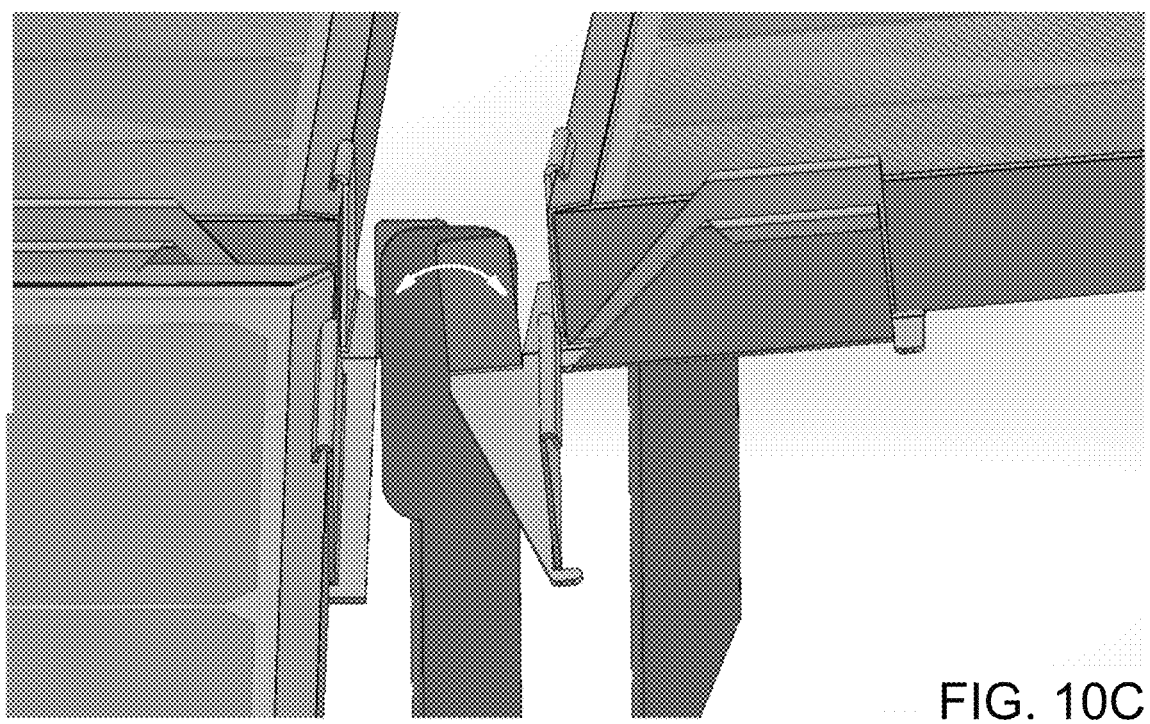
FIG. 10C shows an enlarged view showing the ability of a ground mount system according to embodiments, to handle relatively high tolerances.
Figure 10D:
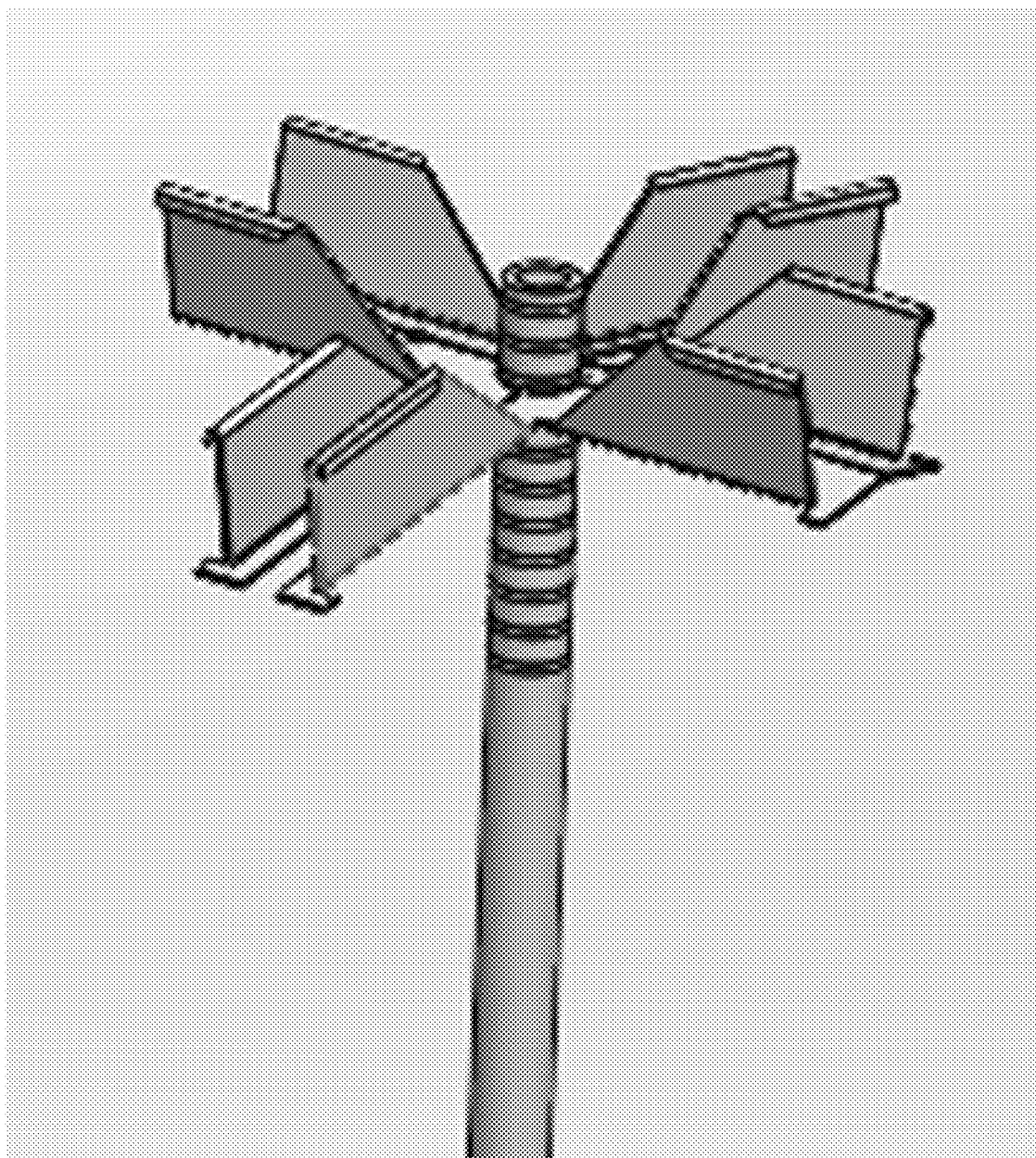
FIG. 10D shows a perspective view of an alternative post embodiment.

FIG. 10D shows a perspective view of an alternative embodiment featuring a ground screw. In some cases, a four way clip can be retained by standard retaining rings that snap into grooves on the post. In some cases, the vertical tolerances can be accommodated by having multiple grooves. In some cases, angular tolerances can be accommodated by oversizing the hole. In some cases, a component can withstand at least about 10 lbs, 20 lbs, 30 lbs, 40 lbs, 50 lbs, 100 lbs, 200 lbs, 300 lbs, 400 lbs, 500 lbs, or more of uplift at a corner area.

FIG. 10A shows a perspective view where a clip that has been clinched in place onto a post tab (e.g., using a tool of an installation machine), has rotated substantially to accommodate tolerances. In some cases, clinching may be performed in situ (e.g., when the module makes contact with the post tab), which may lock in the position of the solar module while accommodating for some additional flexibility. According to some embodiments, a clinching tool may perform at least 2 punches (e.g., 800 lbs shear/400 lbs peel) for the full joint.

Figure 14:
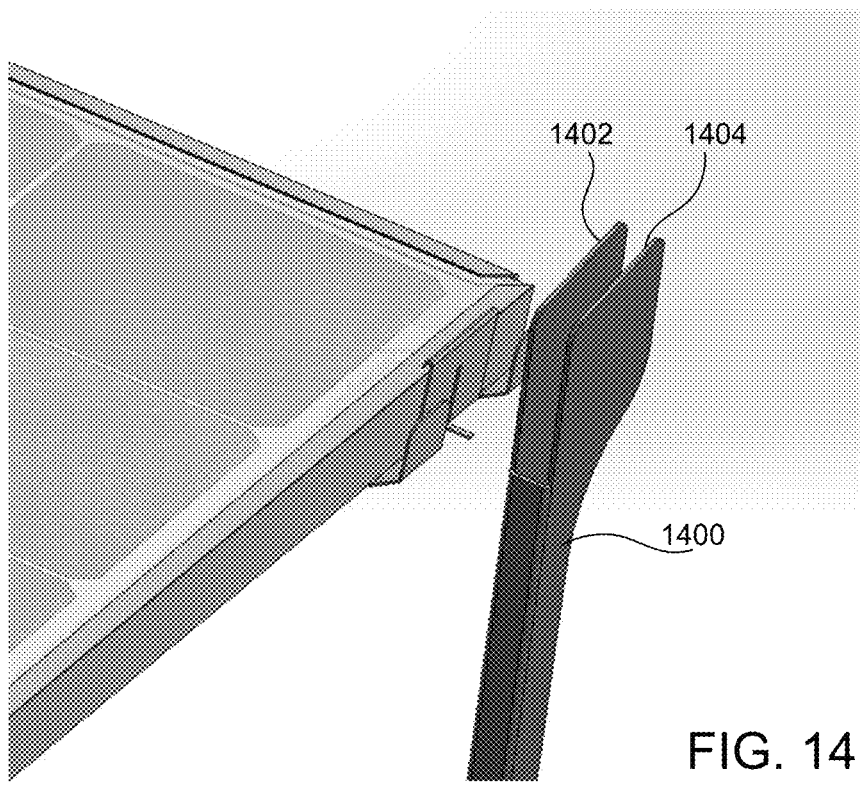
FIG. 14 shows a simplified perspective view showing the clip/module assembly, adjacent to an alternative embodiment of a post.
Figure 15:
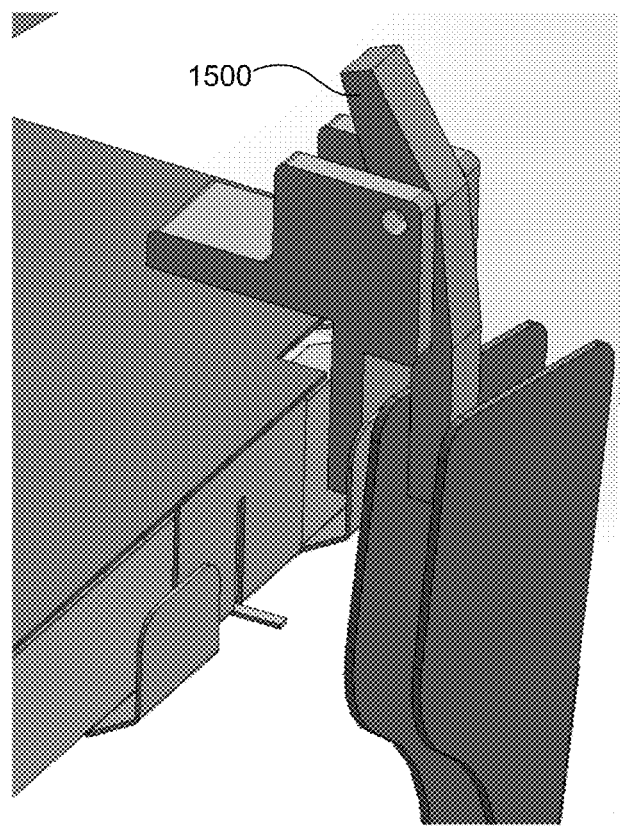
FIG. 15 shows a simplified view showing a clinching tool that can be used to clinch together the clip to a face of the post.
Figure 15A:
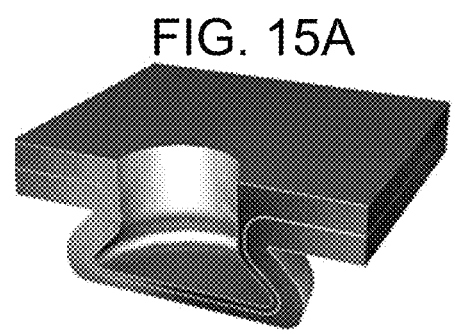
FIG. 15A shows a simplified view of a resulting clinching joint.
Figure 15C:
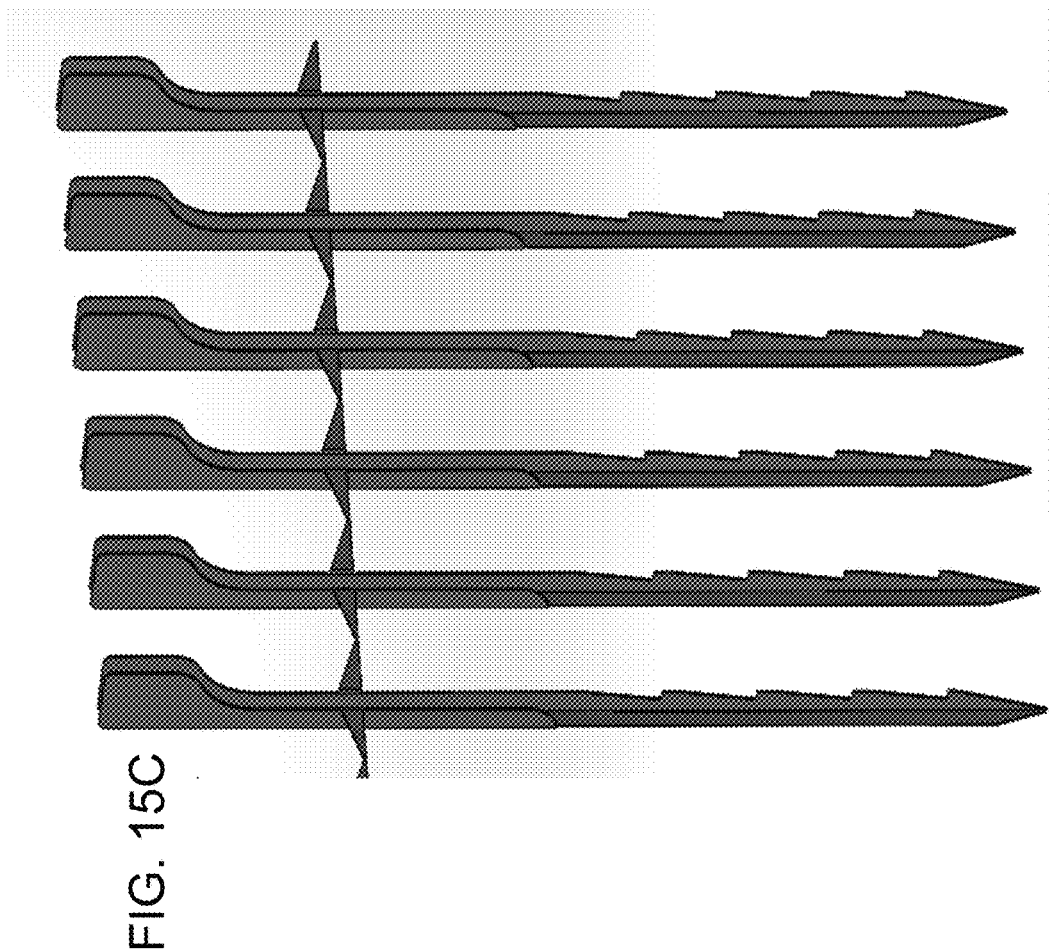
FIG. 15C shows fabricated posts maintained in a bandoliered structure after progressive stamping.
Figure 15B:
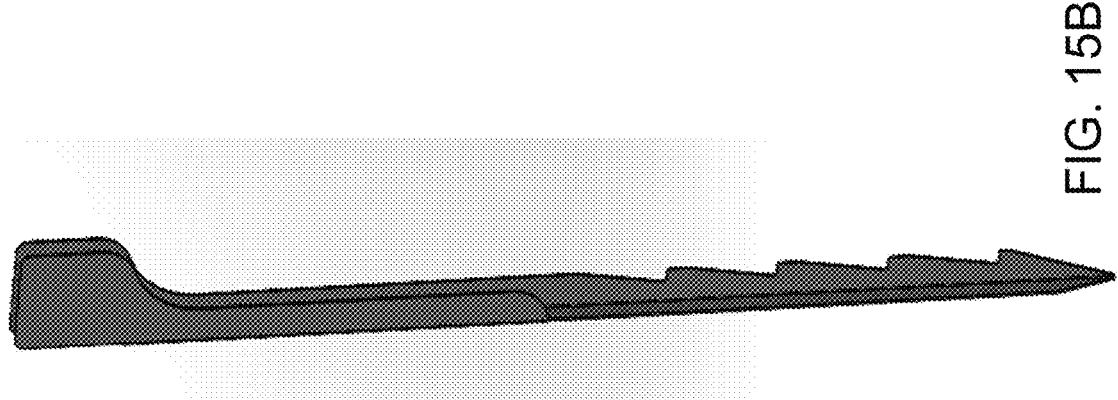
FIG. 15B shows a view of a post according to an alternative embodiment.

FIG. 14 is a simplified perspective view showing an embodiment of a clip/module assembly, adjacent to an alternative embodiment of a post. The post 1400 may comprise two opposing large tabs 1402 and 1404 at the top, which provide large faces for the clips to be clinched against. FIG. 15 is a simplified view showing a clinching tool 1500 that can be used to clinch together the clip to a face of the post, in accordance with some embodiments. FIG. 15A shows a simplified view of a resulting clinching joint, in accordance with some embodiments. FIG. 15B shows a view of a post according to an alternative embodiment. With two large tabs at the top, faces of large areas may be provided to clinch with the clips. FIG. 15C shows fabricated posts maintained in a bandoliered structure after progressive stamping, in accordance with some embodiments.

The clips and clinching operations disclosed herein may permit the forming of a joint from two or more plates that overlap at least partially. The plates may not or need not be parallel to each other, and in fact can be angled relative to each other (e.g., depending on the terrain or the spatial configuration of other components associated with the solar modules or the supporting structures for such modules). The plates may be provided in different positions or orientations relative to each other, and can be deformed uniquely to accommodate a wide range of angular or positional variations for the plates, the posts, the surrounding terrain, or the positioning of any solar modules relative to the plates or the posts. The presently disclosed systems and methods may permit wide tolerances in the way that a joint is shaped or formed, to simplify the installation process and provide additional flexibility in how various components or systems are assembled relative to each other, without comprising structural integrity. The wide tolerances may also permit the installation of posts and solar modules without the need to precisely fine tune the positions, the orientations, and/or the relative alignment of the posts or solar modules, especially when said posts or solar modules are installed on uneven terrain with changing contours.

FIG. 16 shows a simplified view showing a corner of four modules that join to one post, in accordance with some embodiments. This view illustrates the reversibility of the clips, and also demonstrates the angular tolerance of the clips relative to the post to accommodate tilt angle.

Figure 17:
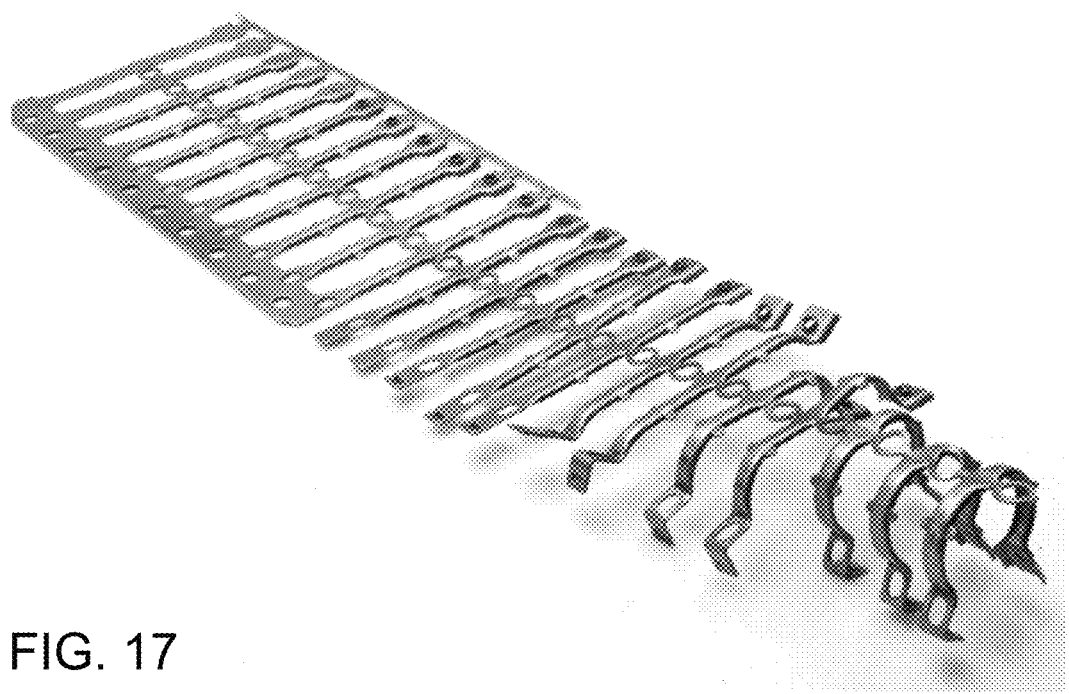
FIG. 17 shows a progressive stamping manufacturing process that can be used to fabricate the clip.
Figure 18:
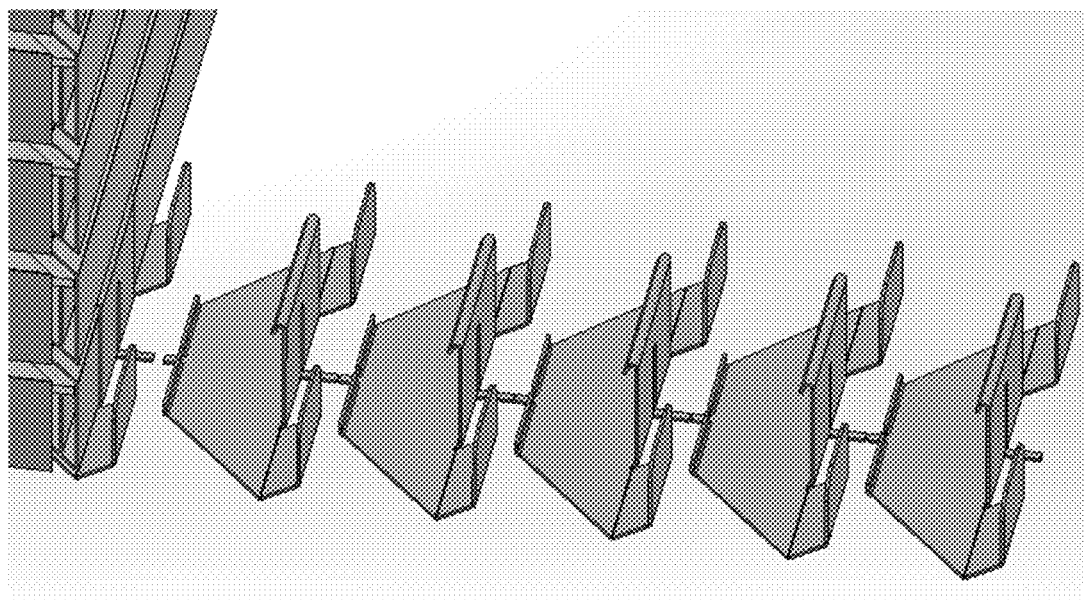
FIG. 18 shows how the clip can maintain its connected orientation in an integrated bandolier configuration after formation.

FIG. 17 shows a progressive stamping manufacturing process that can be used to fabricate the clip, in accordance with some embodiments. FIG. 18 shows how the clip can maintain its connected orientation in an integrated bandolier configuration after it is formed, in accordance with some embodiments.

Figure 19:
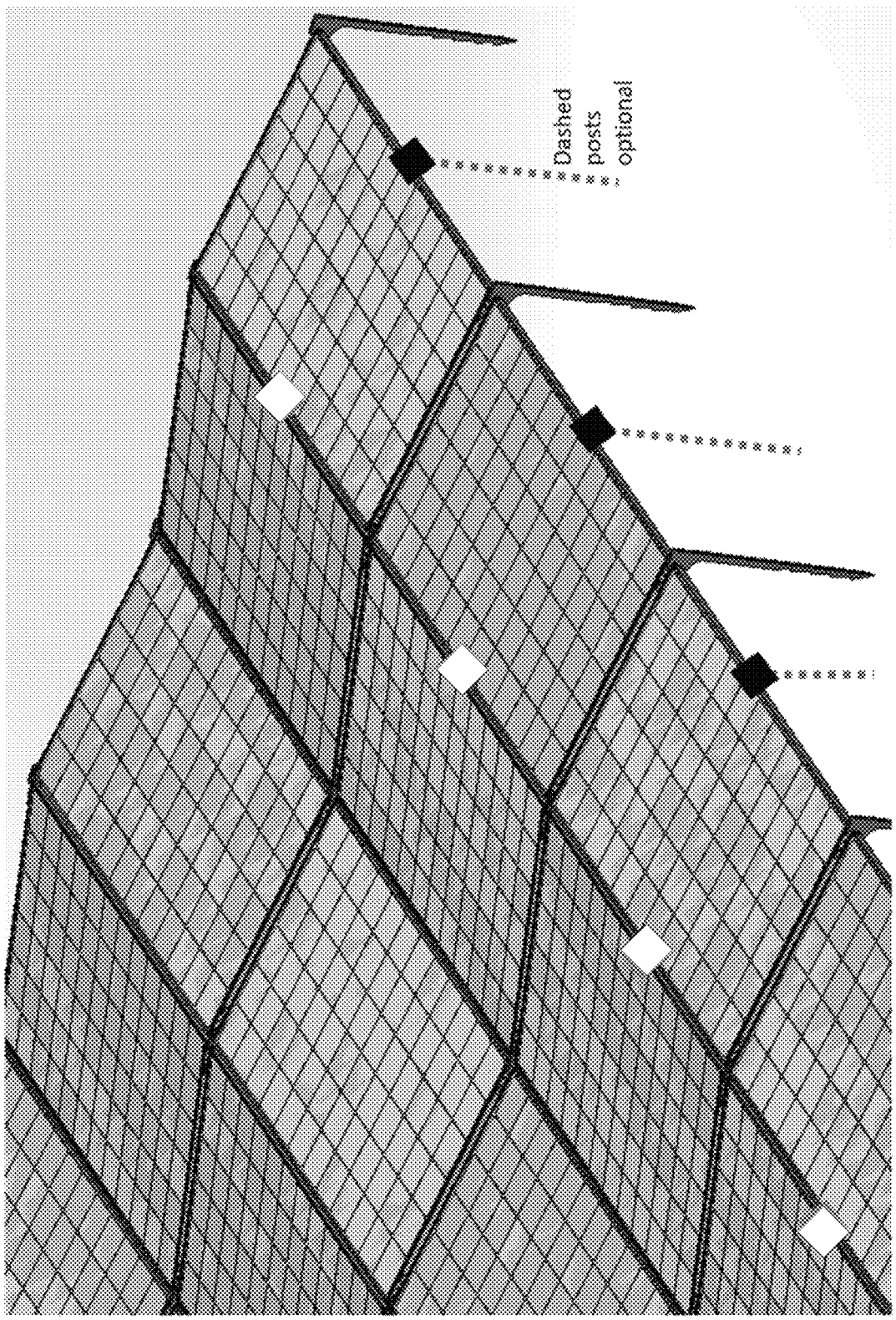
FIG. 19 shows another embodiment of a ground mounting system.

FIG. 19 shows another alternative embodiment of a ground mounting system for solar modules. In some cases, in the event of heavy loading additional clip(s) can be installed on the ridge of two modules (open square) and/or the lower confluence point of point of modules (solid square). These additional clips may connect two neighboring modules. Such additional-clip configurations may (but are not required to) also include a post (dashed) that can be pushed into the ground.

According to some embodiments, the clip may be pre-installed on a post in the factory. The retaining rings described herein may be installed in the factory ahead of time. This may leave enough vertical tolerance for penetration variability of the post. In some embodiments, this can permit around 1 inch of vertical play, thereby facilitating installation and adding flexibility under applied loads.

Figure 11:
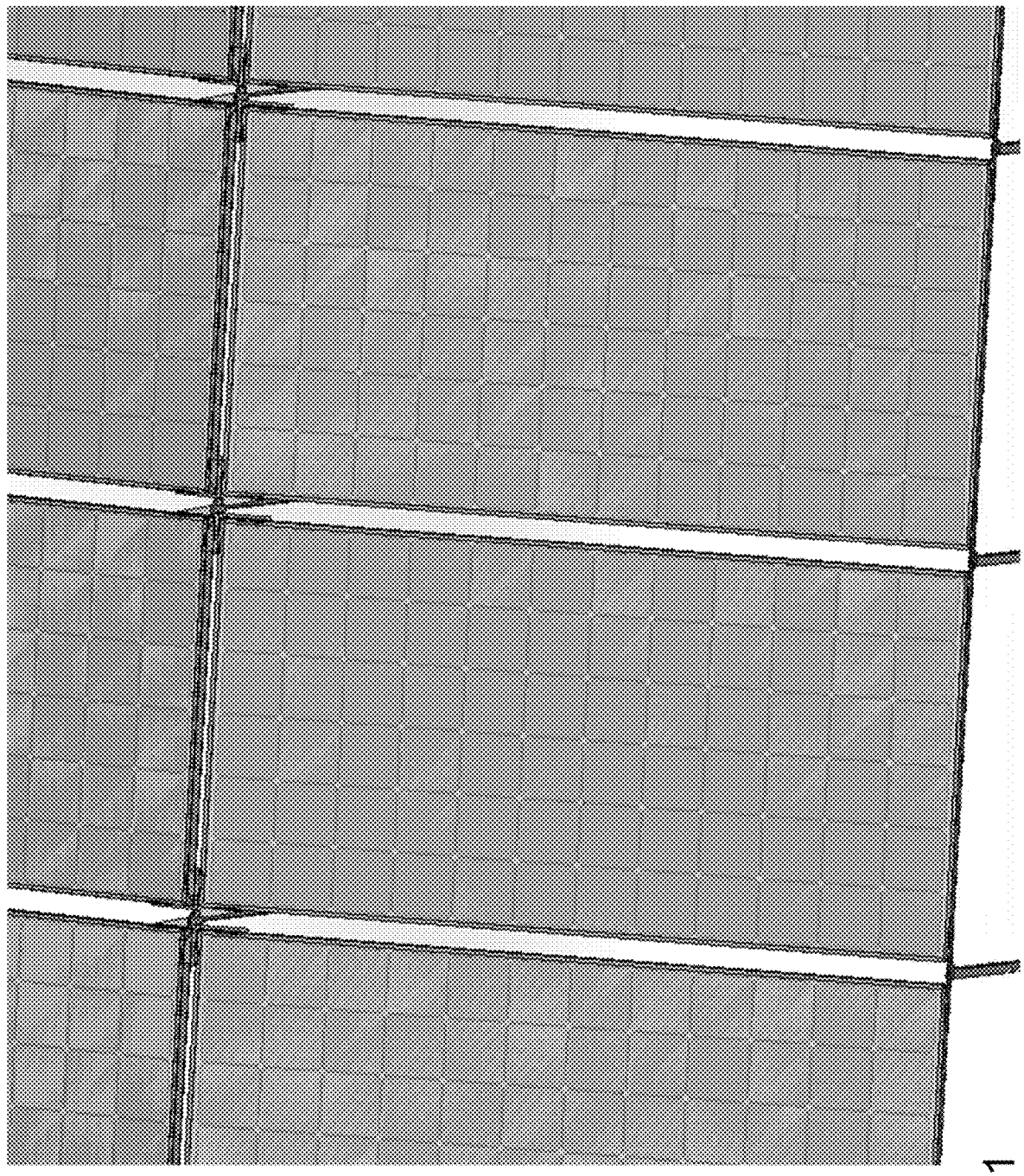
FIG. 11 shows an enlarged perspective view of the spacing between modules.

FIG. 11 shows an enlarged perspective view of the gaps between adjacent modules, in accordance with some embodiments. In some cases, the gaps may be sized according to tolerance availability and to allow tool access. Particular embodiments may feature gaps of around 2" on one side of the module, with gaps on the orthogonal side of the module being smaller.

Figure 13:
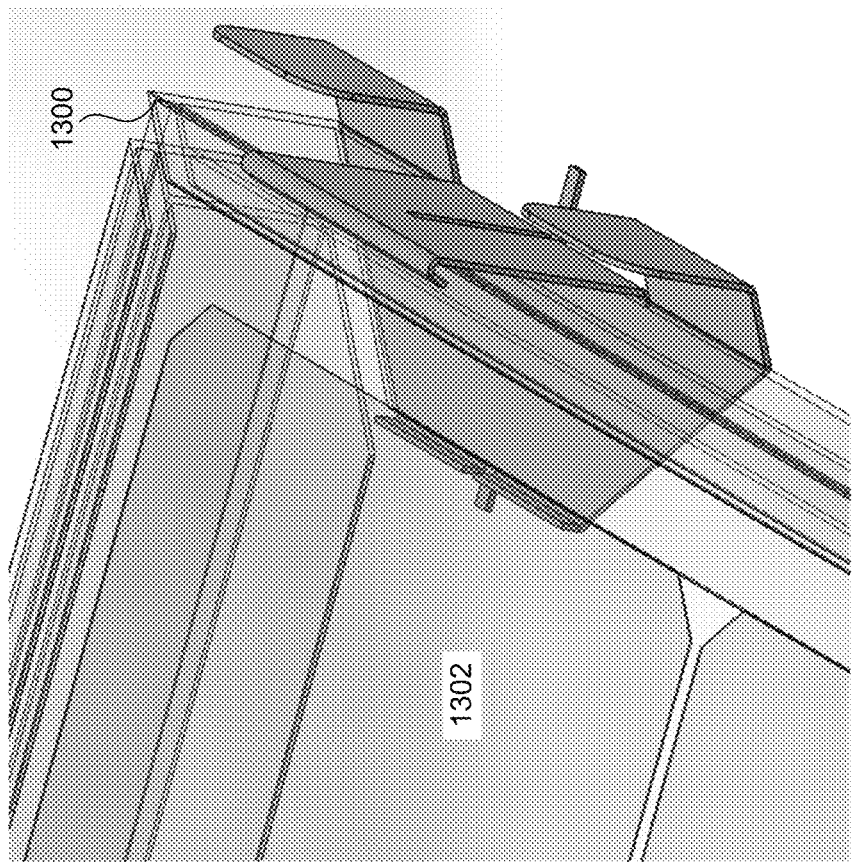
FIG. 13 shows a simplified view showing a clip attached to the side of a module.
Figure 12:
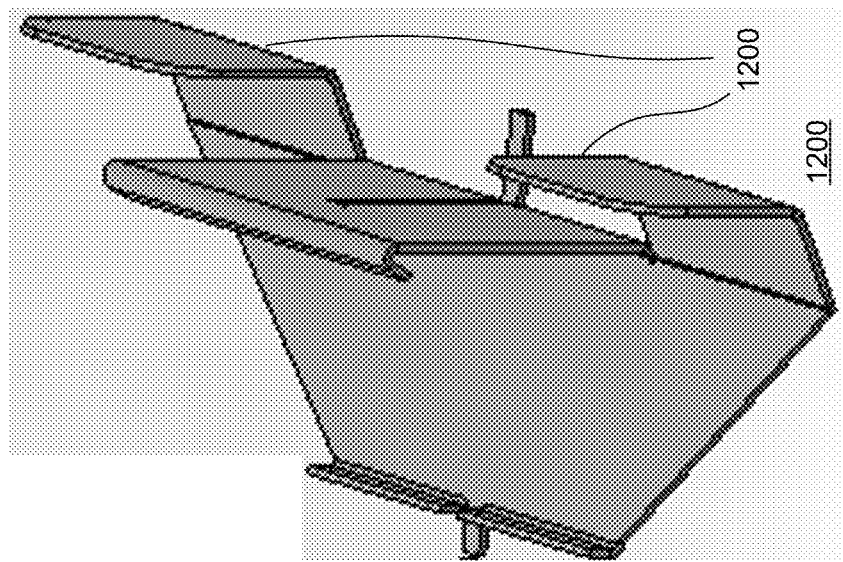
FIG. 12 shows a simplified view of an alternative clip structure.

While the preceding figures have illustrated one particular embodiment of a ground mount system for solar panels, other embodiments are possible. For example, FIG. 12 shows a simplified view of an alternative clip structure 1200, in accordance with some embodiments. Here, the clip may comprise flexible tabs 1202, and may be reversible. FIG. 13 is a simplified view showing the clip embodiment of FIG. 12, attached to the side of a frame 1300 of a solar module 1302. In some cases, the clip may be configured to engage on both the top and bottom of the module via multiple tabs.

Figure 42:
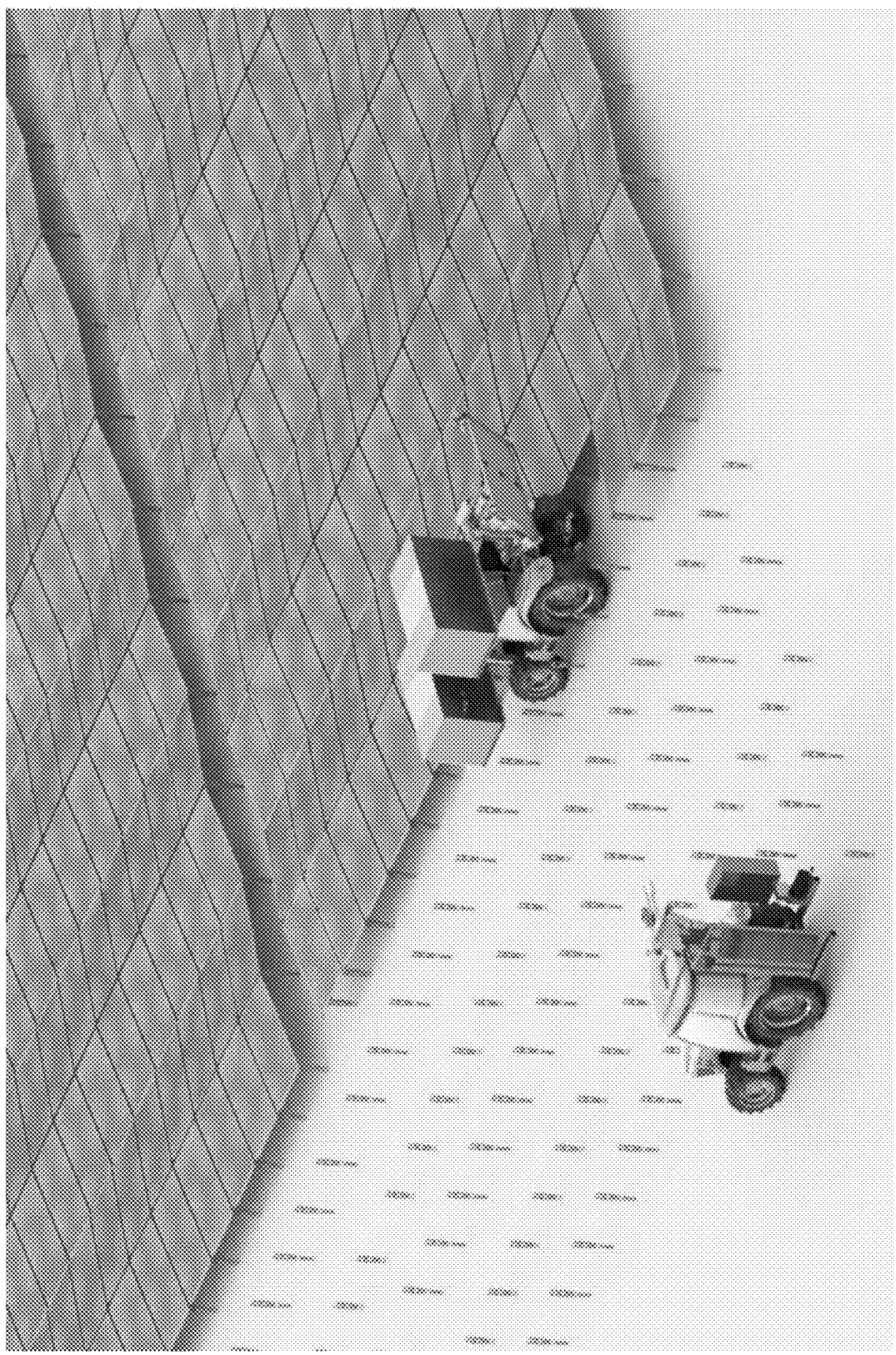
FIG. 42 shows an overhead view of an autonomous system for positioning and assembling solar modules, in accordance with some embodiments.

FIG. 42 shows an overhead view of an autonomous system for positioning and assembling solar modules, in accordance with some embodiments. In some cases, the system may be configured to unbox, inspect, and/or process the solar modules with or without attachments before transporting around a site. In some cases, modules may be unboxed, inspected, and/or processed with or without attachments before transporting around a site.

In some cases, the system may comprise one or more post installers. The post installers may drive posts and continuously reload from bundled packs. In some cases, module installers may pull a solar module from a stack and attach them to posts. In some cases, posts may be installed by a custom machine on the back of a vehicle (e.g., a tractor). In some cases, the vehicle may comprise an autonomous or semi-autonomous vehicle.

In some cases, the system may comprise one or more module installers. The module installers may pull a solar module from a stack and attach them to one or more deployed posts. In some cases, a module may be installed on a previously installed post by a machine on the back of a different vehicle (e.g., a different tractor). The vehicle may comprise an autonomous or semi-autonomous vehicle.

Figure 43:
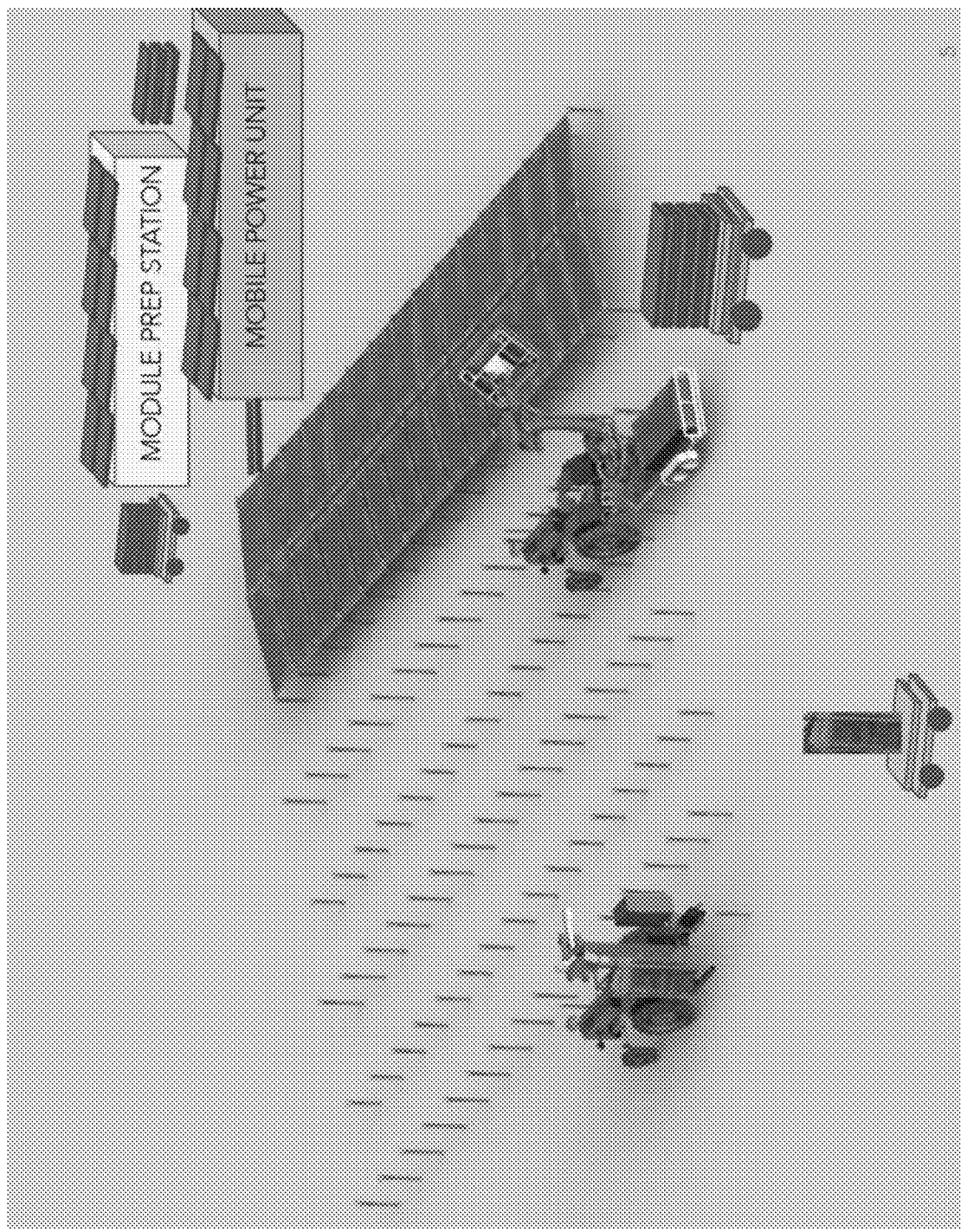
FIG. 43 shows an overhead view of an autonomous system for positioning and assembling solar modules, in accordance with some embodiments.
Figure 44A:
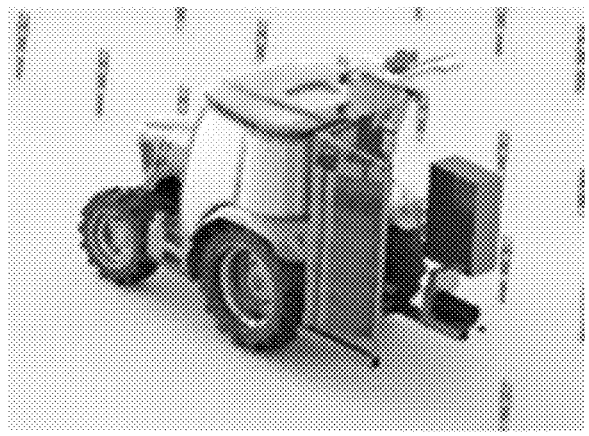
FIGS. 44A-44M show vehicles for positioning and assembling solar modules, in accordance with some embodiments. In some cases, a trailer may comprise a gantry for picking up and/or positioning one or more modules above posts.
Figure 44B:
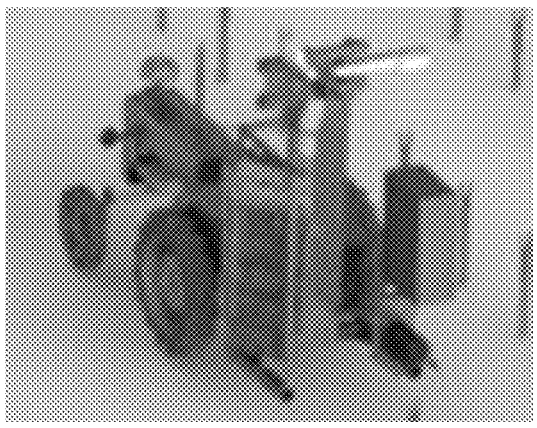
Figure 44C:
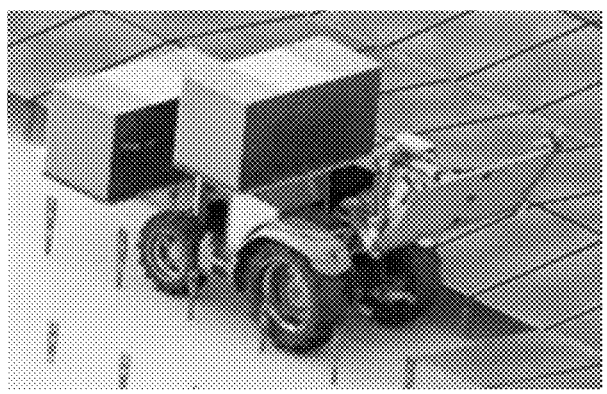
Figure 44D:
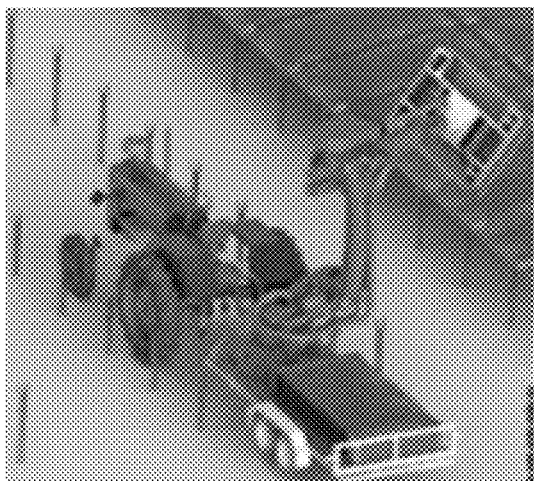
Figure 44E:
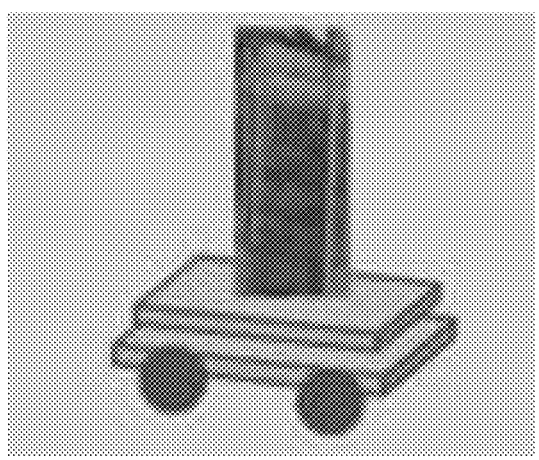
Figure 44F:
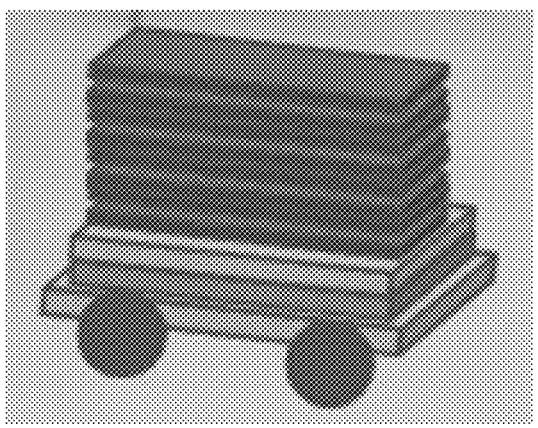
Figure 44G:
Figure 44H:
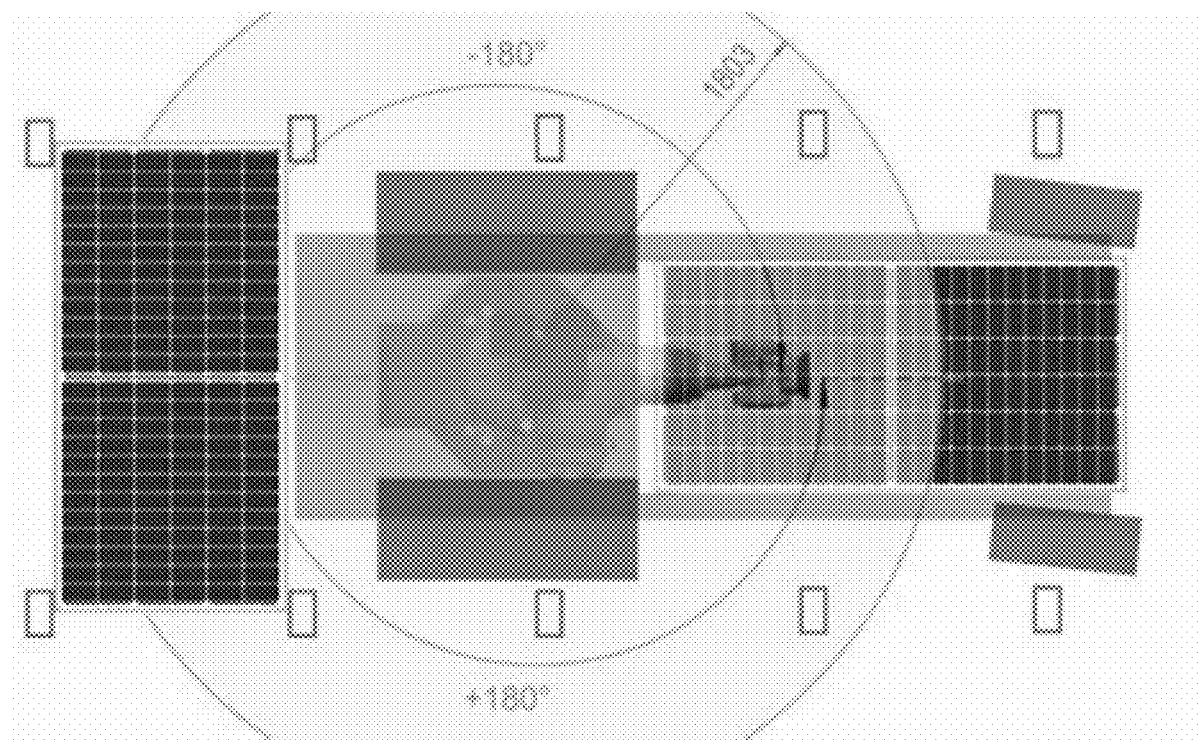
Figure 44I:
Figure 44J:
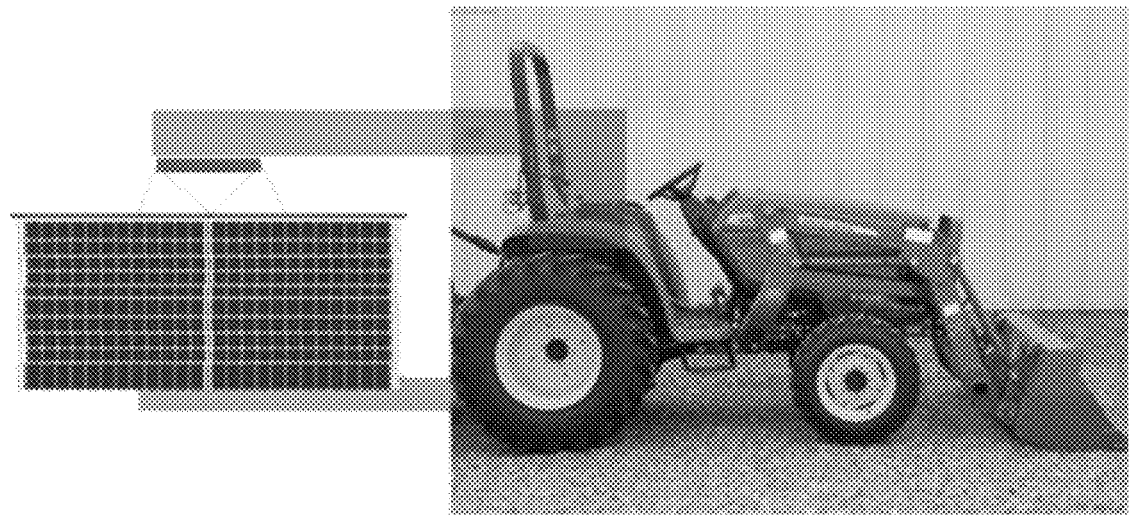
Figure 44K:
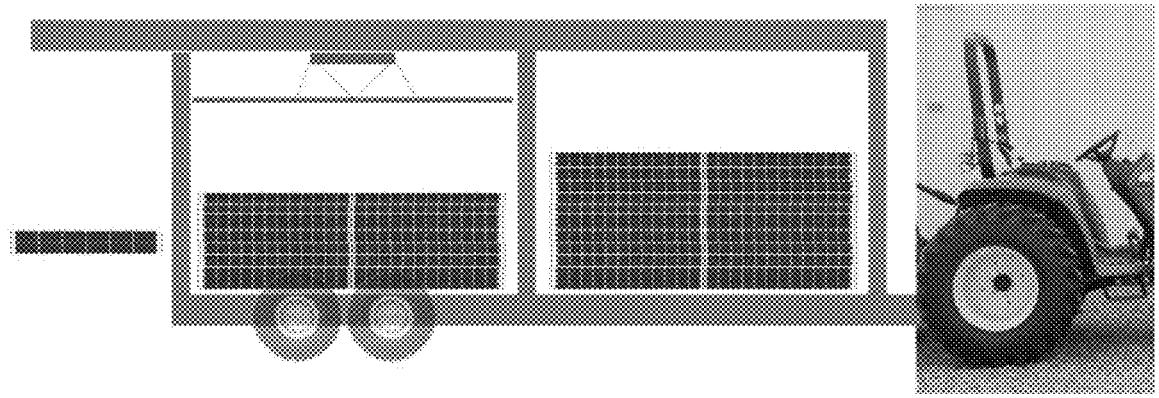
Figure 44L:
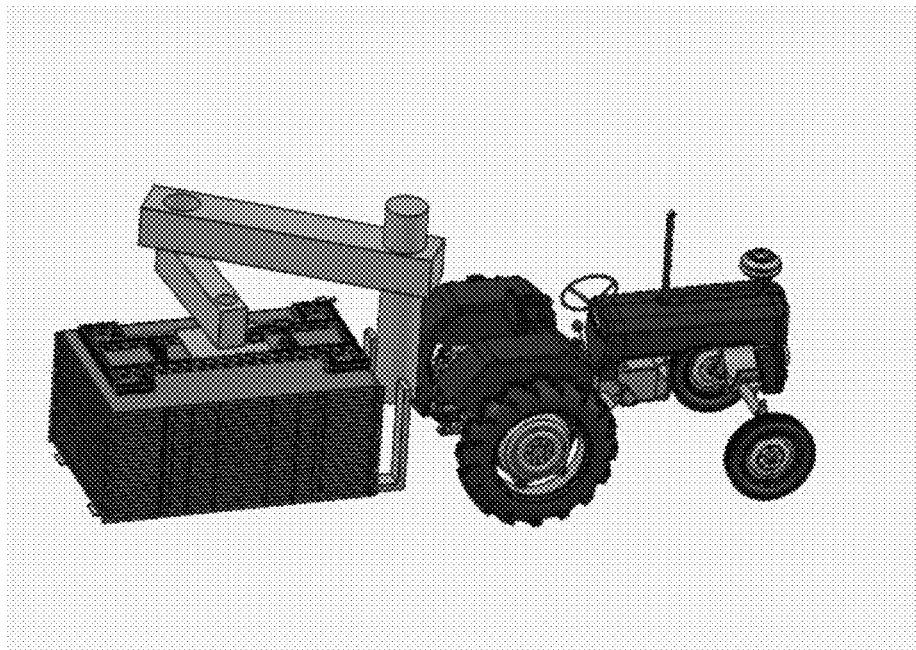
Figure 44M:
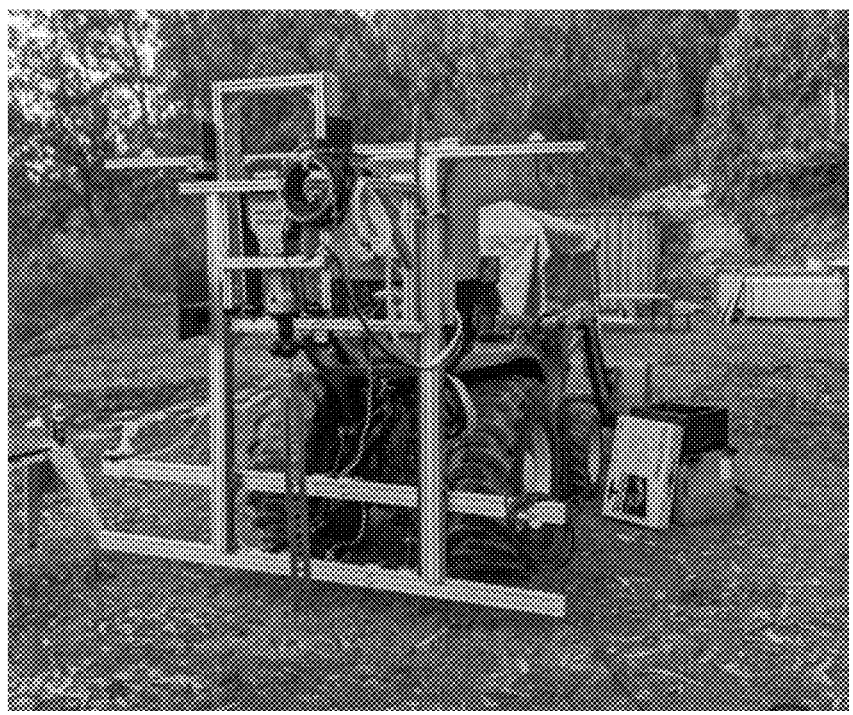
Figure 45A:
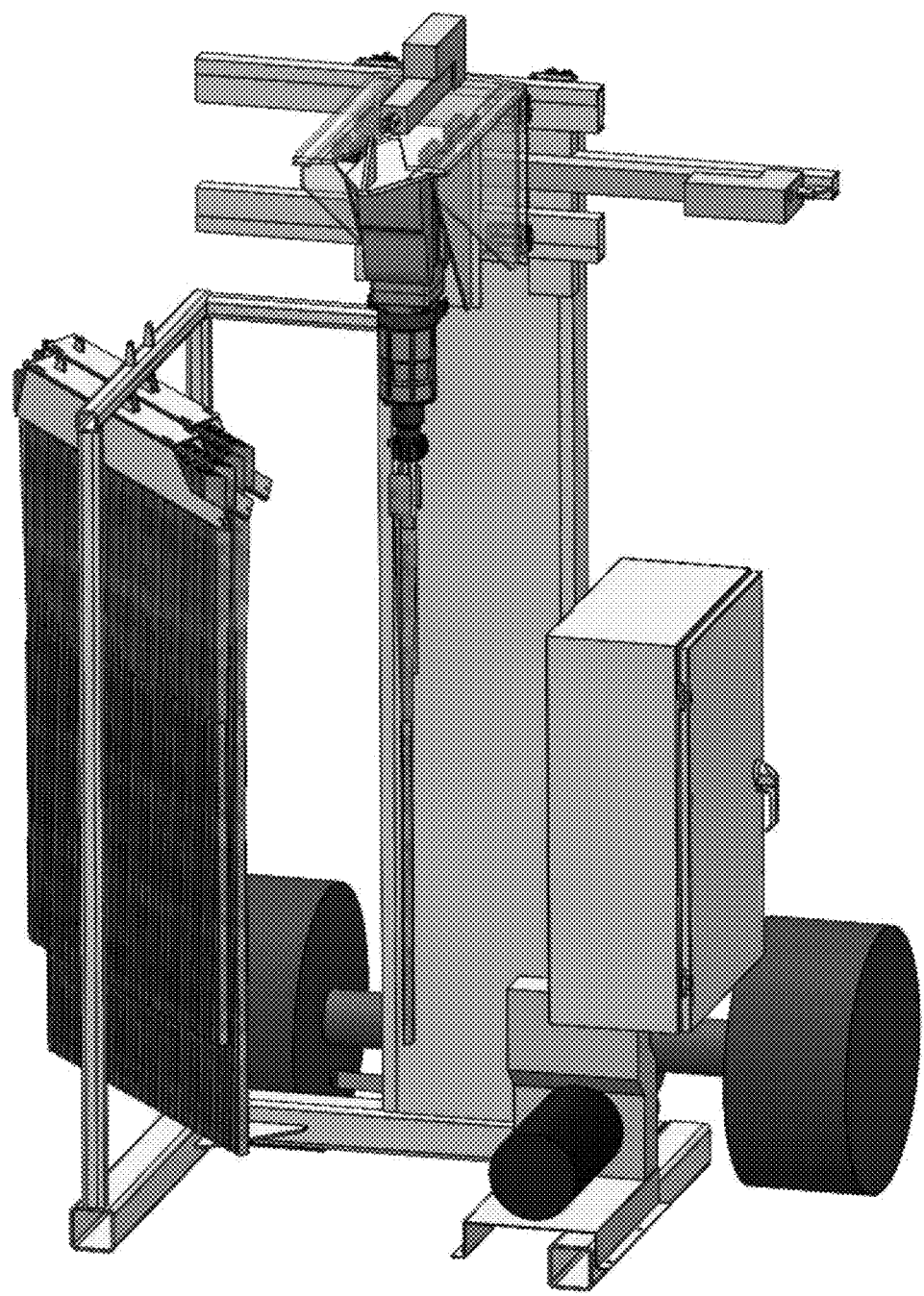
FIGS. 45A-45D show perspective views of a machine for installing posts, in accordance with some embodiments.
Figure 45D:
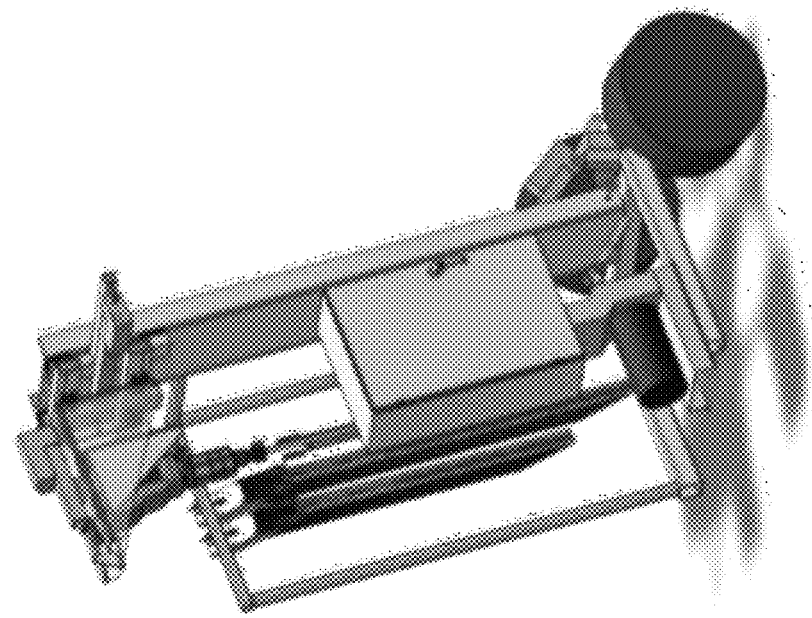
Figure 45C:
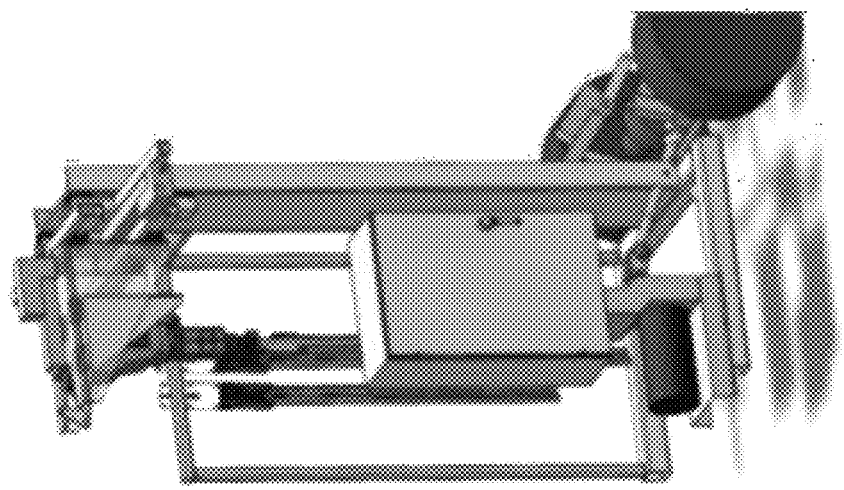
Figure 45B:
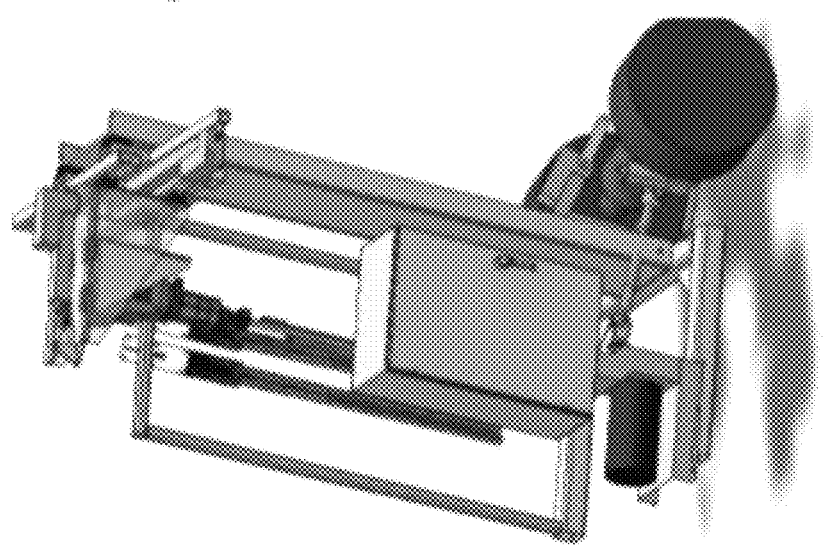

FIG. 43 shows an overhead view of an autonomous system for positioning and assembling solar modules, in accordance with some embodiments. In some cases, the vehicles (e.g., tractors) for deploying posts or solar modules may be fully electric. In some cases, a mobile power unit may be disposed at or near a site where the vehicles may charge. In some cases, the mobile power unit may comprise one or more solar panels and/or batteries. In some cases, a reloading unit may travel between stations. In some cases, a reloading unit may carry posts, solar modules, or any combination thereof. In some cases, a reloading unit may travel between a preparation station or prep station and active installer units (e.g., the autonomous vehicles or robots described elsewhere herein).

In another aspect, the present disclosure provides a method comprising providing one or more mobile platforms that are configured to carry a plurality of posts and a plurality of solar modules. The mobile platforms may comprise any of the robots, machines, or autonomous vehicles described herein.

In some embodiments, a plurality of posts may be positioned and installed by a first mobile platform at a predefined configuration onto the terrain. In some embodiments, a plurality of solar modules may be deployed onto a set of posts by a second mobile platform.

In some cases, the one or more mobile platforms can be equipped with one or more sensors. The one or more sensors may comprise, for example, a location sensor (e.g., a geo-location sensor), a vision sensor (e.g., image sensor or a camera), a GNSS unit, a GPS unit, an accelerometer, a motion sensor, a gyroscope, or any combination thereof. In some cases, the one or more sensors may comprise a stereo vision sensor, a depth sensor, a binocular vision sensor, or an infrared sensor. In some cases, the one or more sensors may comprise a radar unit, a LIDAR unit, an altitude sensor, a proximity sensor, an inertial measurement unit, a contact sensor, a pressure sensor, a piezoelectric sensor, or a force sensor.

In some embodiments, the method may further comprise using at least the one or more sensors to (i) autonomously move the one or more mobile platforms and (ii) autonomously position and assemble the plurality of posts and the plurality of solar modules over a terrain to construct an array of solar modules. In some embodiments, the method may further comprise using the one or more sensors to locate and move an installer load head on the one or more mobile platforms relative to the array of solar modules as the array is being constructed. The installer load head may comprise a movable element that can automatically position and/or deploy one or more posts into a target location.

In some embodiments, the one or more mobile platforms may comprise a first platform for positioning and installing the plurality of posts onto the terrain, and a second platform for positioning and assembling the plurality of solar modules onto the plurality of posts. In some embodiments, the first platform can be separate from the second platform. In some embodiments, the first platform and the second platform may be integrated into a single platform. In some embodiments, the one or more mobile platforms may comprise one or more electric vehicles.

In some embodiments, the plurality of solar modules may be pre-stacked on the second platform, and the second platform may comprise a mechanism for extracting a select solar module from the stack and assembling the select solar module onto a select set of posts that have been installed on the terrain.

FIGS. 44A-44M show vehicles for positioning and assembling solar modules, in accordance with some embodiments. In some cases, a module installer may be a custom machine built on a vehicle. In some cases, a module installer may take in a stack of solar modules. In some cases, the stack of solar modules may be placed on the module installer. In some cases, the stack of solar modules may be picked up by the module installer. In some cases, the module installer may carry the stack of modules. In some case, the module installer may separate one module from the stack of modules. In some cases, the module installer may position the one module over a plurality of installed posts, for example, two, three, four, or more installed posts. In some cases, the module installer may lower the module into a predetermined position over the plurality of installed posts.

In some cases, the module installer may couple, install, or connect the module to the plurality of post. In some cases, the module installer may deform a metallic portion of a module to create a rigid connection between the module and the post. In some cases, the module installer may release the module. In some cases, the module installer may test a strength of connections formed between the module and the plurality of posts by lifting, pushing, twisting, or any sufficient force.

In some cases, the module installer may drive to a next location to place a module. In some cases, a module installer may comprise 3, 4, 5, or 6 degrees of motion or more. In some cases, a module installer may comprise a robot arm that is configured to receive a module from a flipping machine. In some cases, a robot arm may be used to reach for and pick up a module from a stack. In some cases, a gantry may be used to tilt back and forth to pick up a module and position the module behind. In some cases, a double rotary motion manipulator comprising one or more rotating joints may be used to position a module above one or more posts. In some cases, a gantry may be used to pick up and position one or more modules onto one or more installed posts. In some cases, a trailer may comprise a gantry for picking up and/or positioning one or more modules above posts.

In some embodiments, an integrated clinching tool may be provided on an installer load head to create a plurality of post-module interfaces between a plurality of modules and the plurality of posts. In some embodiments, an integrated clinching tool may be provided on an installer load head to create a plurality of post-clip interfaces between a plurality of clips and the plurality of posts. In some cases, the plurality of clips may be pre-attached to the plurality of solar modules.

In some embodiments, the post-module interfaces or post-clip interfaces can comprise a substantially non flat surface such that the angle between the module and the post can be variable. In some embodiments, the modules can be clamped to the non-flat plate surface via a clamp. In some embodiments, the clamp can be bolted to the post. In some embodiments, the non flat plate surface can be bolted to the post via a bolt. In some embodiments, the non flat plate surface can be bolted to the post via a U-bolt. In some embodiments, the bolt can self tap into a cavity of the post without the need for cutting threads on the post. In some embodiments, a post-module interface can be pressed on the post without the use of a fastener. In some embodiments, the post-module interface can be formed by an autonomous machine. In some embodiments, the post-module interface can comprise tabs to align the module position on the interface plate. In some embodiments, the module can be positioned on the plate by an autonomous machine.

In some embodiments, the post can comprise a feature with threads that is pre-installed onto the post. In some embodiments, the modules can be subsequently clipped onto the non flat plate surface without the need for a fastener. In some embodiments, the non flat plate surface or the clip can comprise a protrusion to provide electrical grounding. In some embodiments, the clip can be made of plastic. In some embodiments, the clip can comprise an embedded metal piece to provide electrical grounding.

Figure 53:
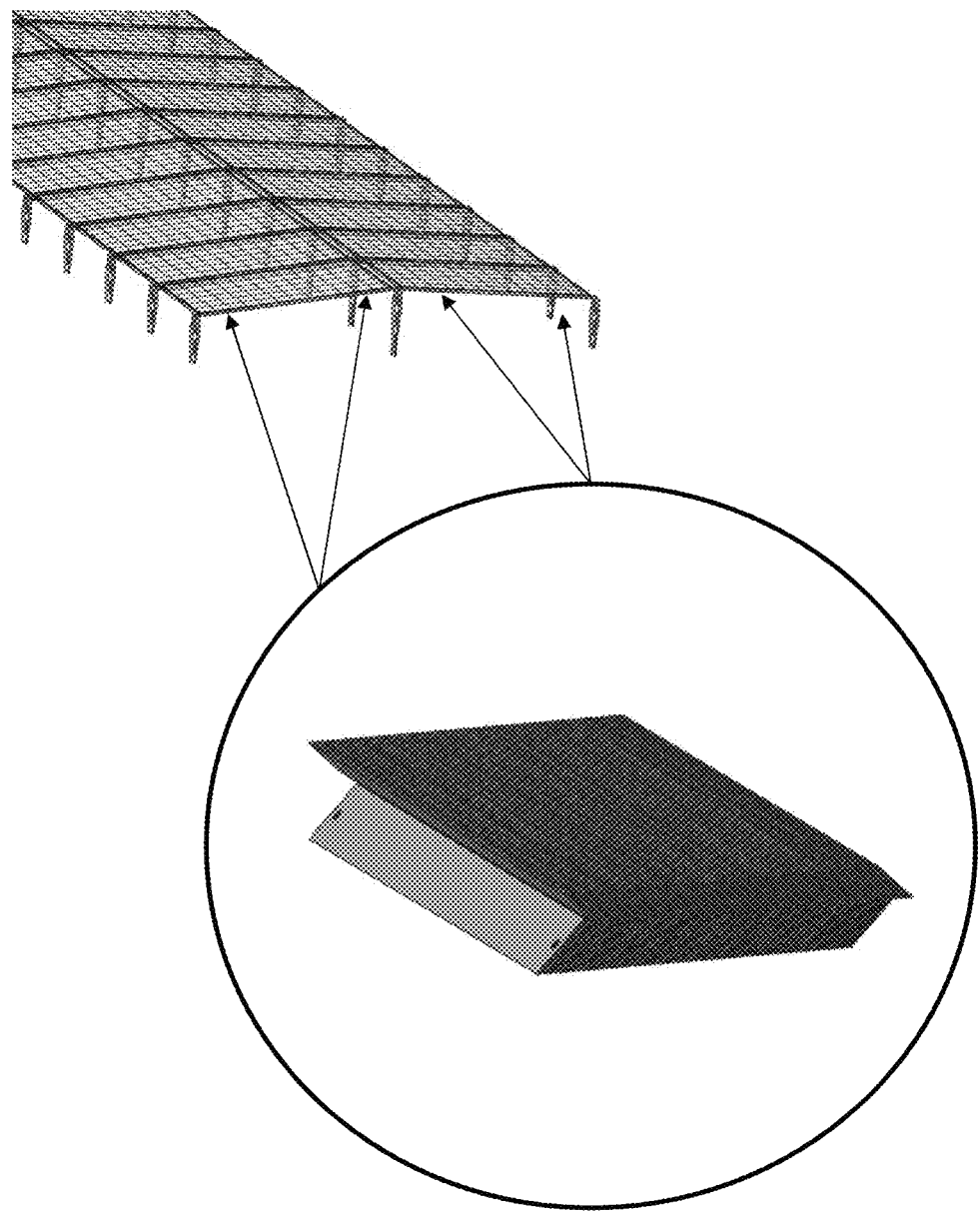
FIG. 53 illustrates a plurality of brackets that can be coupled to one or more posts, in accordance with some embodiments.

FIG. 53 illustrates a plurality of brackets that can be coupled to a post, in accordance with some embodiments. In some cases, a solar module may comprise a bracket. The bracket may be attached or coupled to the solar module. In some cases, the bracket may comprise a deformable metal. The deformable metal may comprise, for example, aluminum, copper, iron, steel, brass, or any metallic alloys. In some cases, a connection may be formed between the bracket and a post. In some cases, the connection may be formed by clinching the bracket and the post together. In some cases, the bracket may comprise a flat or an angled piece of metal that is configured to rivet onto a module, for example, through mounting holes. In some cases, the bracket may be connected to a module by clinching the bracket to the frame of a module. In one alternative embodiment, the module clip can be clinched or dimpled to the solar module frame directly instead of being riveted or bolted through mounting holes.

Figure 51:
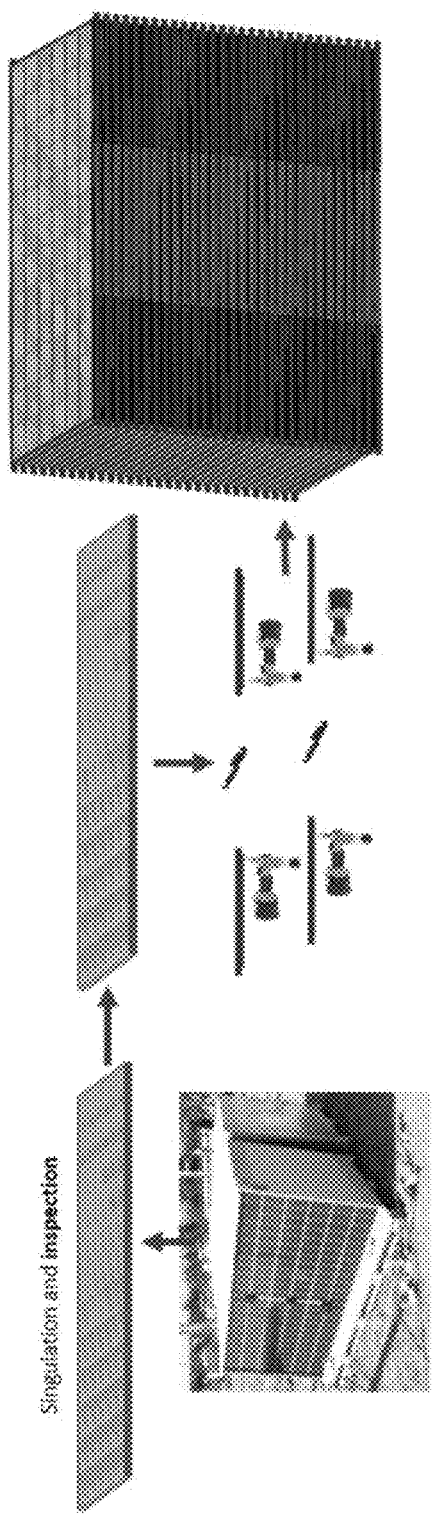
FIG. 51 illustrates a method for coupling a solar module and brackets, in accordance with some embodiments.

FIG. 51 illustrates a method for coupling a solar module and brackets, in accordance with some embodiments. In some cases, a bracket may be installed by a process in a station where modules are unboxed, inspected, and/or then placed on a tooling jig. In some cases, 1, 2, 3, 4, or more rivet guns may install rivets to join a bracket to a solar module from below, side, top, or any sufficient direction. The use of rivets may obviate the need for pre-formed holes with accurate tolerances. In some cases, a clinching tool or an impact driver (e.g., for torquing nuts) may be used instead of a rivet gun.

Figure 99A:
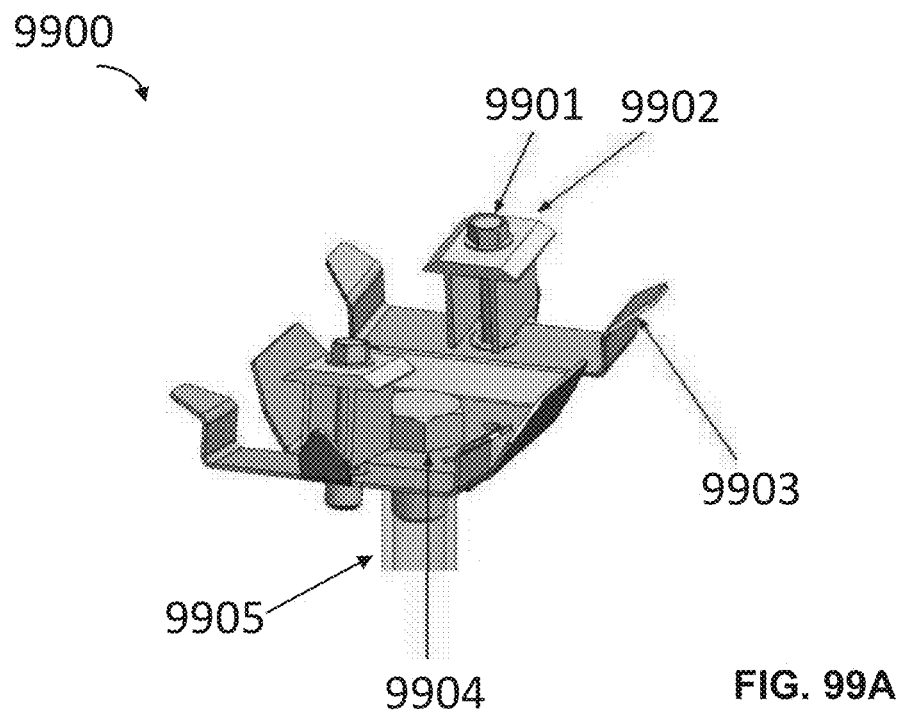
FIG. 99A shows an exemplary post-module interface, e.g., a bracket for coupling a post and solar modules, in accordance with some embodiments.

FIG. 99A shows an exemplary post-module interface, e.g., a bracket for coupling a post and solar modules. The bracket 9900 comprises a bolt 9904 to secure/connect the bracket 9900 to the post 9905. In some embodiments, the bolt can self tap into a cavity of the post without the need for cutting threads on the post. In some embodiments, the post-module interface, e.g., the bracket is pressed on the post without the use of a fastener. In some embodiments, the post can comprise threads for the coupling of bracket to the post. In some embodiments, the threads are pre-installed onto the post.

The bracket 9900 can comprise one or two clamps 9902 and one or two bolts 9901 to affix a solar module or a plurality of solar module to the bracket. The bracket 9900 can comprise a plurality of tabs 9903 to engage with and align the solar module(s). The bracket 9900 can have different configurations to be used as a corner backet, an edge bracket, or a non-corner, non-edge bracket, to hold one solar module, two solar modules, or four solar modules, respectively. For example, for a post which is configured to hold one solar module, e.g., a post at a corner of the array, the bracket can comprise one bolt 9901, one clamp 9902, and one tab 9903. For a post which is configured to hold four solar modules, the bracket can comprise two bolts, two clamps, and four tabs to hold the four solar modules. In some embodiments, a clamp is not required. In some embodiments, a bracket can comprise a fasternerless clip to secure a solar module. In some embodiments, the solar modules are clipped onto the bracket without the need for a fastener.

Figure 99B:
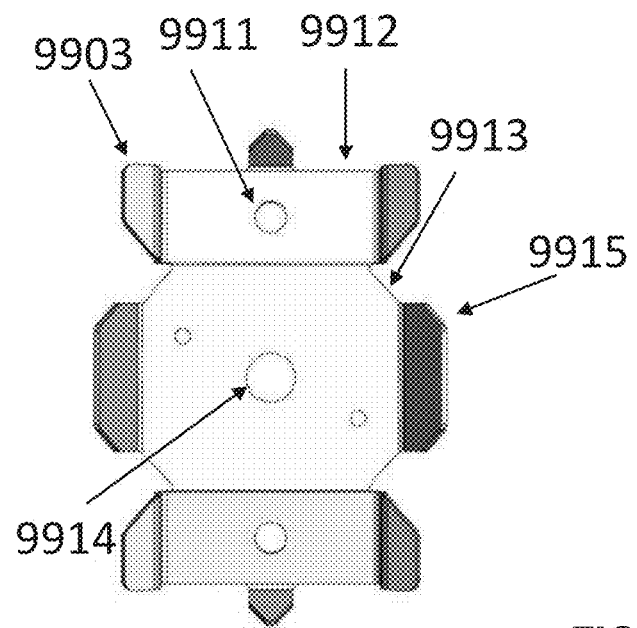
FIG. 99B shows a top view of the bracket 9900 before the bolts and clamps are coupled to the bracket, in accordance with some embodiments.

FIG. 99B shows a top view of the bracket 9900 before the bolts and clamps are coupled to the bracket. The bracket 9900 comprises a base plate 9913. The base plate 9913 comprises a hole 9914 for the bolt 9904 (see FIG. 99A) to secure the bracket to the post. The base plate 9913 can comprise a pair of flanges 9915 configured to prevent the sliding or moving of the solar module upon installation. The bracket 9900 comprises one or more side plates, e.g., 9912. The side plate 9912 comprises a hole 9911 for the bolt 9901 (see FIG. 99A) to secure the clamp 9902 and solar module. The side plate 9912 further comprises tabs 9903 to engage with and align solar module(s). In some embodiments, the base plate and the side plate of the bracket are substantially on the same surface. In some embodiments, the plate surface of the bracket is not flat. In some embodiments, the base plate and the side plate of the bracket are arranged in an angle. In some embodiments, an angle between the base plate and a side plate may be substantially same as an additional angle between the base plate and an additional side plate. In some embodiments, an angle between the base plate and a side plate may be different from an additional angle between the base plate and an additional side plate. In some embodiments, the angle can be from 0° to 45°. In some embodiments, the additional angle can be from 0° to 45°. In some embodiments, the base plate can be in a valley configuration relative to the side plate (FIG. 99C) wherein the side plate tilts upward. In some embodiments, the base plate can be in a ridge or peak configuration relative to the side plate (FIG. 99D) wherein the side plate tilts downward. The angled arrangement of the base plate and side plate provides capability for the solar modules to be installed in tilted arrangement. FIG. 99E shows two adjacent solar modules 9916 and 9917 that are not on the same flat surface. In some embodiments, the two side plates of the bracket can have substantially same angles relative to the base plate. In some embodiments, the two side plates of the bracket can have different angles relative to the base plate. In some embodiments, one side plate can have an angle relative to the base plate that is at least 1°, at least 2°, at least 3°, at least 4°, at least 5°, at least 6°, at least 7°, at least 8°, at least 9°, at least 10°, at least 11°, at least 12°, at least 13°, at least 14°, at least 15°, at least 16°, at least 17°, at least 18°, at least 19°, at least 20°, or more larger than the angle of the other side plate relative to the base plate.

In some embodiments, a height above the ground of a row of posts is at least about 0.1 m, at least about 0.2 m, at least about 0.3 m, at least about 0.4 m, at least about 0.5 m, at least about 0.6 m, or more than a next row of posts so as to support a tilted solar module. In some embodiments, a slope of the tilted solar module can be related to the height difference of the posts and the distance between the posts. When the height difference is x and the distance is y, the angle ($\alpha$) of the solar module can be determined by tan $\alpha$=x/y.

In some embodiments, the solar modules are clamped to the non flat plate surface of the bracket. In some embodiments, the clamp is bolted to the non flat plate surface of the bracket.

In some embodiments, the post-module interface is formed by an autonomous machine. In some embodiments, the module can be positioned on the plate by an autonomous machine.

In some embodiments, the bracket has a protrusion to provide electrical grounding.

Figures 99F, 99G:
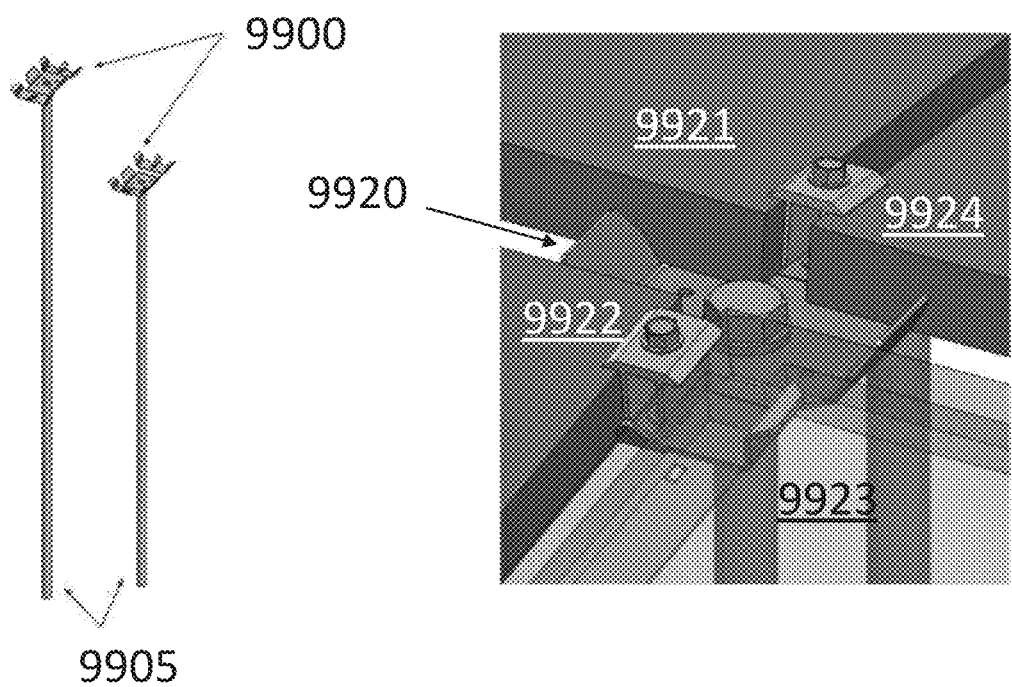
FIG. 99F shows the coupled bracket 9900 with posts 9905, in accordance with some embodiments.
FIG. 99G shows an exemplary assembly of a post, a bracket, and solar modules.

FIG. 99F shows the coupled bracket 9900 with two posts 9905. One post may have a greater height above the ground than the other post. The bracket may have a valley configuration or a peak configuration.

FIG. 99G shows an exemplary assembly of a post, a bracket, and solar modules. A bracket 9920 is bolted to a post and four solar modules 9921-9924 are secured to the bracket 9920.

In some embodiments, the bracket allows for installation of solar modules at angular misalignments. In some embodiments, the tabs on the bracket are bendable. In some embodiments, the tabs on the bracket are flexible. In some embodiments, the tabs on the bracket are deformable. When the solar module is installed, the tabs can be bent or deformed to accommodate the rotation or tilt of the solar module between two adjacent posts. In some embodiments, the bracket allows for the solar modules to contour to the terrain.

Figure 100A:
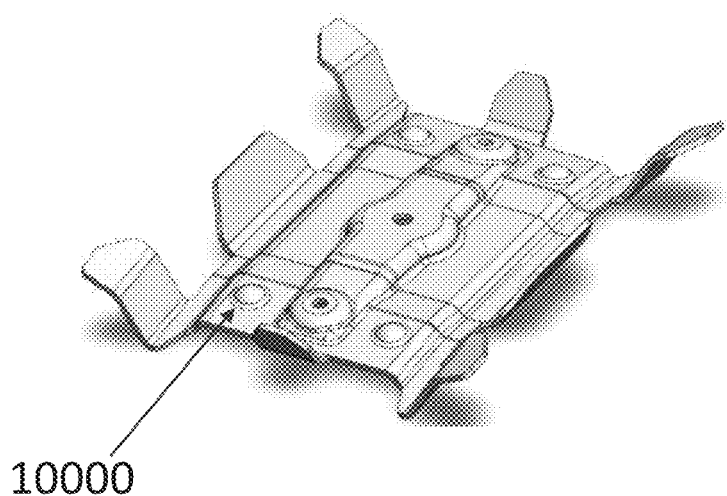
FIG. 100A shows a non-flat pivot feature 10000 of a bracket, in accordance with some embodiments.
Figure 100B:
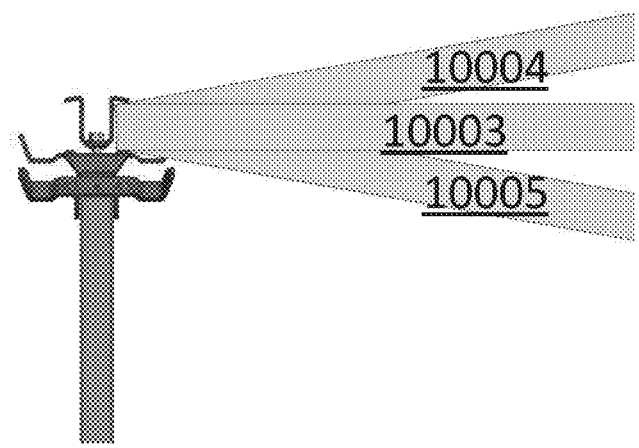
FIG. 100B shows a solar module with no tilt (10003), tilted with a positive angle (10004) and tilted with a negative angle (10005) when the solar module is coupled to the bracket with the non-flat pivot feature, in accordance with some embodiments.
Figure 100C:
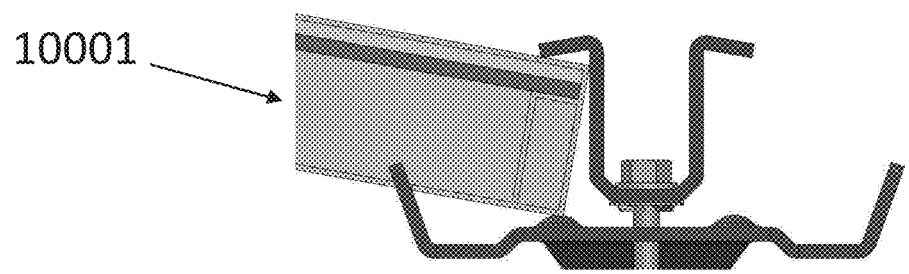
FIG. 100C shows an enlarged view of a solar module 10001 tilted at a positive angle relative to a flat surface, in accordance with some embodiments.
Figure 100D:
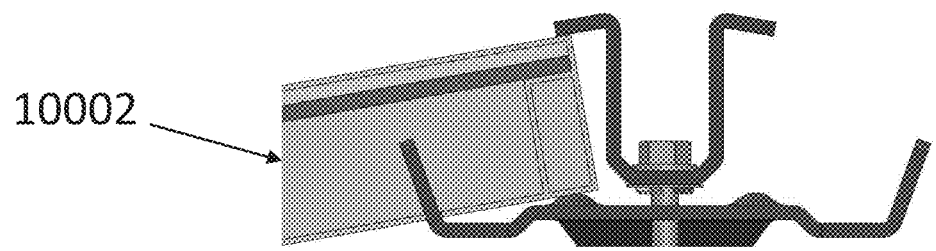
FIG. 100D shows an enlarged view of a solar module 10002 tilted at a negative angle relative to a flat surface, in accordance with some embodiments.

In some embodiments, the bracket comprises a non-flat pivot feature that allows the solar module to articulate at angles while being connected and held in place on the bracket. FIG. 100A shows a non-flat pivot feature 10000 of a bracket. FIG. 100B shows a solar module with no tilt (10003), tilted with a positive angle (10004) and tilted with a negative angle (10005) when the solar module is coupled to the bracket with the non-flat pivot feature. FIG. 100C shows an enlarged view of a solar module 10001 tilted at a positive angle relative to a flat surface. FIG. 100D shows an enlarged view of a solar module 10002 tilted at a negative angle relative to a flat surface. In some embodiments, the angle can be from 0° to 30°. In some embodiments, the angle can be 11.5°.

Figure 101:
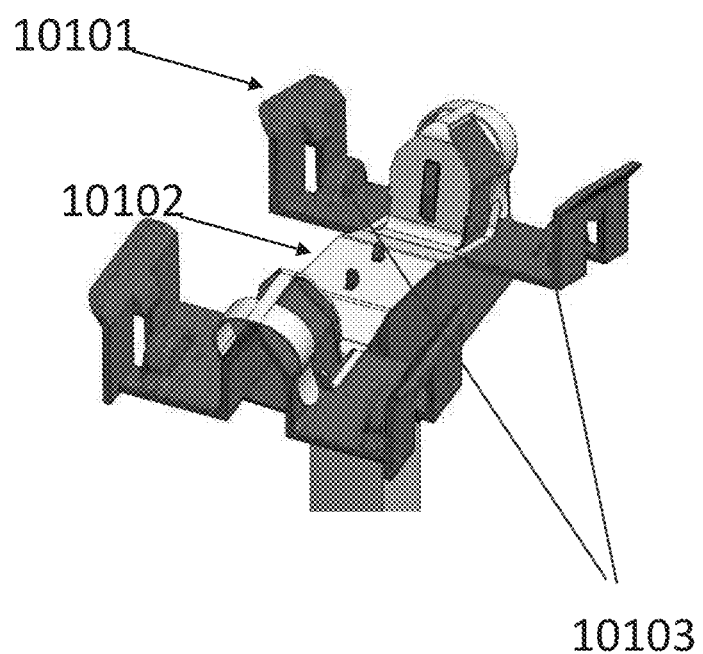
FIG. 101 shows an exemplary bracket comprising plastic material and metallic material, in accordance with some embodiments.

In some embodiments, the bracket may comprise a deformable metal. The deformable metal may comprise, for example, aluminum, copper, iron, steel, brass, or any metallic alloys. In some embodiments, the bracket can comprise plastic material or enforced plastics. The plastic material can comprise high density polyethylene, polyphenylene sulfide, nylon, polyetheretherketone, polyetherimide, or polyamide-imide. In some embodiments, at least a part of the bracket comprises a plastic material while the remaining parts are made of metallic material, e.g., for electric grounding and spring. FIG. 101 shows an exemplary bracket comprising plastic material and metallic material. The base plate 10102 is made of metallic material while the tabs 10101 are made of plastic material. The bracket further comprises non-flat pivot feature 10103 to accommodate the tilting of solar module(s).

Figure 116A:
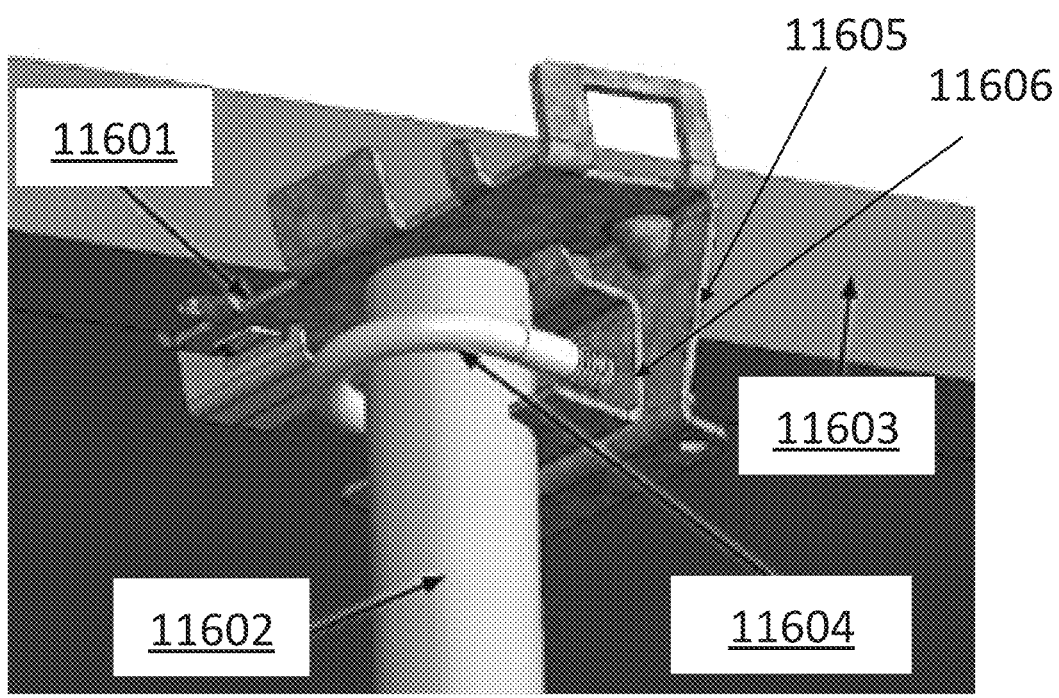
FIG. 116A shows an exemplary post-module interface.

In some embodiments, the post-module interface can be secured to a post using a bolt. In some embodiments, the bolt can be a U-bolt. In some embodiments, the post-module interface can comprise the bolt to secure the post-module interface to the post. In some embodiments, the U-bolt can work with any post-module interface disclosed herein. FIG. 116A shows an exemplary post-module interface. The post-module interface 11601 is secured to the post 11602 by a U-bolt 11604. 11603 refers to a solar module that is coupled to the post 11602 via the post-module interface 11601. The post-module interface comprises a flange (or hat) 11605. In some embodiments, the flange or hat can be substantially perpendicular to the top surface of the post-module interface (wherein the solar module is installed). In some embodiments, the flange or hat can have an angle from about 60° to about 120° relative to the top surface of the post-module interface. The flange or hat can comprise two holes for the U-bolt to cross. The U-bolt can be secured to the flange by two nuts at the opposite side of the flange or hat. In some embodiments, the post-module interface can further comprise a muffler clamp 11606 at the flange U-bolt interface. The U-bolt can tightly wreathe the perimeter of the post. In some embodiments, the U-bolt can have a gap with the perimeter of the post. In some embodiments, the gap can be from about 0.001 m to about 0.05 m. In some embodiments, the curved portion of the U-bolt can have a radius of curvature substantially similar to the radius of the post (e.g., a post with a circular cross section). In some embodiments, the curved portion of the U-bolt can have a radius of curvature that is at least 1%, at least 2%, at least 3%, at least 5%, at least 10%, at least 15%, or larger than the radius of the post (e.g., a post with a circular cross section).

The U-bolt provides flexibility and versatility in the assembly of the solar module and the post. The post does not need to drill a hole or internal thread for the securing of the post-module interface. The post-module interface and the U-bolt can be used for newly planted post or a replacement post. As the dimensions of the U-bolt can be easily adjusted, the post-module interface and the U-bolt can be used for post with different dimensions.

Figure 116B:
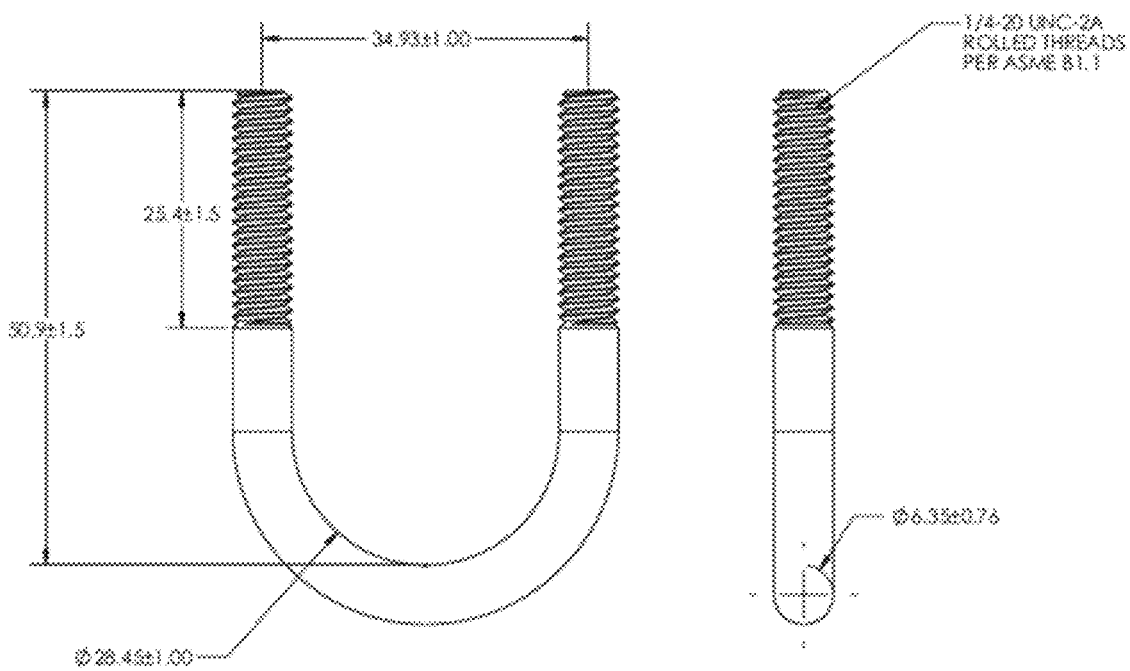
FIG. 116B shows an exemplary U-bolt with exemplary dimensions.
Figure 116C:
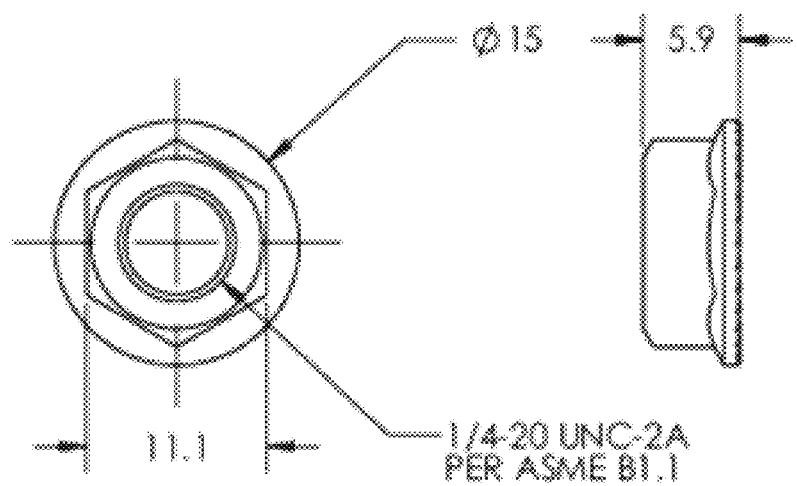
FIG. 116C shows an exemplary nut with exemplary dimensions.

FIG. 116B shows an exemplary U-bolt with exemplary dimensions. The dimensions of the U-bolt are not limited by the values provided in FIG. 116B. The dimensions of the U-bolt can depend on the dimension of the post, the post-module interface, and/or the solar module. The dimensions of the U-bolt can depend on the weight of the post-module interface and/or the solar module. FIG. 116C shows an exemplary nut with exemplary dimensions. The dimensions of the nut are not limited by the values provided in FIG. 116C. The dimensions of the nut can depend on the dimension of the U-bolt.

Figure 116D:
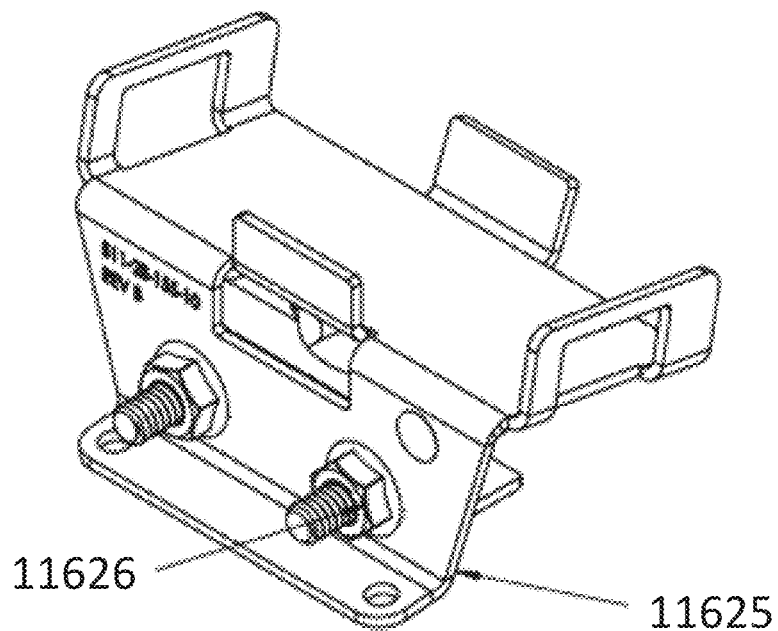
FIG. 116D shows a perspective view of a post-module interface connected with a U-bolt.

FIG. 116D shows a perspective view of a post-module interface connected with a U-bolt. The U-bolt is coupled to the flange 11625 of the post-module interface by nuts e.g., 11626.

Figure 116E:
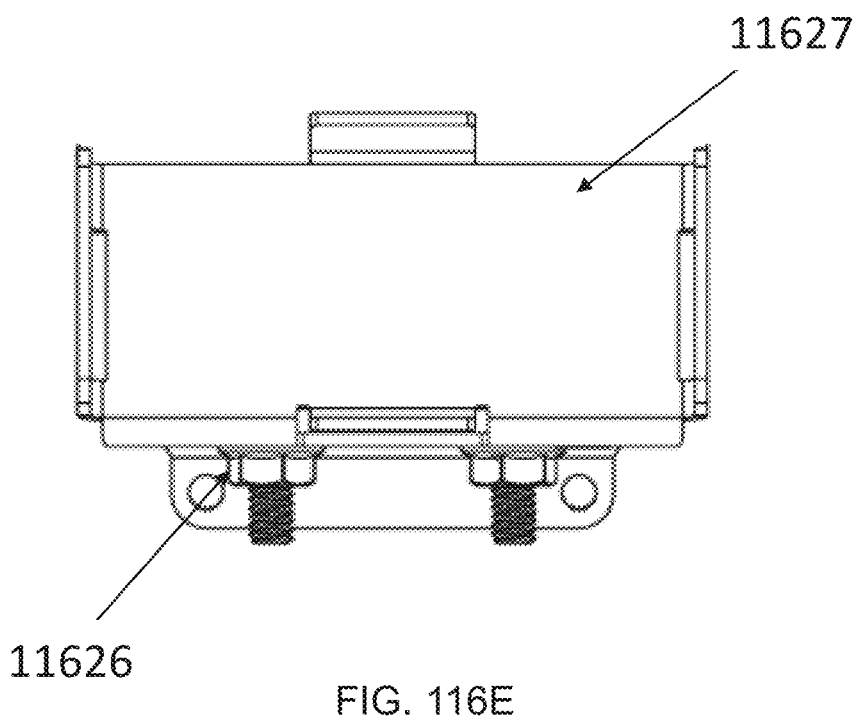
FIG. 116E shows a top view of the post-module interface connected with a U-bolt by nuts.

FIG. 116E shows a top view of the post-module interface 11627 connected with a U-bolt by nuts e.g., 11626.

Figure 116F:
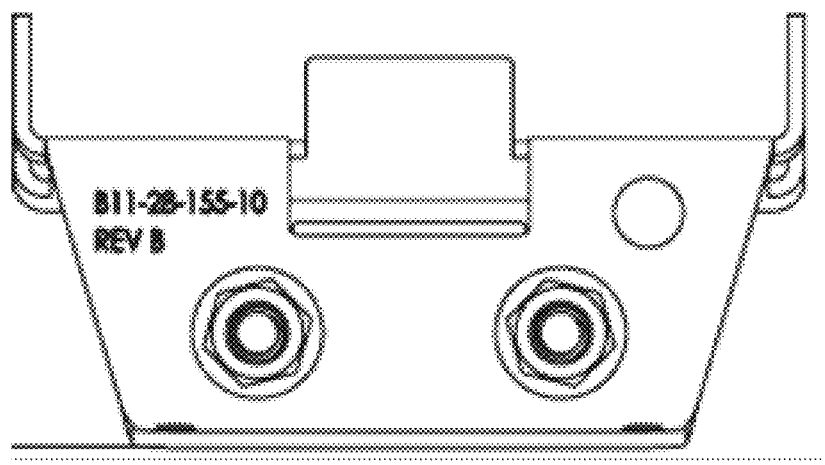
FIG. 116F shows a side view of the post-module interface with the flange.
Figure 116G:
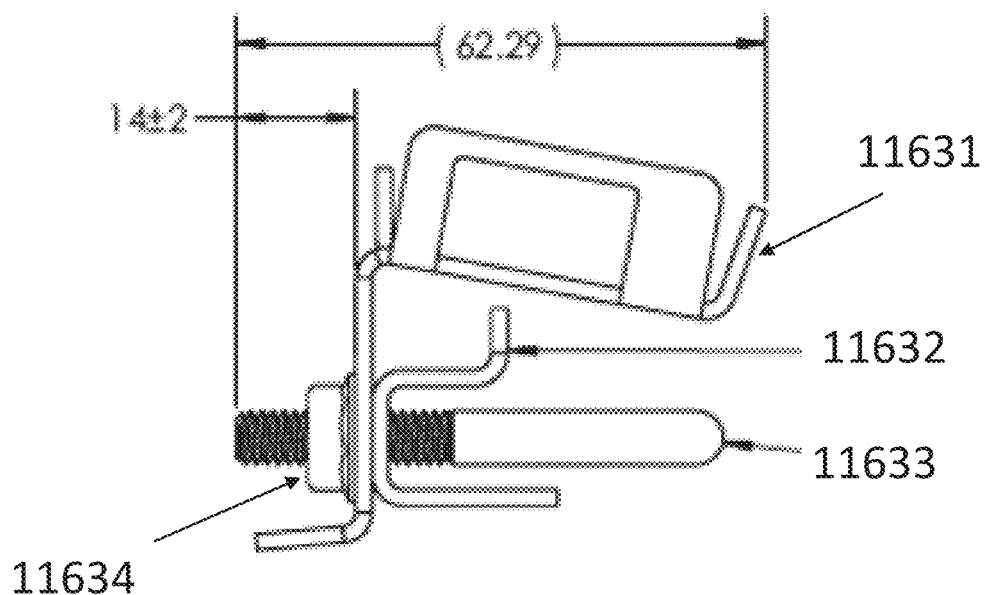
FIG. 116G shows a side view of the post-module interface connected with a U-bolt.

FIG. 116F shows a side view (facing the flange) of the post-module interface with the flange. FIG. 116G shows a side view of the post-module interface connected with a U-bolt. The dimensions of the post-module interface are not limited by the values provided in FIG. 116G. The U-bolt 11633 is secured to the post-module interface 11631 by inserting to the holes on the flange of the post-module interface and tightened by bots e.g., 11634. In some embodiments, a muffler clamp 11632 can be present at the flange U-bolt interface to provide additional strength, cushion, or force.

Figure 116H:
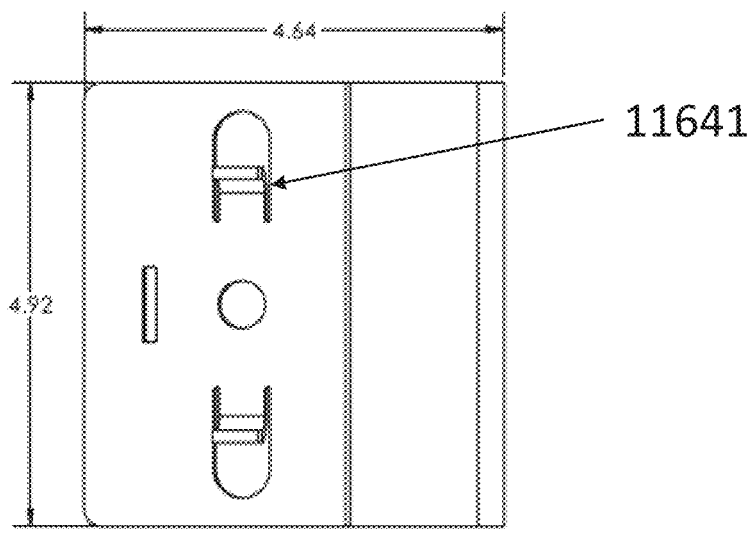
FIG. 116H shows a top view of a post-module interface.
Figure 116I:
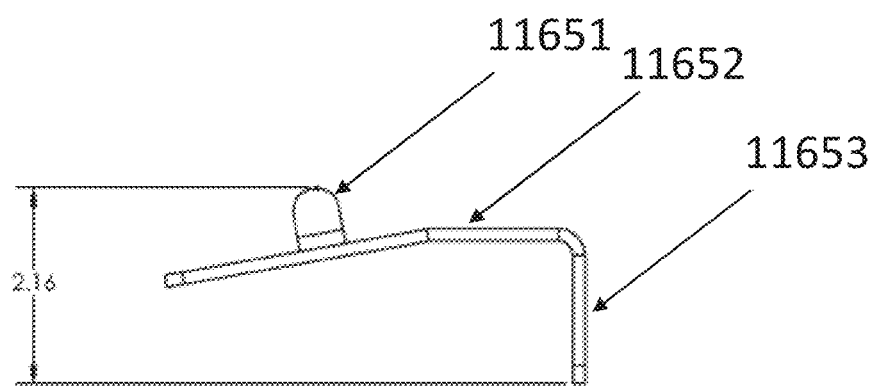
FIG. 116I shows a side view of a post-module interface.

FIG. 116H shows a top view of a post-module interface. The post-module interface comprises two tabs e.g., 11641 for securing solar modules. In some embodiments, the post-module interface can comprise 2, 3, or 4 tabs. FIG. 116I shows a side view of a post-module interface. The post-module interface comprises a top surface 11652, a flange or hat 11653, and one or more tabs e.g., 11651 on the top surface. The top surface can be substantially flat or non-flat. The dimensions of the post-module interface are not limited by the values provided in FIGS. 116H and 116I.

Figure 116J:
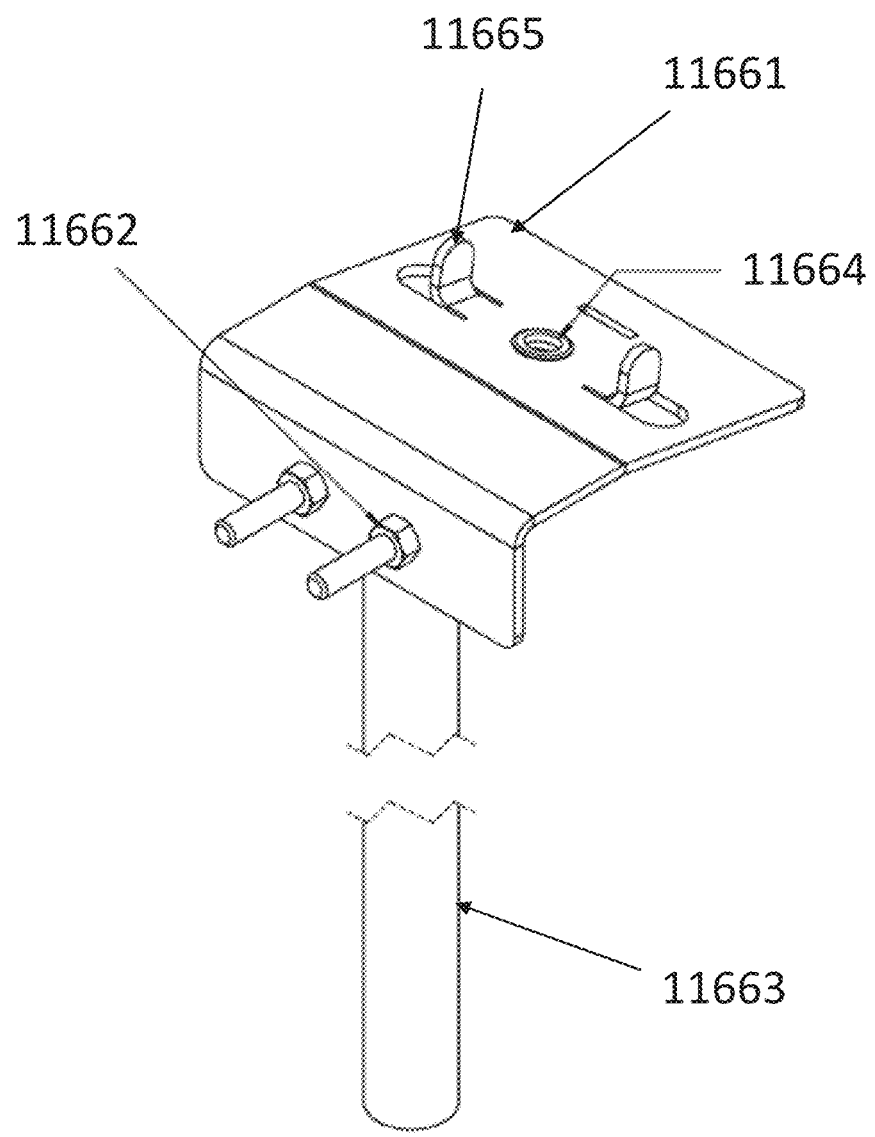
FIG. 116J shows an exemplary assembly of post-module interface with a post.
Figure 116K:
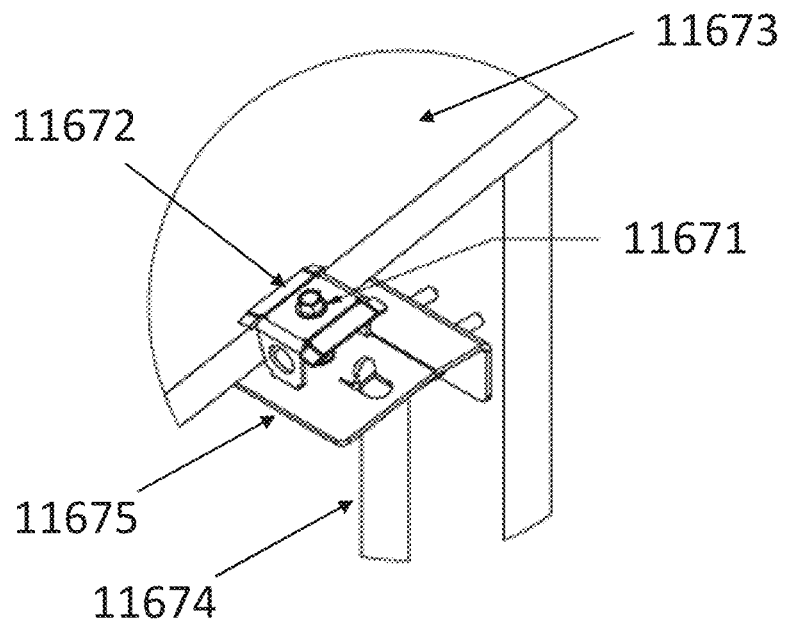
FIG. 116K shows an exemplary assembly of a solar module and a post via a post-module interface.
Figure 116L:
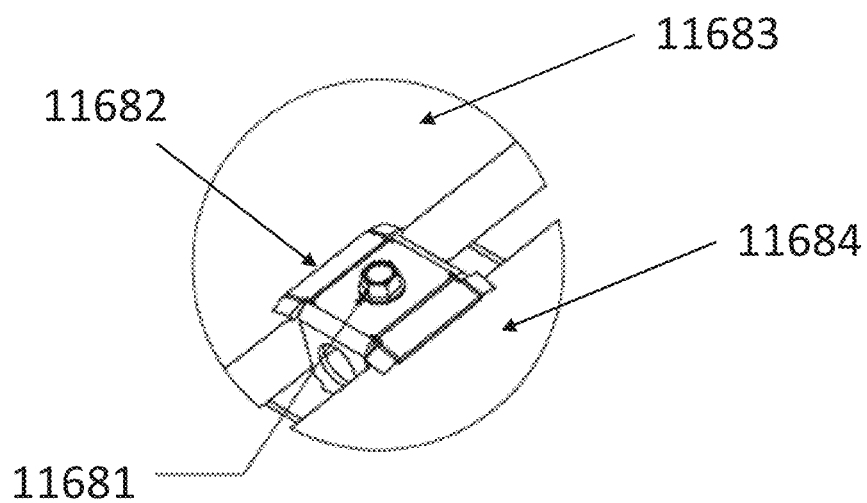
FIG. 116L shows an exemplary assembly of two solar modules and a post via a post-module interface.

In some embodiments, the solar module can be secured or affixed to the post-module interface with a bolt. FIG. 116J shows an exemplary assembly of post-module interface with a post. The post-module interface 11661 is secured to the post 11663 by a U-bolt (covered by the post-module interface) and nuts 11662. The post-module interface can comprise one or more tabs 11665 and a nut or a hole 11664. In some embodiments, the tab can resist lateral movement of the solar module. A solar module can be secured to the post-module interface by the tab, a clamp, and a bolt to the nut or hole. FIG. 116K shows an exemplary assembly of a solar module and a post via a post-module interface. The post-module interface is coupled or secured to the post by a U-bolt (covered by the post-module interface). The solar module 11673 is coupled to the post-module interface 11675 by a clamp 11672. The clamp 11672 is tightened to the post-module interface by a bolt 11671. The post-module interface can comprise a tab (covered by the solar module) to restrict a lateral movement of the solar module. FIG. 116L shows an exemplary assembly of two solar modules and a post via a post-module interface, similarly to FIG. 116K. The two solar modules 11683 and 11684 can be affixed to the post-module interface by a clamp 11681. The clamp 11682 is tightened to the post-module interface by a bolt 11681. The post-module interface can comprise a tab (covered by the solar module) to restrict a lateral movement of the solar module.

Figure 116M:
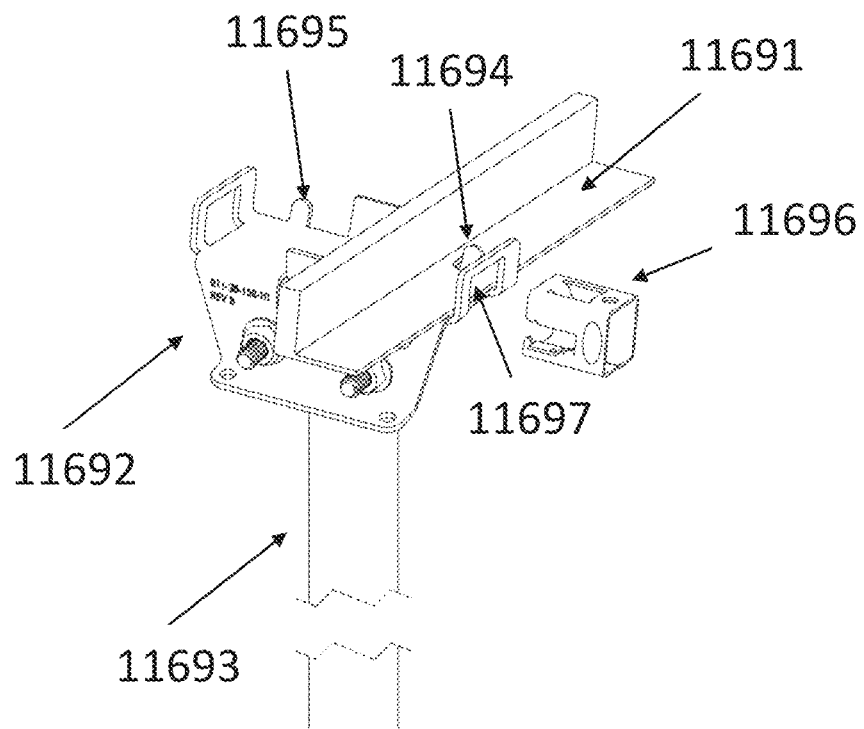
FIG. 116M shows an exemplary assembly of a solar module and a post via a post-module interface (clip not coupled to the post-module interface).
Figure 116N:
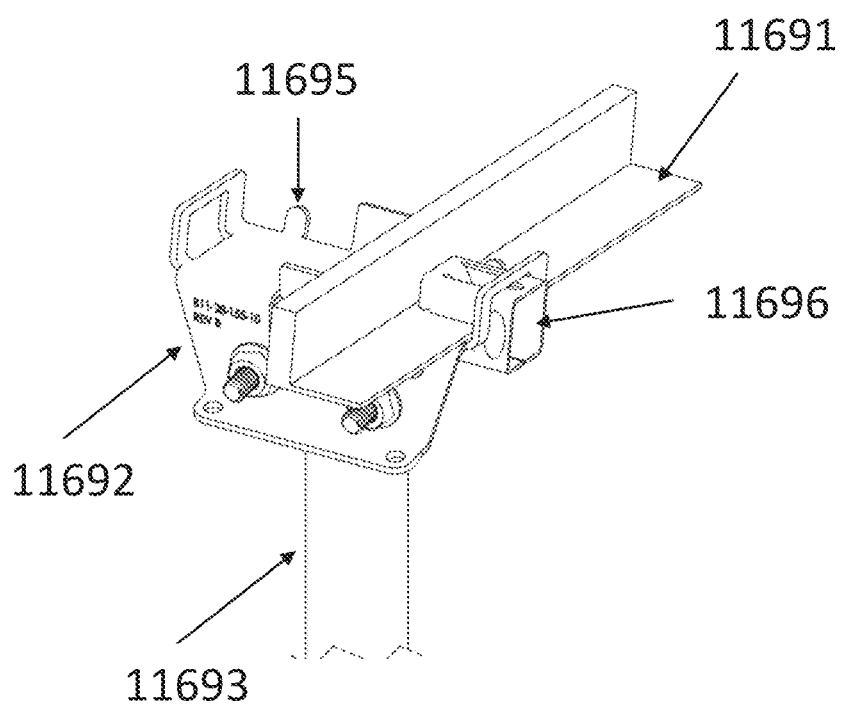
FIG. 116N shows an exemplary assembled post-module with the clip inserted and fixed.
Figure 116O:
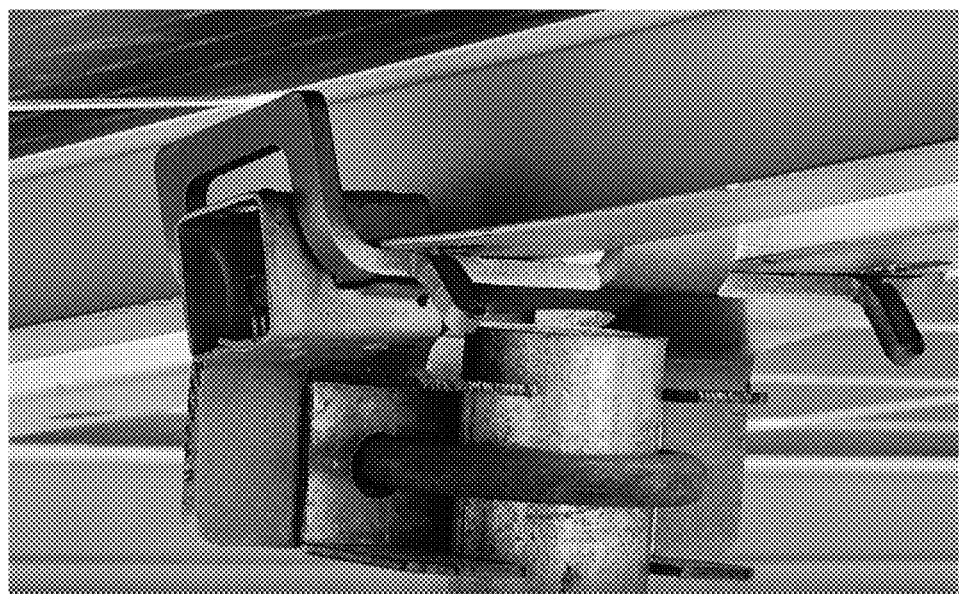
FIG. 116O shows a picture of an exemplary assembled post-module with the clip inserted and fixed.

In some embodiments, the solar module can be secured or affixed to the post-module interface with a clip. In some embodiments, the solar module can comprise a flange for affixing the solar module to the post-module interface. In some embodiments, the solar module can comprise a frame or coupled to a frame for affixing the solar module to the post-module interface. FIG. 116M shows an exemplary assembly of a solar module and a post via a post-module interface (clip not coupled to the post-module interface). 11691 refers to a flange of the solar module or a frame of the solar module (or coupled to the solar module). The post-module interface 11692 can be affixed to the post 11693 with a U-bolt or a bolt as disclosed herein. The post-module interface can comprise one or more tabs e.g., 11694 and 11695. The tabs can be at an edge or a non-edge position of the post-module interface. The post-module interface can further comprise one or more flanges protruding upwards. The flanges protruding upwards can comprise a hole or an opening 11697. The solar module (e.g., 11691) can be affixed to the post-module interface by a clip, e.g., 11696. The tab 11694 can cross the solar module 11691 through a hole at the bottom flange or frame of the solar module. The clip 11696 can cross the hole or opening 11697 on the flange of the post-module interface that protrudes upwards and interlock with the tab 11694 to secure the solar module to the post-module interface. FIG. 116N shows an exemplary assembled post-module with the clip inserted and fixed. FIG. 116O shows a picture of an exemplary assembled post-module with the clip inserted and fixed. In some embodiments, the clip can be any suitable fastening clip. In some embodiments, the clip can be an off-the-shelf clip, e.g., a PowAR® wing cinch fastening clip.

In some embodiments, a clip as shown in FIGS. 116M and 116N is not needed. In some embodiments, the solar module can be affixed to the post-module interface by clamping or bolting with a clamp or a bolt/nut, e.g., via a flange or a frame of the solar module or a frame coupled to the solar module.

In some embodiments, the post-module interface can be made from sheet metal. In some embodiments, the clip can be made from sheet metal.

Figure 117A:
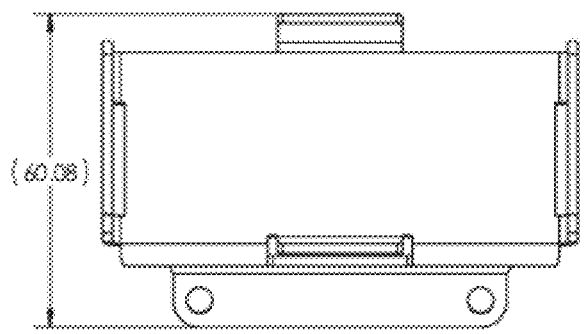
FIGS. 117A-117C show a top view, front side view, and side view of an exemplary post-module interface without coupling to a U-bolt.
Figure 117B:
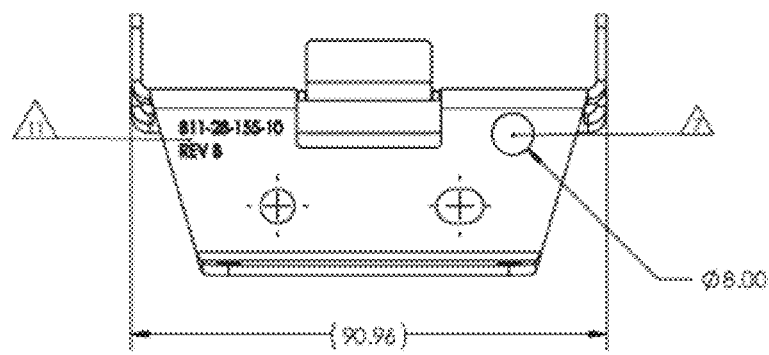
Figure 117C:
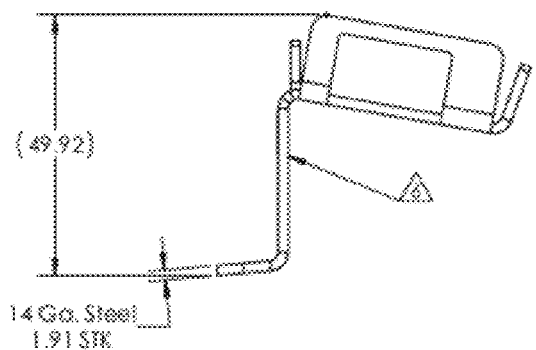

FIGS. 117A-117C show a top view, front side view, and side view of an exemplary post-module interface without coupling to a U-bolt. The dimensions of the post-module interface are not limited by the values provided in FIGS. 117A-117C.

In some embodiments, the post-module interface can comprise a metal. In some embodiments, the post-module interface can comprise a stainless steel.

In some embodiments, the top surface of the post-module interface can have flexibility. In some embodiments, the top surface of the post-module interface can tip or tilt by an angle. In some embodiments, the flexibility of the post-module interface can help align the solar module and contour the solar module to the terrain or ground, thereby eliminating a need for grading of the terrain.

Figure 118A:
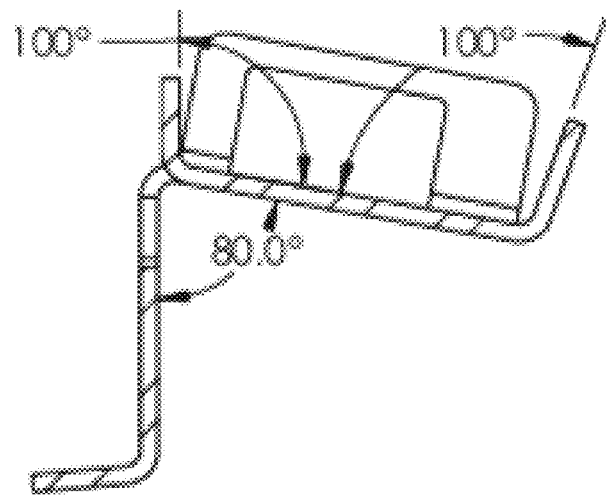
FIGS. 118A and 118B show exemplary post-module interface with a flexible surface.
Figure 118B:
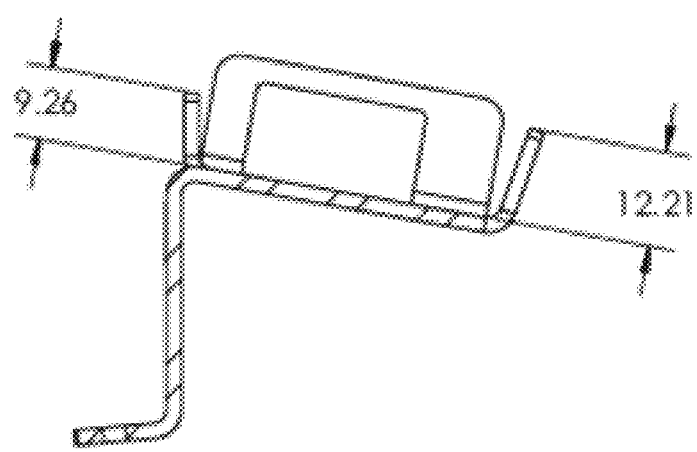

In some embodiments, the ground may have a movement in a vertical or lateral direction. In some embodiments, the ground may heave and cause a change in the surface (e.g., topography). In some embodiments, the flexibility of the post-module interface can continue contouring the solar module to the terrain after installation, during the lifetime of the solar module, and/or in a situation the terrain has a change or movement. FIGS. 118A and 118B show exemplary post-module interface with a flexible surface. The dimensions of the post-module interface are not limited by the values provided in FIGS. 118A and 118B. In some embodiments, the flexible surface can be non-flat. In some embodiments, the flexible surface can flex for 1° to 30°.

FIGS. 119A-119D show an isometric view, side view, back side view, and front side view of a muffler clamp. The dimensions of the muffler clamp are not limited by the values provided in FIGS. 119A-119D.

In some embodiments, the method may further comprise assessing a structural integrity of the post-module interfaces, e.g., post-clip interfaces using at least one of a measured force or a deflection during and/or after installation of the solar modules onto the posts. In some cases, the structural integrity of the post-module interfaces, e.g., post-clip interfaces may be assessed by testing separation force, resistance to shear forces due to translational or rotational motions, and/or resistance to pull forces.

In some embodiments, the method may further comprise obtaining images of the plurality of post-module interfaces, e.g., post-clip interfaces during or after the interfaces have been formed. In some embodiments, the method may further comprise determining a structural integrity of each of the plurality of post-module interfaces, e.g., post-clip interfaces based at least on one or more of the images.

In some embodiments, the method may further comprise using a testing tool located on the one or more mobile platforms to perform pull strength and assembly tests on one or more of the plurality of installed posts. In some cases, the testing tool may be used to apply pushing, pulling, twisting, vibration, or any appropriate force to an installed post and/or an installed solar module to test the mechanical strength, stability, and/or rigidity of an installation.

In some cases, the method may further comprise using a testing tool located on the one or more mobile platforms to perform electrical testing on one or more solar modules. In some cases, the electrical testing may comprise testing a voltage, current, connectivity, and any appropriate electrical measurements to ensure proper installation of the solar modules.

In another aspect, the present disclosure provides a method for constructing an array of solar modules. The method may comprise providing a plurality of posts and a plurality of solar modules. In some cases, the plurality of solar modules may comprise a plurality of clips pre-attached thereon. In some embodiments, the method may comprise using one or more mobile platforms to autonomously position and assemble the plurality of posts and the plurality of solar modules over the terrain to construct the array of solar modules.

In some embodiments, the method may comprise forming a plurality of post-module interfaces, e.g., post-clip interfaces between a plurality of clips and the plurality of posts to construct an array of solar modules over a terrain without requiring one or more premade holes/features for one or more fasteners. In some embodiments, the plurality of post-module interfaces, e.g., post-clip interfaces may have tolerances that enable the array to contour to the terrain, thereby eliminating a need for grading of the terrain. In some embodiments, the plurality of post-clip interfaces may comprise a plurality of clinched joints. In some embodiments, the plurality of clinched joints can be formed by a dimpling process. In some embodiments, each of the plurality of posts may comprise one or more tabs. In some cases, the dimpling process may comprise joining the one or more tabs to a corresponding clip to form the plurality of clinched joints. In some embodiments, the method may further comprise adding the one or more fasteners to the post-clip interfaces after or during the dimpling process.

In some cases, the plurality of post-module interfaces, e.g., post-clip interfaces can be formed at one or more corners of the plurality of solar modules. In some cases, the plurality of post-module interfaces, e.g., post-clip interfaces can be formed at all corners of the plurality of solar modules. In some cases, the plurality of post-module interfaces, e.g., post-clip interfaces can be formed at opposite corners of the plurality of solar modules. In some cases, the plurality of post-module interfaces, e.g., post-clip interfaces can be formed at one or more lateral sides of the plurality of solar modules. In some cases, the plurality of post-module interfaces, e.g., post-clip interfaces can be formed at all lateral sides of the plurality of solar modules. In some cases, the plurality of post-module interfaces, e.g., post-clip interfaces can be formed at opposite lateral sides of the plurality of solar modules.

In some cases, the plurality of post-clip interfaces can be formed by using a clinching tool that is located on a post installer load head. In some cases, the post installer load head may be located on one or more mobile platforms that are configured to carry the plurality of posts and the plurality of solar modules.

In some embodiments, the plurality of post-clip interfaces can be formed without requiring the one or more fasteners. In some embodiments, the plurality of post-clip interfaces can be formed by locating the one or more fasteners in position relative to each clip and a corresponding tab on each post, and piercing the one or more fasteners through the tab to fasten the tab onto the clip, or piercing the one or more fasteners through the clip to fasten the clip onto the tab.

In some embodiments, the presently disclosed methods may comprise using a movable tool to form a plurality of holes in-situ on at least the clips on the solar modules and/or tabs on the posts. In some embodiments, the presently disclosed method may comprise using the movable tool or another tool to install the one or more fasteners through the plurality of holes formed in-situ on the clips and/or tabs.

In another aspect, the present disclosure provides an algorithm for facilitating the deployment of a solar module. In some embodiments, the method may comprise using an algorithm to identify a location suitable for autonomous positioning and assembly of at least one solar module, without requiring aid or involvement from a user in the autonomous positioning and assembly of the at least one solar module.

In some embodiments, the algorithm comprises a machine learning (ML) algorithm. In some cases, the machine learning algorithm may comprise a neural network. Examples of neural networks can include, for instance, a deep neural network (DNN), a convolutional neural network (CNN), a recurrent neural network (RNN), and/or a generative adversarial network (GAN).

In some embodiments, the machine learning algorithm may comprise a deep neural network (DNN). In other embodiments, the deep neural network may comprise a convolutional neural network (CNN). The CNN may be, for example, U-Net, ImageNet, LeNet-5, AlexNet, ZFNet, GoogleNet, VGGNet, ResNet18, or ResNet, etc. In some cases, the neural network may comprise or utilize, for example, a deep feed forward neural network, a recurrent neural network (RNN), LSTM (Long Short Term Memory), GRUs (Gated Recurrent Units), autoencoders (e.g., variational autoencoders, adversarial autoencoders, denoising autoencoders, or sparse autoencoders), a Boltzmann machine (BM), a RBM (Restricted BM), a deep belief network, a generative adversarial network (GAN), a deep residual network, a capsule network, or one or more attention/transformer networks. In some embodiments, the neural network may comprise a plurality of neural network layers. In some cases, the neural network may have at least about 2 to 1000 or more neural network layers.

In some cases, the machine learning algorithm may comprise a support vector machine (SVM), a classification algorithm, a regression analysis algorithm, or any other type of supervised, semi-supervised, or unsupervised machine learning algorithm. In some embodiments, the supervised learning algorithm may comprise or utilize, for example, support vector machine algorithms, linear regression algorithms, logistic regression algorithms, linear discriminant analysis algorithms, k-nearest neighbor algorithms, similarity learning, or any combination thereof. In some embodiments, the unsupervised learning algorithm may comprise, for example, clustering algorithms, hierarchical clustering algorithms, k-means clustering algorithms, mixture models, anomaly detection, local outlier factor algorithms, autoencoders, deep belief networks, Hebbian learning, self-organizing maps, expectation-maximization algorithms (EM), principal component analysis algorithms, independent component analysis algorithms, non-negative matrix factorization, singular value decomposition, or any combination thereof. In some cases, the machine learning algorithm may comprise or utilize a random forest, a decision tree (e.g., a boosted decision tree), a classification tree, a regression tree, a bagging tree, or a rotation forest.

In some embodiments, the algorithm may be configured to identify the location for deploying one or more solar modules and/or posts based at least on an analysis of terrain data. In some embodiments, the terrain data is obtained using at least one of aerial imaging or Global navigation satellite systems (GNSS).

In some embodiments, the method may further comprise creating a set of executable instructions in a digital medium for an autonomous system to autonomously position, deploy, install, and/or assemble the at least one solar module to construct a solar module array. In some embodiments, the autonomous system comprises a plurality of field machines that are in operative communication via a network. In some embodiments, the plurality of field machines comprises one or more robots. In some embodiments, the method may further comprise creating a set of executable instructions in a digital medium for an autonomous system to autonomously position, deploy, install, and/or assemble one or more posts or other supporting structures for one or more modules of a solar module array.

In some embodiments, the present disclosure provides a method for determining a location suitable for using an algorithm to identify the location suitable for autonomous positioning and assembly a post and a solar module. In some embodiments, the method further comprises creating a set of executable software instructions for controlling one or more mobile platforms to autonomously position and assemble a plurality of posts and a plurality of solar modules over a terrain to construct an array of solar modules without requiring aid or involvement from a user.

In some embodiments, the present disclosure provides a method for constructing an array of solar modules, comprising: (a) autonomously positioning a plurality of posts over a terrain; and (b) autonomously assembling a plurality of solar modules with the plurality of posts over the terrain, thereby constructing the array of solar modules, wherein the plurality of posts comprises a row of posts wherein two adjacent posts in the row of posts are each tilted toward one another, wherein a third post adjacent to the two adjacent posts is tilted away.

In some embodiments, the algorithm uses a digital representation of the design of the array. In some embodiments, the algorithm and the executable software instruction comprise a digital surface model of the terrain that can be used to determine the location.

In some embodiments, the method comprises determining the location of posts by an algorithm that uses the post-clip interface angles. In some embodiments, the method can determine the location of the posts over flat terrain, and/or substantially non flat terrain.

In some embodiments, the method comprises using a sensor to record the location of the posts or module in the digital representation.

In some embodiments, the method comprises using the algorithm to minimize a depth of the post. In some embodiments, the method comprises using the algorithm and the digital surface model to minimize the depth of the post.

In some embodiments, the algorithm can use soil properties. Soil properties can comprise the composition of the soil, the softness or hardness of the soil, the density of the soil, a moisture content of the soil, etc. In some embodiments, the posts can be tilted to a non plumb angle at the target location.

In some embodiments, the algorithm can use the array geometry and/or tolerances.

In some embodiments, the digital surface model of the terrain is updated with the measurements.

In some embodiments, a sensor can be used to modify the location of the post or module based on the measurement of a nearby post or module. In some embodiments, the sensor can comprise an optical sensor. In some embodiments, the sensor can comprise a geolocation sensor.

In some embodiments, a sensor can collect various data of the terrain. The data can be saved, transmitted, and/or displayed in a digital representation. The digital representation of the data can be used by the algorithm for simulating or modeling a design array. In some embodiments, the design array comprises design features of the posts, solar modules, interaction between the posts and the solar modules, and relationships between the posts or the solar modules and any other components of the array.

In some embodiments, the method disclosed herein can determine, with a processor, an orientation and a tilt angle of a solar module array. In some embodiments, the determining can be based on a terrain topography information. In some embodiments, the determining can be based on a pattern of a sunlight during the day, e.g., angle, energy, and energy distribution of the sunlight.

In some embodiments, a digital representation of the output of the algorithm can be exported or displayed. In some embodiments, the method further comprises providing a graphic user interface (GUI) to display an output of the algorithm. In some embodiments, the method further comprises displaying a digital representation of an output of the algorithm on the GUI.

Figure 109:
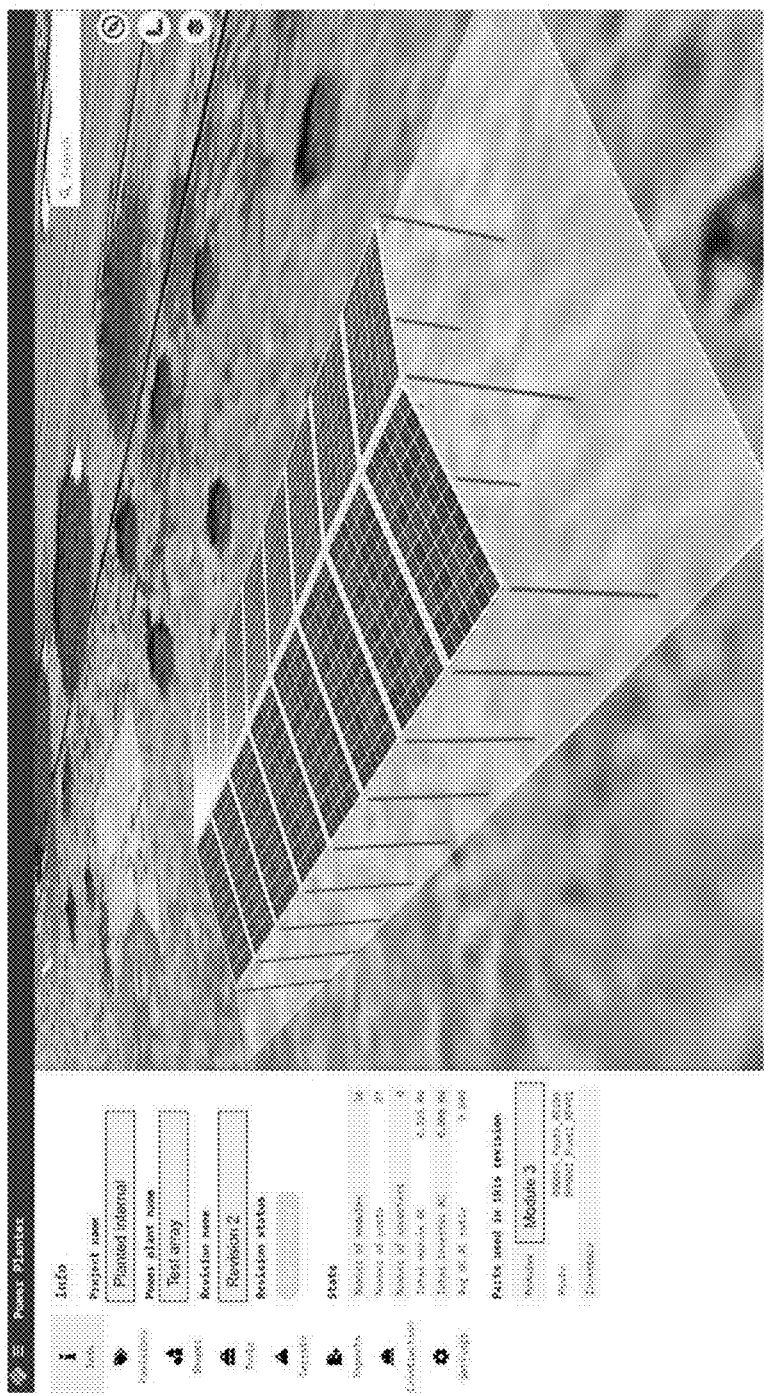
FIG. 109 shows an example of a digital representation of the post and solar module assembly, in accordance with some embodiments.

FIG. 109 shows an example of a digital representation of the post and solar module assembly. The digital representation can be used for design, evaluation, construction, operations, and maintenance of the post and solar module system. The digital presentation can comprise a GUI interface for the display parameters, for example, number of modules, number of posts, number of inverters, total module DC, total inverter AC, and Average DC:AC ratio. The GUI interface can also comprise input information, for example, the project name, the power plant name, revision name, and revision status.

Figure 110A:
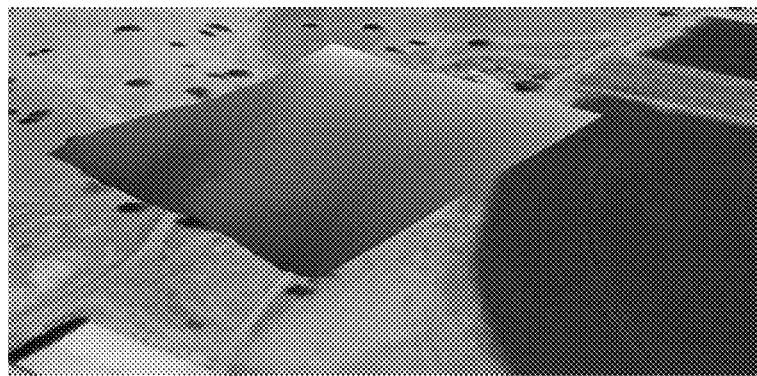
FIG. 110A shows an exemplary digital surface data, in accordance with some embodiments.
Figure 110B:
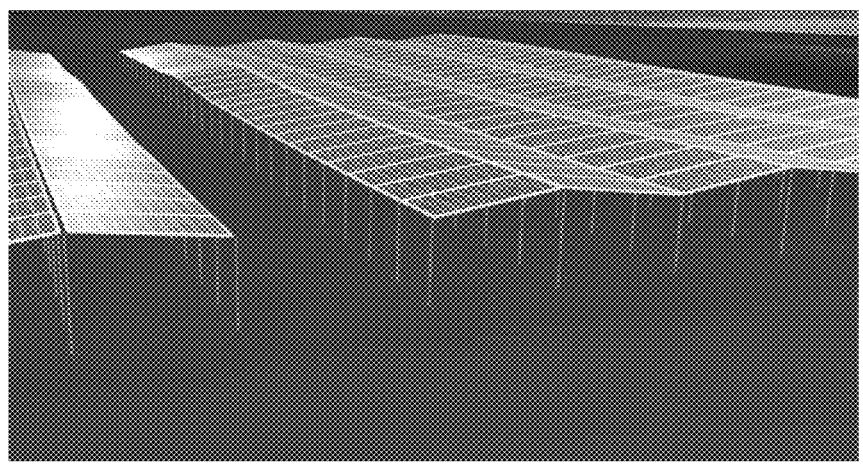
FIG. 110B shows a digital representation of the predicted and/or design array components at the terrain, in accordance with some embodiments.

FIG. 110A shows an exemplary digital surface data. The digital surface data can be obtained based on the terrain data, for example, the surface flatness, the conditions, the soil properties, and the angles at different locations. The digital surface data can be used to evaluate precise locations of array components, e.g., the post, the solar module, and/or the racking/assembly components. FIG. 110B shows a digital representation of the predicted and/or design array components at the terrain.

Figure 111:
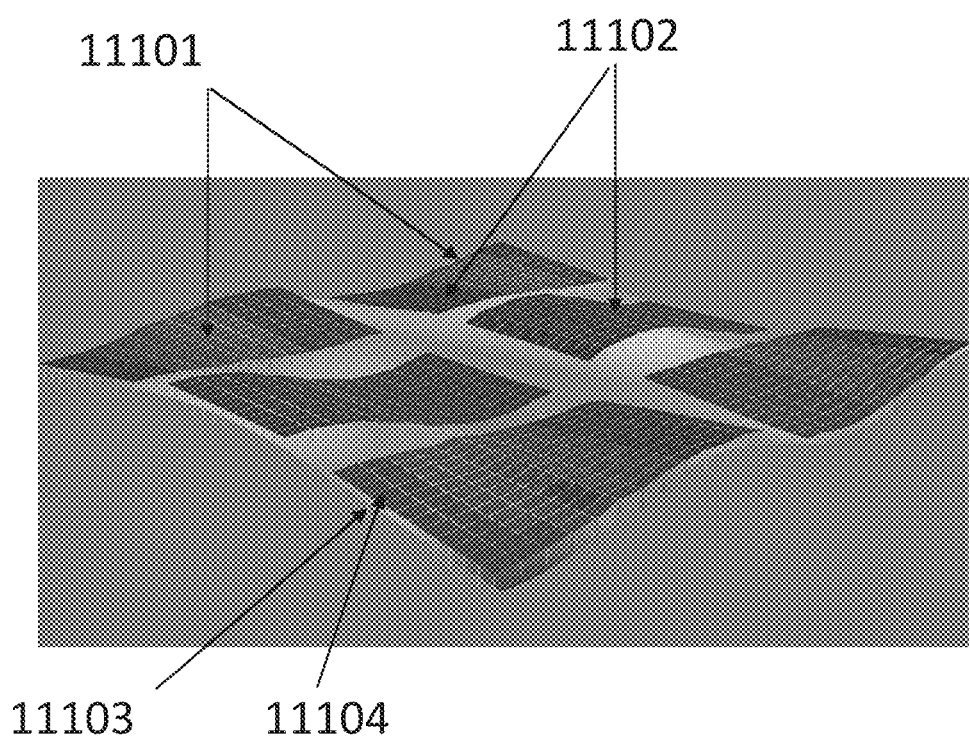
FIG. 111 shows an exemplary digital representation of a design array, in accordance with some embodiments.

FIG. 111 shows an exemplary digital representation of a design array. An algorithm can use the digital representation and the terrain surface model to calculate relationships between different array components, e.g., the module (e.g., 11104), the post (e.g., 11103), the post-module interface, and the ground. The digital representation can also show regions that are in desired specification (e.g., regions 11102) and regions that are out of desired specification (e.g., regions 11101) of the design array. In some embodiments, the digital representation can provide guidance and direction to adjust the position, orientation, configuration, and/or angle of the array components to optimize the design of the array. In some embodiments, the algorithm can be used to optimize the relative angle between the post and the ground to optimize strength. In some embodiments, the algorithm can use the location of the ground and the design of the array to determine an optimal length of the post that is embedded in the soil to maximize or minimize a parameter of interest, for example, height of post out of the ground, length of post under the ground, error tolerance to the ground, and/or post-module angle interface. In some embodiments, the algorithm can use properties of the soil that come from a soil model or from a test of the soil to determine the soil strength.

Figure 112A:
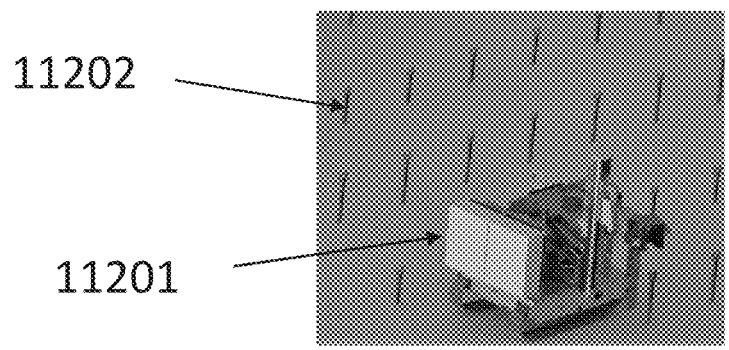
FIG. 112A shows a sensor to record array and terrain data during the installation.
Figure 112B:
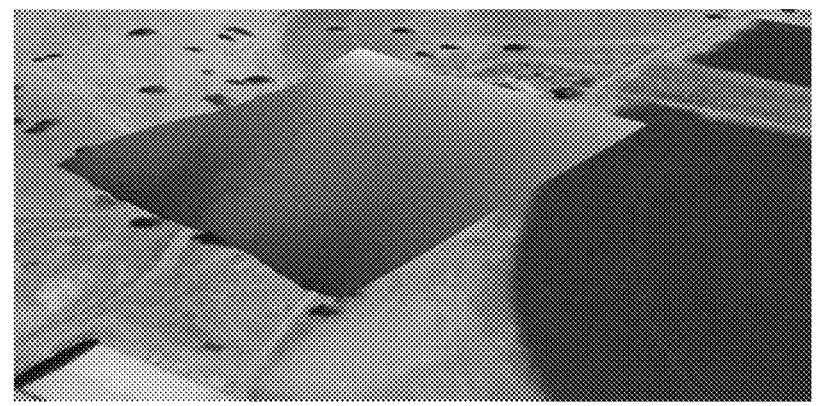
FIG. 112B shows an updated digital model with data from the sensor, in accordance with some embodiments.

In some embodiments, during the installation of the post and/or solar module, a sensor, e.g., a geolocation sensor can be used to record data, e.g., the location of the ground, the location of the posts, the number of posts installed, the height of the post above the ground, the angles of the posts, the distance between the posts, etc. In some embodiments, the recorded data can be fed into the algorithm to update or modify the digital model, which can be further used for analysis, design, and construction of the posts and solar modules. FIG. 112A shows a sensor to record array and terrain data during the installation. A vehicle 11201 is moving over a terrain to install a plurality of posts. The vehicle 11201 may comprise a sensor to obtain data of the terrain and/or the installed posts. FIG. 112B shows an updated digital model with data from the sensor.

Figure 113A:
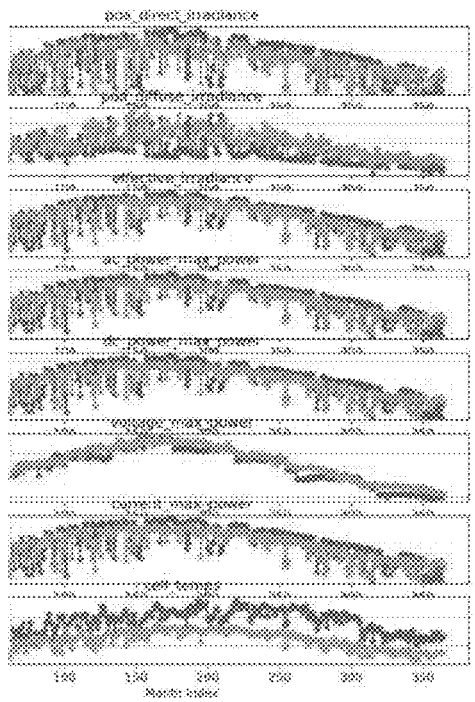
FIG. 113A shows example data of the calculation for power produced by the array, in accordance with some embodiments.

In some embodiments, the digital representation can be used to predict the electric (or electrical) power produced by the array. FIG. 113A shows example data of the calculation for electric power produced by the array. In some embodiments, the digital representation of the design array can be used to predict the cost of the array. In some embodiments, the digital representation can be used to predict the cost of the energy produced by the array.

Figure 113C:
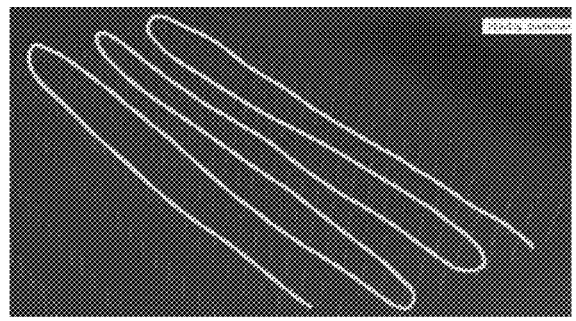
FIG. 113C shows an exemplary instruction path plan for an installation/construction, in accordance with some embodiments.
Figure 113B:
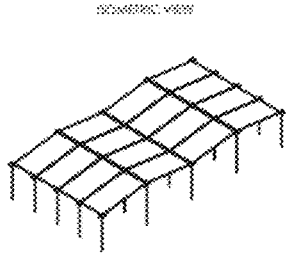
FIG. 113B shows an exemplary isometric view of a design array exported from the digital representation, in accordance with some embodiments.
Figure 113D:
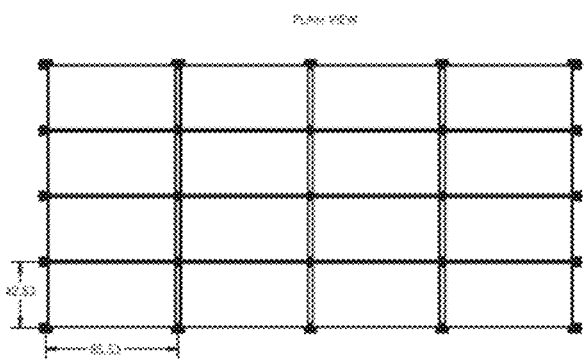
FIG. 113D shows an exemplary plan view of a design array exported from the digital representation, in accordance with some embodiments.

In some embodiments, the digital representation can be used to calculate the number of the required components of the array. In some embodiments, the digital representation of the design array is used to create construction plan drawings. In some embodiments, 2D drawings can be exported from the digital representation to guide or direct the construction. FIG. 113B shows an exemplary isometric view of a design array exported from the digital representation. FIG. 113D shows an exemplary plan view of a design array exported from the digital representation. The spacing or distance of the posts, the height of the post above the ground, and/or the angle of the post-module interface can be displayed on the 2D drawings.

In some embodiments, the digital representation can be used to generate a plan and/or analysis for construction operations of the array. FIG. 113C shows an exemplary instruction path plan for an installation/construction. The lines in FIG. 113C indicates the optimized construction path plan.

In some embodiments, the present disclosure provides a design software to design, optimize, engineer, and/or build high density arrays. In some embodiments, the software may be in communication with an installation machinery or a plurality of installation machineries (e.g., post installer and/or module installer). In some embodiments, the software may be connected to the installation machinery. In some embodiments, the design software can comprise information with user tools to accomplish one or more tasks. In some embodiments, the one or more tasks may comprise design and terrain analysis, construction planning, and/or build directions.

Figure 113E:
FIG. 113E shows an exemplary design information for a solar module array, in accordance with some embodiments.

FIG. 113E shows an exemplary design information for a solar module array 11351. The design information may be based on the terrain analysis and other environment parameters analysis (e.g., wind, precipitation). The design information may be further based on the required energy outputs. The design information may comprise the locations to install the posts, the driving depth of the posts, the height of the posts, the distances between the posts, the number of the posts, the number of the modules, the orientation of the modules, the angles of the modules, and/or the spacing between the modules. The design information may be exported, loaded, and/or stored in the installation machinery to guide the installation of posts and/or modules.

Figure 113F:
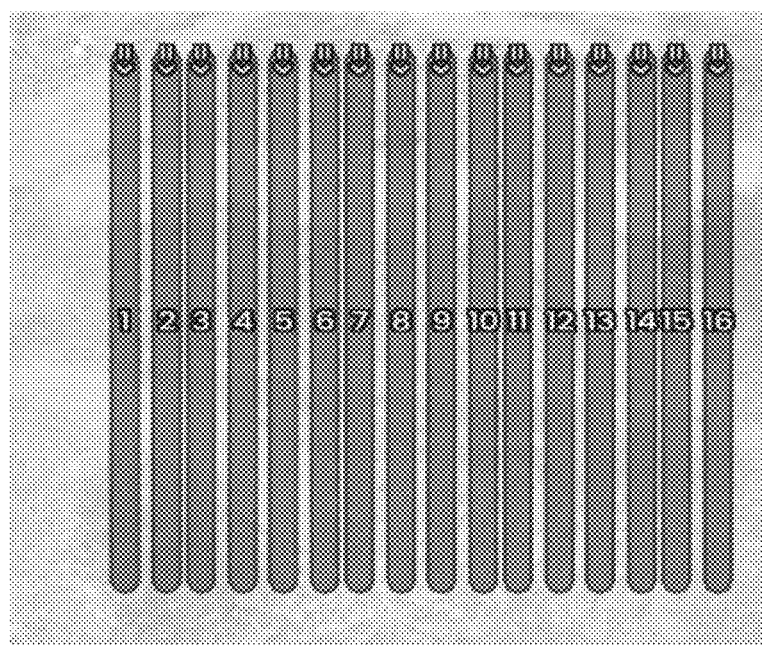
FIG. 113F shows an exemplary construction planning, in accordance with some embodiments.

FIG. 113F shows an exemplary construction planning. In some cases, the construction planning may comprise information about the direction and/or order of the installation. In some cases, the construction planning may comprise the post installation orders. In some cases, the construction planning may comprise the module installation orders. In some cases, the construction planning shown in FIG. 113F may comprise 16 rows of posts and the installation order.

Figure 113G:
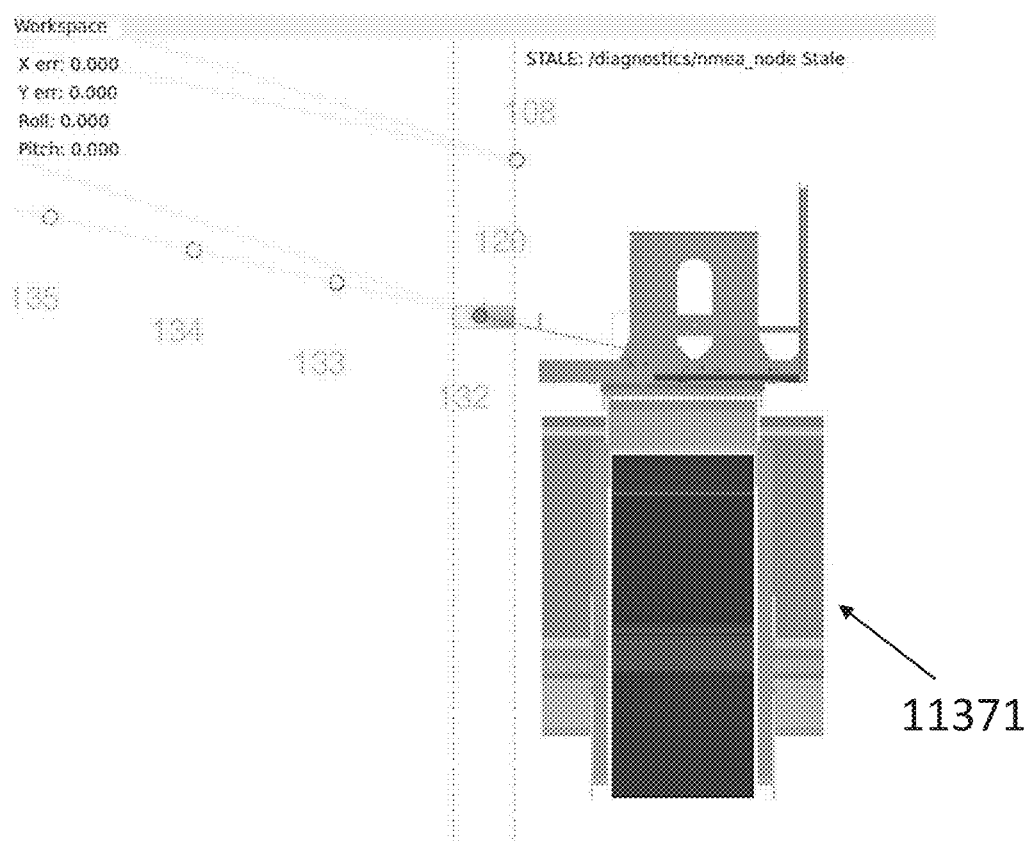
FIG. 113G shows an exemplary interface showing a detailed driving directions and targets, in accordance with some embodiments.

FIG. 113G shows an exemplary interface showing a detailed driving directions and targets. In some cases, the driving directions and targets may comprise the installation locations (e.g., 132, 133, 134, 135, 120, and 108) for the installation of posts. In some cases, the driving directions and targets may instruct an installation machinery (e.g., 11371) to follow the installation planning, directions, and/or order. In some cases, the interface may further comprise sensed data to show the accuracy of the installation. The accuracy of the installation may comprise errors in X, Y, roll, and/or pitch parameter.

Figure 113H:
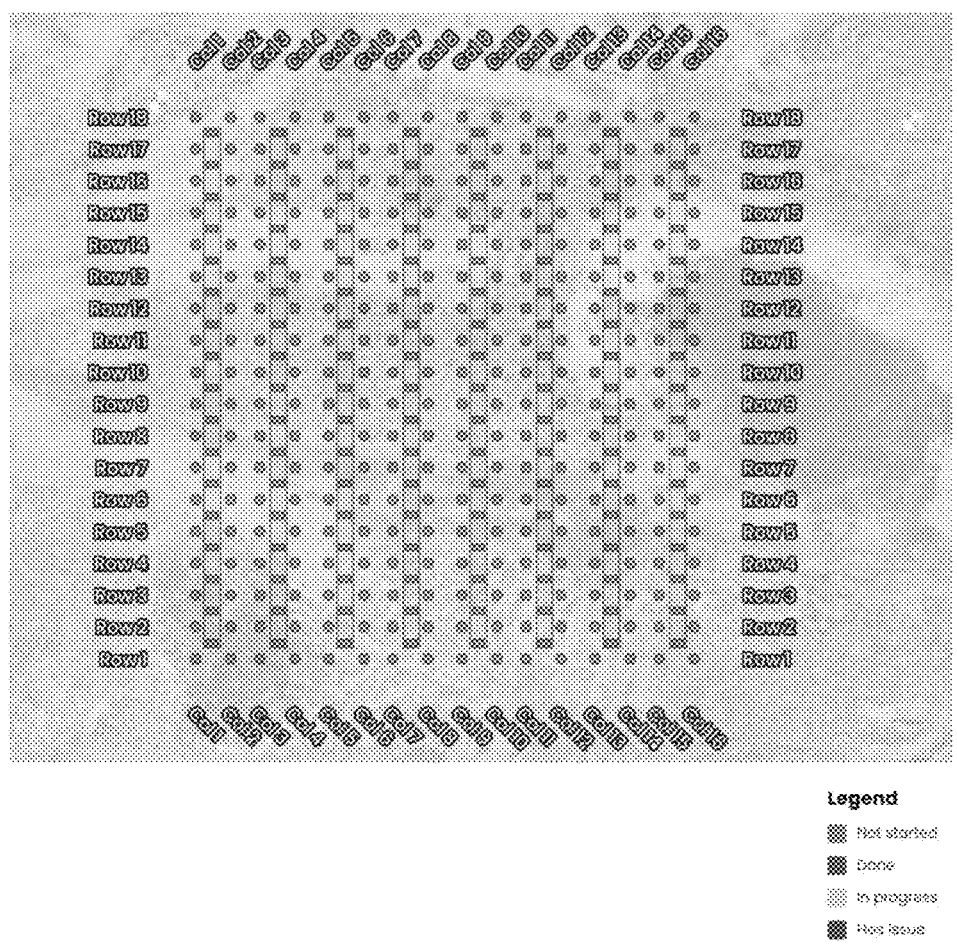
FIG. 113H shows an exemplary interface showing a construction quality assurance (QA interface), in accordance with some embodiments.

FIG. 113H shows an exemplary interface showing a construction quality assurance (QA interface). In some cases, the QA interface may comprise digital representation of the installation process. In some cases, the QA interface may show the status of the installation. In some cases, the status of the installation may comprise not started, done, in progress, and/or has issue. FIG. 113H shows the posts at rows 1-18 and columns 1-16 have been installed.

In some cases, a GPS guided machine may steer to the correct post location. In some cases, the machine may be equipped with a hopper (post feeder) which stores bulk posts. In some cases, the machine may singulate one post from the bulk posts. In some cases, the machine may automatically feed the post to a hammer and the hammer may drive the post into the ground. In some cases, the machine may comprise a roller to retain the post while it is driven into the ground. In some cases, the machine can install posts positioned with control over X, Y, Z, Tip and Tilt to follow the terrain as instructed by the software.

In another aspect, the present disclosure provides an apparatus that is configured to: carry a plurality of posts over a terrain; autonomously position a select post from the plurality of posts at a predetermined location on the terrain; and autonomously install the select post at the predetermined location. In some cases, the select post and the plurality of posts can be useable to support a plurality of solar modules.

FIGS. 45A-45D show perspective views of a machine for installing posts, in accordance with some embodiments. In some cases, the machine may comprise 3, 4, 5, or 6 degrees of freedom or more. In some cases, the machine may autonomously position a post, install the post in the ground, and/or force-test the post by pulling on it laterally, vertically, or any other direction and record the force-test data. In some cases, the machine may be configured to carry one or more bundles of posts on a rack. In some cases, the machine may be configured to locate one or more posts in a bundle of posts and collect a new post on a driving bit.

Figure 46B:
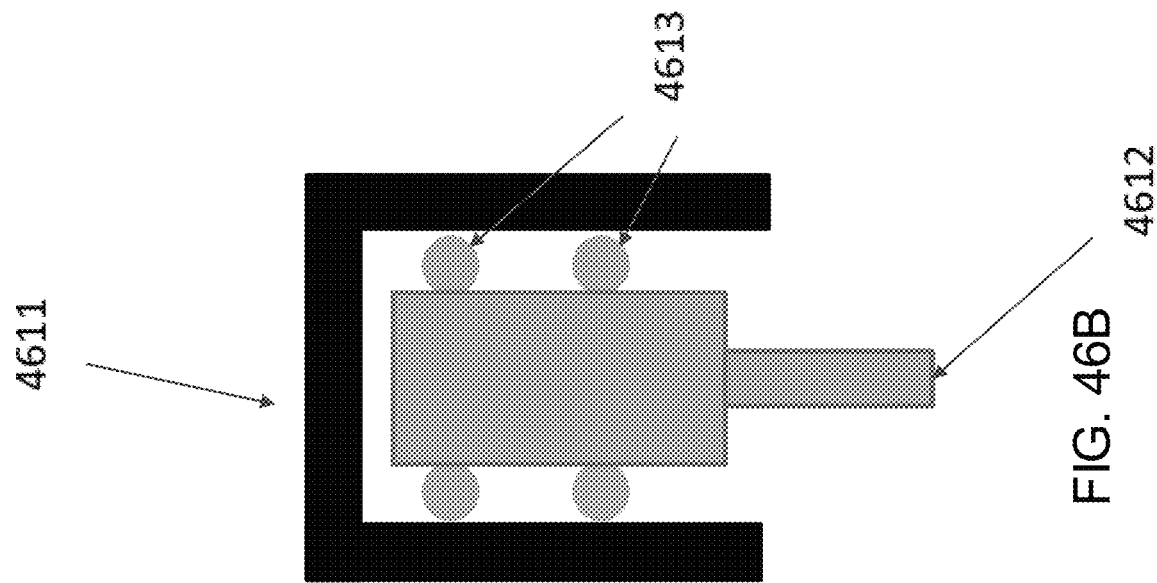
FIGS. 46A-46B show a machine for installing posts, in accordance with some embodiments.
Figure 46A:
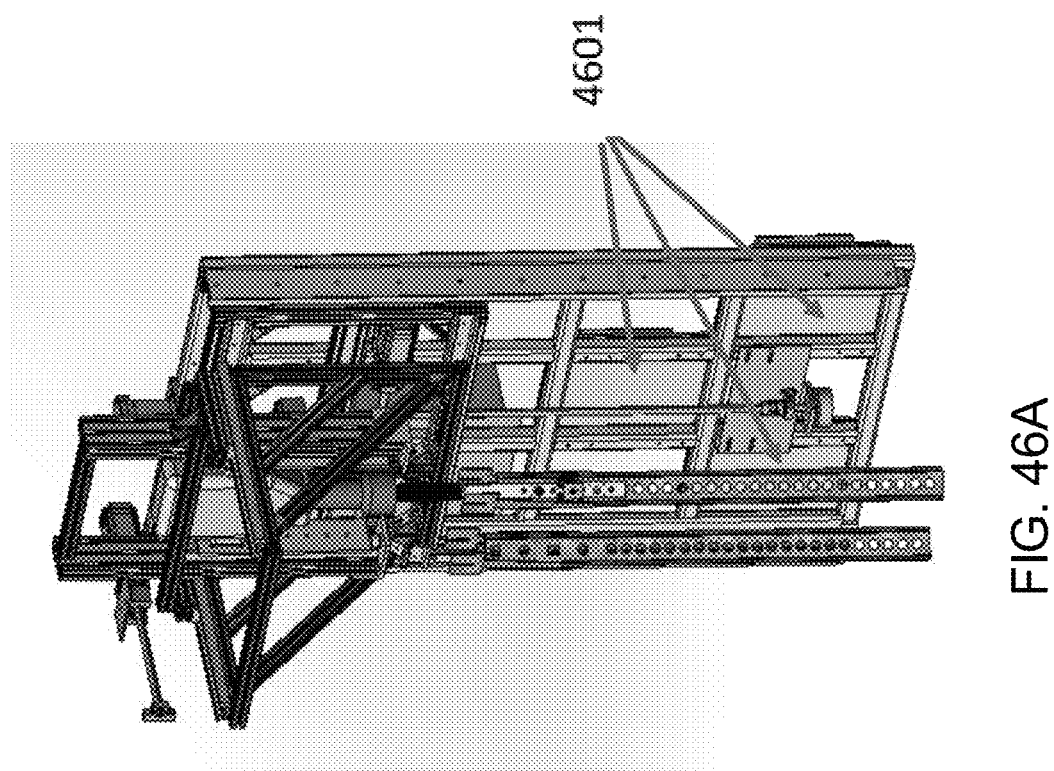
Figure 47A:
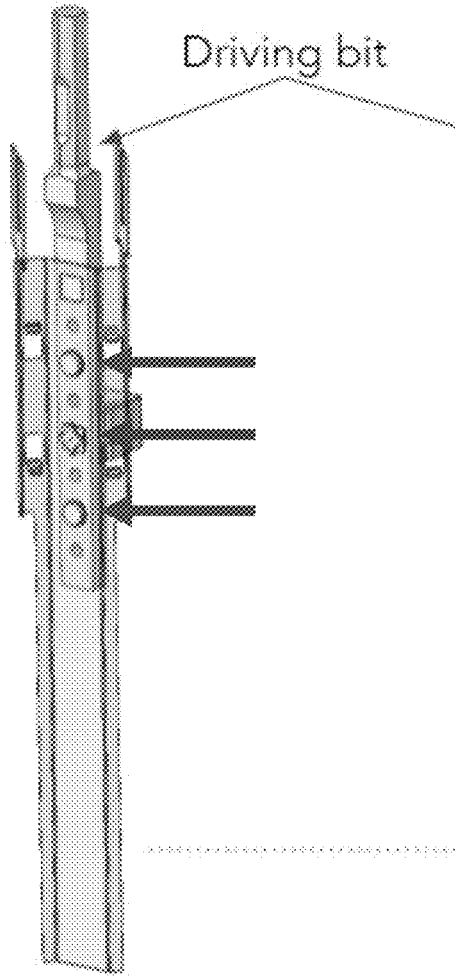
FIGS. 47A-47I show coupling mechanisms between a driving bit and a post, in accordance with some embodiments.
Figure 47B:
Figures 47C, 47D:
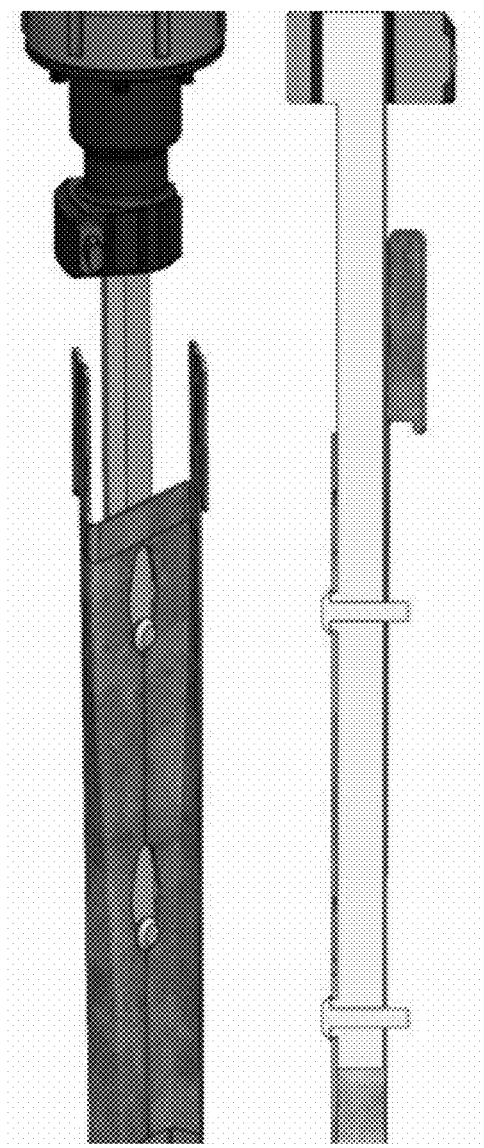
Figure 47G:
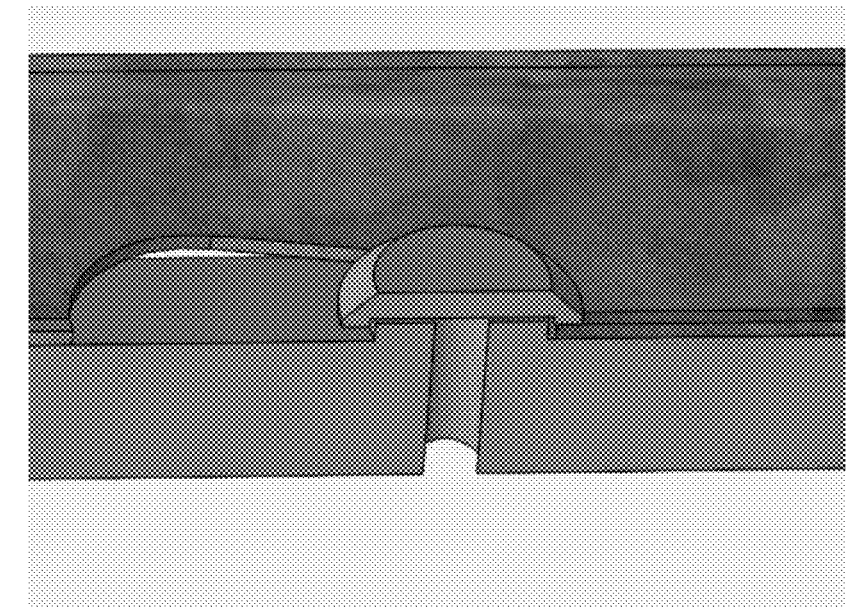
Figure 47F:
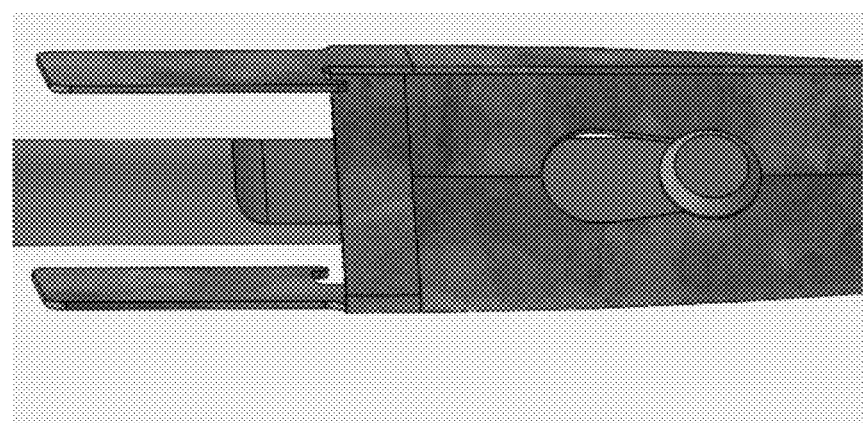
Figure 47E:
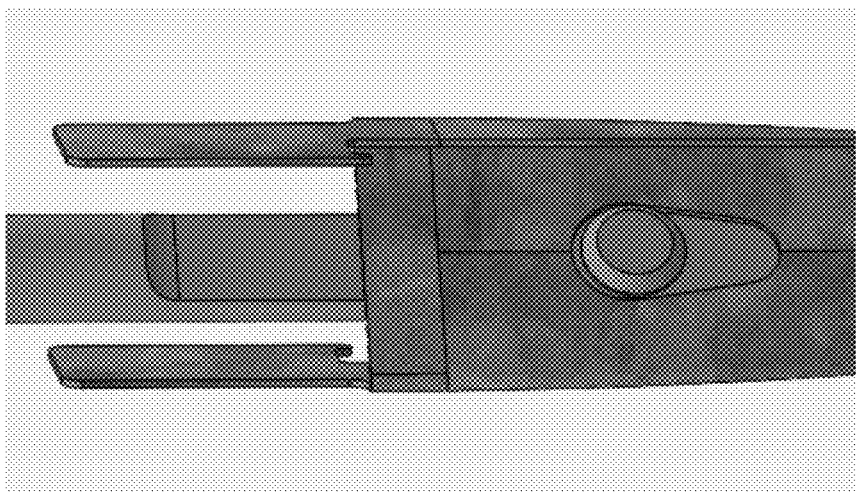
Figure 47H:
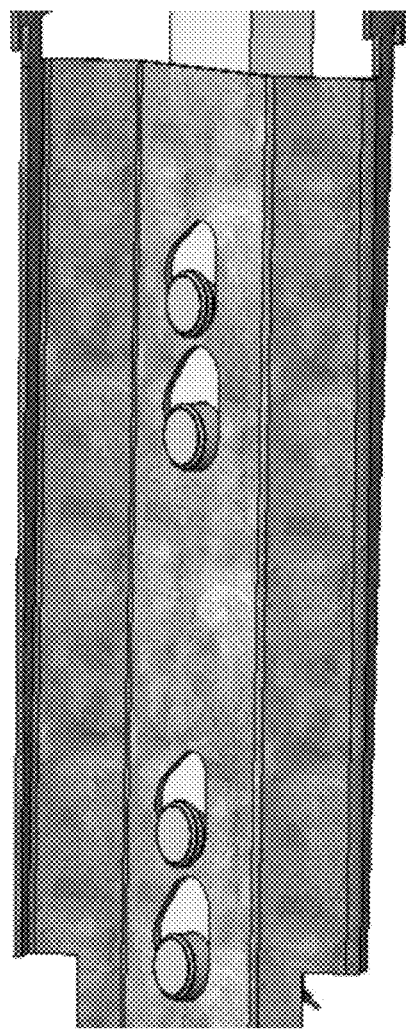
Figure 47I:
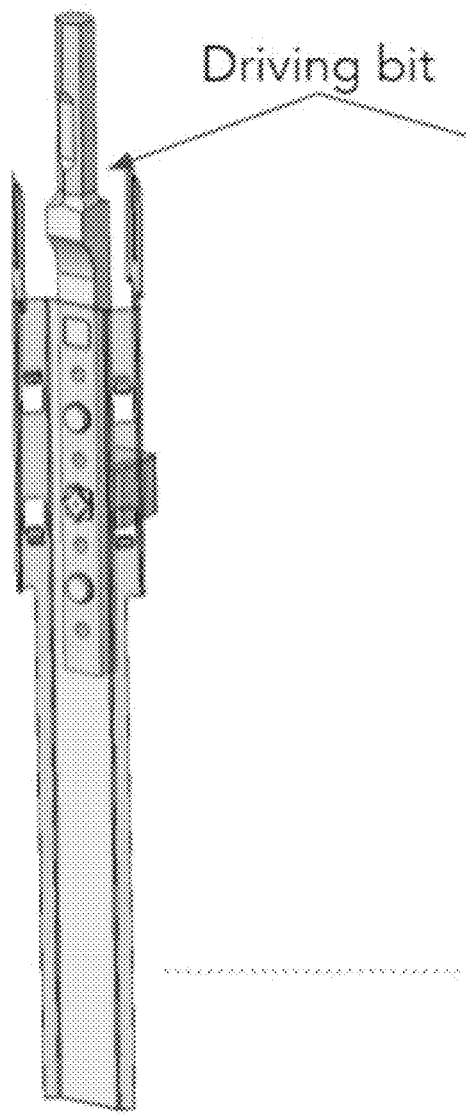

FIGS. 46A-46B show a machine for installing posts, such as those illustrated in FIGS. 49A-49C. In some cases, the machine may have 3 or more mounting interfaces to mount a tractor to, for example, using a 3 point hitch 4601. In some cases, the machine may carry a hammer 4611 for pounding a post 4612 into the ground. In some cases, the hammer may be mounted on vertical rails 4613 and may be free to slide vertically or in any other sufficient direction such that sufficiently small or no vibration is transferred from the hammer to the remainder of the machine.

FIGS. 50A-50C show coupling mechanisms between posts and a rack, in accordance with some embodiments. In some cases, a post may comprise a Z shaped section or a Z shape. In some cases, a post may comprise a shape that is substantially stackable. In some cases, a post may comprise one or more oblique set of tabs at the top. In some cases, a tab may comprise a cutout feature. In some cases, a cutout feature may be configured to allow a post to be hung from a hanger or a rack. In some cases, one or more posts may be bundled and shipped in a container or provided to a machine.

In some embodiments, the apparatus may be further configured to perform a force test after the select post has been installed at the predetermined location. In some embodiments, the force test may comprise applying a pull force on the select post in at least one of a lateral direction or a vertical direction.

In some embodiments, the select post may be installed at a predetermined location using a load driving mechanism configured to drive the select post into the ground at the predetermined location. In some cases, the load driving mechanism comprises or is coupled to a hammer. In some cases, the load driving mechanism is mounted to and movable along a plurality of rails in a vertical direction. In some cases, the load driving mechanism is configured to slide along the plurality of rails via bearings.

In some cases, the load driving mechanism comprises a retention mechanism that prevents the select post from displacing or decoupling from the load driving mechanism as the select post is being installed into the ground. In some cases, the retention mechanism comprises one or more shear features.

In some cases, the load driving mechanism comprises a driving bit having one or more shear features. In some cases, the one or more shear features may be configured to dually function as retention features. In some cases, the load driving mechanism is configured to have a driving force length that is less than a full longitudinal length of the select post.

FIGS. 47A-47I show coupling mechanisms between a driving bit and a post, in accordance with some embodiments. In some cases, a driving bit may be connected to a hammer. In some cases, a driving bit may comprise a shear interface for engaging a post during the pounding. In some cases, a driving bit may comprise a retention feature which prevents a post from falling off of the bit while it is being positioned and driven. In some cases, a driving bit may be configured to allow a post to be pounded from the post's web, which may be disposed lower on the body of the post. In some cases, pounding from the web may allow the hammer to impact the post with greater force, as compared to impacting from the head, because pounding from the web may effectively lower the buckling length of the post during pounding. In some cases, a driving bit may enter a larger portion of a hole in a post. In some cases, a driving bit may slide down in a configuration and retain against a chisel bit. In some cases, a head of a chisel feature on a driving bit may overlap with at least a portion of a post when the driving bit is engaged with the post. In some cases, there may be 1, 2, 3, 4, or more shear features on a chisel bit. In some cases, a chisel bit may also be used as a retention feature. In some cases, a feature on a chisel bit may retain a post. In some cases, a feature on a chisel bit may be separate from a feature that is pounding the post. In some cases, a retention feature may be a clocking element that rotates to engage with a post. In some cases, a retention feature may be a clocking square that turns about 45 degrees such that the corners retain a post once engage. In some cases, a retention feature may overhang a hole in the post. In some cases, a shaft may not engage a bottom of a hole in the post. In some cases, a pin may engage with a post without overhanging.

Figures 48A, 48B:
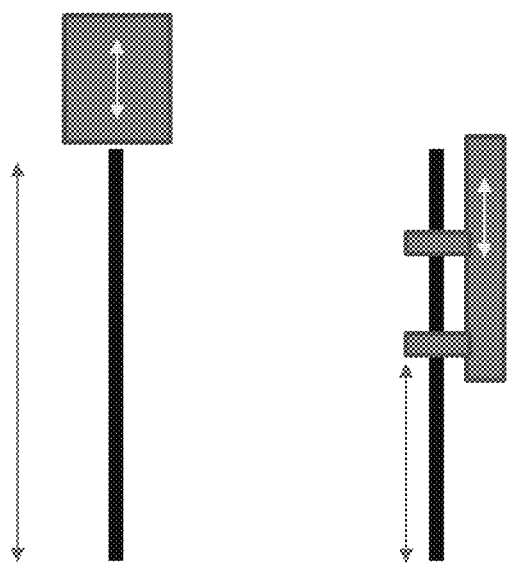
FIGS. 48A-48B show a comparison of driving a post using different coupling mechanisms, in accordance with some embodiments.

FIGS. 48A-48B show a comparison of driving a post using different coupling mechanisms, in accordance with some embodiments.

In some embodiments, the post may be driven into a terrain using a component that is positioned, oriented, and/or moved to impact a feature that is positioned along a length of the post. The component may comprise a hammer, a pin, or any other rigid structural member. In some cases, the movement of the component may be guided using a sleeve or a rail. The impact between the component and the feature may provide a driving force to push a post into a desired location. The point of impact may be closer to a center of gravity or a center of mass of the post, which can help to minimize buckling forces and to ensure that the post is installed in a desired orientation (e.g., perpendicular to the terrain or at any other desired angle relative to the terrain).

Figure 102:
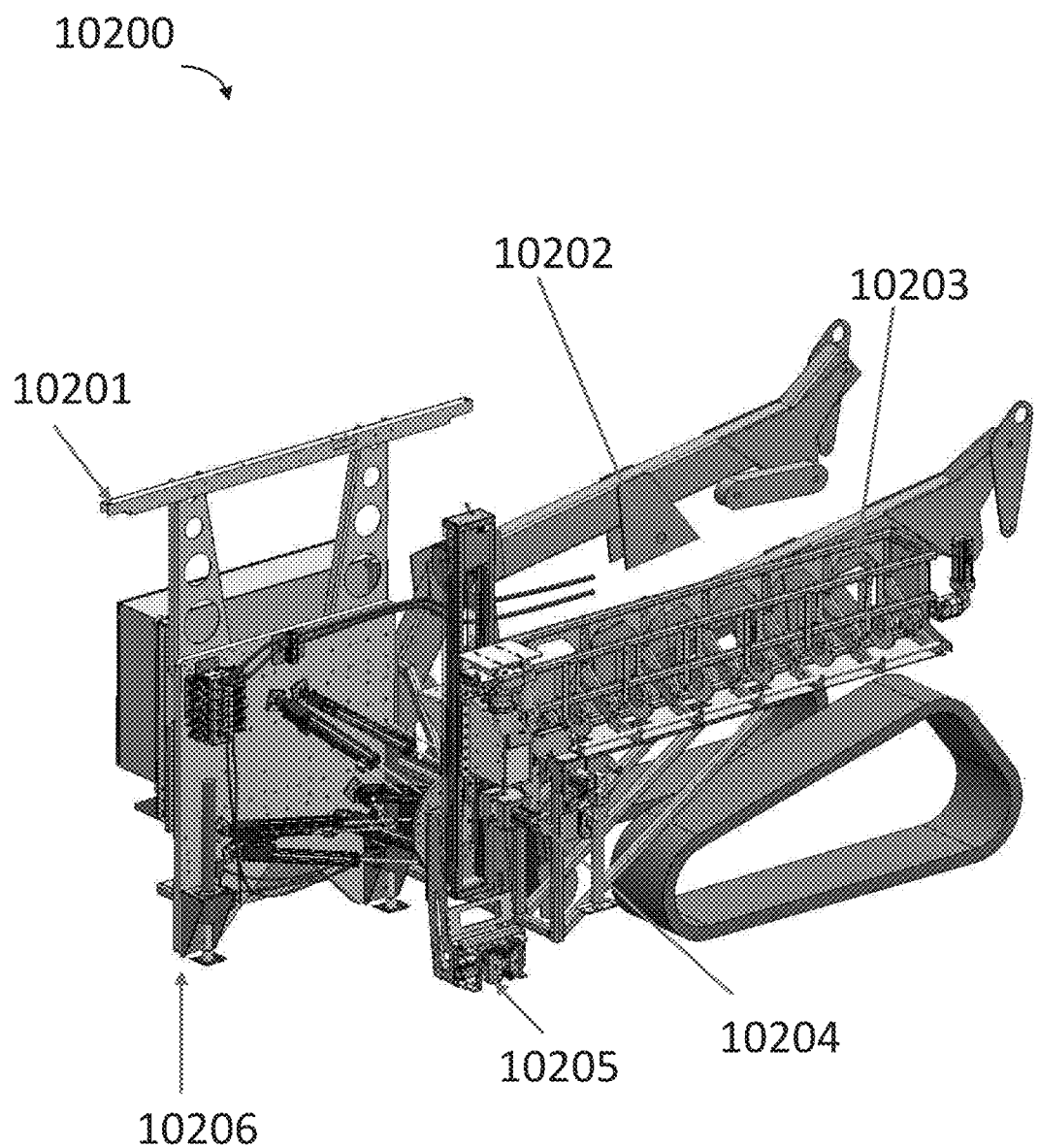
FIG. 102 shows a post installer, in accordance with some embodiments.

FIG. 102 shows a post installer. The post installer 10200 comprises a sensor 10201, e.g., a geolocation sensor, a vehicle 10202 to hold the posts and the other components, a post hopper and feeder (or post dispenser and conveyor) 10203, a post retention and pounder 10204, a post retention mechanism 10205, and a plurality of outriggers 10206. The post hopper and feeder can singulate a post from a bundle of posts and dispense the post to the post retention and pounder to be planted.

Figure 103A:
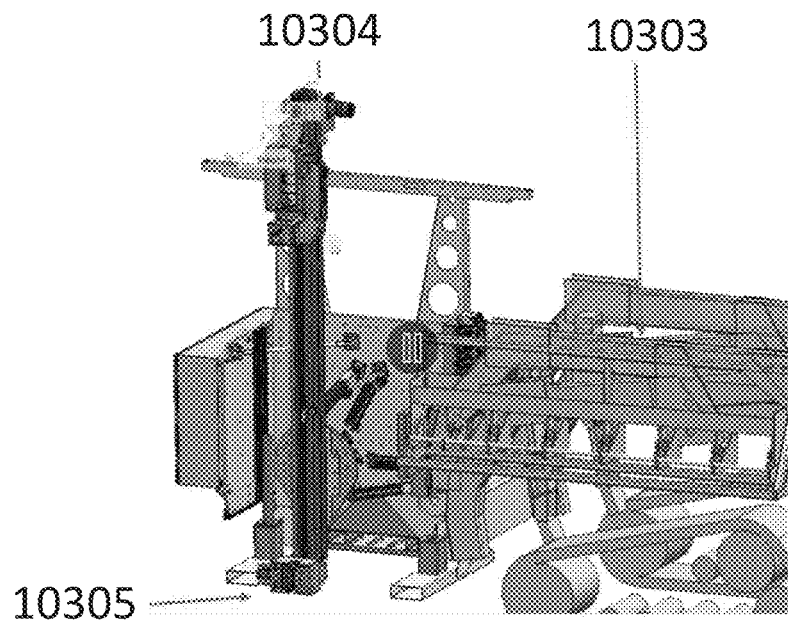
FIGS. 103A and 103B show the apparatus for post loading from a post hopper and feeder, in accordance with some embodiments.
Figure 103B:
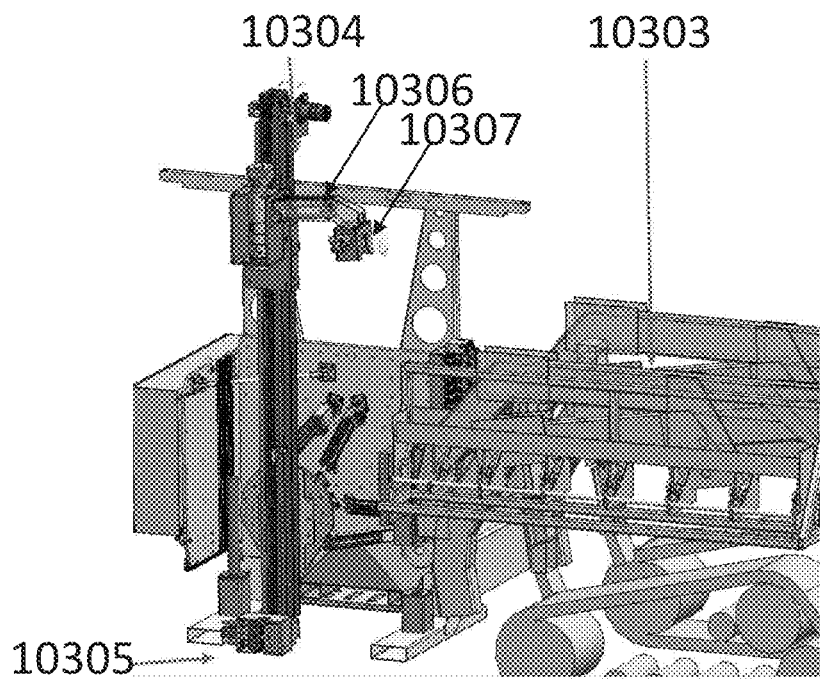

FIGS. 103A and 103B show the apparatus for post loading from a post hopper and feeder. The apparatus comprises a post pounder, e.g., a hammer 10304. The post pounder 10304 comprises an arm that can rotate about 90° from a vertical position to a horizontal position. At the distal end of the arm, the post pounder comprises a grabber. In the process of picking up a post, the post pounder 10304 travels up along a support, e.g., a rail to a pre-determined position, the arm 10306 rotates/opens to a horizontal position, and the grabber 10307 opens. The apparatus can travel to a lateral position of a post hopper and feeder 10303. Alternatively, the apparatus can travel to the post hopper and feeder before the pounder opens. When the apparatus is at the lateral position of the post hopper and feeder, the post pounder can move to the side of the post hopper and feeder, or any appropriate position, to grab a post from the post hopper and feeder 10303. Following the grabbing, the post pounder can travel up along the support, e.g., the rail to a position that permits enough vertical space/length to accommodate the post. The apparatus can then drive to the post install location and the arm can rotate to a vertical position and be lowered to insert the post into a post retention mechanism for the subsequent installation. The apparatus can further comprise a post retention mechanism 10305 for positioning the post before and during the installation of the post.

Figure 104A:
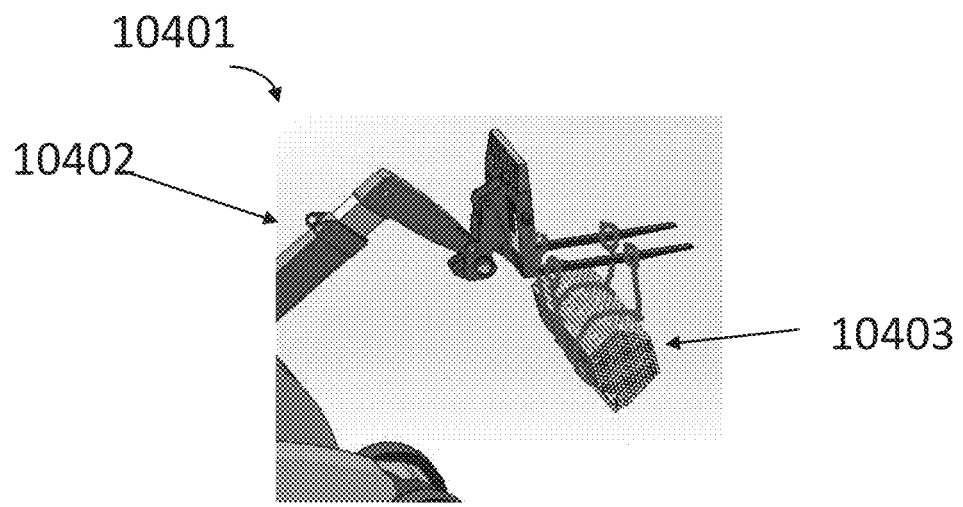
FIGS. 104A and 104B illustrate the loading operation of posts, in accordance with some embodiments.
Figure 104B:
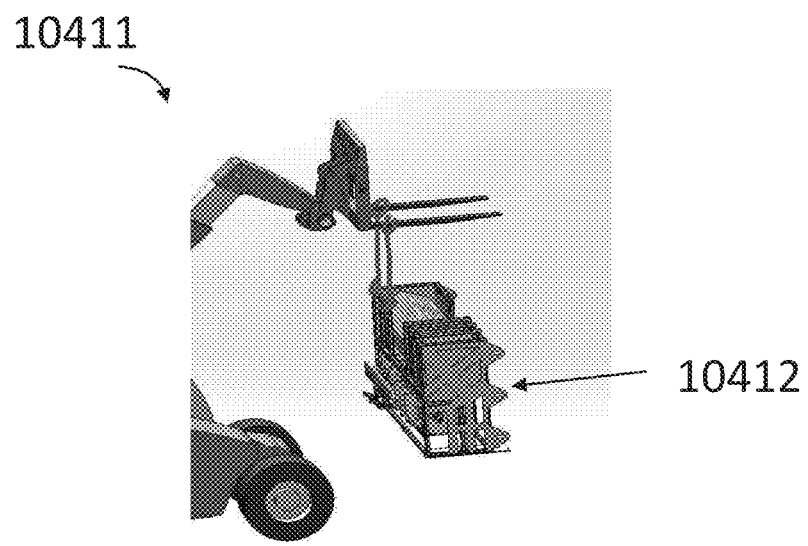

FIGS. 104A and 104B illustrate the loading operation of posts. At operation 10401 (FIG. 104A), a vehicle 10402 grabs a bundle of posts 10403. At operation 10411 (FIG. 104B), the vehicle 10402 loads the bundle of posts 10403 to a post hopper and feeder (or post dispenser) 10412.

Figure 105A:
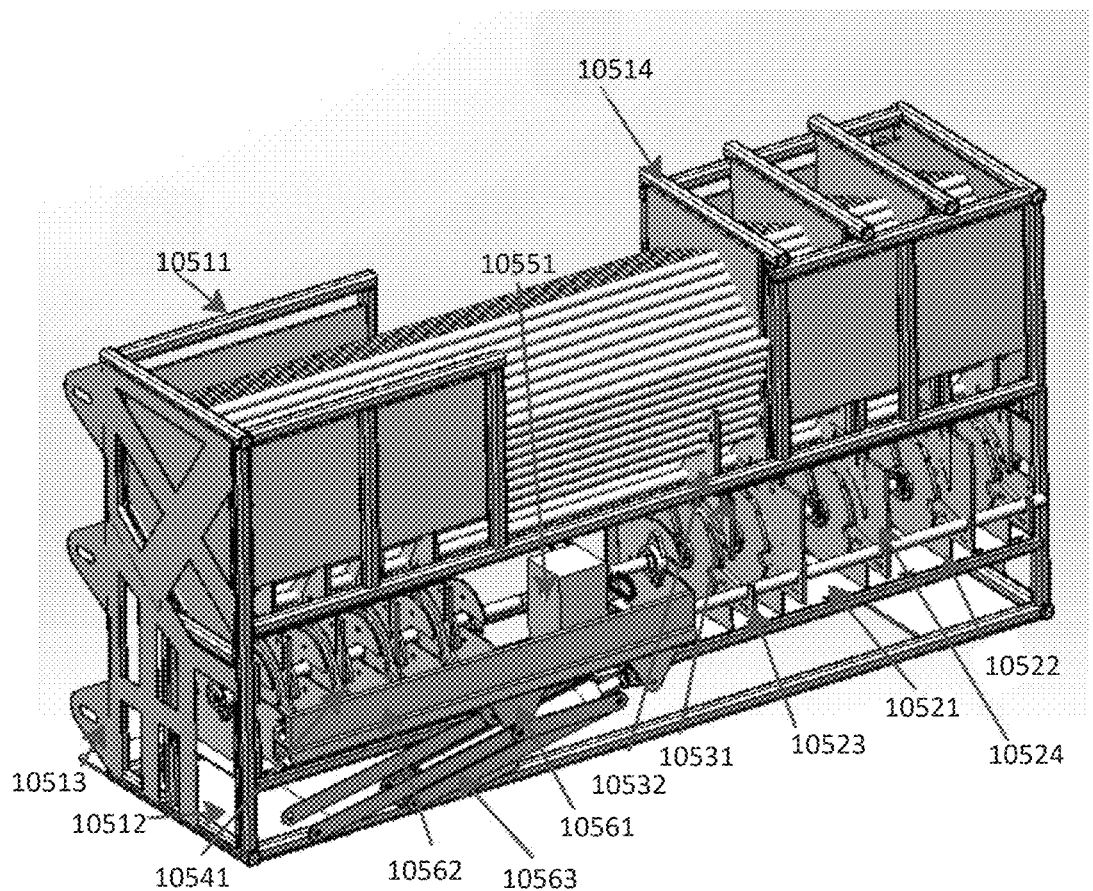
FIG. 105A shows a schematic post hopper and feeder (or a post dispenser) when a bundle of posts is loaded.
Figure 105B:
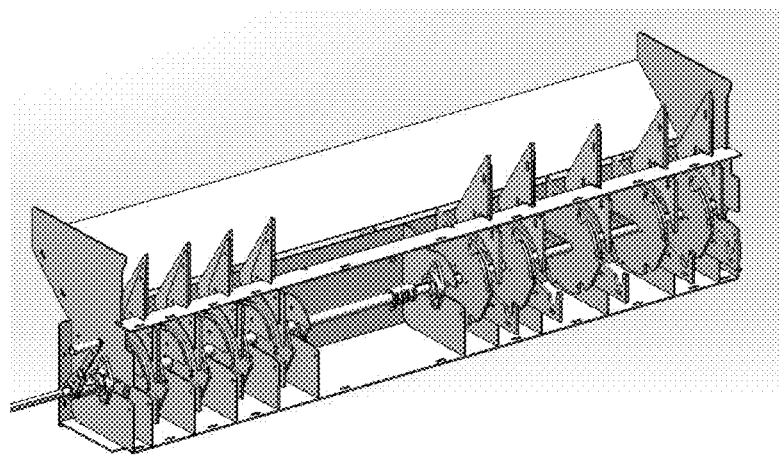
FIG. 105B shows a schematic post hopper and feeder (or a post dispenser) when no post is loaded.

FIG. 105A shows a schematic post hopper and feeder (or a post dispenser) when a bundle of posts is loaded and FIG. 105B shows a schematic post hopper and feeder (or a post dispenser) when no post is loaded. The post hopper and feeder can singulate one post at a time out of a bundle of posts for installation. The post hopper and feeder can comprise a hopper (or a dispenser) 10511, a lower tray 10521, an upper tray 10531, a singulator fin 10541, a motor mount tray 10551, and a kicker arm 10561. The hopper 10511 comprises a chassis base mount 10512, a chassis vertical mount 10513, and post adjustment walls 10514. The lower tray 10521 comprises a plurality of lower backer fins 10522, a plurality of lower chute fins 10523, and a plurality of length adjustment fins 10524. The upper tray 10531 comprises a plurality of upper backer plates and upper chute fins 10532. The singulator fin 10541 comprises a plurality of keyed shafts, a shaft collar, and spacers. The motor mount tray 10551 comprises a motor, a gearbox, a shaft coupler, and/or a motor shaft. The kicker arm 10561 comprises a 4 bar linkage 10563 and a post support arm 10562. The kicker arm 10561 can further comprise a plurality of hydraulic swivel clamps, hydraulic cylinders, bearings, bushings, proximity sensors, and/or a post holder. A bundle of posts can be placed into the post dispenser. A post of the bundle of posts can drop to the upper tray one at a time and be pushed or pulled to the lower tray by the rotating singulator fins.

Figure 106:
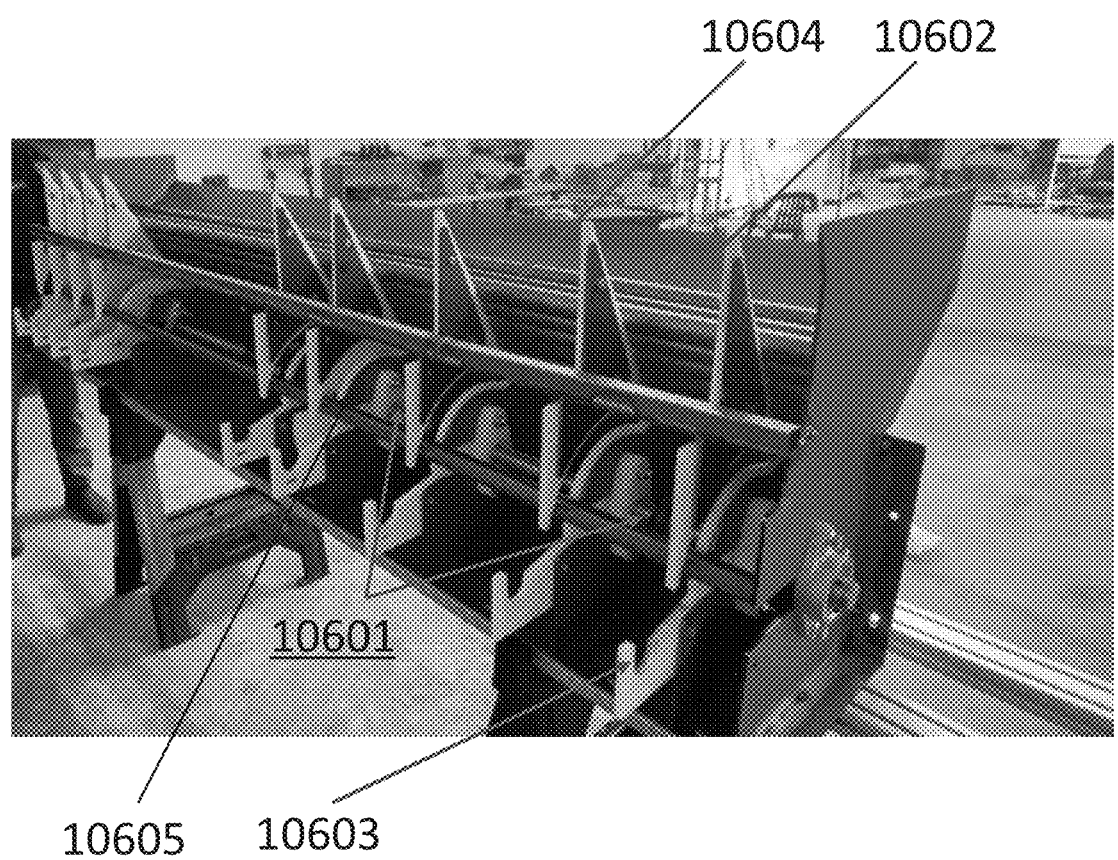
FIG. 106 shows a post hopper and feeder machine, in accordance with some embodiments.

FIG. 106 shows a post hopper and feeder machine (post dispenser). The machine comprises rotating shafts 10601 that rotate to separate one post from the bulk unsorted posts 10604 from the hopper 10602. In some embodiments, the bulk unsorted posts can comprise 3 to 600 unsorted posts. The rotating shafts can connect to a plurality of fins 10605 that have an opening or a pathway that only one post can drop to or enter the fin. The one post can subsequently enter the chute fins 10603.

FIG. 107A shows an exemplary post pounder. The post pounder 10700 comprises a hammer 10701, an arm 10702, and a grabber or gripper 10703. The arm 10702 can rotate from a vertical position to a horizontal position to grab or grip the post and transfer it to a post retention mechanism. In some embodiments, the arm 10702 may be extendible. The grabber is coupled to an actuator 10705 which actuators a grabbing mechanism to grip a post 10704 (only part of the post is shown). FIG. 107B shows a post pounder configuration after a post is gripped and transported to a vertical position. FIG. 107C is a perspective view of a post pounder configuration after a post is gripped and transported to a vertical position.

In some embodiments, the gripper can grip an individual post. In some embodiments, the gripper can be used to load test the post. In some embodiments, the gripper can be used to retain the post during post driving/installation. In some embodiments, the gripper can be attached to a common load head as the hammer or pounder.

Figure 108:
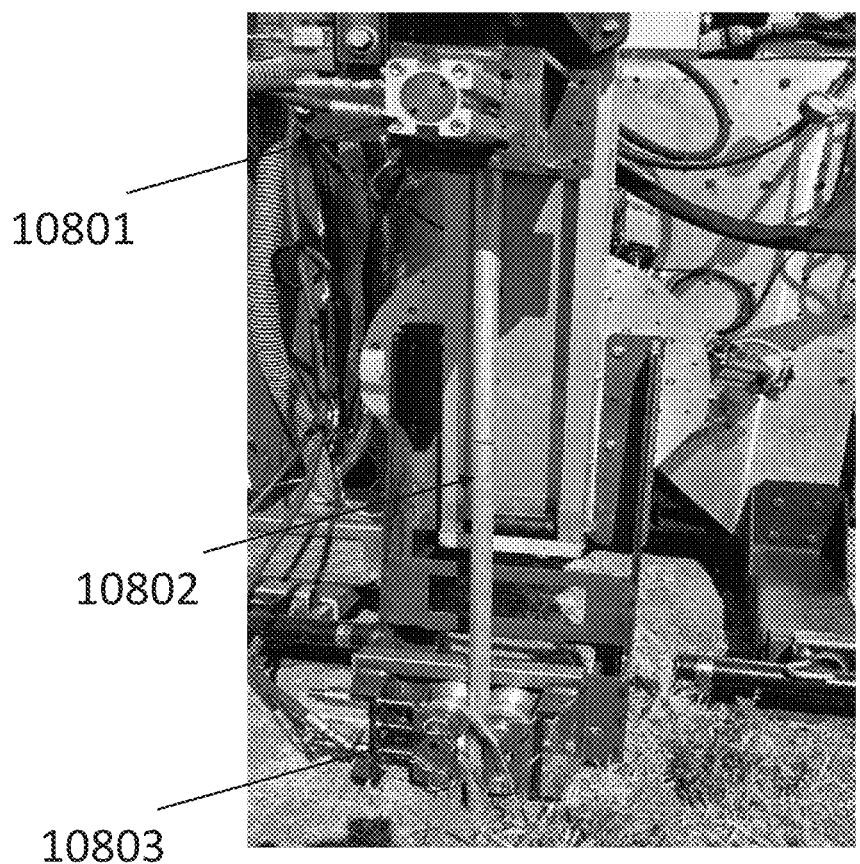
FIG. 108 shows an exemplary post installing machine (post installer), in accordance with some embodiments.

FIG. 108 shows an exemplary post installing apparatus/machine (post installer). The post installer comprises an actuator 10801 to enable the gripping of the post by the grabber (see FIGS. 107A-107C). The post is inserted to a post retention mechanism 10803. The post retention mechanism 10803 comprises a plurality of rollers and an actuator. The rollers actuate to retain the post close to the ground for high accuracy. The rollers can open for ease of movement retraction. In some embodiments, the post can be retained perpendicular to a flat surface. In some embodiments, the post can be retained at a desired angle relative to the vertical axis.

In some embodiments, the post installer can comprise a mechanism to singulate a post from a plurality of posts. In some embodiments, the mechanism is a spiral. In some embodiments, the mechanism has bumps to perturb the posts. In some embodiments, the mechanism can be integrated to the load head of the installer. In some embodiments, the post installer can comprise a sensor to detect a post being individually separated from the bundle.

In another aspect, the present disclosure provides an apparatus that is configured to carry a plurality of solar modules over a terrain; autonomously position a select solar module from the plurality of solar modules over a set of posts installed on the terrain; and autonomously assemble the select solar module to the set of posts without requiring or using fasteners.

In some cases, the apparatus may be configured to autonomously assemble the select solar module to the set of posts by forming a plurality of post-module interfaces, e.g., post-clip interfaces. In some cases, the plurality of post-clip interfaces comprise a plurality of clinched joints.

In some cases, the select solar module can be pre-attached with a clip at one or more corners or sides of the select solar module, and each post in the set of posts may comprise a plurality of tabs. In some cases, the apparatus may be configured to autonomously position the select solar module over the set of posts by aligning the clip to a corresponding tab at each post. In some cases, the apparatus may be configured to autonomously assemble the select solar module to the set of posts by clinching the corresponding tab to the clip at each post.

Figure 59:
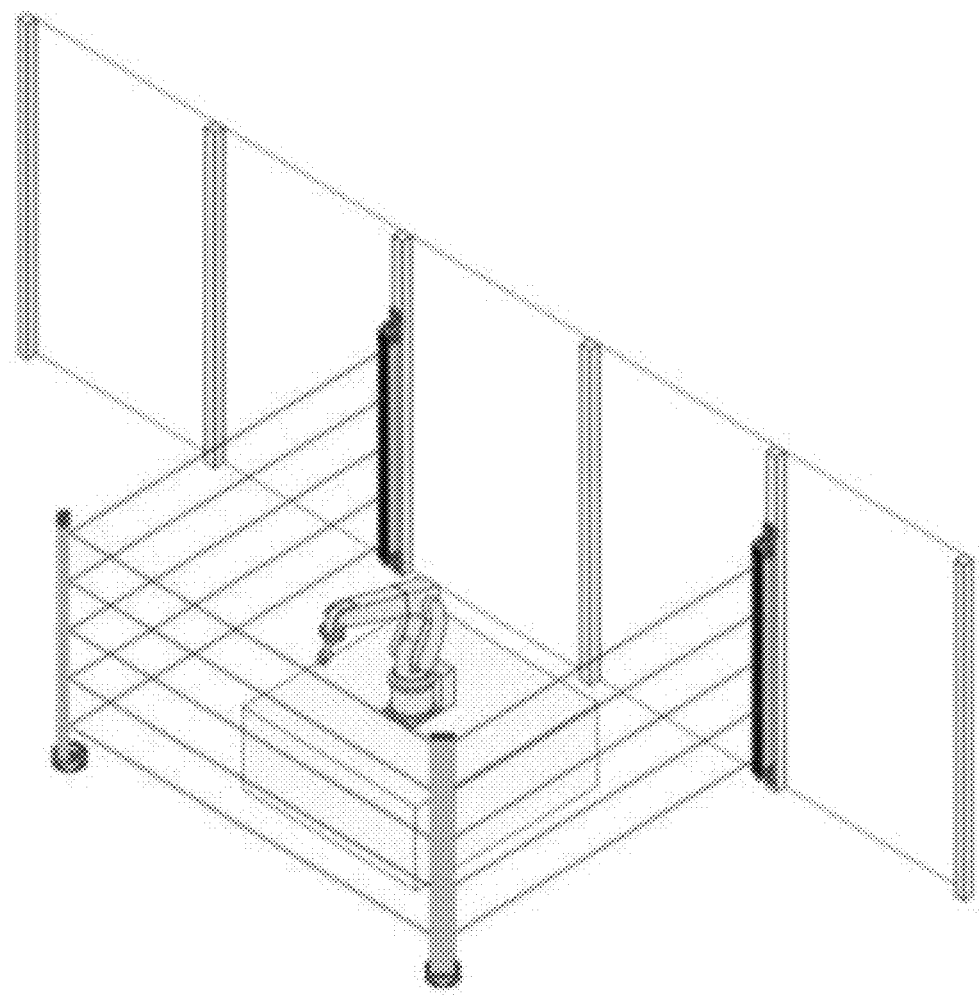
FIG. 59 illustrates a light curtain, in accordance with some embodiments. In some cases, a machine may comprise one or more optical sensors configured to detect when a foreign object (e.g., a human or another agent) enters a workspace defined by a light curtain.

FIG. 59 illustrates a light curtain, in accordance with some embodiments. In some cases, a machine may comprise one or more optical sensors configured to detect when a foreign object (e.g., a human or another agent) enters a workspace defined by a light curtain. When a foreign object enters the workspace, at least a portion of the light curtain may be interrupted or disrupted, which can trigger one or more safety procedures or protocols (e.g., shutting down a machine or limiting an operation of the machine until the foreign object exits the workspace).

The following examples are provided to further illustrate some embodiments of the present disclosure, but are not intended to limit the scope of the disclosure; it will be understood by their exemplary nature that other procedures, methodologies, or techniques known to those skilled in the art may alternatively be used.

Figures 20, 21:
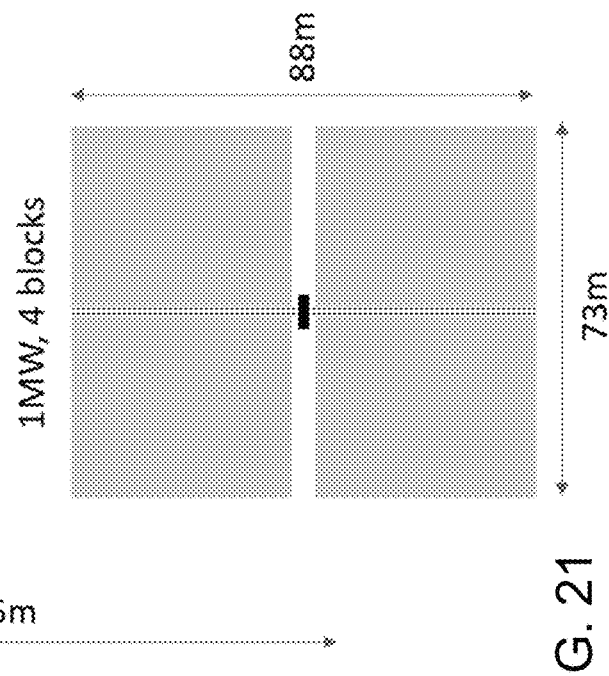
FIG. 20 shows a typical layout of standard blocks of solar modules in this connected orientation.
FIG. 21 shows how four of the blocks of FIG. 20 connect to one central inverter.

FIG. 20 shows a layout of blocks of solar modules in a connected orientation. FIG. 21 shows a plurality of blocks connected to a central inverter.

Figure 22:
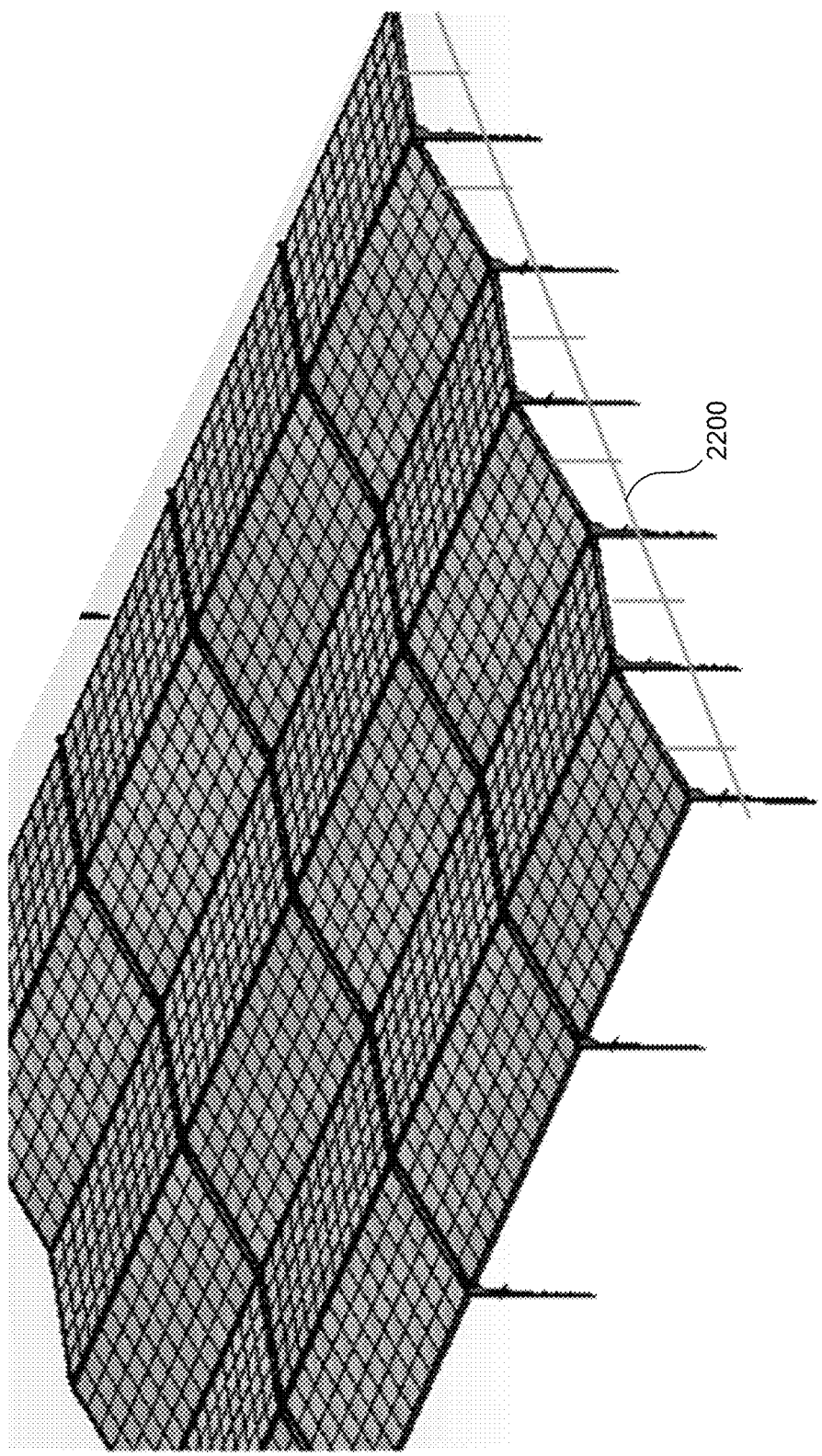
FIG. 22 shows a perspective view of a portion of a block.

FIG. 22 is a perspective view of a portion of a block. The lines 2200 here show how the wires going from the module strings to the inverter (the 'home runs'), can be mounted on the side of an array and clipped to the posts.

Figure 23:
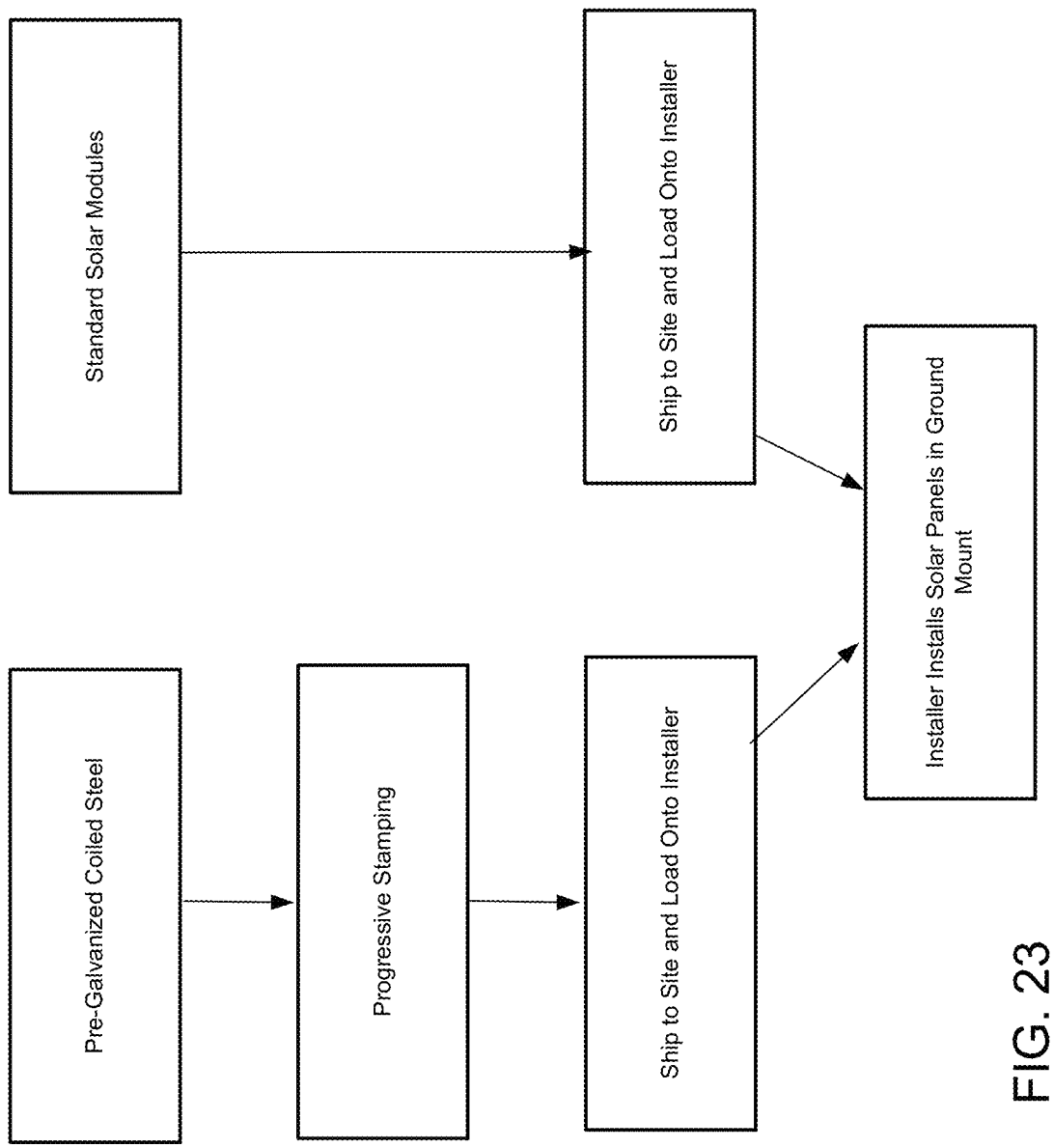
FIG. 23 shows a simplified flow diagram illustrating a supply chain that is made available according to embodiments.

FIG. 23 is a simplified flow diagram illustrating a supply chain that is made available according to embodiments. The simplicity of this supply chain allows the posts, joints, and prefabricated solar modules to be shipped from the factories to a location for deployment. There, these components can be installed onto a machine that is configured for rapid and automatic installation of the ground mount system.

Figure 24:
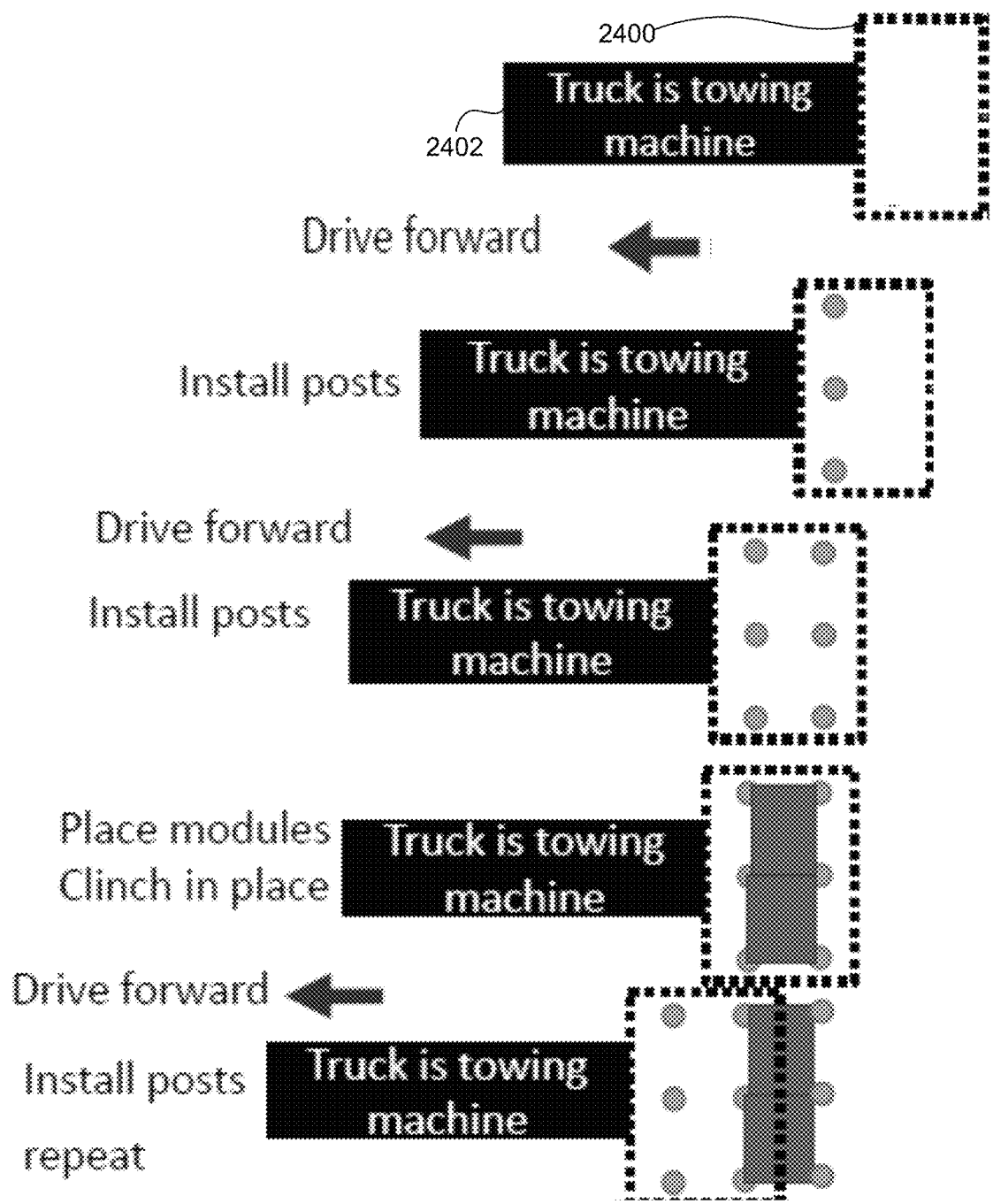
FIG. 24 shows a simplified overhead view showing progress of one embodiment of an installation machine over a site.

FIG. 24 is a simplified overhead view showing progress of one embodiment of an installation machine 2400 over a site. Here, the machine is towed by a truck 2402, in a right-to-left direction. After the posts are pushed into the ground, the modules can be attached. In this particular embodiment, the modules may have clips pre-installed in them.

Figure 25:
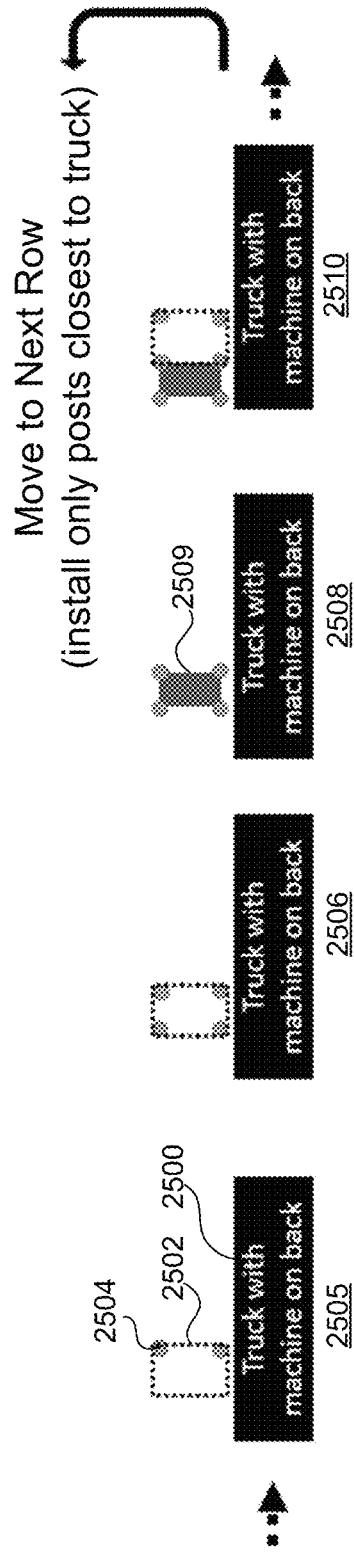
FIG. 25 shows a simplified overhead view showing progress of an alternative embodiment of an installation machine 2500 over a site.

FIG. 25 is a simplified overhead view showing progress of an alternative embodiment of an installation machine 2500 over a site, from left-to-right. This particular embodiment utilizes a post tool jig 2502 that comprises a rectangle of fixed dimensions, in order to always index the next pair of posts 2504 off of the previous pair. Specifically, in a first phase 2505 two posts are pushed into the ground, with the jig used to position the posts relative to one another. In a second phase 2506, two more posts are pushed into the ground, again with the jig used to position the posts. In a third phase 2508, the module 2509 is placed directly after next pair of posts. The jig can grab features on clips on posts to both index and to hold the clips while pressing modules into them. A fourth phase 2510 places the next posts (e.g., using the jig to index from previous posts). The process may then be repeated.

In some cases, the path of the installation machine may be serpentine over the site. When the vehicle turns around and does the other side of the row (from right-to-left), everything is the same except only posts closest to the truck are implanted. The two specific installation machines presented in FIG. 24 and FIG. 25 are examples only, and alternative embodiments may be used.

Figure 26:
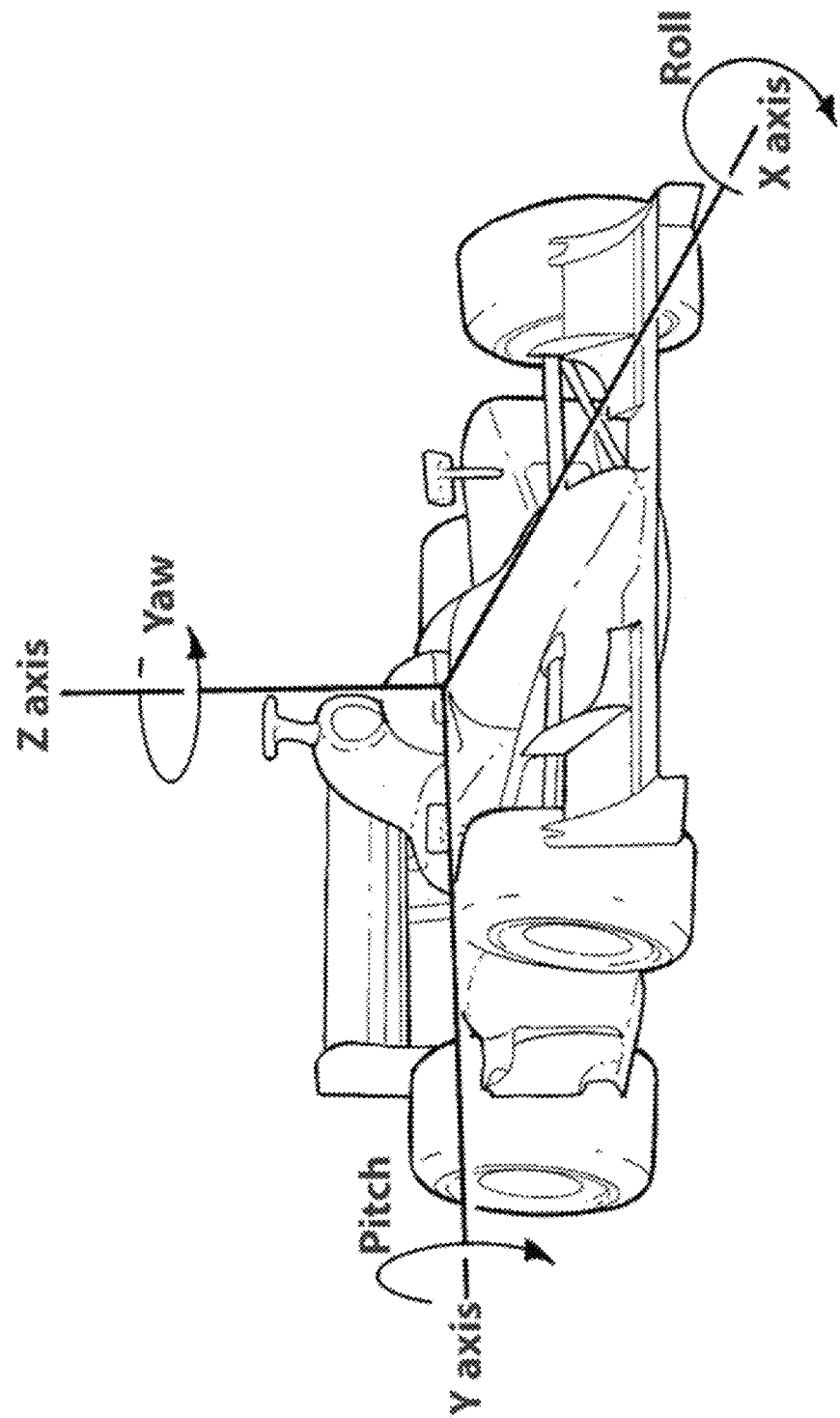
FIG. 26 provides a formal coordinate system for describing a moving vehicle.

FIG. 26 provides a formal coordinate system for describing a moving vehicle. This coordinate system is now referenced to describe another exemplary embodiment of an apparatus configured to perform installation of ground mounted solar panels.

Figure 27:
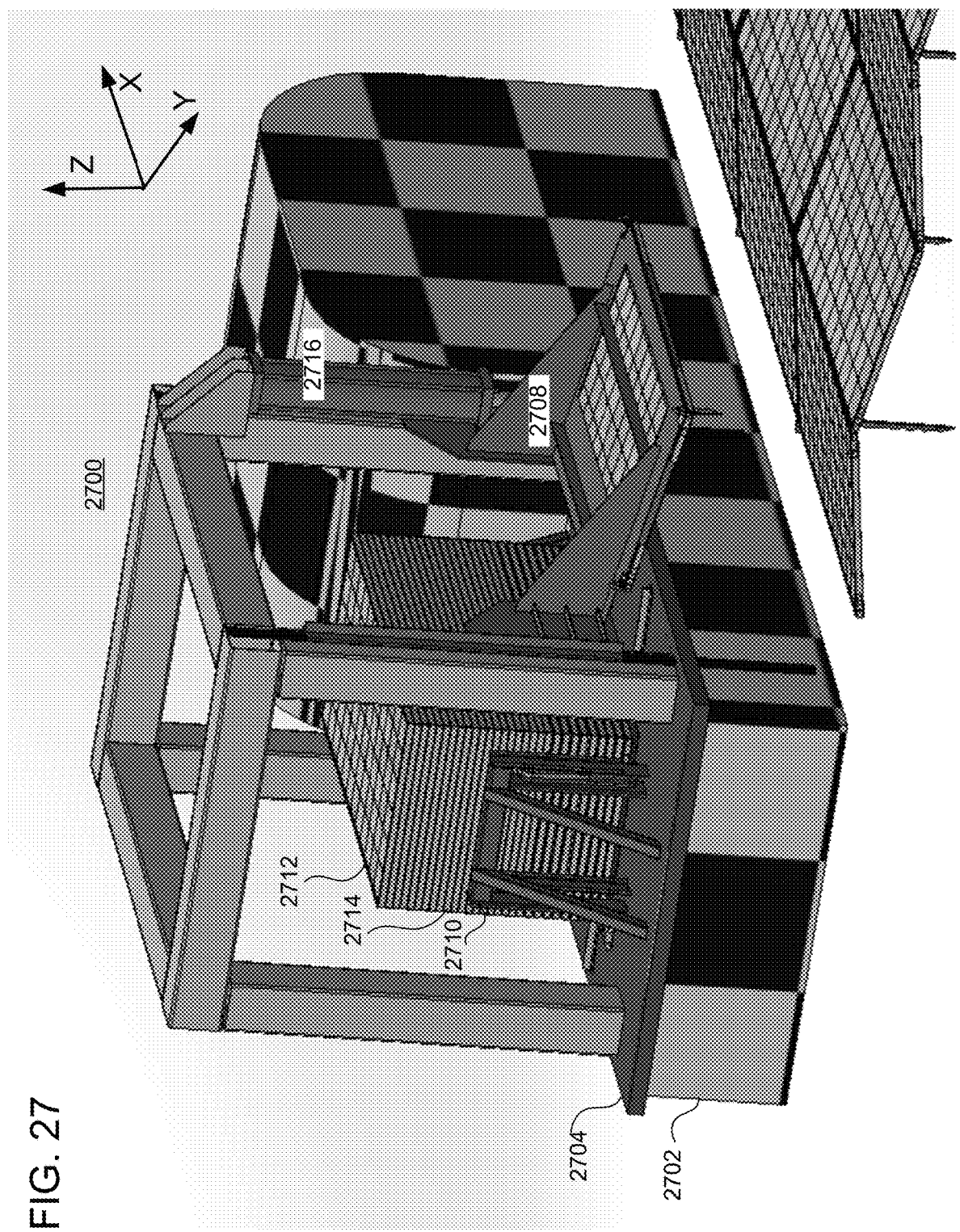
FIG. 27 shows a rear perspective view of one embodiment 2700 of the installation apparatus.

FIG. 27 shows a rear perspective view of one embodiment 2700 of the installation apparatus. The apparatus comprises various elements mounted to a moving vehicle 2702 (e.g., a pickup truck bed)-via a platform 2704. As described in detail below, this platform may be configured to move in one or more direction(s). Elements of the installation machinery may comprise a frame 2706 and a load head 2708. A vertical conveyor 2710 may be configured to receive a stack 2712 of individual pre-fabricated solar panels 2714. In some cases, the installation machinery may further comprise a hydraulic actuator 2716 for implanting posts into the ground by pushing (rather than hammering).

Figure 28:
FIG. 28 shows a detail of the vertical conveyor element which can be used to lower modules one at a time.
Figure 29:
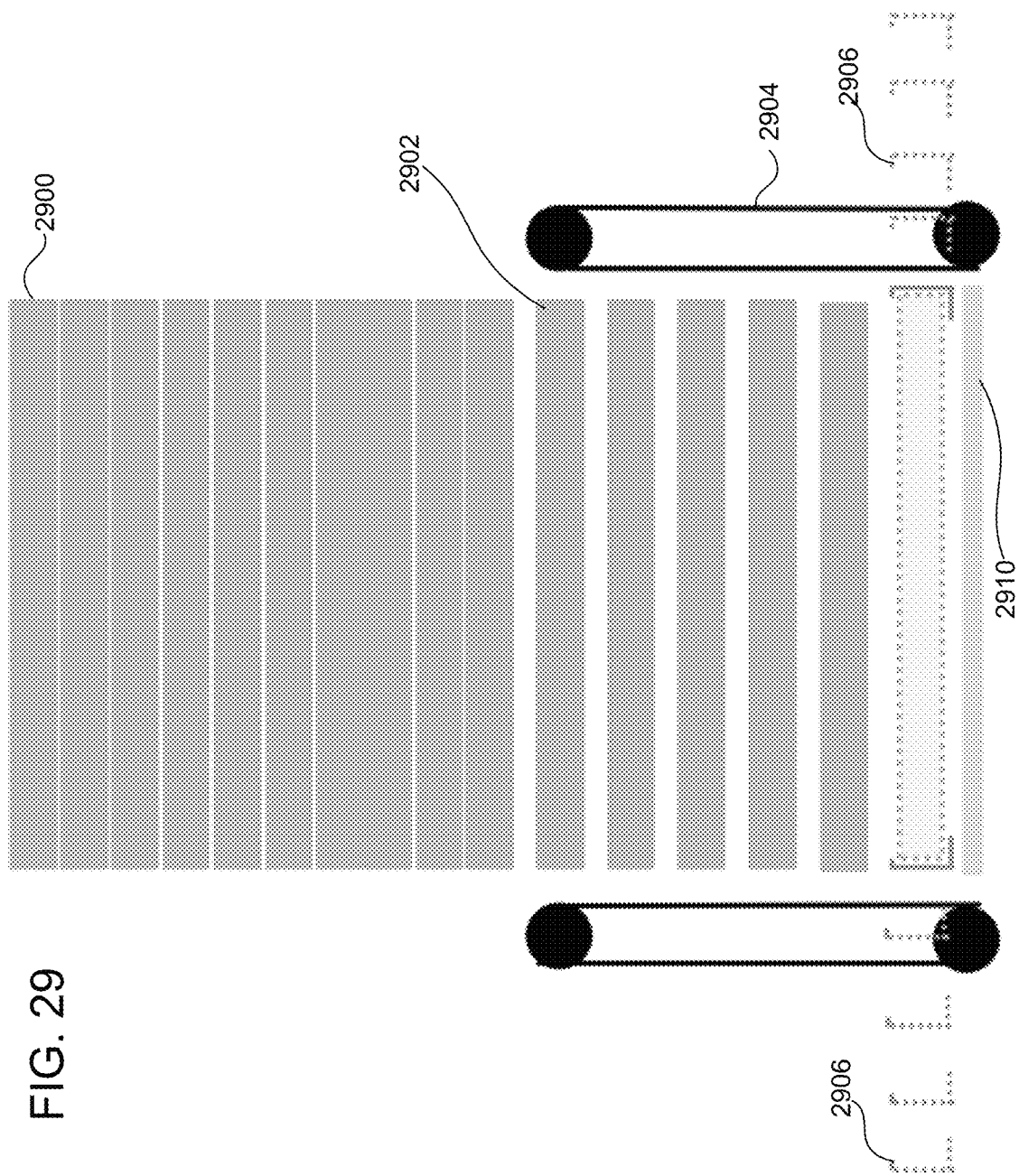
FIG. 29 shows a schematic view showing how standard packaging of a stack of solar modules, can be loaded on to vertical conveyors and lowered module-by-module onto sheet metal joints.

FIG. 28 shows a detail of the vertical conveyor element which can be used to lower modules one at a time. FIG. 29 is a schematic view showing how standard packaging of a stack 2900 of solar modules, can be loaded on to vertical conveyors 2904 and individual modules 2904 then lowered onto the sheet metal clips 2906. The modules can be lowered onto the sheet metal clips 2906. The resultant combination of the module and clips can be lowered onto a tray 2910, which can slide out from the bottom of this stack.

Figure 30:
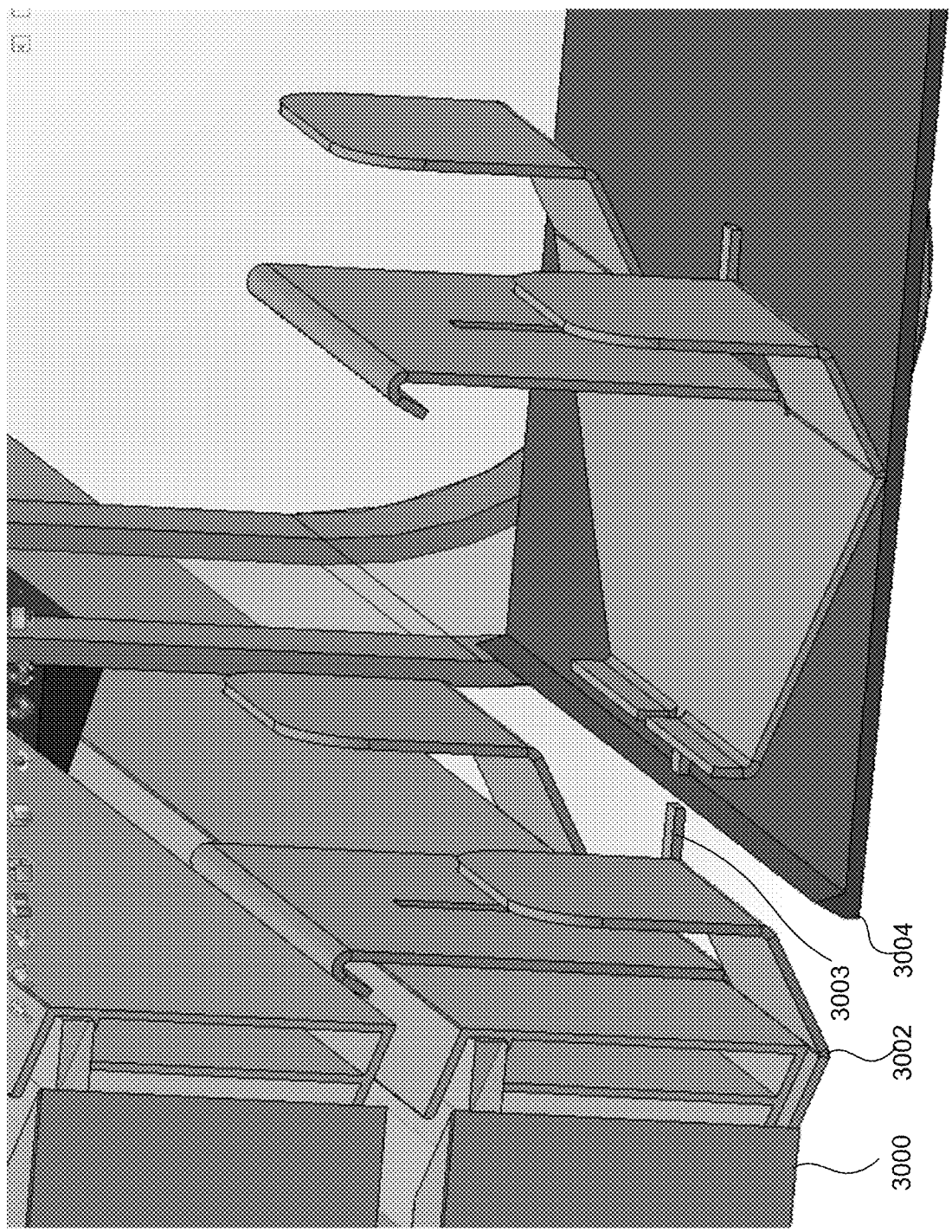
FIG. 30 shows a detail of a module lowered onto a joint.

FIG. 30 shows a detail of a module including a frame 3000 that is being lowered onto a clip 3002. The joint's connection 3003 to its adjacent joint can be severed by the piece 3004 during this process.

Figure 31:
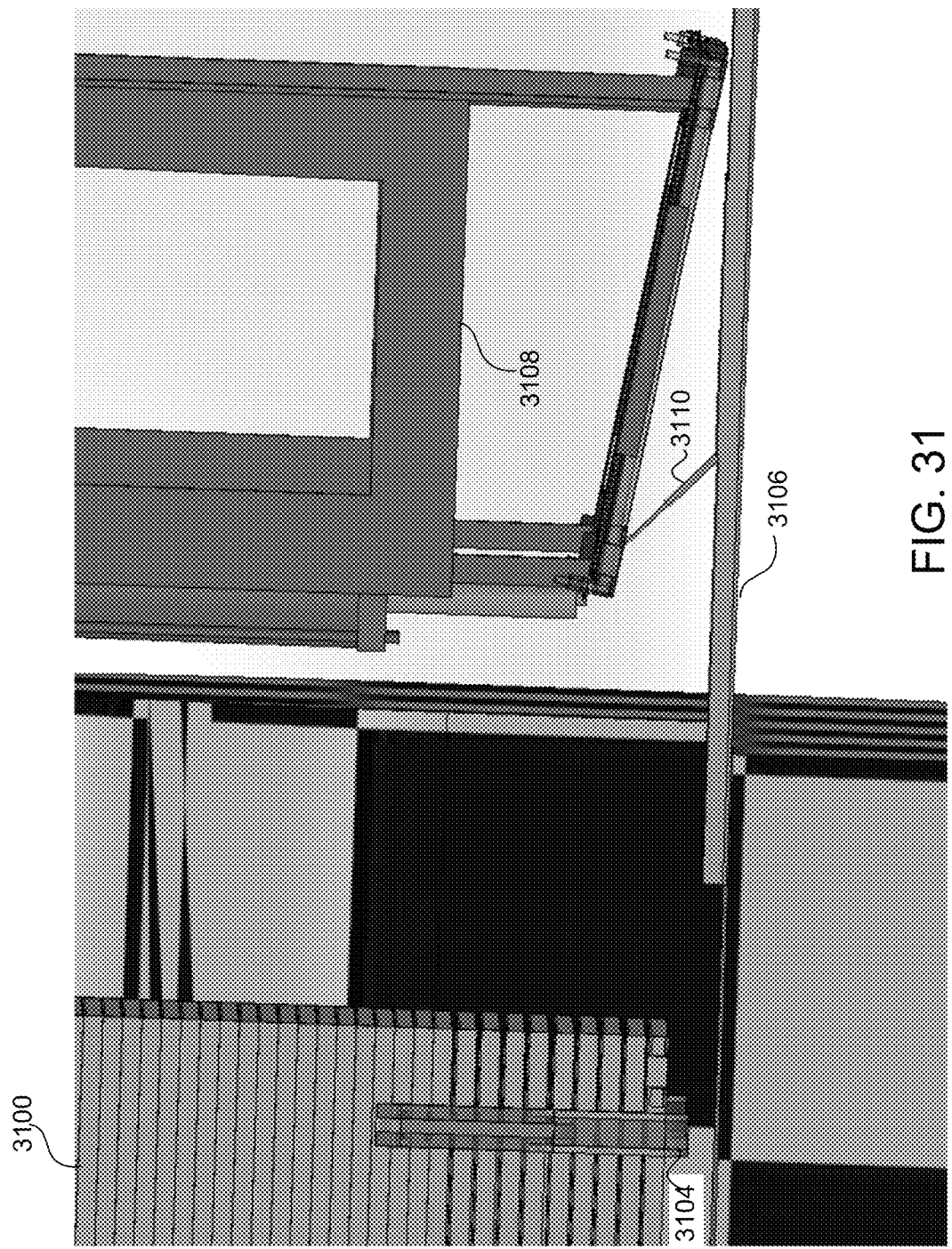
FIG. 31 shows a side view of a stack of solar modules on a vertical conveyor.

FIG. 31 shows a side view of a stack 3100 of solar modules on a vertical conveyor 3104. A horizontal rail 3106 can be used to slide the bottom module laterally onto the installation load head 3108. The module can be tilted by a small linear actuator 3110.

Figure 32:
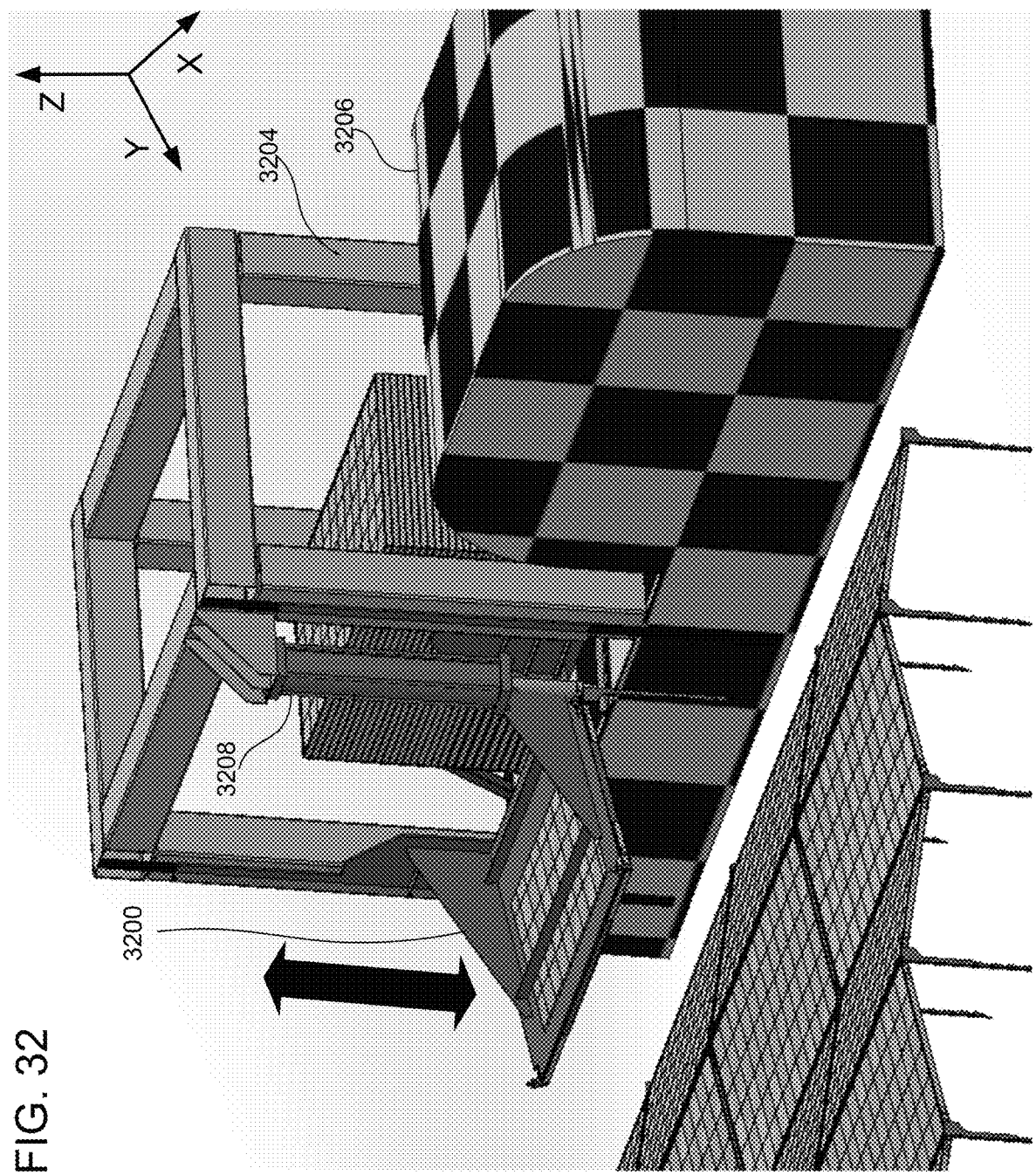
FIG. 32 shows a front perspective view of an installation apparatus.

FIG. 32 shows a front perspective view of the installation apparatus according to an embodiment. The load head 3200 is shown in vertical sliding motion relative to the frame 3204 which is connected to the truck 3206. This motion can be actuated by a hydraulic actuator 3208 which is mounted to the frame.

Figure 33:
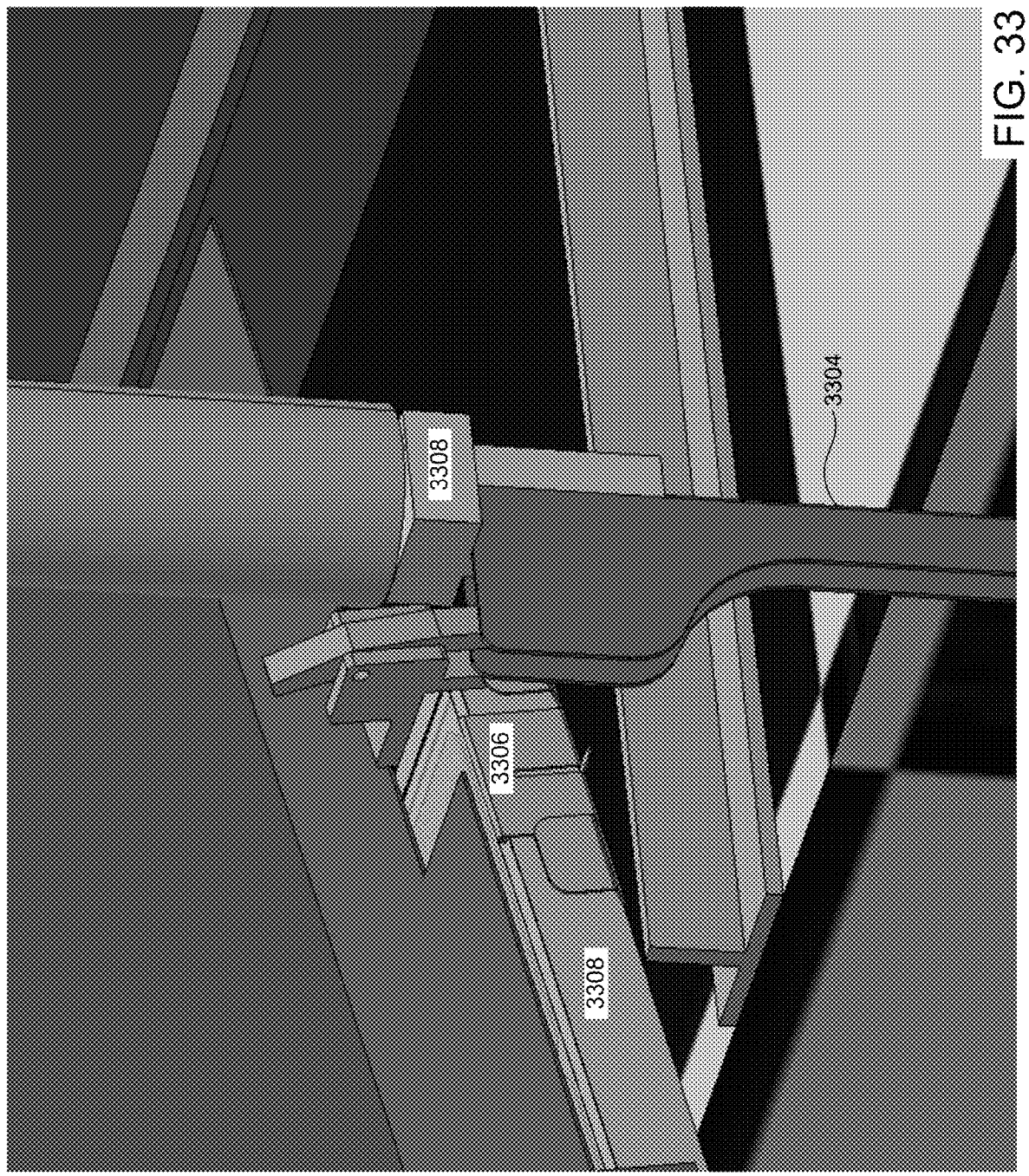
FIG. 33 shows a view of the load head frame connected to the actuator tip.

FIG. 33 shows a detailed view of the load head frame 3300 connected to the actuator tip 3302 that is used to (simultaneously) drive in the post 3304. A joint 3306 can be seen already attached to the solar module 3308 that is loaded into the load head. The tip 3308 of the actuator that is pushing directly on the post is also connected to the module load head. Thus, the module can be lowered into the correct place simultaneously as the post is driven into the ground. The connection between the actuator tip and the module load head can also have a flexure to reduce vibrations from being transferred to the module during installation.

In connection with the installation machine embodiment of FIGS. 27-33, one or more of the various elements (e.g., frame, load head, conveyor(s), others) can be mounted on the movable platform. That platform can be actuated in either: (i) x-axis, y axis, and yaw directions, or (ii) x-axis, y axis, yaw, pitch, and roll directions.

In some cases, a vertical actuator can control the Z axis motion. One method of controlling planar motion is via a two-way table. An additional drive can control the yaw direction.

Figure 34:
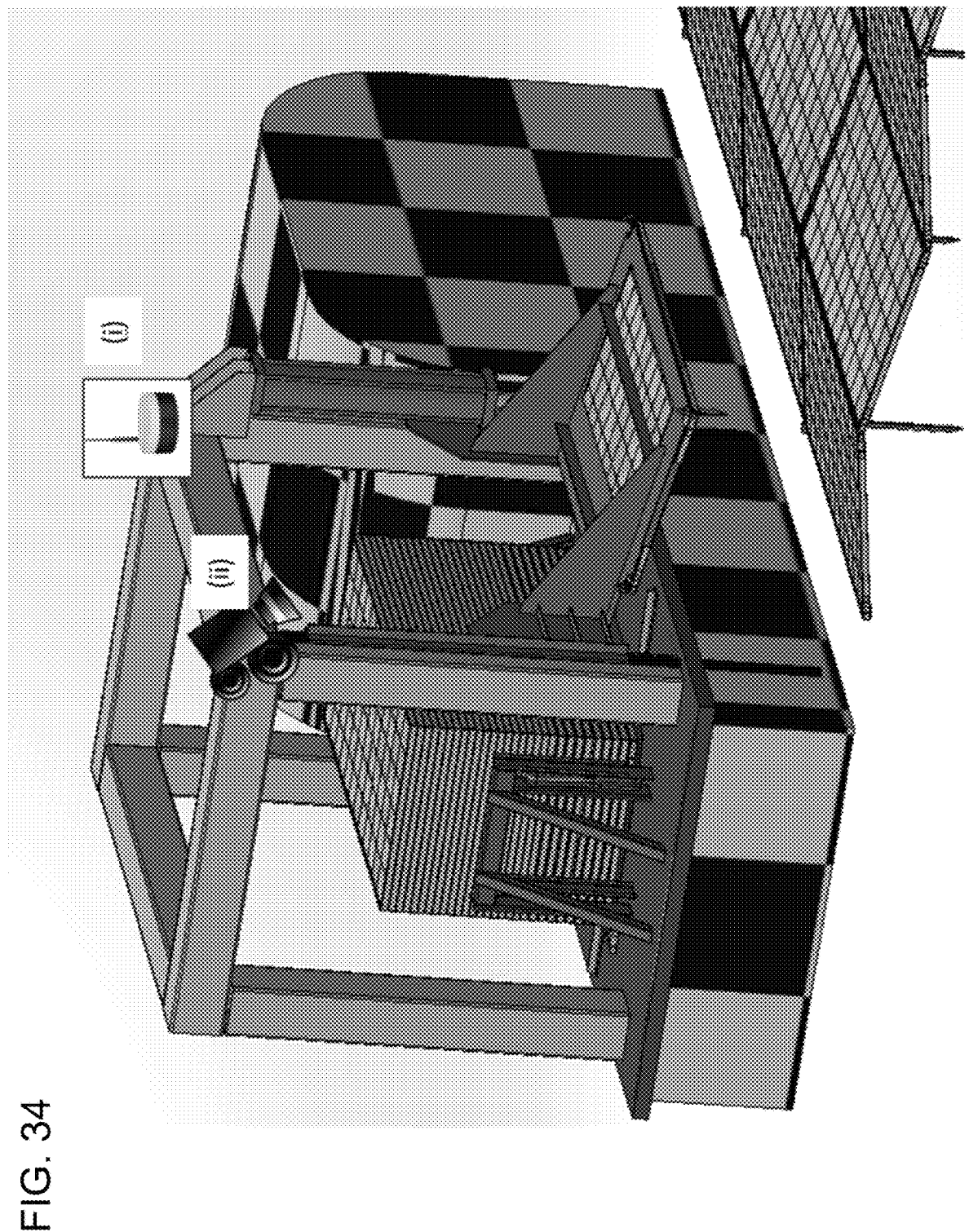
FIG. 34 shows approaches for controlling position of a moveable platform.

FIG. 34 further shows that the position of the moveable platform may be controlled (either separately or individually) by the use of: (i) a differential GPS system, (ii) cameras, (iii) lidar, and/or (iv) laser tracking. In some cases, a GPS and/or camera system may allow control over how to precisely place each module and post in the solar array. This functionality can provide control over the movable machinery on the red platform, and/or the position/driving of the entire installation apparatus (e.g., as disposed in a truck, within a trailer, or in the form of a specially-built vehicle).

Embodiments are not limited to the specific installation apparatuses described above, and alternatives are possible. For example, FIG. 35 shows a front perspective view of an alternative embodiment of an installation machine.

Figure 35:
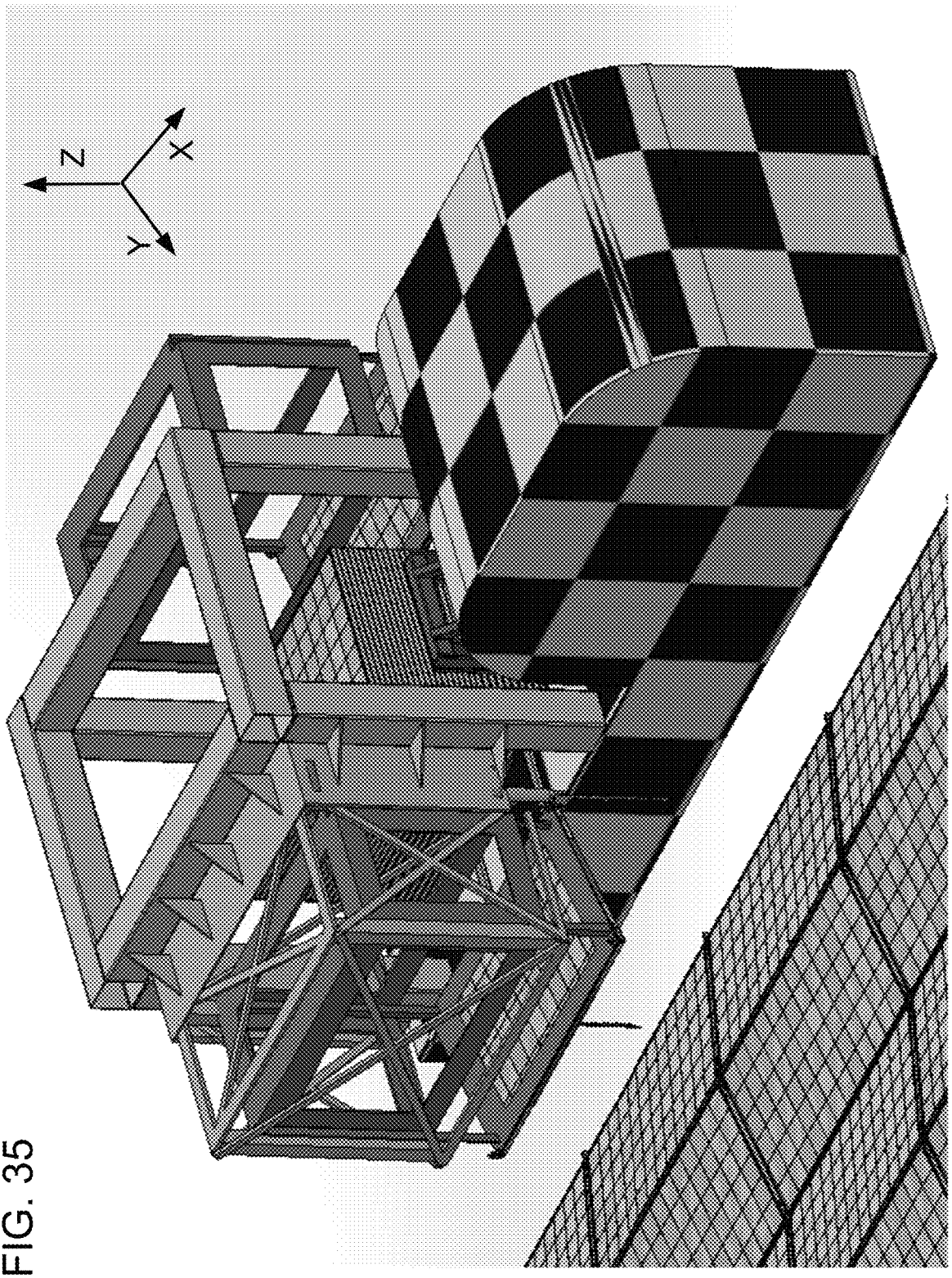
FIG. 35 shows a front perspective view of an installation apparatus according to an alternative embodiment.
Figure 36:
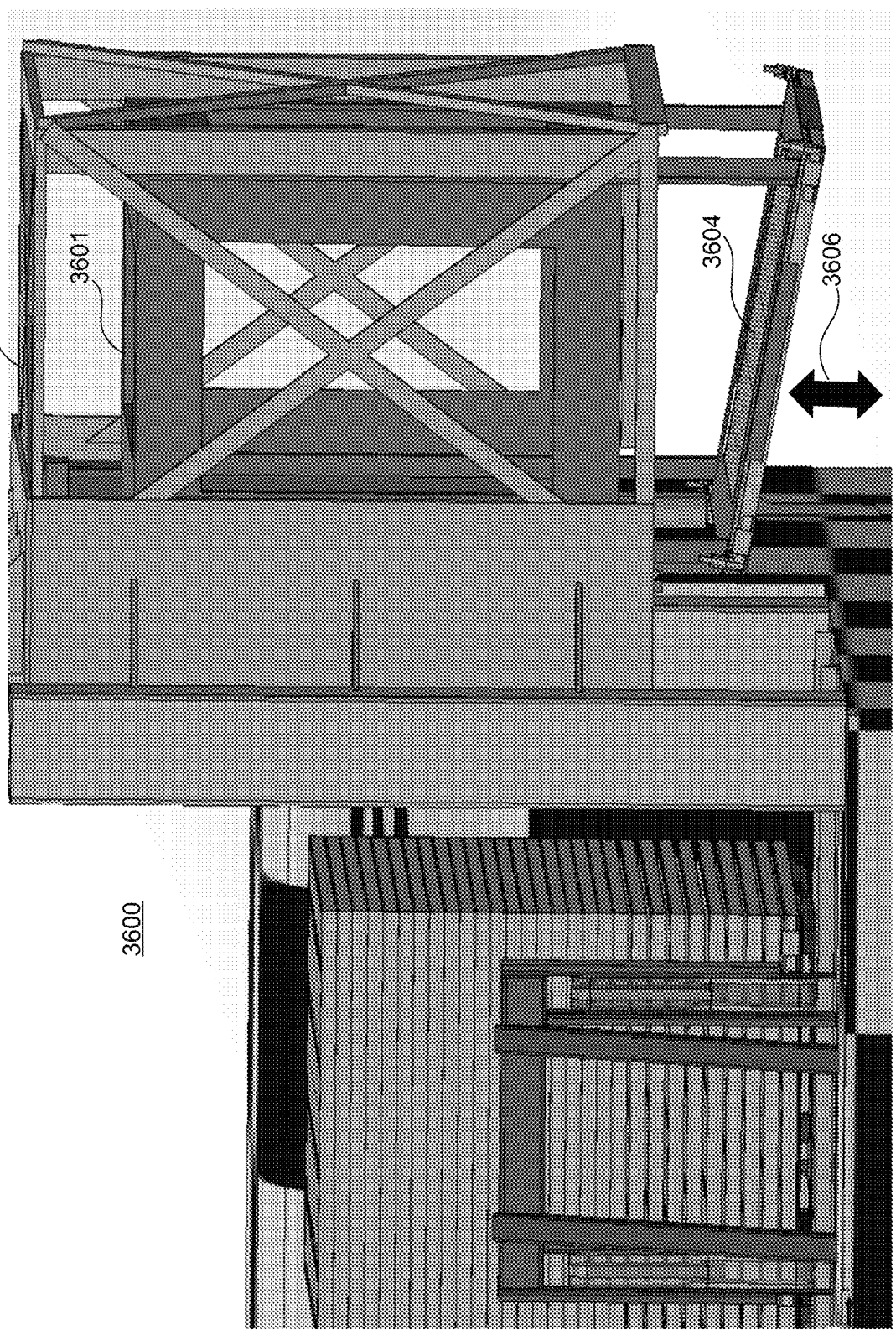
FIG. 36 shows an enlarged side view of the apparatus of FIG. 35.

FIG. 36 shows an enlarged side view of the installation apparatus 3600 illustrated in FIG. 35. Here, the load head 3601 can slide inside a retained fixture 3602 to install a single solar module 3604 in a vertical linear motion. The load head may be captured inside of the rigid frame to constrain motion to only vertical (shown by the arrow 3606).

Figure 37A:
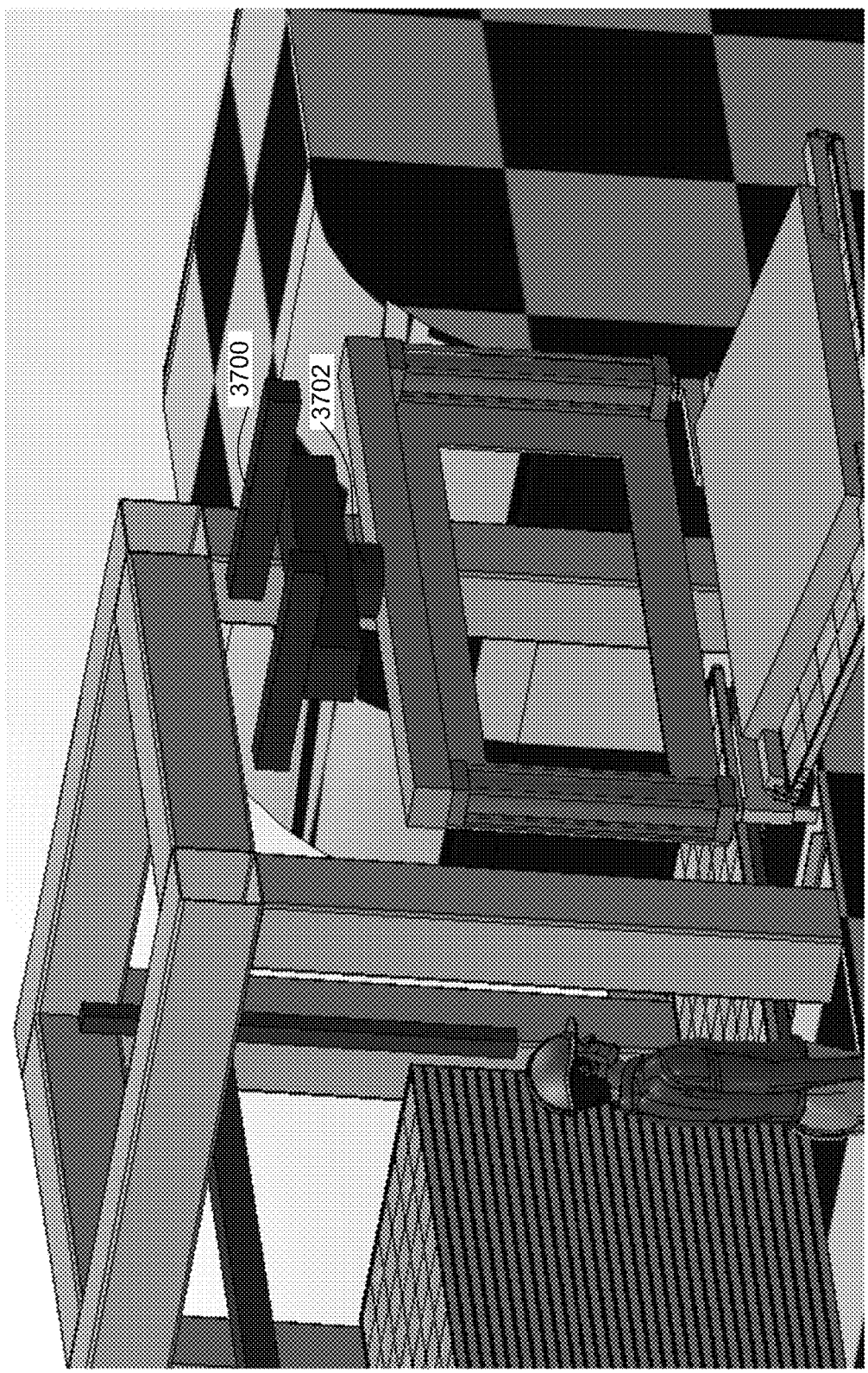
FIG. 37A shows a perspective view of an alternative embodiment.

FIG. 34 shows one non-limiting example of a platform that can be used to facilitate solar module deployment and installation. In some embodiments, the position of the module and load head can be controlled using a mechanism such as the overhead part 3700 shown in FIG. 37A, which can be attached to a frame of the platform.

FIG. 37B shows the overhead part as taking the form of a gantry 3704 to control planar positioning. FIG. 37C shows an enlarged view of a rotational gear 3702 that may be mounted below. In some cases, other mechanisms such as a conveyor (e.g., a vertical conveyor or a horizontal conveyor) may be used to control positioning of the modules.

Figure 38A:
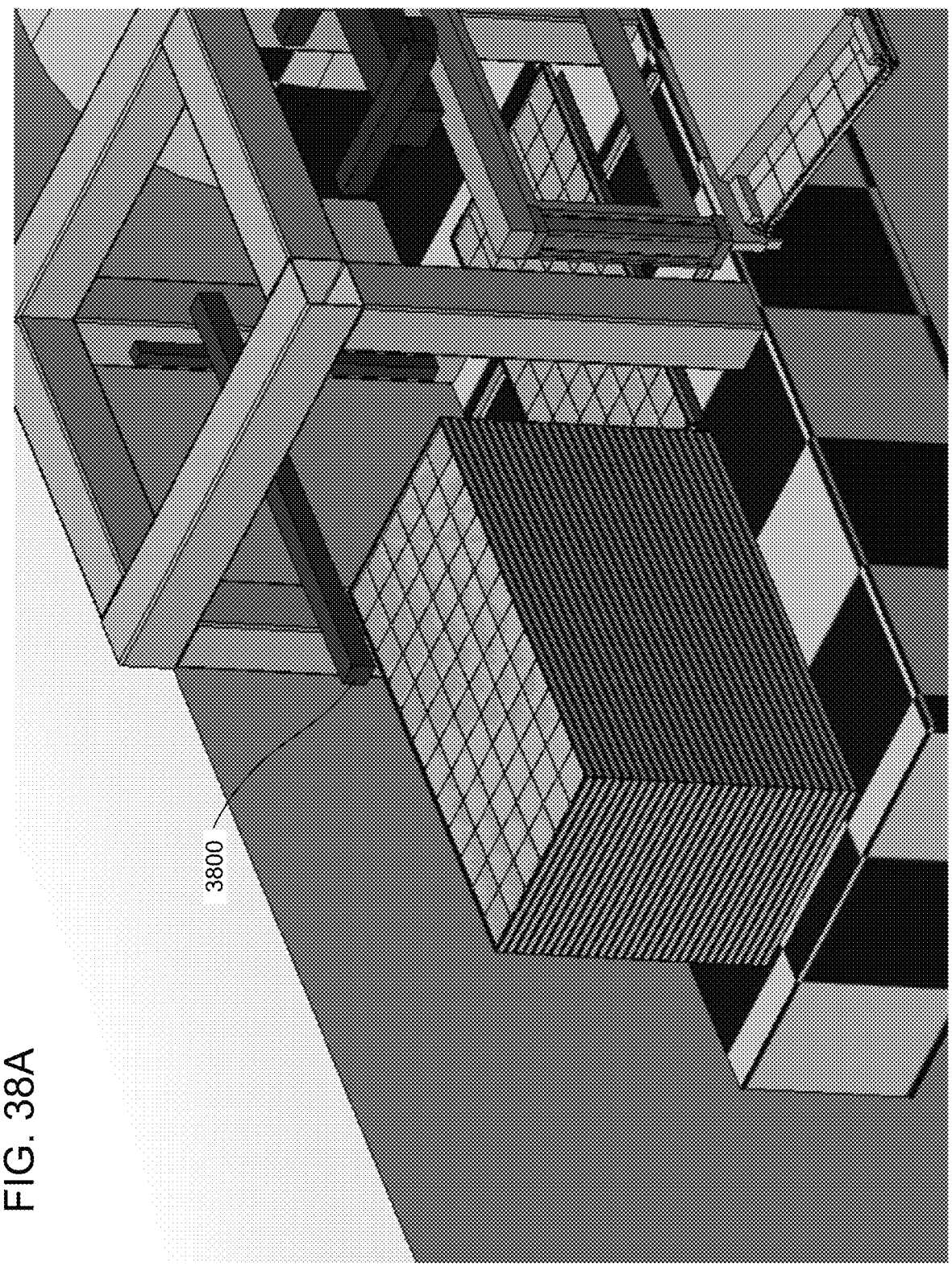
FIG. 38A shows a perspective view of another alternative embodiment.
Figure 38B:
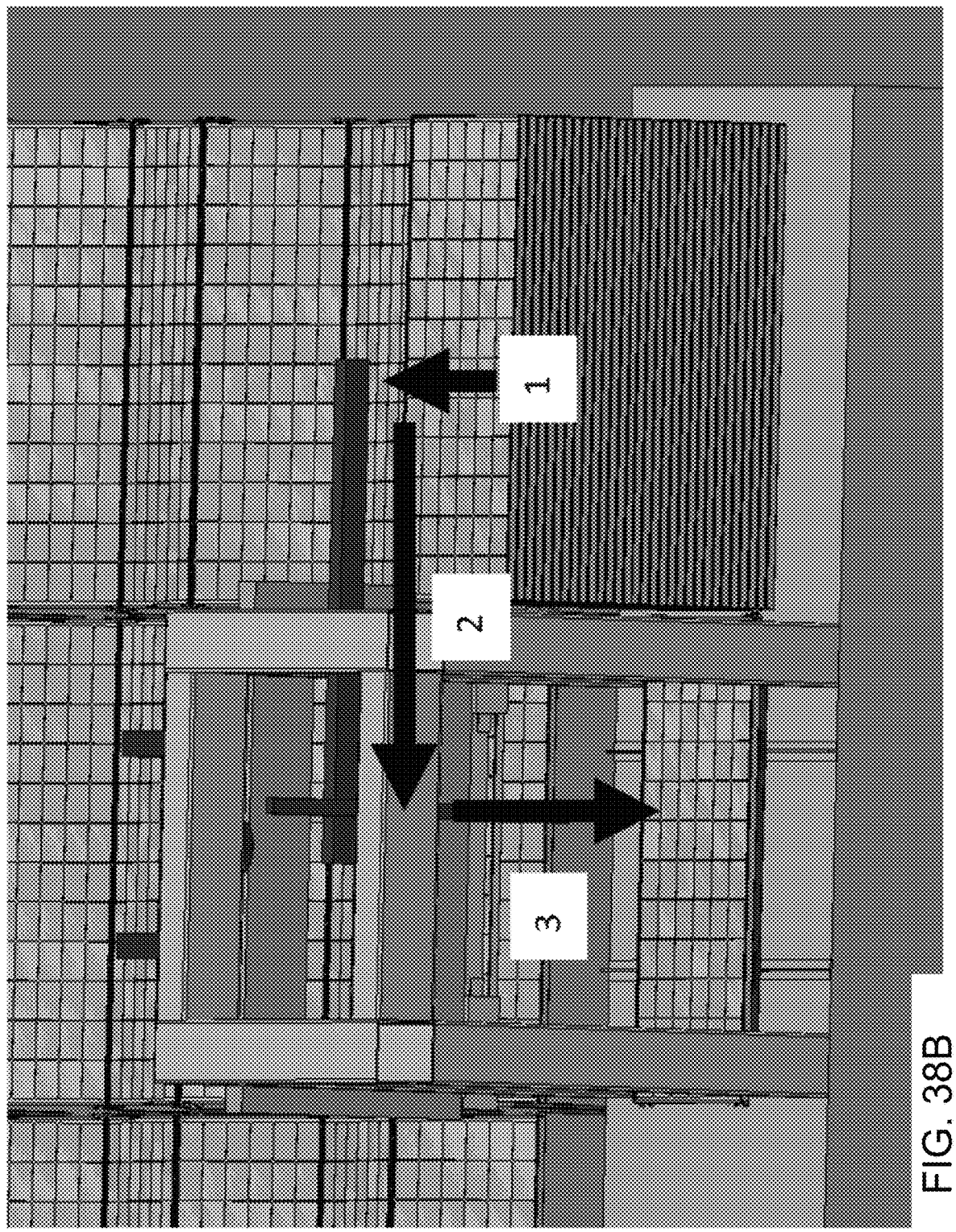
FIG. 38B shows movement in various directions of the embodiment of FIG. 38A.

FIG. 38A shows a perspective view of an embodiment where modules are lifted off of their stack on a pallet by a gantry with a suction cup load head and translated over and put down onto the module slider (shown extended in FIG. 31). This gantry can press the modules down onto the four clips during the motion #3 shown in FIG. 38B to install the clips onto the module.

Figure 39:
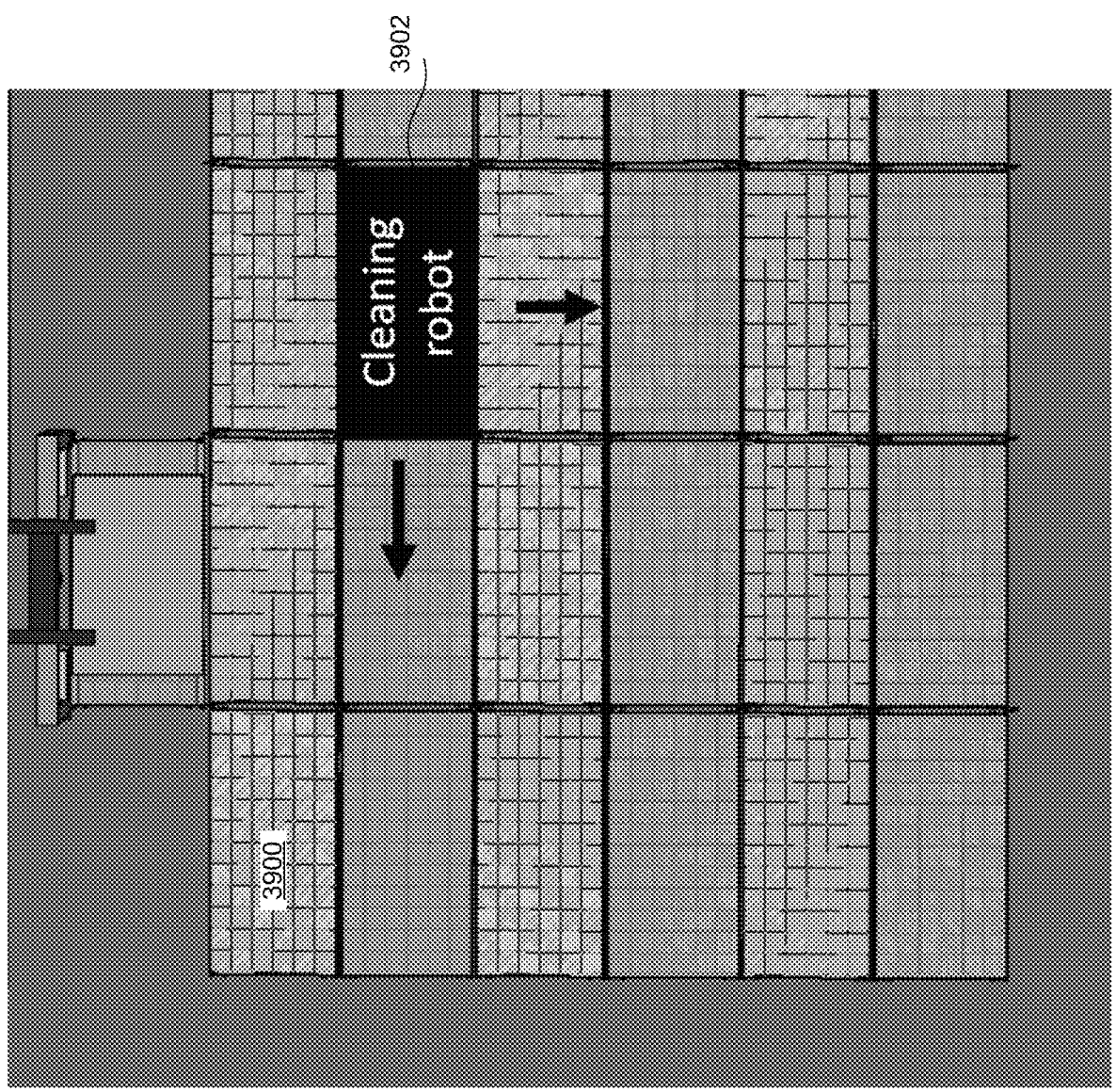
FIG. 39 shows an overhead view of an alternative embodiment featuring a cleaning robot.

FIG. 39 shows an overhead view of an embodiment comprising a dual tilt (between 0 and 20 degrees) array 3900 of ground mounted solar modules. This uninterrupted array of modules may provide a valuable opportunity to clean the array using a robot 3902. This cleaning robot can autonomously travel in any direction on the module plane.

Figure 40:
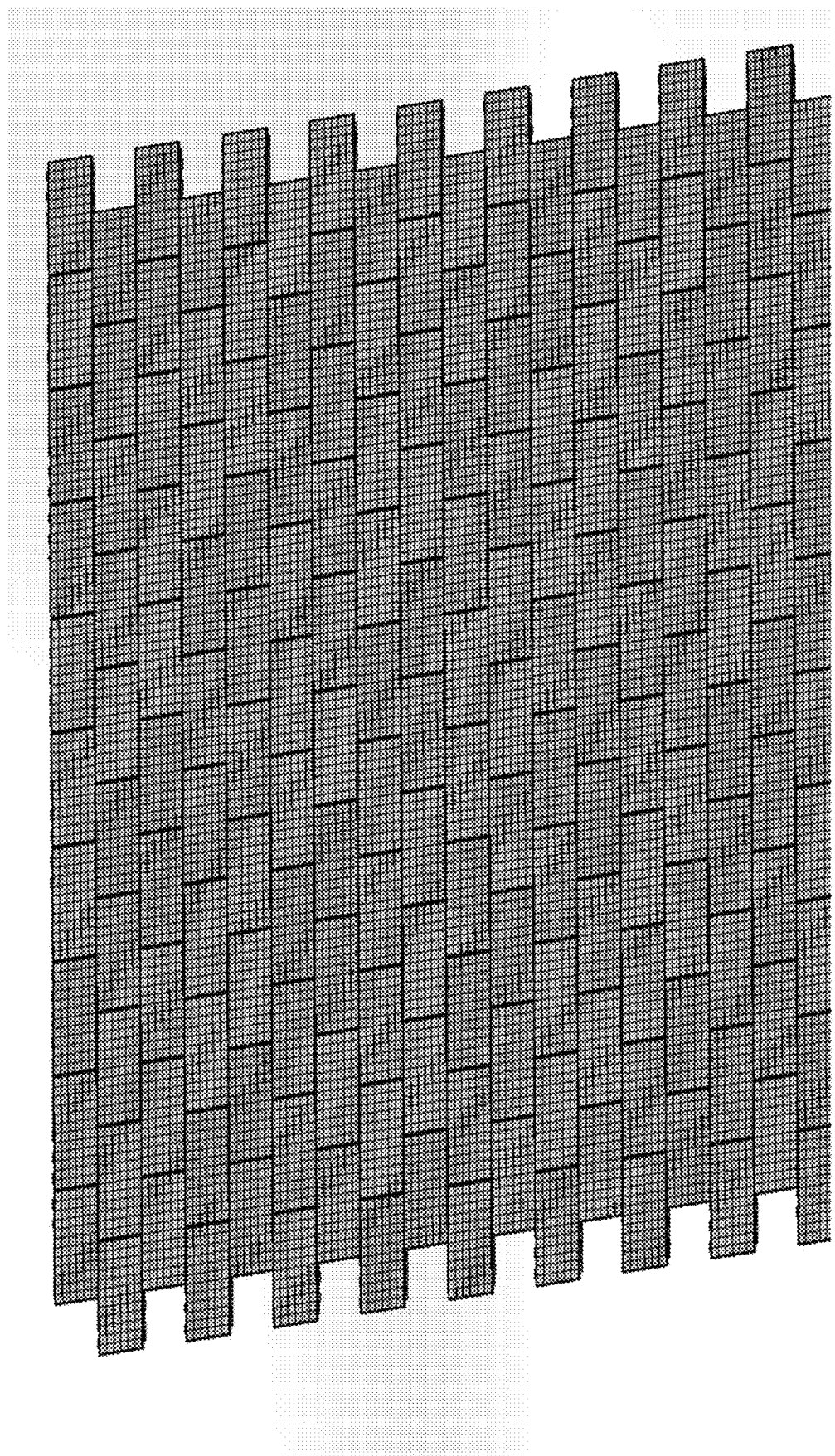
FIG. 40 shows an overhead view of an alternative embodiment featuring staggered module placement.

FIG. 40 shows an overhead view of another alternative embodiment. Here, the array of solar modules may be installed with a stagger between the rows of modules. Such an implementation may add significant stiffness in the stagger direction due to the overlapping frames. Apart from consuming 50% more posts, such an embodiment could function in a manner similar to those described previously.

Figure 41:
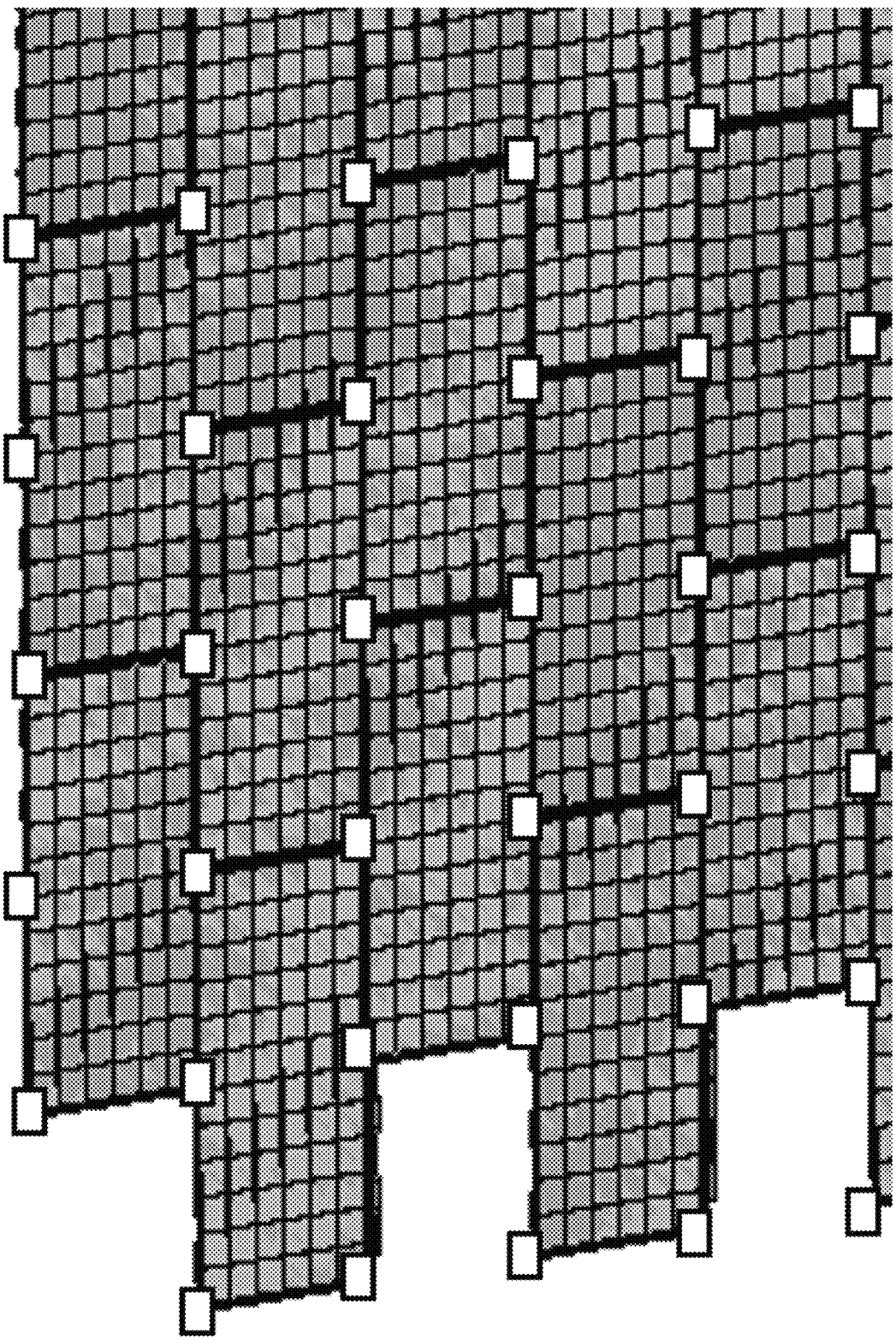
FIG. 41 shows an overhead view of an alternative embodiment featuring staggered module placement and post location.

In the configuration where the modules are staggered, there may be 6 posts per module, and the clip can be modified to clamp on the corner of two modules and the middle edge of a third module. In FIG. 41, post locations are shown as a white square at the intersection of a module edge and two corners of adjacent modules.

Figure 55:
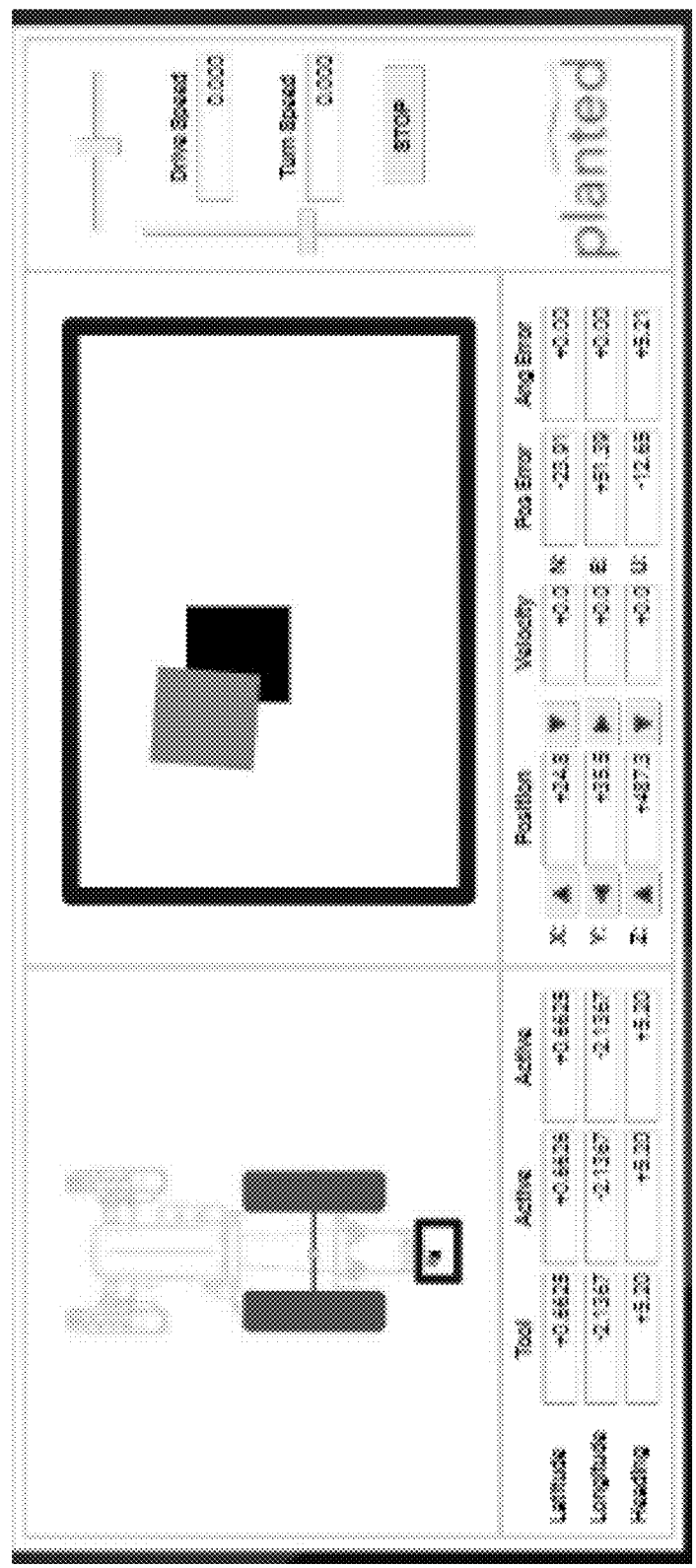
FIG. 55 illustrates a GUI for determining a landscape topology for positioning and assembling solar modules, in accordance with some embodiments.

FIGS. 54A-54C illustrate a method for determining a landscape topology for positioning and assembling solar modules, in accordance with some embodiments. In some cases, the method may comprise analyzing a terrain topology and/or GIS data of a given terrain. In some cases, the method may comprise processing a curvature of the terrain topology or GIS data. In some cases, the method may comprise simulating posts and modules installed on the given terrain. In some cases, the method may comprise uploading the posts and the modules geolocation position and construction data for one or more machines for installing the posts and the modules. FIG. 55 illustrates an exemplary GUI for determining a landscape topology for positioning and assembling solar modules, in accordance with some embodiments.

In some cases, one or more algorithms, machine learning algorithms, or neural networks may be configured to process data of a terrain and determine an optimal layout, positioning, or installation location for one or more posts or solar modules. In some cases, the one or more algorithms, machine learning algorithms, or neural networks may be implemented to generate a virtual representation or simulation of a terrain and one or more candidate locations for installing posts or solar modules. In some cases, the one or more algorithms, machine learning algorithms, or neural networks may be configured to generate a blueprint or a set of instructions for controlling and moving a plurality of robots or mobile platforms to collectively deploy and install one or more posts or solar modules in a target environment. Such blueprint or set of instructions may be generated based on the virtual representation or simulation, or other data associated with the terrain or the landscape topology of the target environment. The virtual representation or simulation may comprise, for example, a 3D model or a point cloud representation of the terrain and the one or more candidate installation or deployment locations.

In some embodiments, when the robots or mobile platforms of the present disclosure run out of posts or solar modules for installation (or if the number of posts or solar modules immediately accessible to the robots or mobile platforms drops below a certain threshold), the robots or mobile platforms may undergo a restocking or replenishment operation. In some cases, the robots or mobile platforms may return to a facility or other central location for restocking or replenishing of posts and/or solar modules. In other cases, one or more other restocking vehicles or robots may carry or store an inventory of additional posts and/or solar modules, and can automatically travel to a robot or mobile platform that needs additional posts or solar modules. In some cases, the one or more other restocking vehicles or robots may travel or idle along a perimeter of the terrain, and travel to a particular robot or mobile platform when the robot or mobile platform requires additional posts or solar modules. This can avoid the need for the robot or mobile platforms to make an additional trip for restocking or replenishment purposes.

Figure 62:
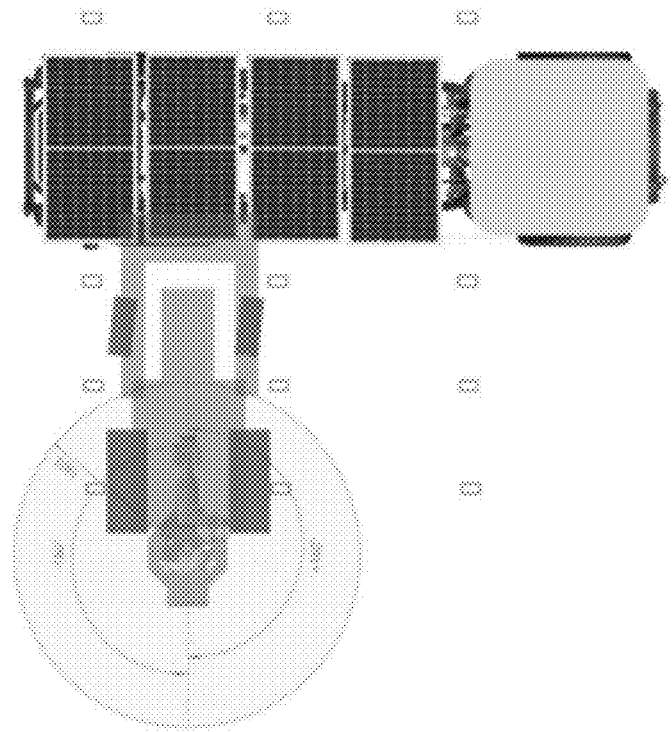
FIG. 62 illustrates an alternative embodiment of an exemplary vehicle that can be used or configured to handle, transport, install, or deploy one or more solar modules.

FIG. 62 illustrates an alternative embodiment of an exemplary vehicle that can be used or configured to handle, transport, install, or deploy one or more solar modules. The vehicle may acquire new stacks of modules autonomously, semi-autonomously, or with aid of human input or intervention. The vehicle may not or need not use or rely on a separate robot to acquire new stacks of modules. In some cases, the vehicle may comprise one or more front attachments that can be used to retrieve or obtain new solar modules from a stocking area or another vehicle.

Figure 63:
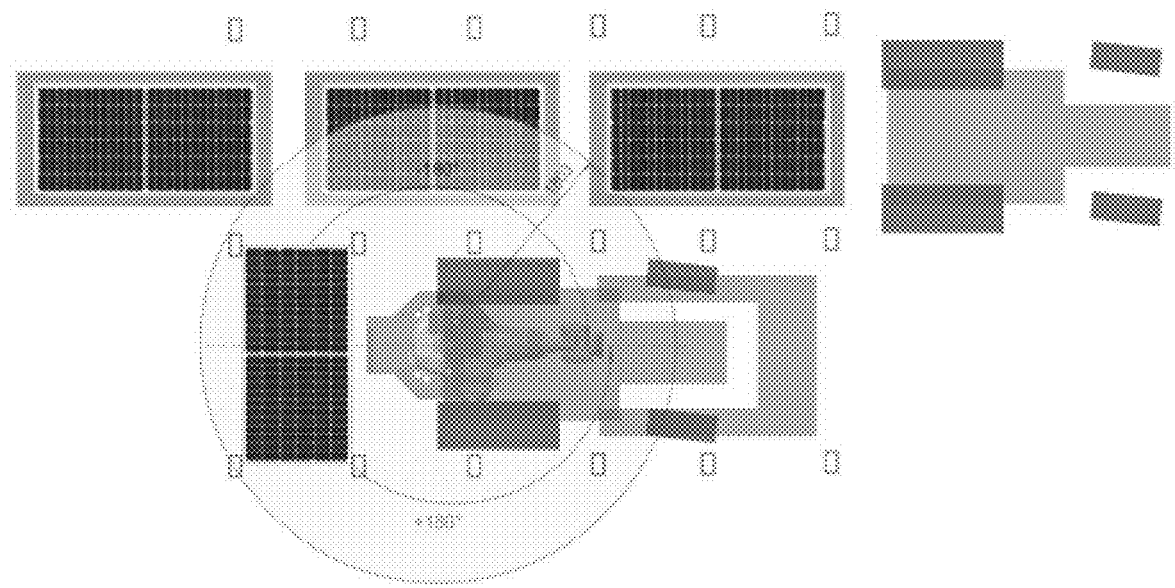
FIG. 63 illustrates another alternative embodiment of an exemplary vehicle that can be used or configured to handle, transport, install, or deploy one or more solar modules.

FIG. 63 illustrates another alternative embodiment of an exemplary vehicle that can be used or configured to handle, transport, install, or deploy one or more solar modules. In some embodiments, the vehicle may be configured to use a robot to move new solar modules off of a trailer of another vehicle.

Figure 64:
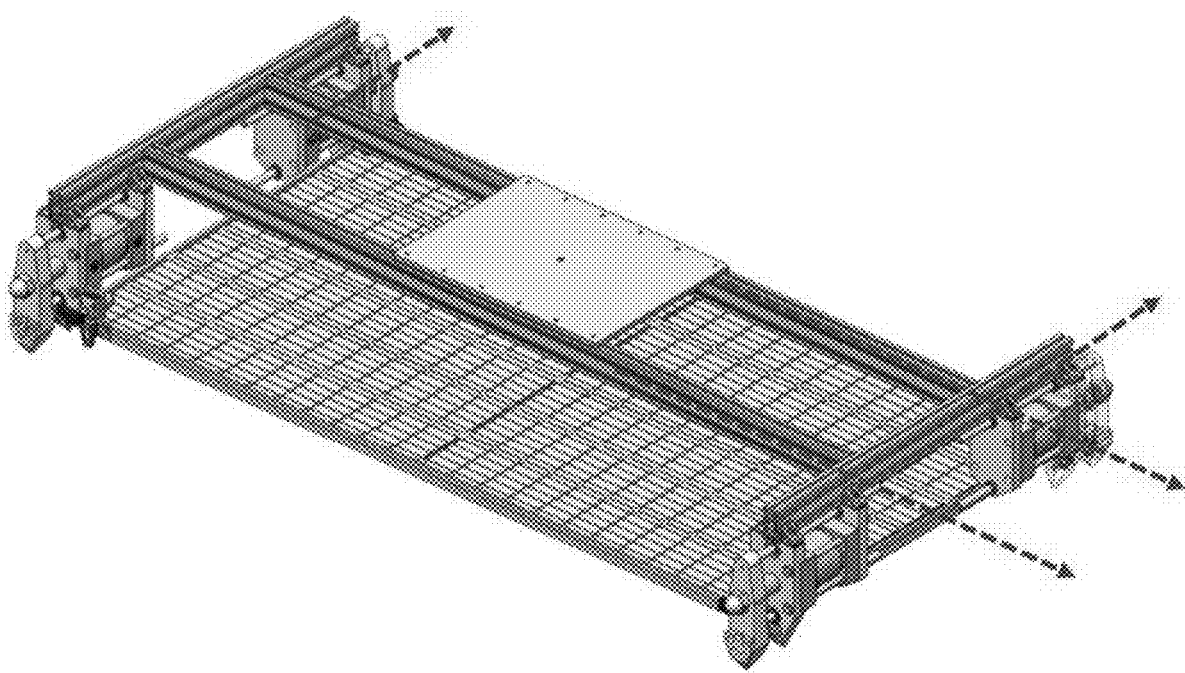
FIG. 64 illustrates an end-effector with clinch tools positioned at the corners of the end-effector, in accordance with some embodiments.
Figure 65:
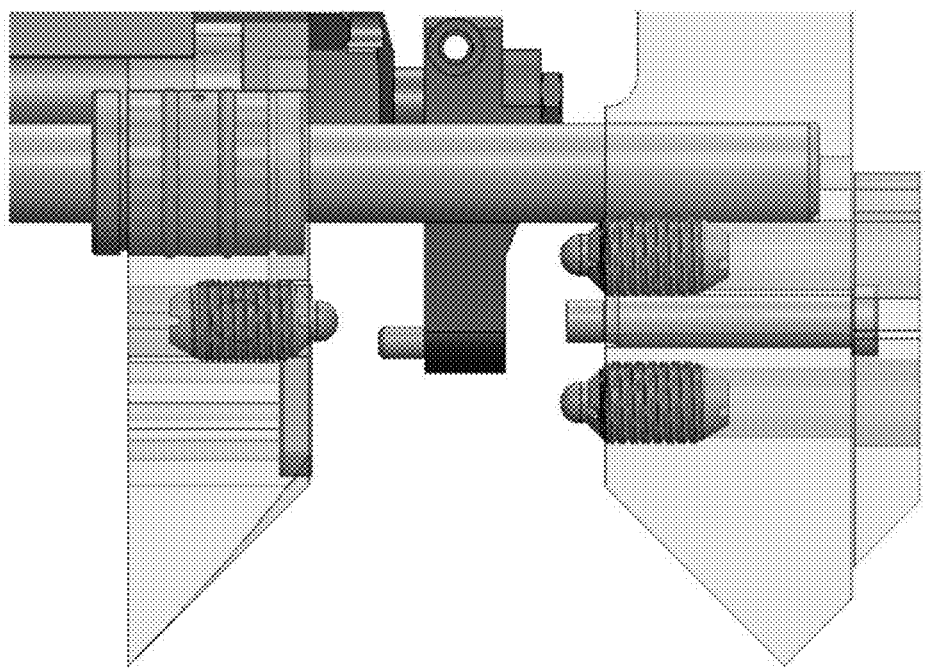
FIG. 65 illustrates a bottom portion of the clinch tools which can be tapered to help the clinch tools locate or engage with a module.

FIG. 64 illustrates an end-effector with clinch tools positioned at the corners of the end-effector. The end-effector in this case may not or need not use suction cups to pick up a solar module, and can instead grab the modules from the side by a squeezing or pinching action. The size of the frame of the end-effector may be adjustable such that the same end-effector can be configured to pick up modules of different shapes or sizes. As shown in FIG. 65, the bottom portion of the clinch tools can be tapered to help the clinch tools locate or engage with the module (e.g., a complementary feature disposed on the module).

Figure 66A:
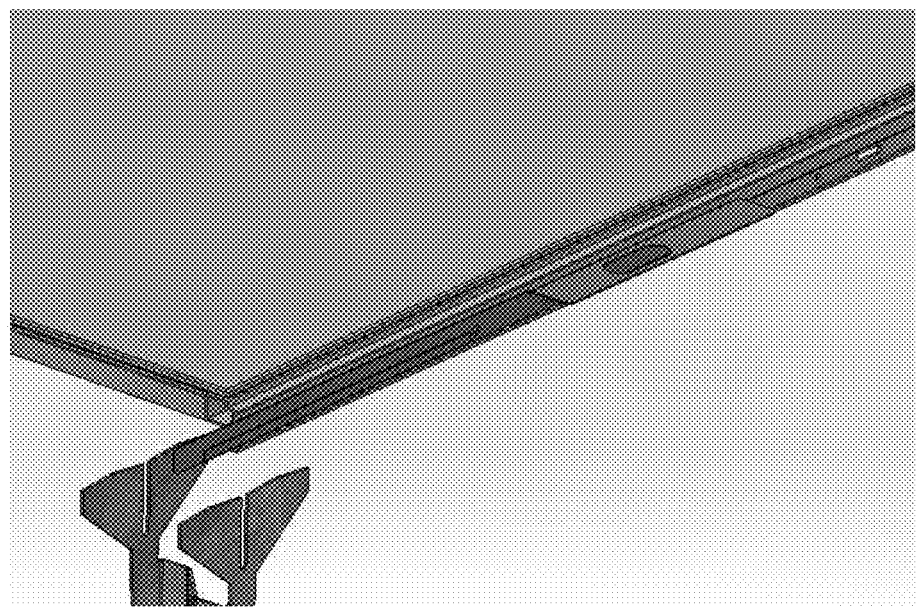
FIGS. 66A and 66B illustrate an alternate embodiment of a clip, in accordance with some embodiments.
Figure 66B:
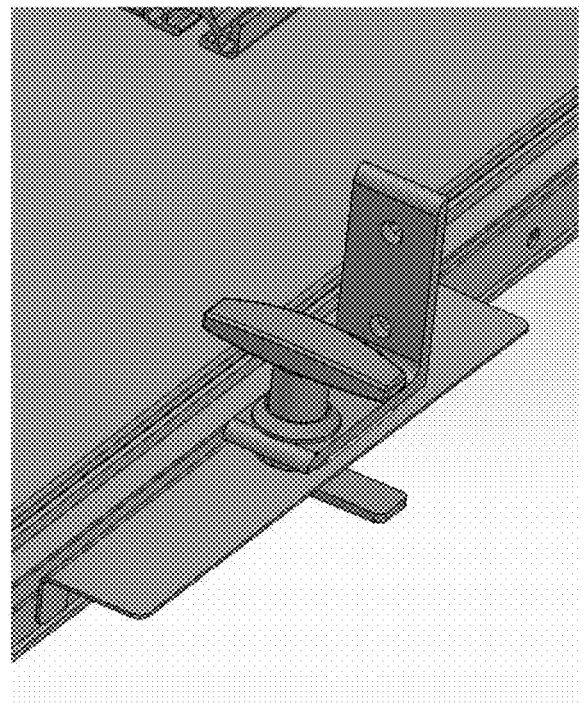

FIGS. 66A and 66B illustrate an alternate embodiment of a clip. The clip may comprise a hole or a slot that can interface with a latch that turns 90 degrees automatically which then engages the module and clip assembly with the load head on the module installer thus holding it in place. This is another embodiment of a way to pick up a solar module without using a suction cup.

Figure 67:
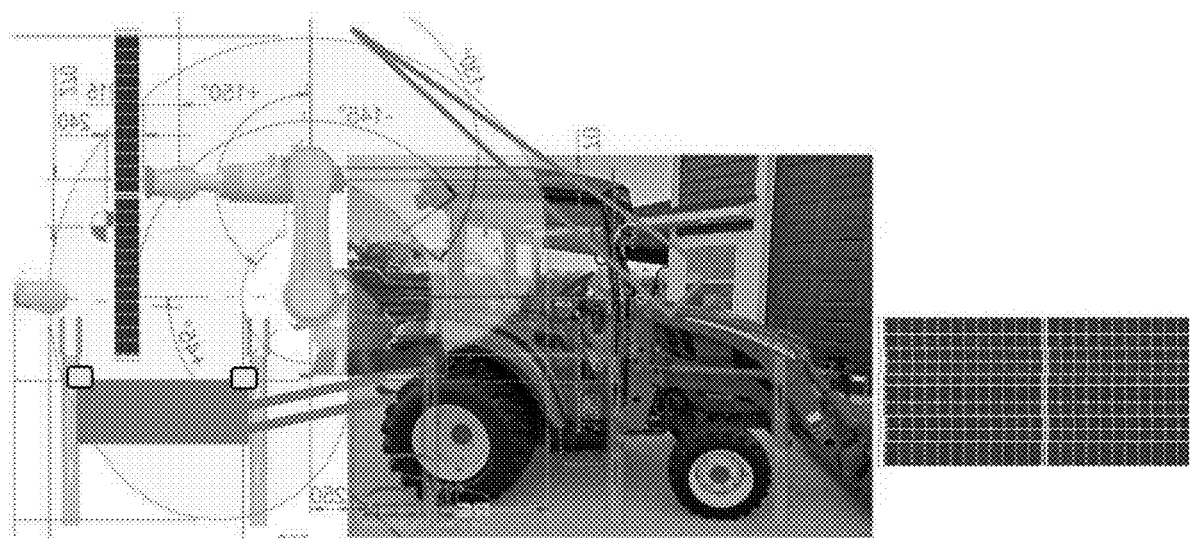
FIG. 67 illustrates an alternative embodiment of a module installer vehicle, in accordance with some embodiments.

FIG. 67 illustrates an alternative embodiment of a module installer vehicle as described elsewhere herein. Here, the clinch tools (yellow) may not or need not be located on the same piece of automation that is moving the module (orange) but can instead be located on a separate piece of automation (blue) which is attached to the same mobile vehicle platform as the automation that moves the modules. The separate piece of automation (blue) may autonomously and releasably mate to previously installed posts. The module-moving automation (orange) can then move a module to the location where the posts are installed.

Figure 68:
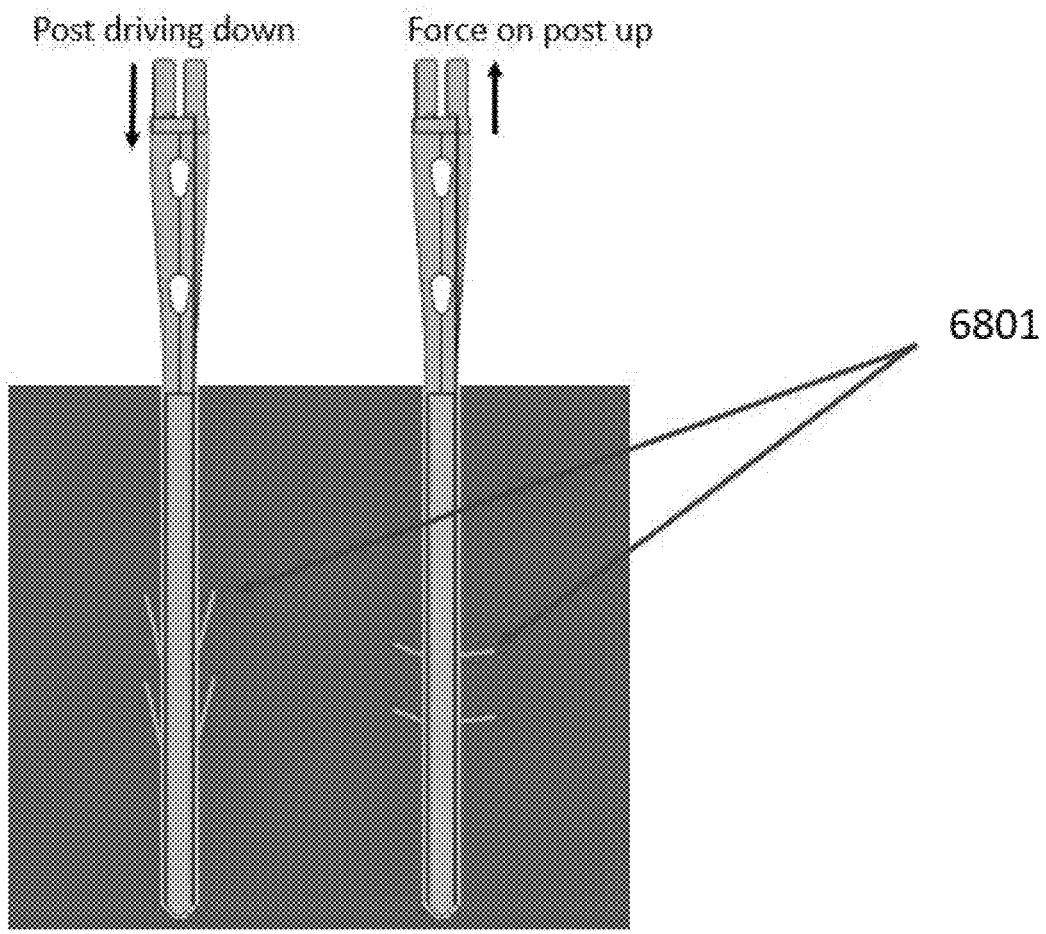
FIG. 68 illustrates an exemplary configuration for a post, in accordance with some embodiments.

FIG. 68 illustrates an exemplary configuration for a post as described elsewhere herein. This embodiment shows cutout flanges 6801 that are bent out in a flared way such that they allow the post to enter the soil with low resistance (left), but then when the post is pulled up, they are engaged with the soil and bend out more, providing increased uplift resistance (right).

Figure 69A:
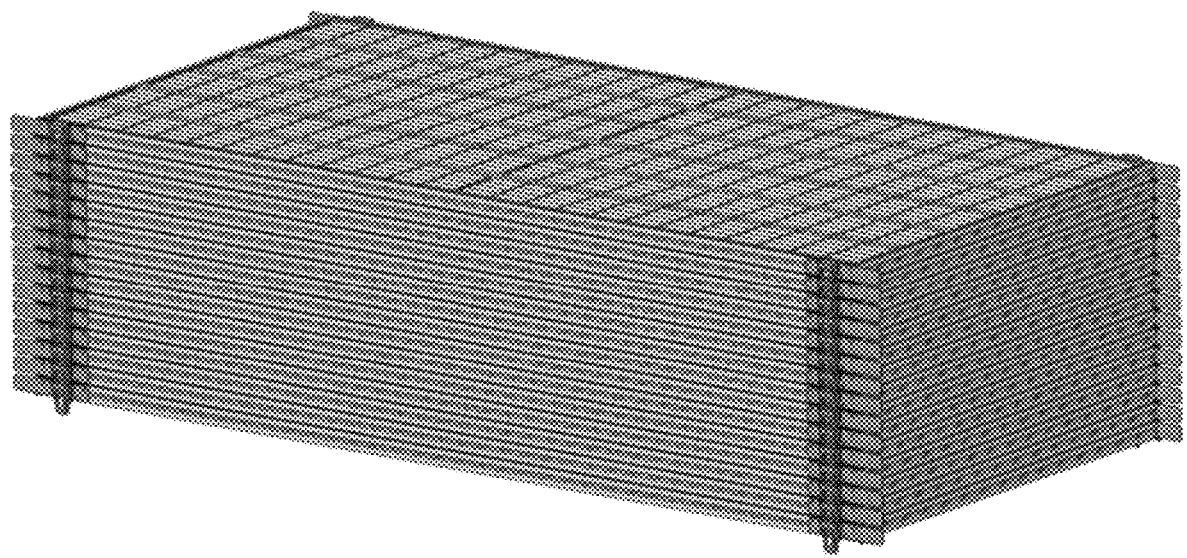
FIGS. 69A and 69B illustrate an alternative embodiment of the clips described herein, in accordance with some embodiments.
Figure 69B:
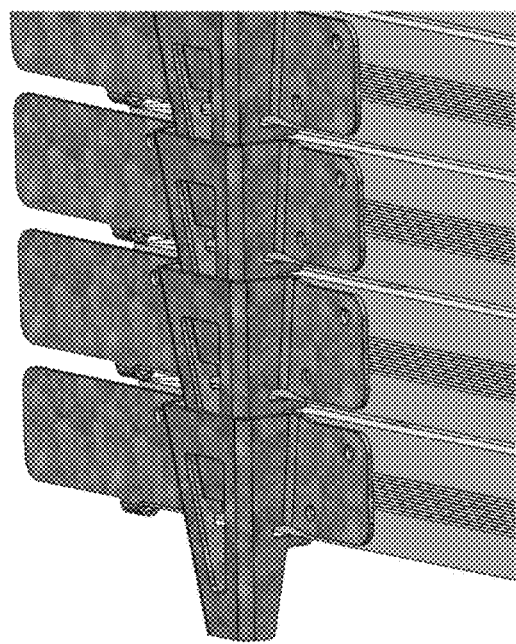

FIGS. 69A and 69B illustrate an alternative embodiment of the clips described elsewhere herein. In this embodiment, the clips may have bends and tabs such that they nest and stack so that the solar modules do not contact the other modules above or below them in the stack.

Figure 70A:
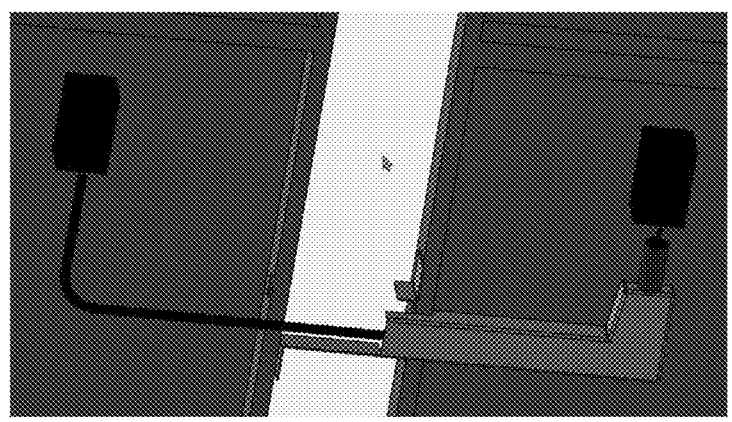
FIG. 70A illustrates an additional sheet metal feature that can be used to retain one or more lead wires or wire leads of a solar module and hold them fixed in a specific side of the module, for later handling or processing.
Figure 70B:
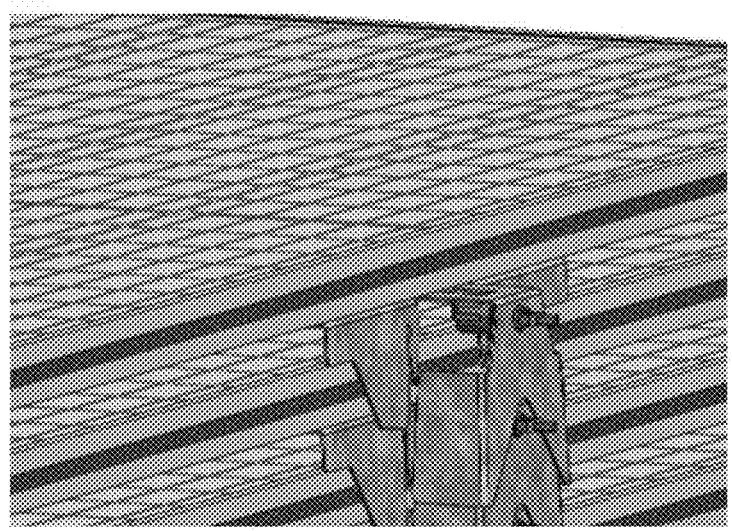
FIG. 70B illustrates an embodiment of a clip where the module wire lead is connected to the clip that is also connected to the module and that will be connected to the post.
Figure 70C:
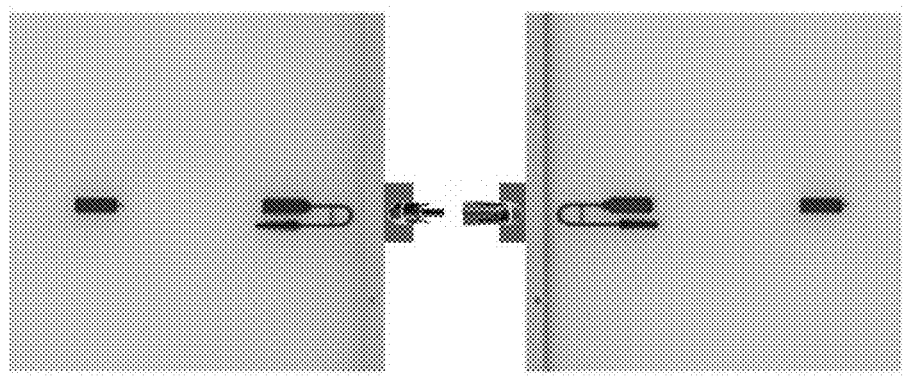
FIG. 70C illustrates using an additional tool to autonomously take the solar module wire leads that are held in place by the clip and connect them to each other to form an electrical connection between the modules.
Figure 71:
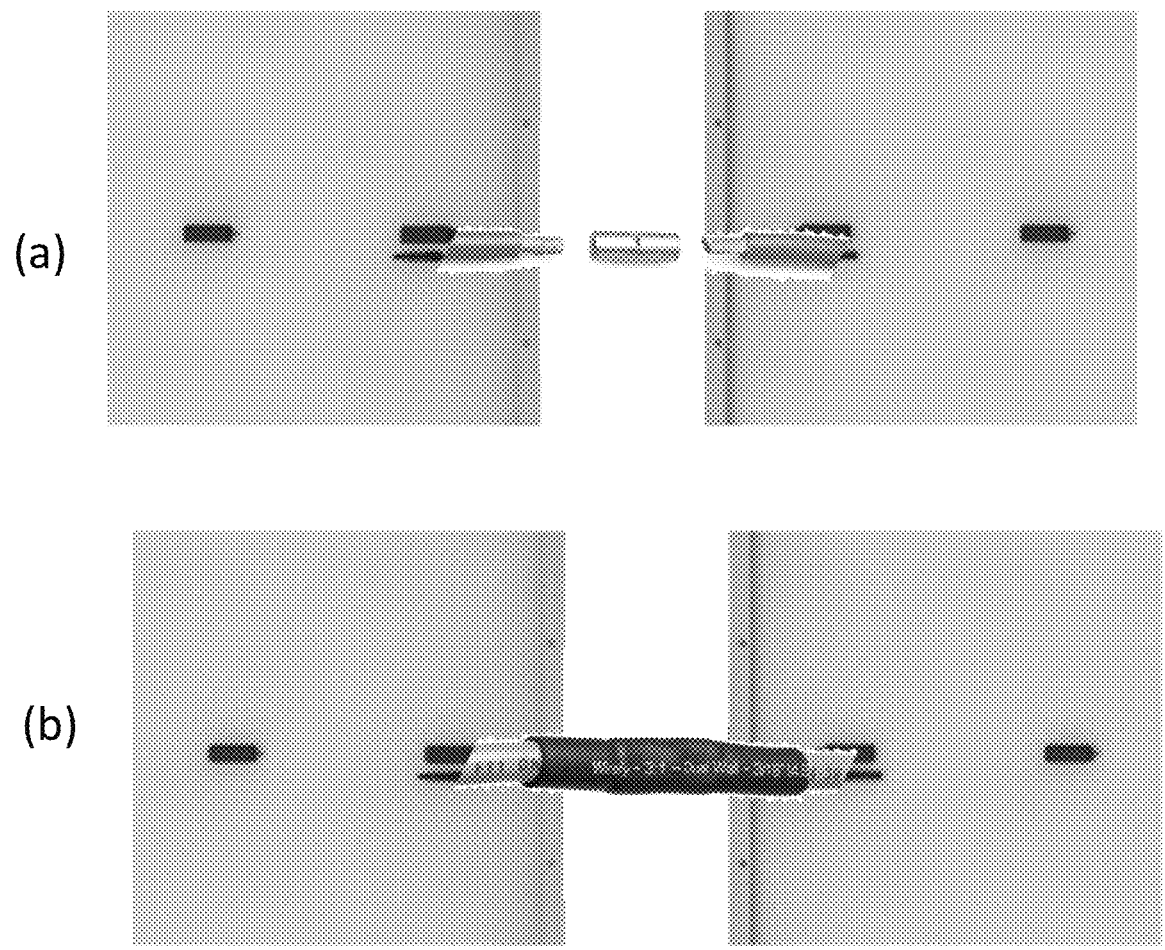
FIG. 71 illustrates an alternative embodiment of the tool and method in FIGS. 70A, 70B, and 70C, whereby the tool does not push two connectors together, and instead cuts, strips, and splices the wires together in place without the use of a connector.

FIG. 70A illustrates an additional sheet metal feature that can be used to retain one or more lead wires or wire leads of a solar module and hold them fixed in a specific side of the module, for later handling or processing. FIG. 70B illustrates an embodiment of a clip where the module wire lead is connected to the clip that is also connected to the module and that will be connected to the post. FIG. 70C illustrates using an additional tool (blue squares) to autonomously take the solar module wire leads that are held in place by the clip and connect them to each other to form an electrical connection between the modules. FIG. 71 illustrates an embodiment of the tool and method in FIGS. 70A, 70B, and 70C, except in this embodiment, the tool does not push two connectors together, and instead it cuts (a), strips (a), and splices (b) the wires together in place without the use of a connector.

Figure 75:
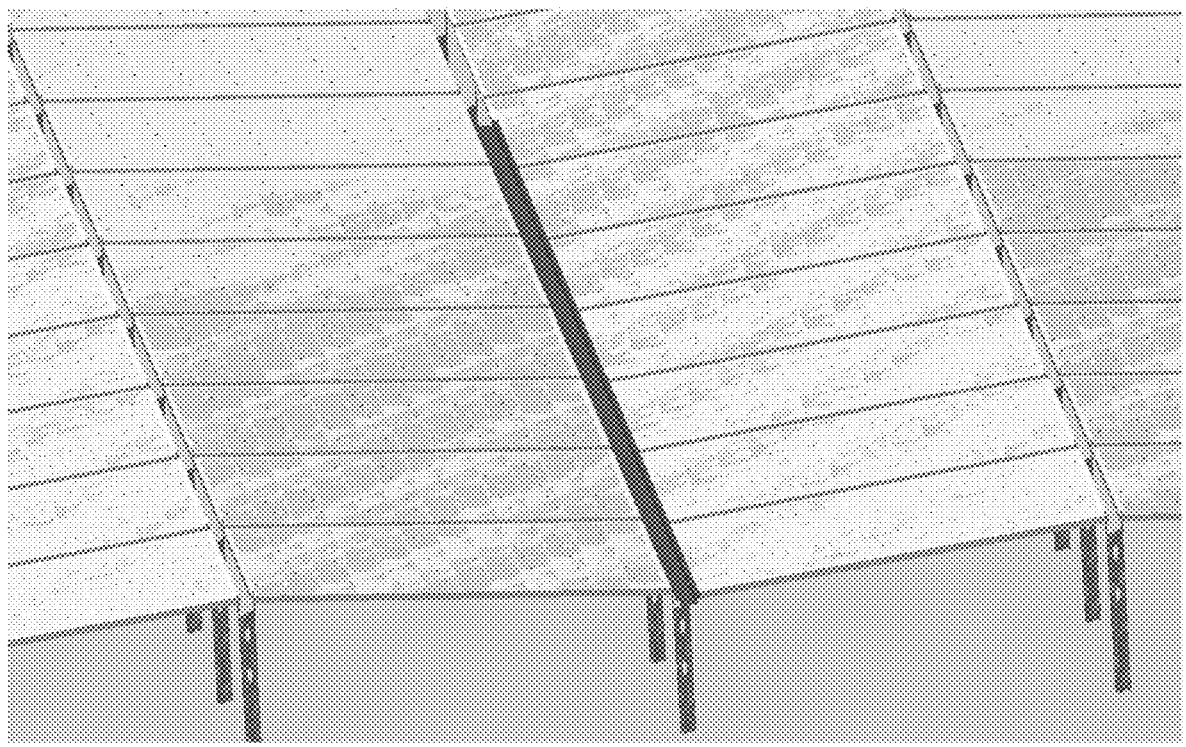
FIG. 75 illustrates a removable access trough that can be placed on top of posts in the valley or peaks of a solar module array.

FIG. 75 illustrates a removable access trough that can be placed on top of posts in the valley or peaks of the module array. This trough can transfer its weight and load to the posts below it and not to the modules, and can be walked on top of in order to access modules in the interior regions of the array. In some cases, this trough can also be a rail that a robot can ride on (e.g., to clean, water, spray, or inspect).

Figure 76:
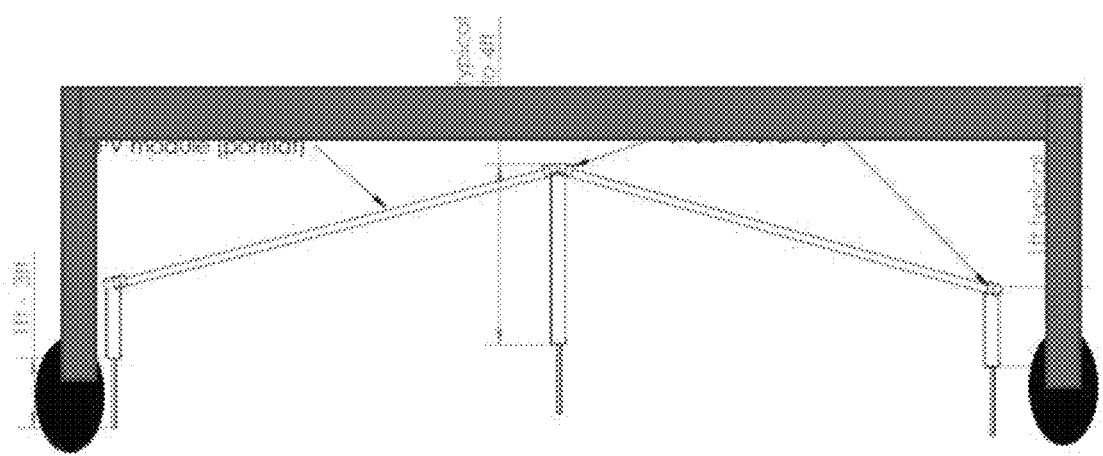
FIG. 76 and FIG. 77 illustrate a gantry on wheels that can drive on the ground in the gaps between the array in certain configurations.
Figure 77:
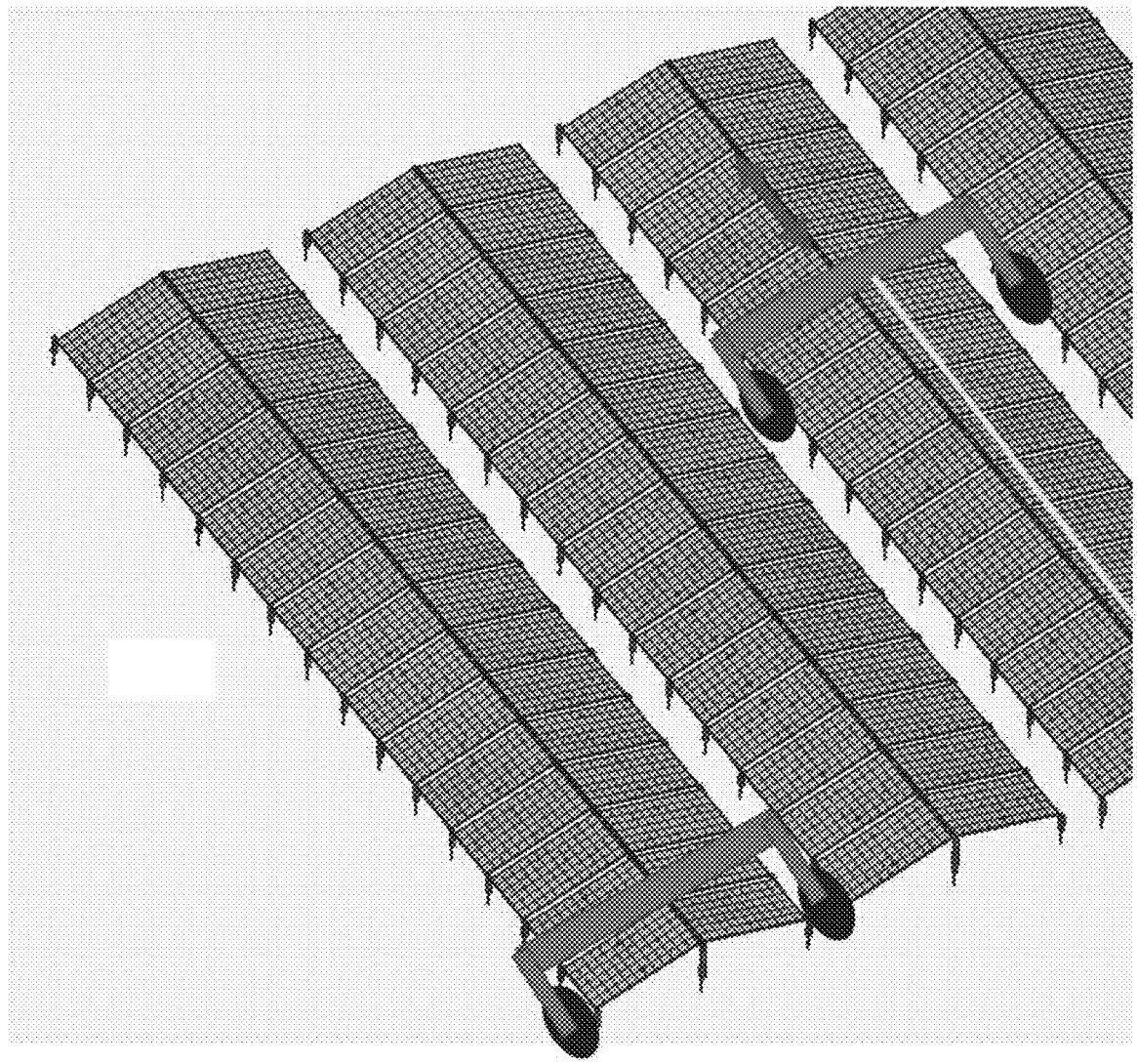

FIG. 76 and FIG. 77 illustrate a gantry (blue) on wheels (black) that can drive on the ground in the gaps between the array in certain configurations. This gantry can be outfitted with automation to clean the modules with water, or to mechanically wipe the solar modules in the array beneath the gantry. This gantry can also spray water or herbicide, or hydroseed, to manage vegetation underneath the array. The gantry can have a cord, a tube, or other hollow structure attached thereto to connect it to a source of water or other liquids at the end of a row of modules.

Computer Systems

In an aspect, the present disclosure provides computer systems that are programmed or otherwise configured to implement methods of the disclosure, e.g., any of the subject methods for using at least one robot to fully autonomously position and assemble at least one solar module and its supporting structure.

In another aspect, the present disclosure provides computer systems that are programmed or otherwise configured to provide one or more mobile platforms that are configured to carry a plurality of posts and a plurality of solar modules. In some cases, the one or more mobile platforms are equipped with one or more sensors comprising a geolocation sensor. In some cases, the computer systems are further programmed or otherwise configured to use at least in part the readings or measurements obtained using one or more sensors to (i) autonomously move the one or more mobile platforms and (ii) autonomously position and assemble the plurality of posts and the plurality of solar modules over a terrain to construct an array of solar modules. Such autonomous movement or positioning may be performed using one or more signals or commands generated by a computing unit of the computer system.

In another aspect, the present disclosure provides computer systems that are programmed or otherwise configured to provide a plurality of posts and a plurality of solar modules. In some cases, the plurality of solar modules comprises a plurality of clips pre-attached thereon. In some cases, the computer systems are further programmed or otherwise configured to form a plurality of post-module interfaces, e.g., post-clip interfaces between a plurality of clips and the plurality of posts to construct an array of solar modules over a terrain without requiring one or more premade holes/features for one or more fasteners.

In another aspect, the present disclosure provides computer systems that are programmed or otherwise configured to use an algorithm to identify a location suitable for autonomous positioning and assembly of at least one solar module. In some cases, using the algorithm may be performed without requiring aid or involvement from a user in the autonomous positioning and assembly of the at least one solar module.

Figure 61:
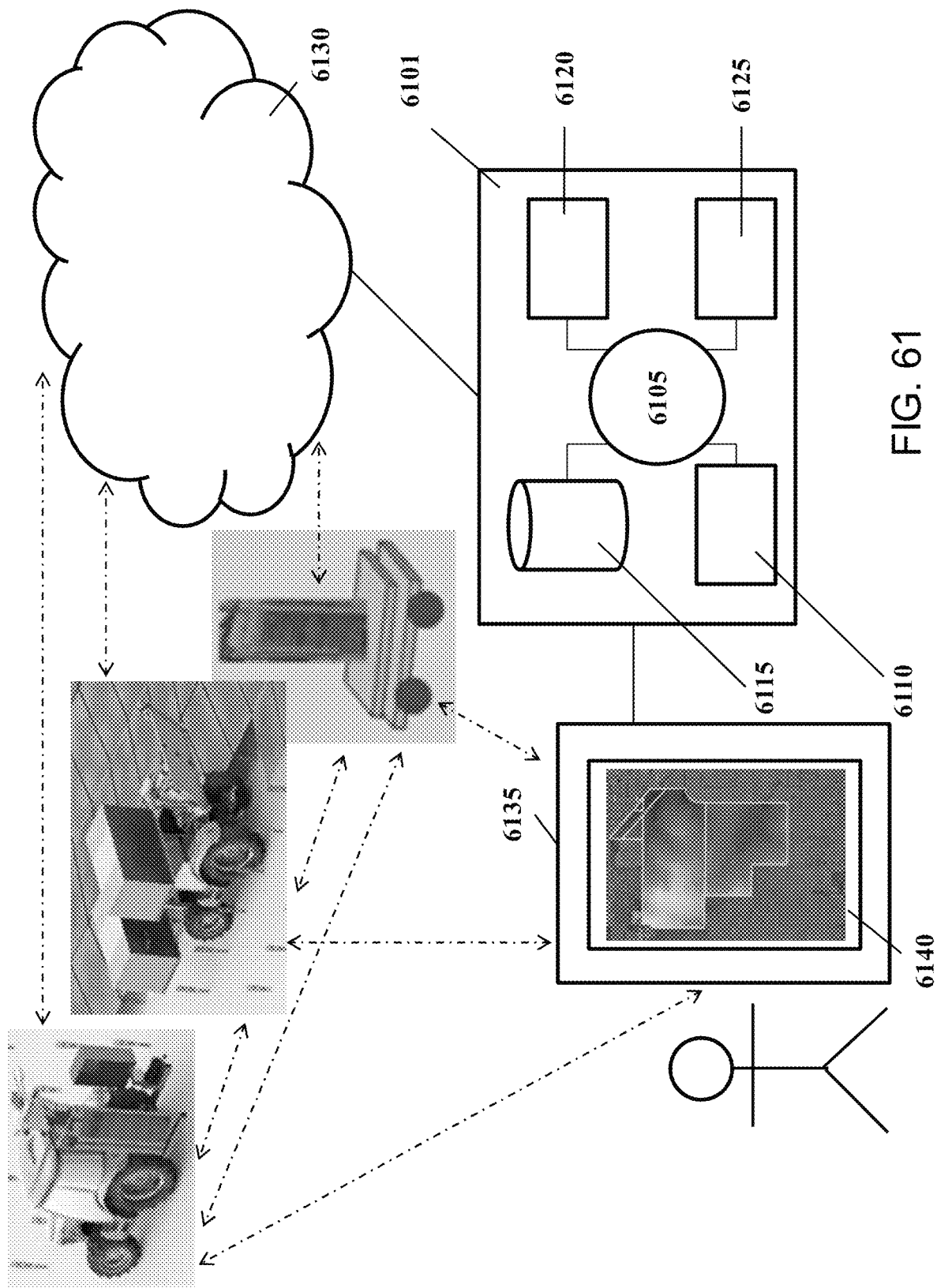
FIG. 61 shows a computer system, in accordance with some embodiments.

FIG. 61 shows a computer system 6101 that is programmed or otherwise configured to implement a method for fully autonomously positioning and assembling at least one solar module and its supporting structure. In some embodiments, the computer system 6101 may be configured to, for example, use an algorithm to identify a location suitable for autonomous positioning and assembly of at least one solar module, without requiring aid or involvement from a user in the autonomous positioning and assembly of the at least one solar module. The computer system 6101 can be an electronic device of a user or a computer system that is remotely located with respect to the electronic device. The electronic device can be a mobile electronic device.

The computer system 6101 may include a central processing unit (CPU, also "processor" and "computer processor" herein) 6105, which can be a single core or multi core processor, or a plurality of processors for parallel processing. The computer system 6101 also includes memory or memory location 6110 (e.g., random-access memory, read-only memory, flash memory), electronic storage unit 6115 (e.g., hard disk), communication interface 6120 (e.g., network adapter) for communicating with one or more other systems, and peripheral devices 6125, such as cache, other memory, data storage and/or electronic display adapters. The memory 6110, storage unit 6115, interface 6120 and peripheral devices 6125 are in communication with the CPU 6105 through a communication bus (solid lines), such as a motherboard. The storage unit 6115 can be a data storage unit (or data repository) for storing data. The computer system 6101 can be operatively coupled to a computer network ("network") 6130 with the aid of the communication interface 6120. The network 6130 can be the Internet, an internet and/or extranet, or an intranet and/or extranet that is in communication with the Internet. The network 6130 in some cases is a telecommunication and/or data network. The network 6130 can include one or more computer servers, which can enable distributed computing, such as cloud computing. The network 6130, in some cases with the aid of the computer system 6101, can implement a peer-to-peer network, which may enable devices coupled to the computer system 6101 to behave as a client or a server.

The CPU 6105 can execute a sequence of machine-readable instructions, which can be embodied in a program or software. The instructions may be stored in a memory location, such as the memory 6110. The instructions can be directed to the CPU 6105, which can subsequently program or otherwise configure the CPU 6105 to implement methods of the present disclosure. Examples of operations performed by the CPU 6105 can include fetch, decode, execute, and writeback.

The CPU 6105 can be part of a circuit, such as an integrated circuit. One or more other components of the system 6101 can be included in the circuit. In some cases, the circuit is an application specific integrated circuit (ASIC).

The storage unit 6115 can store files, such as drivers, libraries and saved programs. The storage unit 6115 can store user data, e.g., user preferences and user programs. The computer system 6101 in some cases can include one or more additional data storage units that are located external to the computer system 6101 (e.g., on a remote server that is in communication with the computer system 6101 through an intranet or the Internet).

The computer system 6101 can communicate with one or more remote computer systems through the network 6130. For instance, the computer system 6101 can communicate with a remote computer system of a user (e.g., an end user or entity overseeing, supervising, monitoring, or managing an operation of the robots). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 6101 via the network 6130.

Methods as described herein can be implemented by way of machine (e.g., computer processor) executable code stored on an electronic storage location of the computer system 6101, such as, for example, on the memory 6110 or electronic storage unit 6115. The machine executable or machine readable code can be provided in the form of software. During use, the code can be executed by the processor 6105. In some cases, the code can be retrieved from the storage unit 6115 and stored on the memory 6110 for ready access by the processor 6105. In some situations, the electronic storage unit 6115 can be precluded, and machine-executable instructions are stored on memory 6110.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 6101, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media including, for example, optical or magnetic disks, or any storage devices in any computer(s) or the like, may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 6101 can include or be in communication with an electronic display 6135 that comprises a user interface (UI) 6140 for providing, for example, a portal for monitoring the installation of posts or solar modules. In some cases, the UI may permit inputs such as commands to "begin installation" or "halt all robots." In some cases, the UI may provide a visualization or a blueprint for installing multiple solar modules of a solar module array. In some cases, the UI may provide a visualization tracking one or more robots in real-time. The portal may be provided through an application programming interface (API). A user or entity can also interact with various elements in the portal via the UI. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 6105. For example, the algorithm may be configured to determine one or more locations for installing one or more solar modules. In some cases, the algorithm may be configured to coordinate one or more robots during installation of one or more solar modules. In some cases, the algorithm may be configured to process force-testing data of one or more solar modules to determine if the one or more solar modules are installed securely. In some cases, the algorithm may be configured to provide instructions to the one or more robots to adjust the one or more solar modules or supporting structures thereof based at least in part on the force-testing data.

High Throughput Post Installation

In one aspect, the present disclosure provides methods and systems for high throughput post installation.

In some embodiments, the present disclosure provides an apparatus comprising a conveyance unit and a dispensing unit. The conveyance unit may be configured to support and transport a plurality of posts. The dispensing unit may be configured to dispense one or more posts among the plurality of posts from the conveyance unit, for installation onto a terrain.

In some embodiments, the conveyance unit may comprise a conveyor line. In some embodiments, the conveyance unit may be configured to support the plurality of posts by hanging the plurality of posts on the conveyor line. In some embodiments, the dispensing unit may comprise an actuator that is configured to dispense the one or more posts by separating or releasing the one or more posts from the conveyance unit. In some embodiments, the actuator may be configured to separate or release the one or more posts from the conveyance unit by pushing, pulling and/or lifting the one or more posts off the conveyance unit. In some embodiments, the dispensing unit may be configured to feed the one or more posts to a post installation machine. In some embodiments, the dispensing unit may be configured to dispense the one or more posts to a carrier that is configured to feed the one or more posts to a post installation machine. In some embodiments, the dispensing unit may comprise a supporting arm configured to extend through one or more first holes in the one or more posts to support the one or more posts, wherein the supporting arm may be further configured to push, pull and/or lift the one or more posts off the conveyance unit. In some embodiments, the dispensing unit may be further configured to feed the one or more bundles to a post installation machine. In some embodiments, the dispensing unit may be configured to dispense the one or more bundles to a carrier that is configured to feed the one or more bundles to a post installation machine.

In some embodiments, the apparatus may further include a transfer arm that is configured to extend through one or more second holes in the one or more posts, to take over the one or more posts from the supporting arm. In some embodiments, the transfer arm may be configured to transfer the one or more posts to a carrier that is configured to feed the one or more posts to a post installation machine.

Figure 78A:
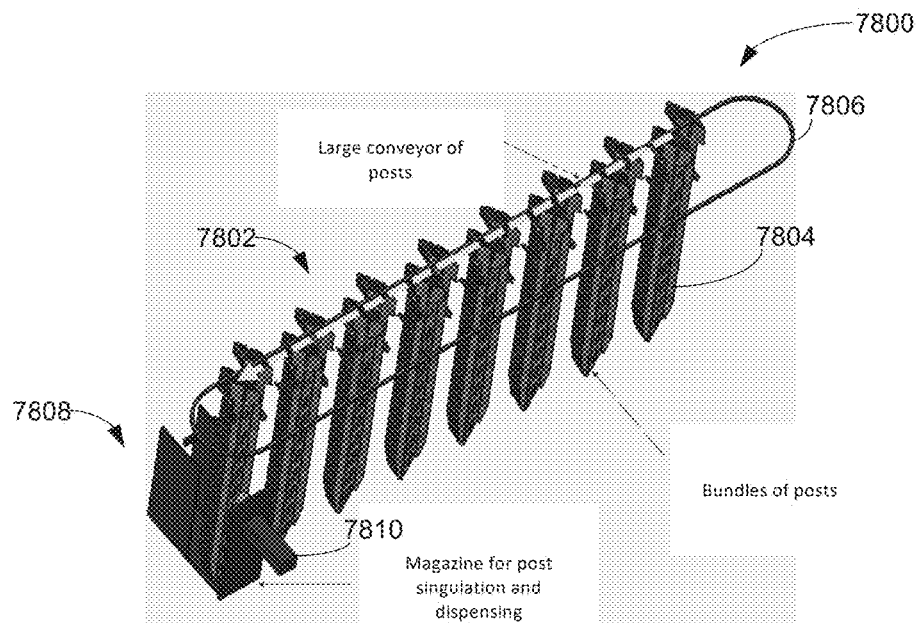
FIGS. 78A-78C illustrate an example configuration of a conveyer apparatus for the post installation machine, in accordance with some embodiments.
Figure 78B:
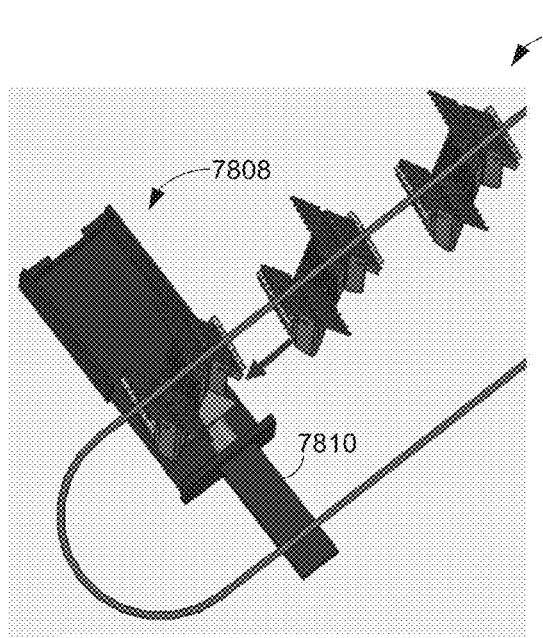
Figure 78C:
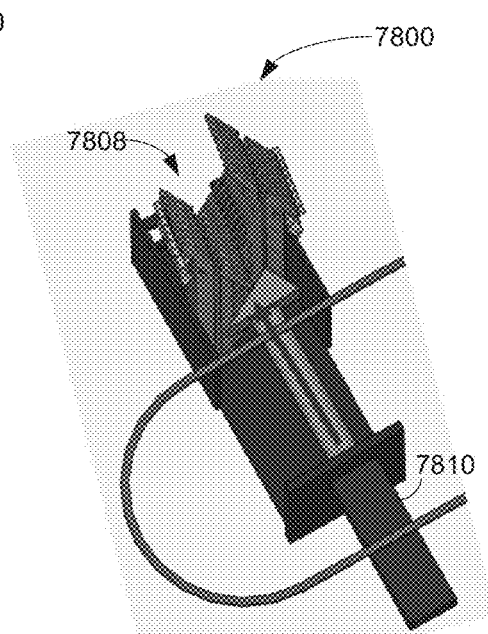

FIGS. 78A-78C illustrate an example configuration of a conveyer apparatus 7800 for a post installation machine, in accordance with some embodiments. According to some embodiments, the conveyer apparatus 7800 may be configured to store, transport, and convey posts on a conveyor. The conveyer apparatus 7800 may include a conveyance unit 7802 configured to support and transport a plurality of posts 7804. The plurality of posts 7804 may be bundled. The conveyance unit 7802 may include a conveyor line 7806. The conveyance unit 7802 may be configured to support the plurality of posts 7804 by securing the plurality of posts 7804 on the conveyor line 7806. In some embodiments, the conveyance unit 7802 may be configured to support the plurality of posts 7804 by hanging the plurality of posts 7804 on the conveyor line 7806. The conveyer apparatus 7800 may include a dispensing unit 7808. The dispensing unit 7808 may be configured to dispense one or more posts 7804 from the conveyance unit 7802, for installation onto a terrain. The dispensing unit 7808 may include an actuator 7810 that is configured to dispense the one or more posts by separating or releasing the one or more posts from the conveyance unit 7802. The actuator 7810 may be configured to separate or release the one or more posts from the conveyance unit 7802 by pushing, pulling and/or lifting the one or more posts off the conveyance unit 7802. The actuator 7810 may cause posts to enter a specific location at the conveyer to be pushed into an organized magazine arrangement such that they can be singulated one by one into a carrier of a post installation machine. The conveyance unit 7802 and the dispensing unit 7808 may be operably coupled to each other. In some embodiments, the dispensing unit 7808 may be located at a fixed position relative to the conveyance unit 7802. In some embodiments, the dispensing unit 7808 may be movable such that the dispensing unit 7808 is capable of being moved to one or more positions along or relative to the conveyance unit 7802. In some embodiments, the conveyance unit 7808, the dispensing unit 7808, and/or the plurality of posts may be provided in a post storage unit or at a post storage location. The post storage unit or post storage location may include a centralized place on a field, where a plurality of posts may be stored and subsequently distributed for planting over the terrain (e.g., a very large area).

As illustrated in FIGS. 78A and 78B, the plurality of posts 7804 may be provided as a plurality of bundles, with each bundle comprising two or more posts. In some embodiments, the two or more posts in a bundle may be held together by a strap, chain, or clip. According to some embodiments, a bundle may include about three to three hundred posts. According to some embodiments, a bundle may include about three to six hundred posts. Bundles of posts may be easier to manage at the start of a module installation process and may save time needed for transporting, separating, and/or planting, in comparison to grappling with a large number of individual separated posts.

In some embodiments, the dispensing unit may be configured to dispense one or more bundles from the plurality of bundles. In some embodiments, the dispensing unit may comprise an actuator that is configured to dispense the one or more bundles by separating or releasing the one or more bundles from the conveyance unit. In some embodiments, the actuator may be configured to separate or release the one or more bundles from the conveyance unit by pushing, pulling and/or lifting the one or more bundles off the conveyance unit.

In some embodiments, the conveyance unit and the dispensing unit may be operably coupled to each other. In some embodiments, the dispensing unit may be located at a fixed position relative to the conveyance unit. In some embodiments, the dispensing unit may be movable such that the dispensing unit is capable of being moved to one or more positions along or relative to the conveyance unit. In some embodiments, the conveyance unit, the dispensing unit and the plurality of posts may be provided in a posts storage unit or at a posts storage location. In some embodiments, the conveyance unit may comprise a plurality of carriages that are linked to one another. In some embodiments, a number and spacing of the plurality of carriages may be adjustable to enable different turn radii of the conveyance unit during motion of the conveyance unit. In some embodiments, each carriage of the plurality of carriages may comprise one or more hooks that are used for hanging the plurality of posts. In some embodiments, the conveyance unit may be sloped or angled to facilitate the dispense of the one or more posts with aid of gravity. In some embodiments, after a bundle is extracted, the bundle can be fed to a post installation machine, whereby the bundle is then singulated into individual posts to be planted into the ground. In some embodiments, the dispensing unit may dispense one or more bundles of posts to a carrier. In some embodiments, the carrier may feed the one or more bundles of posts to a post installation machine.

Figure 79:
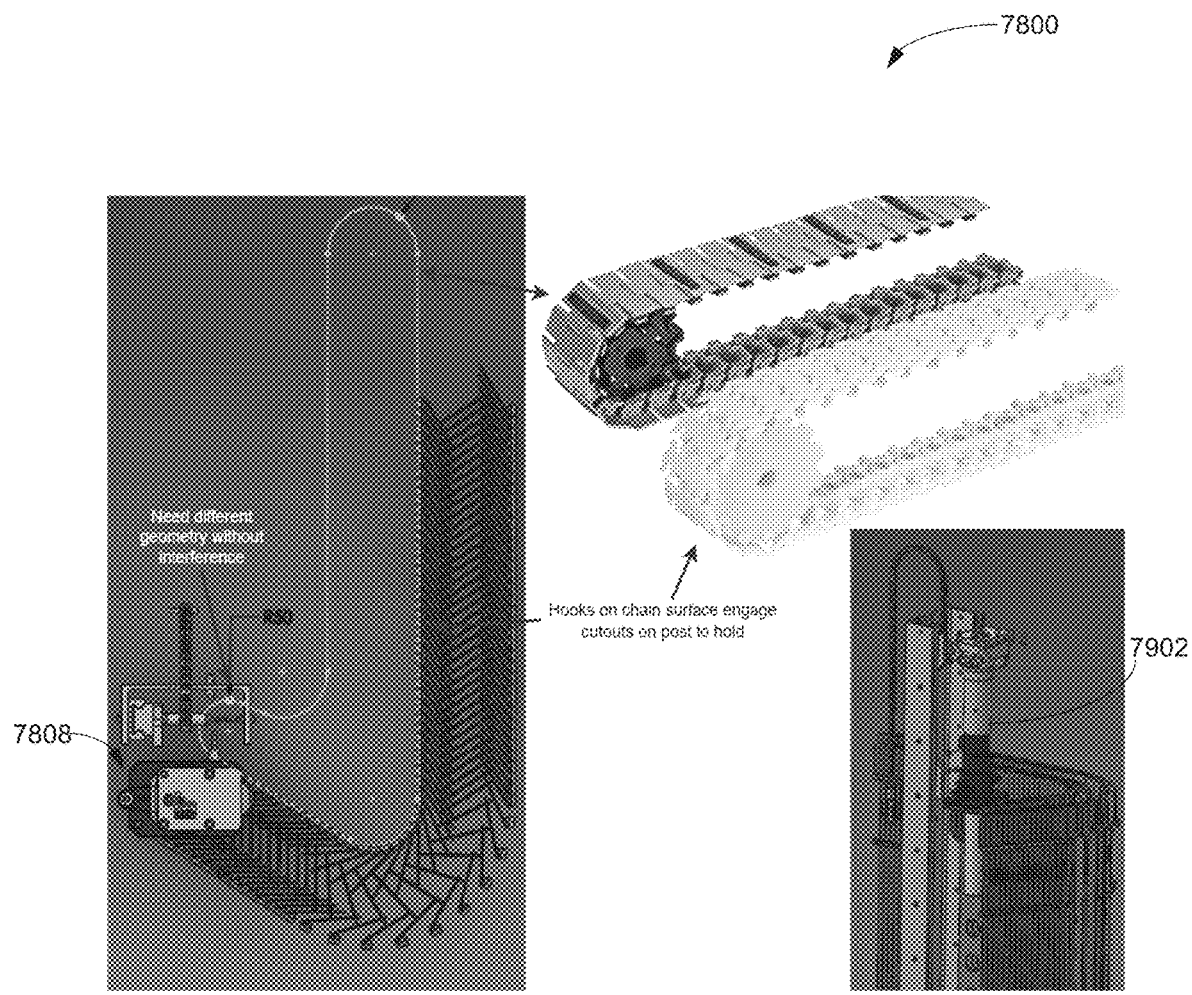
FIG. 79 illustrates another example configuration of the conveyer apparatus, in accordance with some embodiments.

FIG. 79 illustrates another example configuration of the conveyer apparatus 7800, in accordance with some embodiments. The dispensing unit 7808 may be configured to feed one or more posts to a post installation machine. In some embodiments, the conveyor of posts may continue into a workspace of a hammer 7902 without the use of a magazine-like loading mechanism.

Figure 80:
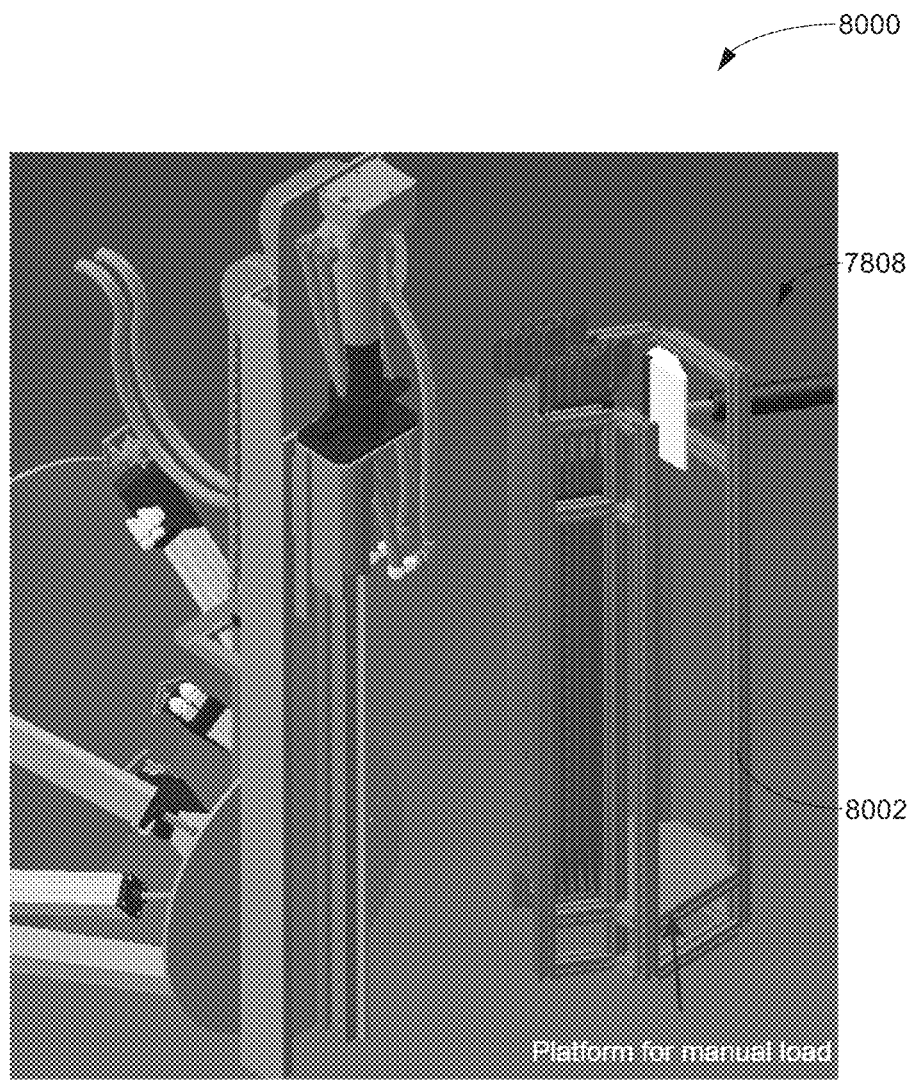
FIG. 80 illustrates an example feeding system for the post installation machine, in accordance with some embodiments.

FIG. 80 illustrates an example feeding system 8000 for the post installation machine, in accordance with some embodiments. The dispensing unit 7808 may be configured to dispense one or more posts to a carrier that is configured to feed the one or more posts to the post installation machine. In some embodiments, the one or more posts may be fed into a carrier 8002. A post can be presented into a position within the carrier 8002 so that the post installation machine can drive to it and pick up the post. In some embodiments, the carrier 8002 can be transported to proximity of the post installation machine and the post installation machine can pick up the post from the carrier 8002.

Figures 81A, 81B, 81C:
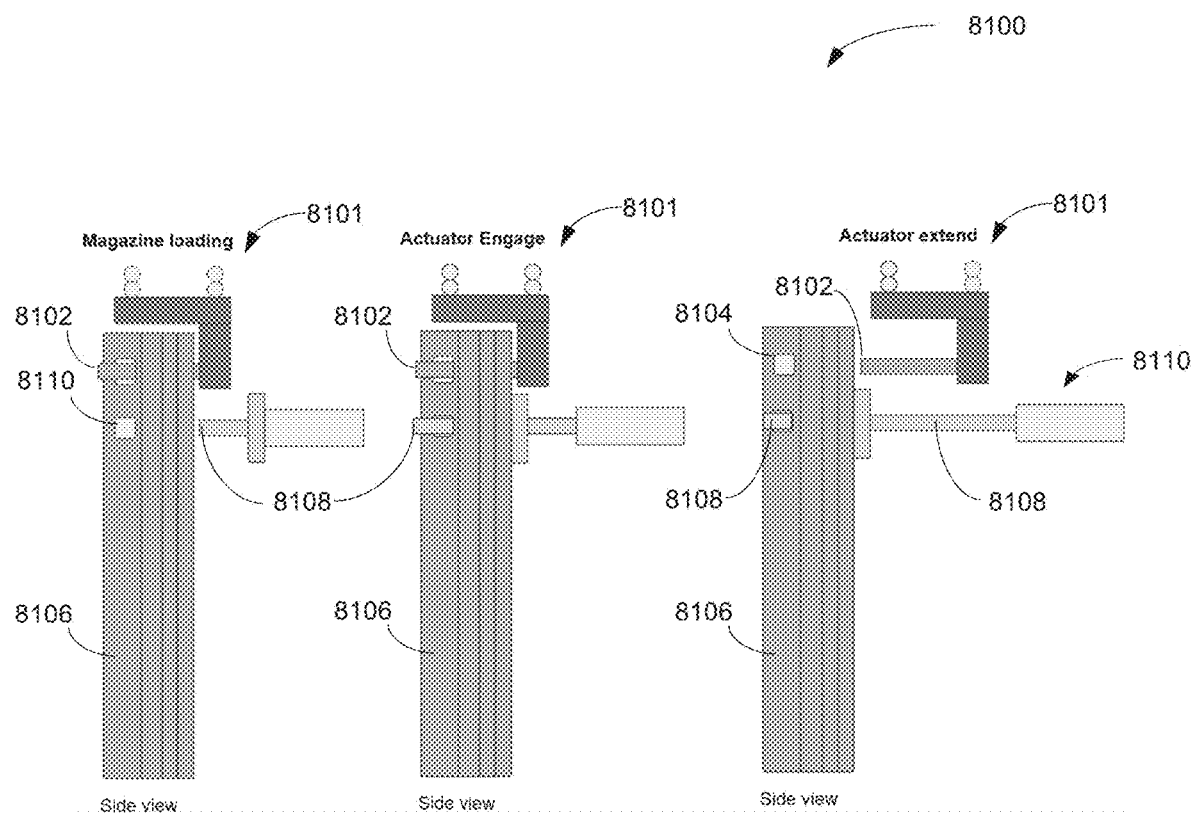
FIGS. 81A-81C illustrate an example mechanical arrangement to transition posts, in accordance with some embodiments.

FIGS. 81A-81C illustrate an example mechanical arrangement 8100 to transition posts, in accordance with some embodiments. A carriage 8101 (e.g., a dispensing unit 7808) may include a supporting arm 8102 configured to extend through one or more first holes 8104 in the one or more posts 8106 to support the posts 8106. The supporting arm 8102 may be configured to push, pull and/or lift the post 8106 off the conveyance unit 7802. In some embodiments, a transfer arm 8108 may be configured to extend through one or more second holes 8110 in the posts 8106 to allow the posts 8106 to hang on it. An actuator 8110 then pushes the post 8106 off the supporting arm 8102, thereby transitioning the post 8106 from the carriage 8101 to the actuator 8110.

In some embodiments, the transfer arm 8108 may transfer the one or more bundles of posts to a carrier. In some embodiments, the carrier may feed the one or more bundles of posts to a post installation machine.

FIGS. 82A-82C illustrate an example of a magazine and rail system 8200 (e.g., of the example feeding system 8000 shown in FIG. 80) in accordance with some embodiments. A carrier 8202 may include a rail 8204. The rail 8204 may be configured to support a plurality of posts 8206. The rail 8204 may include a gate 8208 located at a distal portion of the rail 8204. The gate 8208 may be configured to prevent the plurality of posts 8206 from sliding off the rail 8204. The rail 8204 may have a fixed position for the posts to slide upon. The carrier 8202 may include a follower 8210 configured to move or press the plurality of posts 8206 along the rail 8204 towards or against the gate 8208. The posts may be pushed to the front of the rail 8204 by the follower 8210 and may be required to be lifted up and over the gate 8208 in order to be released. In some embodiments, the gate 8208 and the follower 8210 may be configured to enable each post of the plurality of posts 8206 to be sequentially removable from the distal portion of the rail 8204 for installation onto a terrain. The follower 8210 may include a spring. The plurality of posts may be sequentially removable from the rail 8204 by lifting the post above and over the gate 8208. In some embodiments, each post may be sequentially removable from the rail by lifting said each post above and over the gate. The plurality of posts 8206 may be indexed by a distance relative to each other along the rail 8204 using one or both of (a) one or more tabs on each post of the plurality of posts 8206 and/or (b) a plurality of spacers between the plurality of posts 8206. The carrier 8202 may comprise a vibrating device 8212 operably coupled to the rail 8204. The vibrating device 8212 may be configured to generate vibrations in the rail 8204 for facilitating movement of the plurality of posts 8206 towards the gate 8208. The rail 8204 may be sloped or angled to facilitate movement of the plurality of posts 8206 towards the gate 8208 with aid of gravity.

Figure 83A:
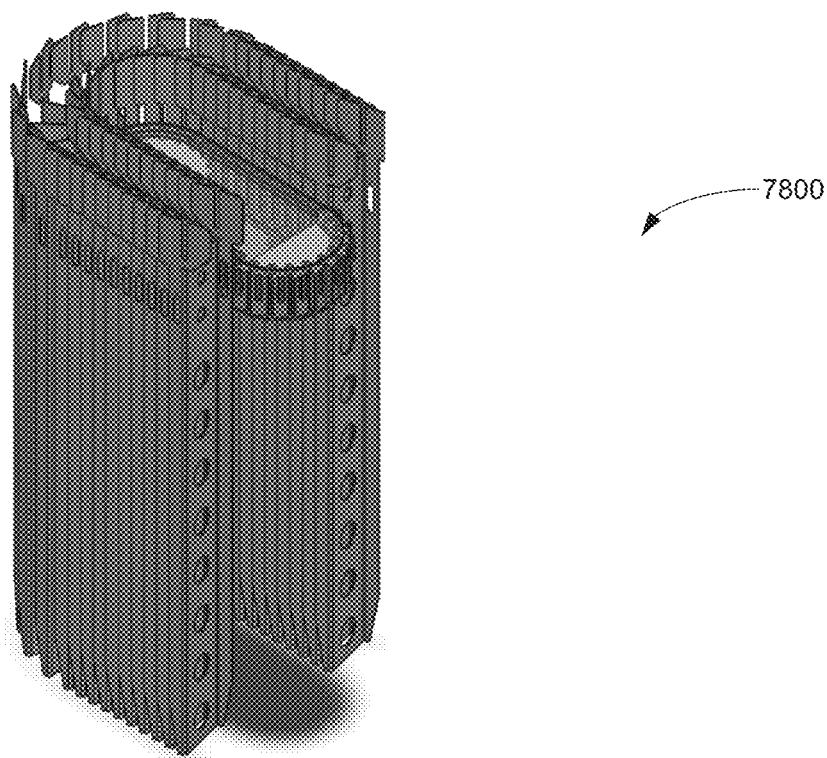
FIGS. 83A and 83B illustrate example detail views of the conveyance unit shown in FIG. 79, in accordance with some embodiments.
Figure 83B:
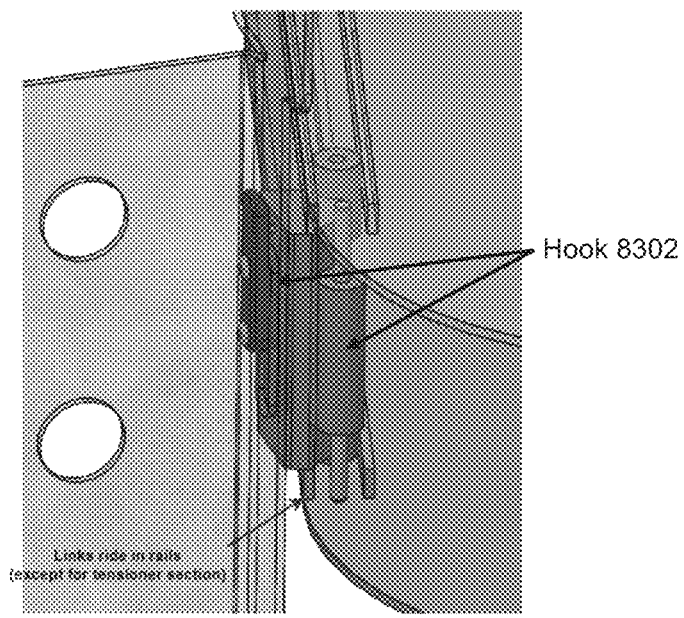

FIGS. 83A and 83B illustrate detail views of the conveyer apparatus 7800 shown in FIG. 79, in accordance with some embodiments. A conveyance unit (e.g., the conveyance unit 7808 in FIG. 78) may include a plurality of carriages that are linked to one another. In some embodiments, a number and spacing of the plurality of carriages may be adjustable to enable different turn radii of the conveyance unit during motion of the conveyance unit. In some embodiments, a carriage of the plurality of carriages may include one or more hooks 8302 that are used for securing (e.g., hanging) the plurality of posts.

Figures 84A, 84B:
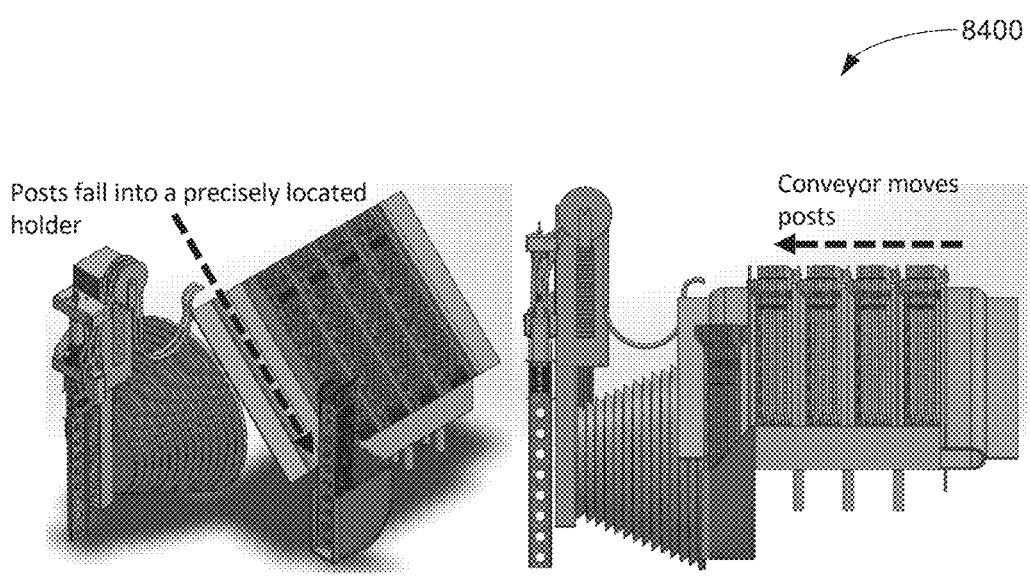
FIGS. 84A and 84B illustrate another example mechanical arrangement to store and transport posts, in accordance with some embodiments.

FIGS. 84A and 84B illustrate another example mechanical arrangement 8400 to store and transport posts, in accordance with some embodiments. A conveyance unit (e.g., the conveyance unit 7808 in FIG. 78) may be sloped or angled to facilitate the dispense of the one or more posts with aid of gravity. The conveyor belt may drive posts forward and the front stack may fall off into a tool (e.g., a carrier) that catches it in a specific vertical orientation.

Figure 85:
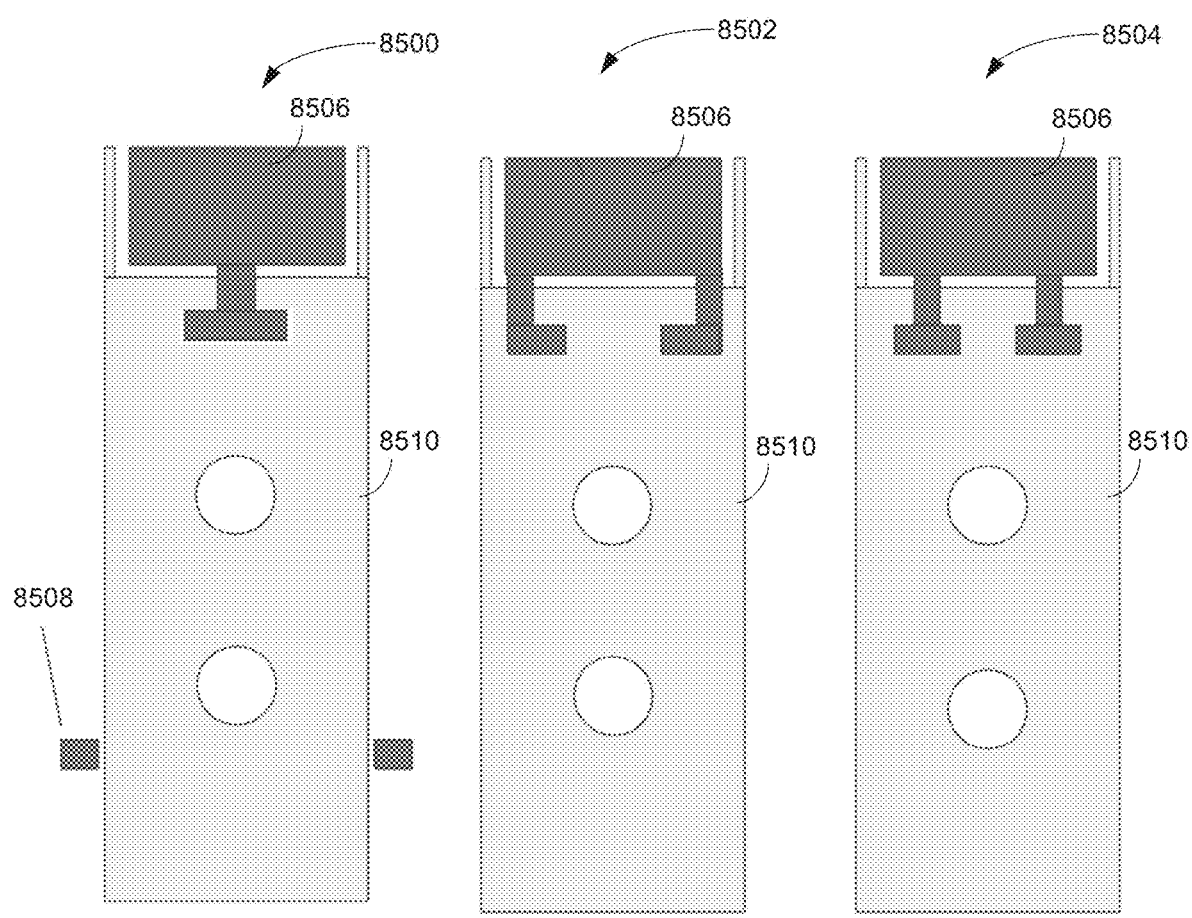
FIG. 85 illustrates different example rail configurations for the rail system, in accordance with some embodiments.

FIG. 85 illustrates different example rail configurations 8500, 8502, and 8504 for the rail system of the post installation machine, in accordance with some embodiments. In some embodiments, a rail 8506 may include a single rail (e.g., configuration 8500). In some embodiments, the rail 8506 may include two or more laterally spaced apart sub-rails (e.g., configurations 8502 and 8504). The two or more laterally spaced apart sub-rails may be configured to reduce swinging of the plurality of posts on the rail. The rail system may include one or more linear guides 8508 located beneath the rail 8506. The one or more linear guides 8508 may be configured to constrain and reduce swinging of the plurality of posts 8510 on the rail 8506. The rail 8506 may be sloped or angled to facilitate removal of each post 8510 from the rail 8506 with aid of gravity. For example, the posts 8510 may slowly slide down the rail 8506 using gravity after a post 8510 from the end of the rail 8506 has been removed.

A system for post installation may comprise a carrier and a post installation machine. In some embodiments, the post installation machine may comprise an extraction device configured to remove the one or more posts from the carrier for installation onto the terrain. The extraction device may be configured to remove the one or more posts 8510 from the carrier by lifting the one or more posts 8510 off the rail 8506 to clear the gate (e.g., the gate 8208 in FIG. 82), so that the post 8510 can be loaded onto the post installation machine for preparation to plant into the ground. In some embodiments, the post installation machine may include a load driving mechanism (e.g., a hammer). The extraction device may be configured to bring the one or more posts 8510 in proximity of the load driving mechanism. For example, an extracted post 8510 may be positioned close to a hammer bit, which may be used to drive the post 8510 into the ground. The load driving mechanism may be configured to drive the one or more posts 8510 onto the terrain (e.g., planting the posts 8510 into the ground). A load driving mechanism may include a load head (e.g., a hammer bit) configured to drive one or more posts 8510 onto a terrain. The load driving mechanism may include a positioning device. The positioning device may be configured to control a location of the load head in three or more degrees of freedom relative to the one or more posts 8510 and an altitude of the terrain, prior to the one or more posts 8510 being driven onto the terrain. The positioning device may include a plurality of linear actuators. The positioning device may include a Stewart platform or a hexapod (see, e.g., FIG. 87). The positioning device may be configured to control the location of the load head in six degrees of freedom.

In some embodiments, the load head can comprise a retention feature. In some embodiments, the retention feature can comprise rollers on bearings. In some embodiments, the retention feature can engage and disengage with a post. In some embodiments, the retention feature can be located lower on the post than the hammer. In some embodiments, the retention feature can be actively extended downwards. In some embodiments, the load head can comprise an outrigger that extends to touch the ground. In some embodiments, the load head can extend to touch the ground. In some embodiments, the retention feature can comprise an outrigger that extends to touch the ground.

Figure 86A:
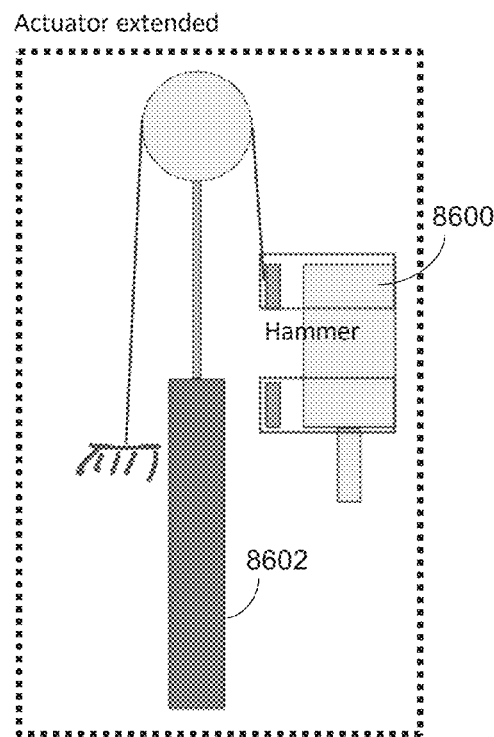
FIGS. 86A-86C illustrate different example configurations of a hammer and actuator of the post installation machine, in accordance with some embodiments.
Figure 86B:
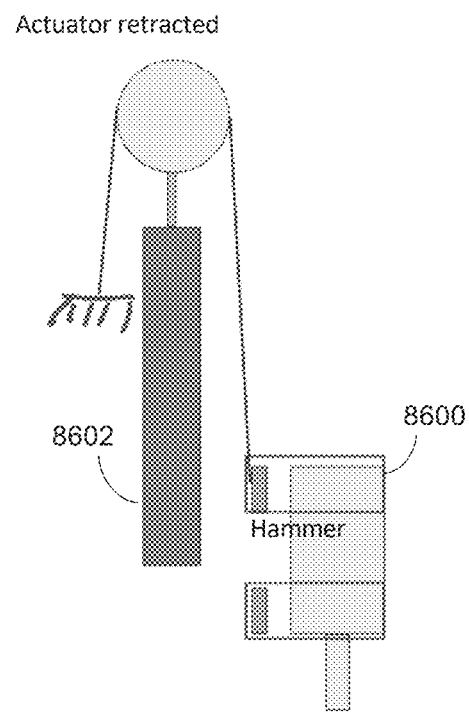
Figure 86C:
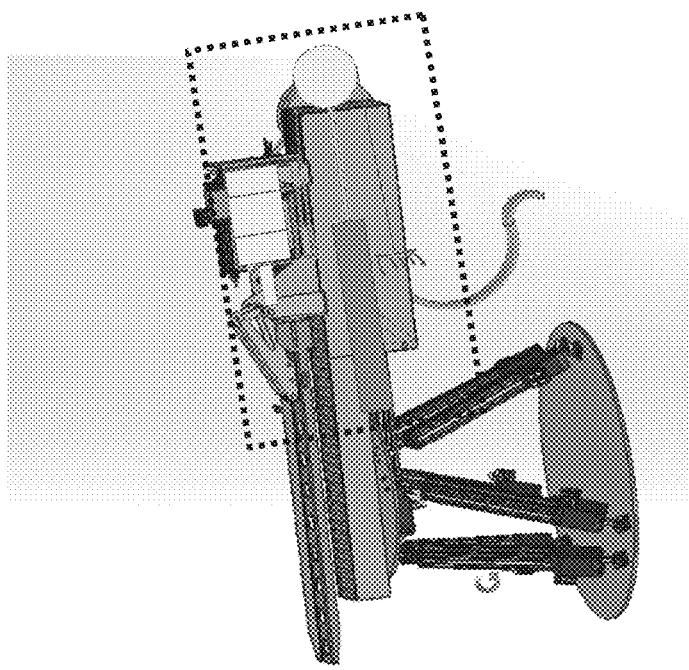

FIGS. 86A-86C illustrate different example configurations of a hammer 8600 and actuator 8602 of the post installation machine, in accordance with some embodiments. A load driving mechanism may include the actuator 8602 configured to control a vertical position of the load head along a Z-axis. The load driving mechanism may be a chain/wire and sheave for adjusting or controlling a ratio of (a) a linear extension of the actuator 8602 relative to (b) a travel distance of the load head. In some embodiments, the ratio may be from 1:6 to 6:1. In some embodiments, the ratio may be 1:2. In some embodiments, the ratio may be adjustable or controllable to reduce an upward reaction force when the load head is retracted after driving the one or more posts downwards onto the terrain. This configuration may prevent the load head from transmitting its reaction force vertically into the post installation machine because when the load head bounces up, it may slack the wire or chain.

Figure 87:
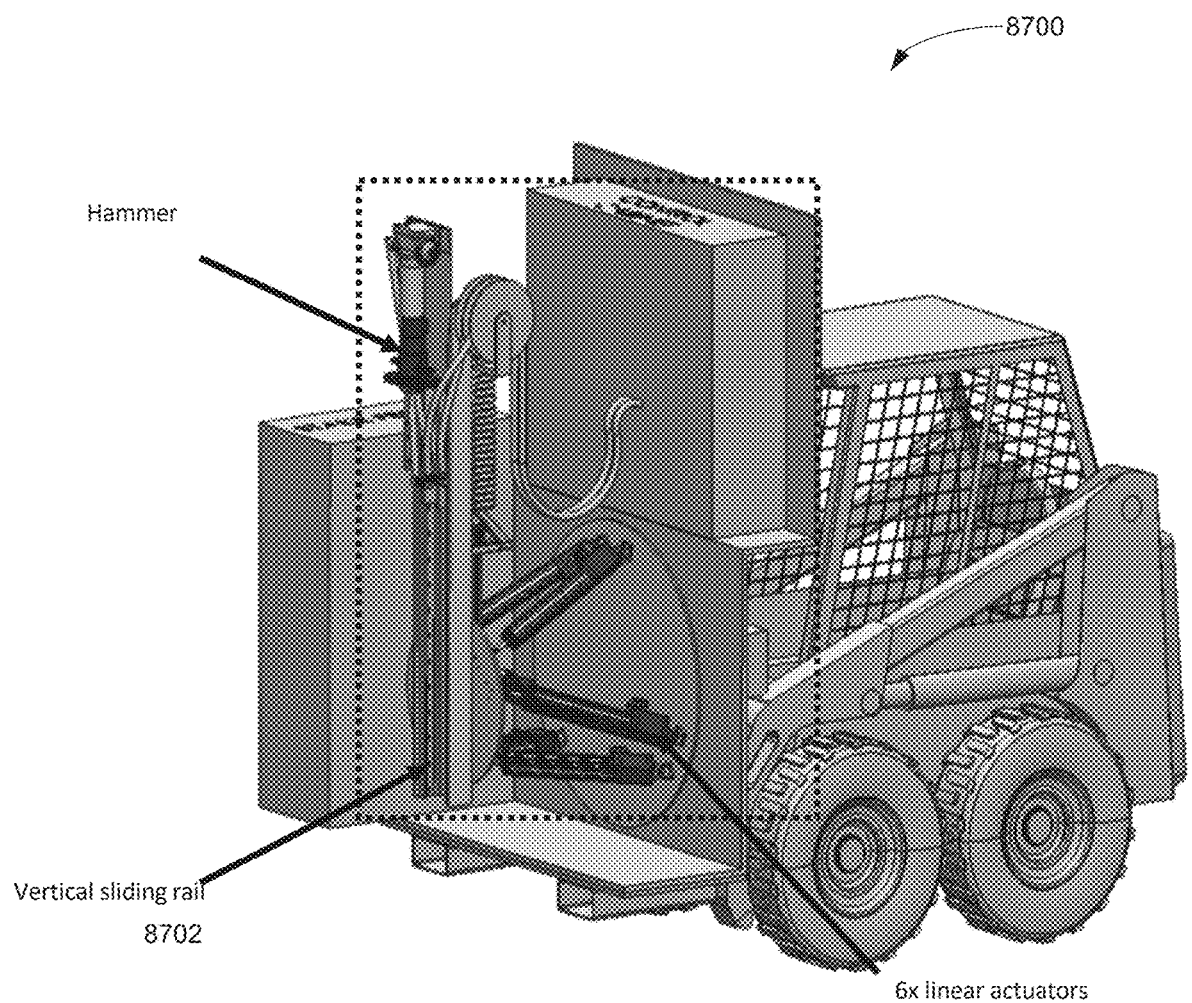
FIG. 87 illustrates an example configuration of a post installation machine with a loader, in accordance with some embodiments.

FIG. 87 illustrates an example configuration of a post installation machine 8700 with a loader, in accordance with some embodiments. The post installation machine 8700 may include one or more vertical sliding rails 8702 for constraining the one or more posts as the one or more posts are being driven onto the terrain. The one or more vertical sliding rails 8702 may be configured to permit the one or more posts to slide along the one or more vertical rails 8702 as the one or more posts are being driven onto the terrain.

Figure 90A:
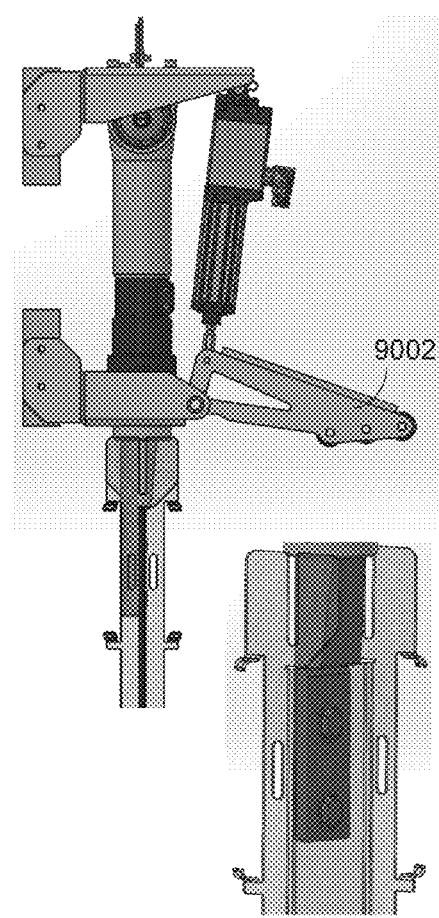
FIGS. 90A and 90B illustrate different views of an example configuration of a hammer bit of the post installation machine, in accordance with some embodiments.
Figure 90B:
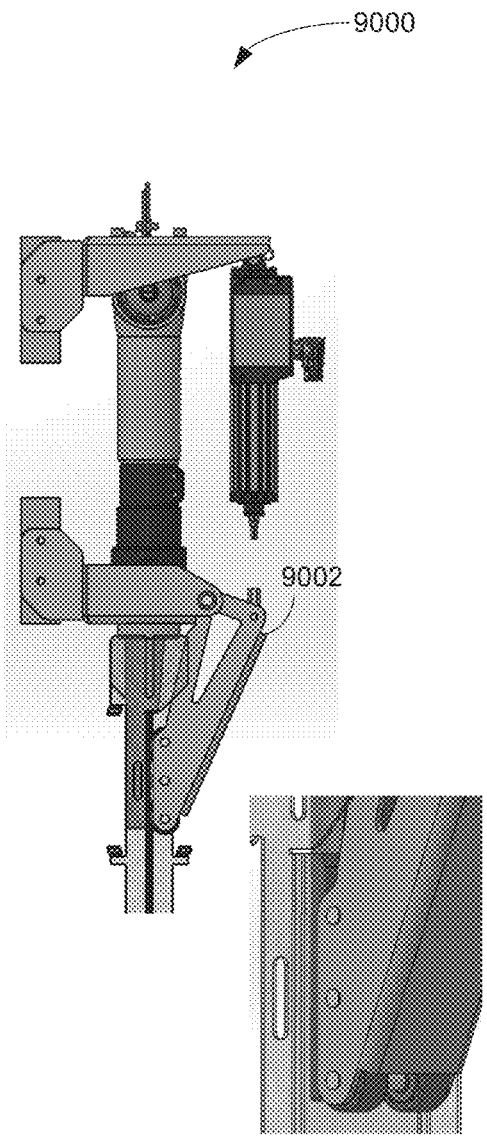
Figure 91:
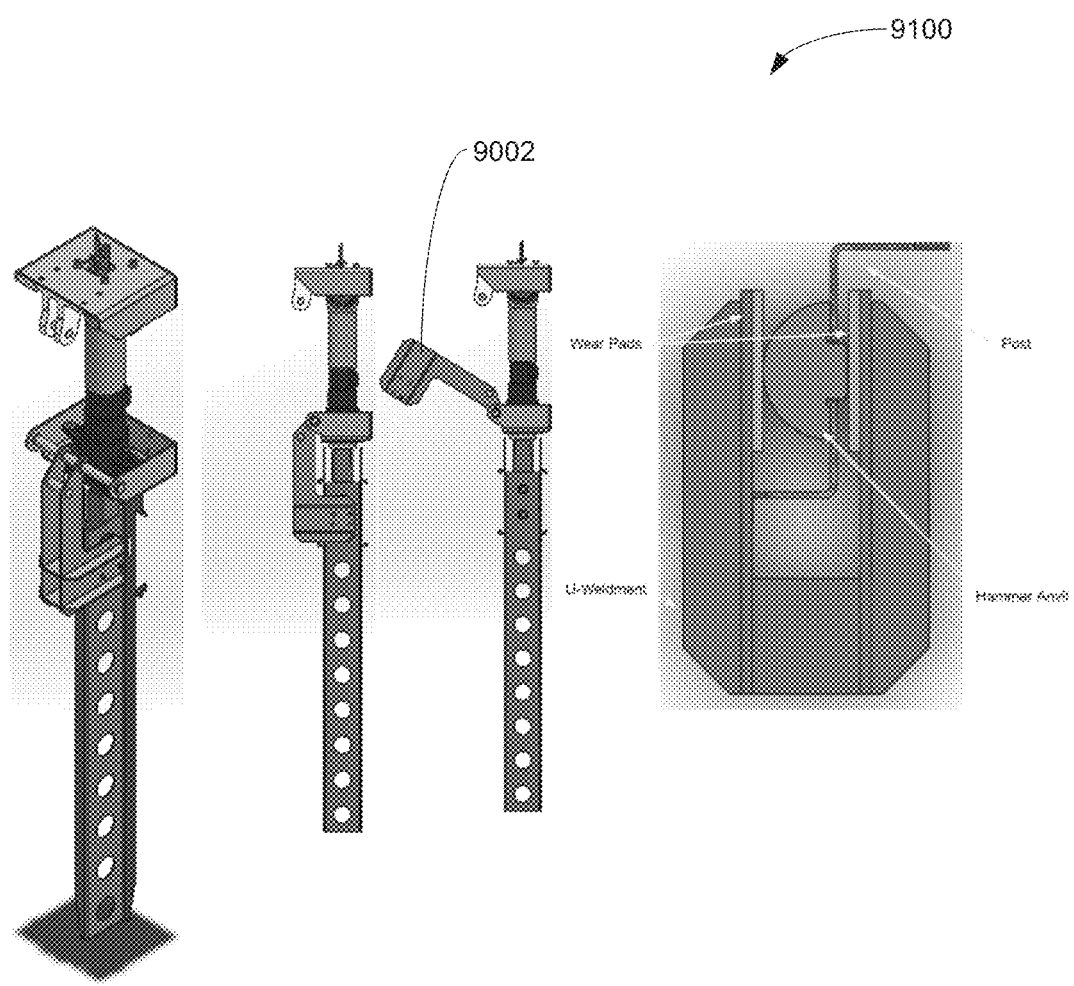
FIG. 91 illustrates different views of another example configuration of the hammer bit of the post installation machine, in accordance with some embodiments.

In some embodiments, the post installation machine may further comprise a brace configured to retain the one or more posts in position relative to the load head. In some embodiments, the brace may be movable to switch between an open state and a closed state. In some embodiments, the closed state may cause the brace to retain the one or more posts in position relative to the load head. In some embodiments, the open state may allow the one or more posts to be placed in position relative to the load head. In some embodiments, the brace may be hinged to a holder that is configured to hold the one or more posts. In some embodiments, the brace may comprise a C-shaped or a horse-shoe bracket. In some embodiments, the post installation machine may comprise a brace and an actuator configured to retain the one or more posts in position relative to the load head (e.g., a hammer bit). FIGS. 90A and 90B illustrate an example configuration 9000 of a hammer bit of the post installation machine, in accordance with some embodiments. A brace 9002 may be movable to switch between an open state (FIG. 90A) and a closed state (FIG. 90B). The open state may allow the one or more posts to be placed in position relative to the load head. The closed state may cause the brace 9002 to retain the one or more posts in position relative to the load head. The brace 9002 may be hinged to a holder that is configured to hold the one or more posts. FIG. 91 illustrates another example configuration 9100 of the hammer bit of the post installation machine. The brace 9002 may be in a C-shape or a horse-shoe bracket. The brace 9002 may self-react the post force in the direction parallel to the shear features on the hammer bit, which may lower the force transmitted to the actuator.

Figure 88C:
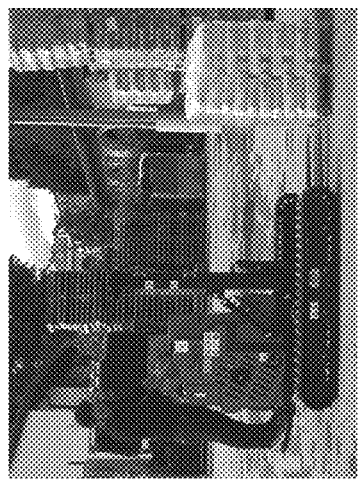
FIGS. 88A-88C illustrate example integrations of the post installation machine with a skid, in accordance with some embodiments.
Figure 88B:
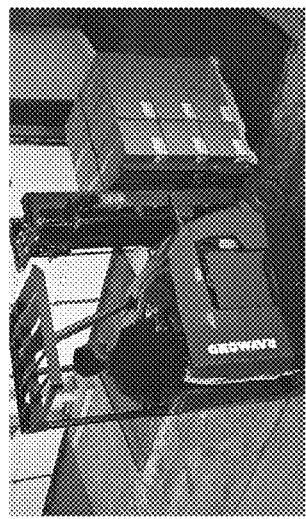
Figure 88A:
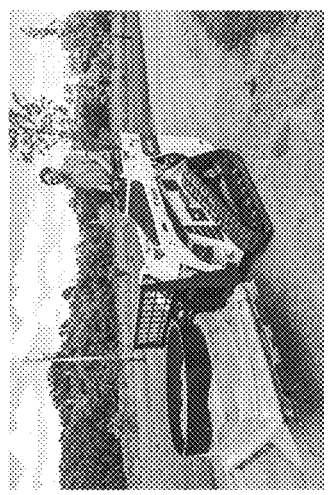

In some embodiments, the post installation machine may be integrated to a vehicle or machine. FIGS. 88A-88C illustrate example integrations of the post installation machine 8700 with a skid, in accordance with some embodiments. The skid may be able to attach to any suitable type of vehicles, for example, forklifts, skid steers, tractors, or a custom-built vehicle.

Figure 89:
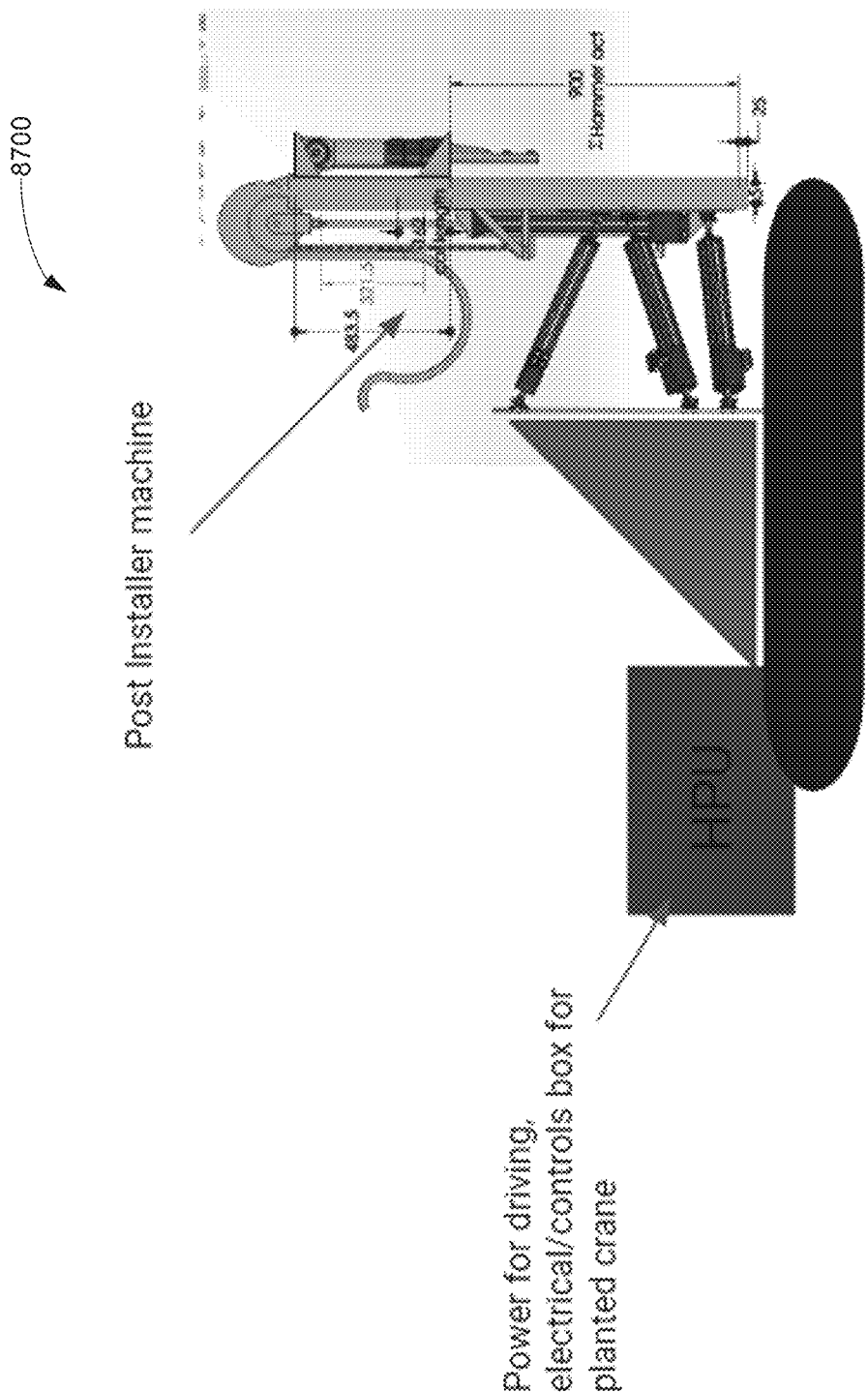
FIG. 89 illustrates an example configuration of the post installation machine fitted with tracks or wheels at its base and a hydraulic or electric power source, in accordance with some embodiments.

Alternatively, the post installation machine may be fitted with tracks or wheels at its base and a hydraulic or electric power source. The post installation machine may move like a vehicle by itself, without the need to mate with a vehicle. FIG. 89 illustrates an example configuration of the post installation machine 8700 fitted with tracks or wheels, in accordance with some embodiments.

Through the high throughput post installation method and system as disclosed herein, the posts may be quickly fed into the post installation machine automatically, without manual intervention. In some embodiments, the posts may be quickly fed into the post installation machine, at a speed from 0.2 to 60 second per post. In addition, the posts can be quickly installed. In some embodiments, the posts may be installed at a speed from 20 posts per hour to 750 posts per hour.

In some embodiments, the post installation speed can be improved by at least 10%, at least 20%, at least 30%, at least 40%, at least 50%, at least 60%, at least 70%, at least 80%, at least 90%, at least 100%, at least 120%, at least 150%, at least 200%, at least 300%, at least 400%, at least 500%, or more. In some embodiments, the time needed for the positioning and assembly of posts can be reduced by at least 10%, at least 20%, at least 30%, at least 40%, at least 50%, at least 60%, at least 70%, at least 80%, at least 90%, or more.

Rapid Solar Module Assembly

In one aspect, the present disclosure provides methods and systems for rapid assembly of solar modules onto posts without a need of high precision alignment.

In some embodiments, the systems for solar module assembly may comprise a module installation machine. In some embodiments, the present disclosure describes an apparatus comprising the compliant mechanism. The apparatus or module installation machine may comprise a compliant mechanism operably coupled to a distal portion of a movable arm. In some embodiments, the compliant mechanism may pick up one or more solar modules from a plurality of solar modules and place the one or more solar modules onto a plurality of posts that have been installed onto a terrain. In some embodiments, the compliant mechanism may rotate and/or flex relative to the movable arm during placement of the one or more solar modules onto the plurality of posts. The compliant mechanism may enable the one or more solar modules to be placed onto the plurality of posts, without requiring the one or more solar modules to be precisely positioned within a threshold tolerance relative to the plurality of posts during the placement.

In some embodiments, the apparatus may further include the movable arm. In some embodiments, the apparatus may further include one or more actuators operably coupled to the movable arm. In some embodiments, the one or more actuators may be configured to control the movable arm to move in two or more degrees of freedom. In some embodiments, the two or more degrees of freedom may comprise a translation along a vertical axis and a rotation about the vertical axis. In some embodiments, the two or more degrees of freedom may further comprise a translation and/or rotation along a lateral axis. In some embodiments, the apparatus may further include a skid for supporting the plurality of solar modules in a stacked format.

Figure 92A:
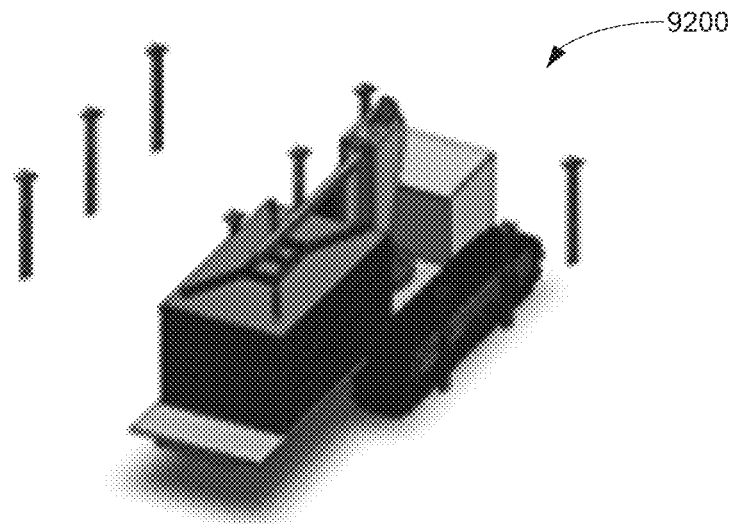
FIGS. 92A and 92B illustrate a range of motion of a module installation machine, in accordance with some embodiments.
Figure 92B:
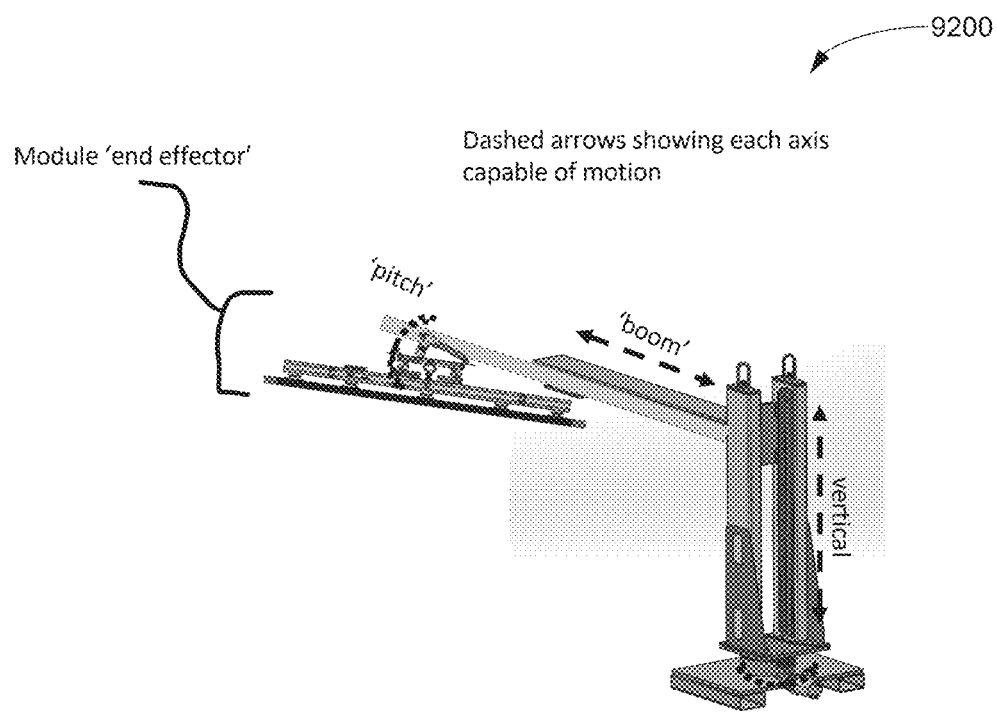

FIGS. 92A and 92B illustrate a range of motion of a module installation machine 9200, accordance with some embodiments. FIG. 92A shows that the module installation machine 9200 may pick up a solar module from a stack of solar modules and rotate to position the solar module over a plurality of posts. In some embodiments, the rotation may be 90 degrees. As shown in FIG. 92B, the module installation machine 9200 may comprise a vertical axis and a movable arm (e.g., a crane). In some embodiments, the movable arm may comprise a boom axis and a pitch axis. The vertical axis may be capable of moving up and down in the Z-axis to adjust the height of the module installation machine. The boom axis and pitch axis may be capable of extending or retracting, thereby moving the solar module away from or close to the posts. The movable arm may be capable of leveling the solar module. The module installer machine 9200 may comprise an end effector comprising a compliant mechanism (details to be illustrated in FIGS. 94A, 94B, and 95). In some embodiments, one or more actuators may be configured to control the movable arm to move in two or more degrees of freedom. The two or more degrees of freedom may include a translation along a vertical axis and a rotation about the vertical axis. The two or more degrees of freedom may include a translation and/or rotation along a lateral axis.

Figures 94A, 94B:
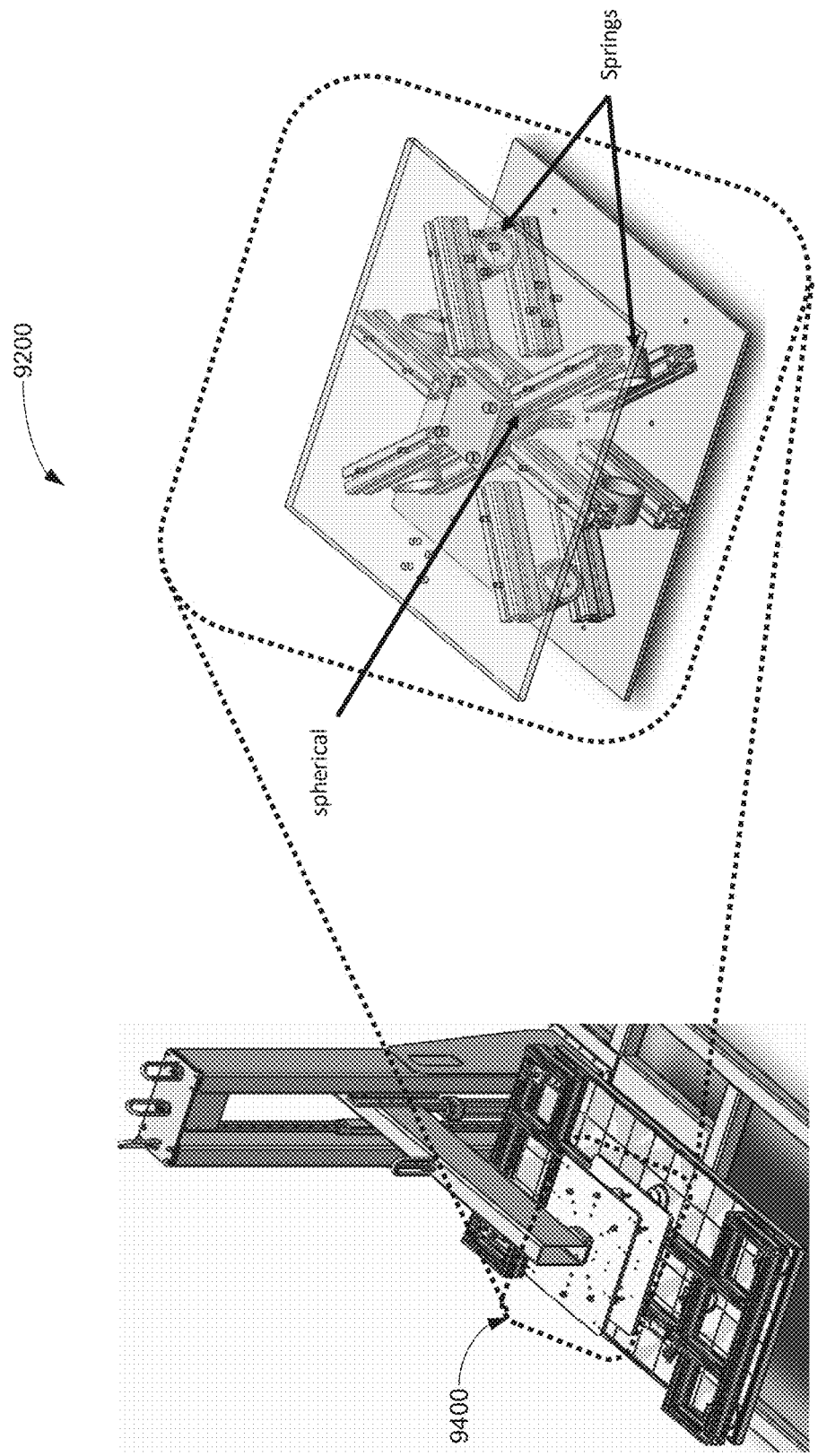
FIGS. 94A and 94B illustrate an example configuration of a compliant mechanism on an end of a crane of the module installation machine, in accordance with some embodiments.

FIGS. 94A and 94B illustrate an example configuration of a compliant mechanism 9400 on an end of a movable arm (e.g., a crane) of the module installation machine 9200, in accordance with some embodiments. The compliant mechanism 9400 may be operably coupled to a distal portion of a movable arm. The compliant mechanism 9400 may be configured to (1) pick up one or more solar modules from a plurality of solar modules and (2) place the one or more solar modules onto a plurality of posts that have been installed onto a terrain. The compliant mechanism 9400 may be configured to rotate and/or flex relative to the movable arm during placement of the one or more solar modules onto the plurality of posts. The compliant mechanism 9400 may enable the one or more solar modules to be placed onto the plurality of posts, without requiring the one or more solar modules to be precisely positioned within a threshold tolerance relative to the plurality of posts during the placement. The threshold tolerance may be based at least on a horizontal accuracy and a vertical accuracy of a Global navigation satellite system (GNSS). The threshold tolerance may be based at least on a tilt of the plurality of the posts. The tilt may range from 0 degree to 25 degrees.

As shown in FIG. 94B, the compliant mechanism 9400 may include a pair of laterally spaced apart plates and a plurality of springs extending radially from a center between the pair of laterally spaced apart plates. The plurality of springs may extend radially from the center equidistant from each other. The plurality of springs may comprise 3 springs, 4 springs, 5 springs, 6 springs, 7 springs, or more. The angles between two neighboring springs may be even. Alternatively, the angles between two neighboring springs may not be even. In some embodiments, the compliant mechanism may include three springs that extend radially from the center at a 120 degree angle relative to each other. In some embodiments, the compliant mechanism may include four springs that extend radially from the center at a 90 degree angle relative to each other. In some embodiments, the compliant mechanism may include six springs that extend radially from the center at a 60 degree angle relative to each other. In some embodiments, the pair of laterally spaced apart plates may include (1) a first plate that is operably coupled to the distal portion of the movable arm, and (2) a second plate that is configured to pick up the one or more solar modules from the plurality of solar modules. In some embodiments, the compliant mechanism 9400 may include a spherical bearing located at a center between the pair of laterally spaced apart plates. The pair of laterally spaced apart plates may be operably coupled to each other via the spherical bearing and the plurality of springs. The spherical bearing may be configured to permit the pair of laterally spaced apart plates to rotate relative to each other. The spherical bearing may include an additional spring that is configured to allow lateral movement of the plates relative to each other. The plurality of springs may be configured to permit the pair of laterally spaced apart plates to flex relative to each other such that pair of plates are non-parallel to each other. The plurality of springs may be made of any suitable materials, for example, metal, alloy, carbon fiber, rubber, or reinforced materials. The plurality of springs may be configured with having a torsional spring force such that the compliant mechanism returns to a default position after the placement of the one or more solar modules onto the plurality of posts.

In some embodiments, the compliant mechanism 9400 may include one or more clinching tools operably coupled to the compliant mechanism. The one or more clinching tools may be configured to attach the one or more solar modules to the plurality of posts via a dimpling process (see, e.g., description on clinching tools and dimpling process in connection with FIG. 7A, FIG. 7B, and/or FIG. 15).

Figure 95:
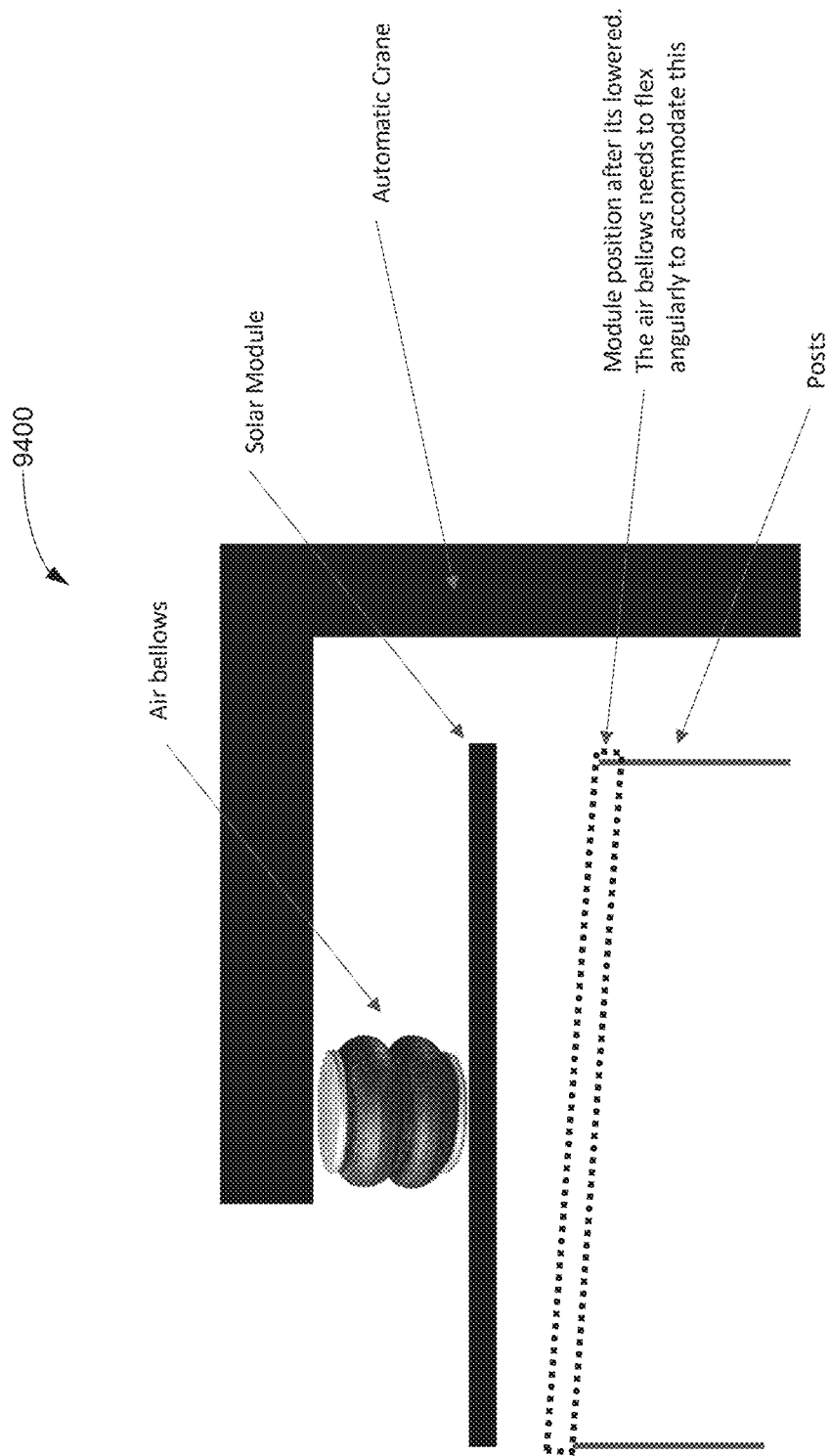
FIG. 95 illustrates another example configuration of the compliant mechanism on the end of the crane of the module installation machine, in accordance with some embodiments.
Figure 96:
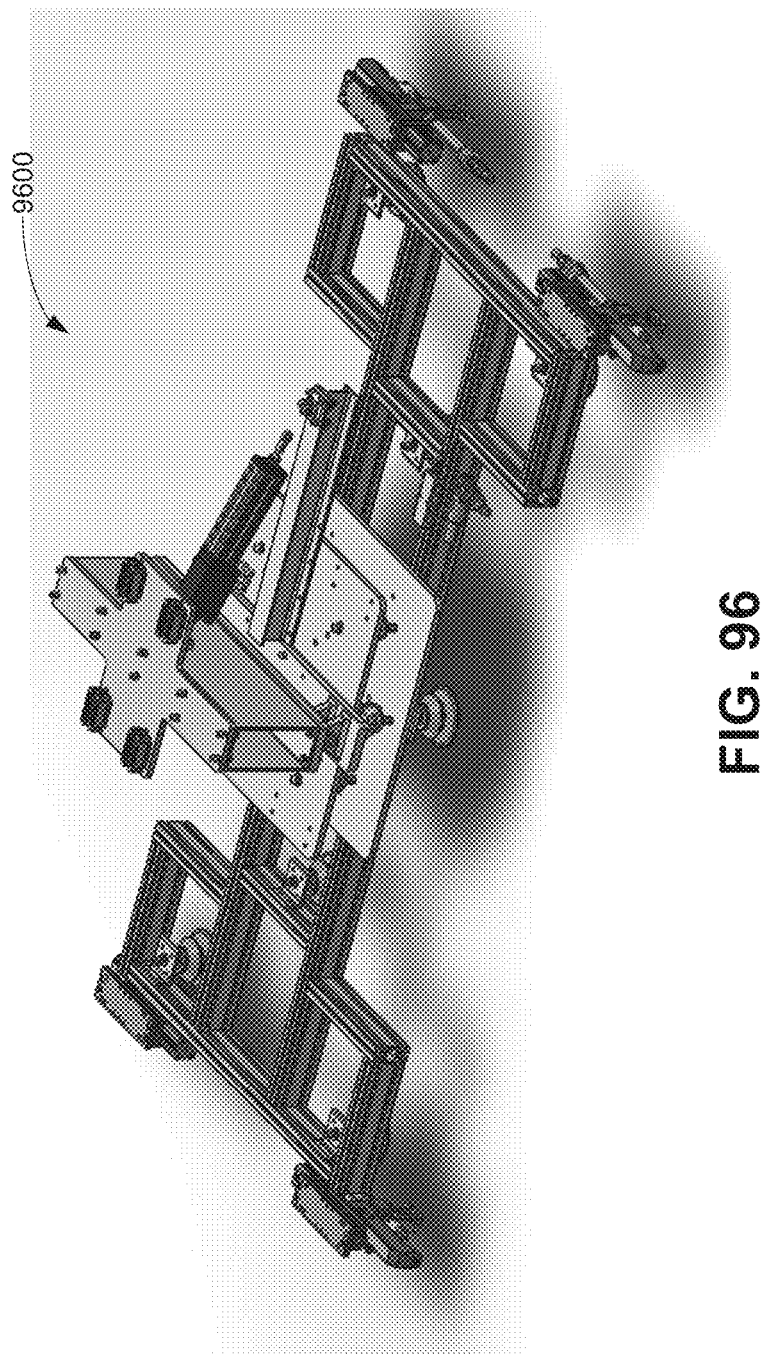
FIG. 96 illustrates an example configuration of an end effector of the crane of the module installation machine, in accordance with some embodiments.

FIG. 95 illustrates another example configuration of the compliant mechanism 9400 on the end of the crane of the module installation machine 9200, in accordance with some embodiments. FIG. 96 illustrates an example configuration of an end effector 9600 of the crane of the module installation machine 9200, in accordance with some embodiments.

As shown in FIG. 95, the compliant mechanism 9400 may include one or more bellows. The one or more bellows may be provided in a rubber casing. The one or more bellows may be inflatable or deflatable with a fluid for controlling a spring constant of the one or more bellows. The fluid may include a gas or a liquid. The compliant mechanism 9400 may include and/or be attached to a movable arm. The compliant mechanism 9400 may include one or more actuators (e.g., motors) operably coupled to the movable arm.

In some embodiments, the module installation machine may be integrated or loaded to a vehicle or machine. FIGS. 93A-93D illustrate different example configurations of the module installation machine 9200, in accordance with some embodiments. The module installation machine 9200 can be on a standard skid and towed on a skid steer (FIG. 93A), a trailer (FIG. 93B), or a tractor (FIG. 93C). In some embodiments, the skid can be fitted with a hydraulic or electric power unit and wheels or tracks to drive itself and not need to be mated to any other vehicle (FIG. 93D). FIGS. 93B and 93C illustrate that module installation machine 9200 may include a skid for supporting a plurality of solar modules in a stacked format.

Using the module installation machine as provided herein, solar modules may be positioned and assembled onto a plurality of posts in a rapid way. The compliant mechanism may enable the one or more solar modules to be placed onto the plurality of posts, without requiring the one or more solar modules to be precisely positioned within a threshold tolerance relative to the plurality of posts during the placement. The time needed for the positioning and assembly of solar modules may be reduced by at least 10%, at least 15%, at least 20%, at least 25%, at least 30%, at least 35%, at least 40%, at least 45%, at least 50%, at least 60%, at least 70%, at least 80%, at least 90%, or more.

The automation and autonomy disclosed herein can reduce the time needed for installing a solar module array or a power plant, by at least 10%, at least 15%, at least 20%, at least 25%, at least 30%, at least 35%, at least 40%, at least 45%, at least 50%, at least 60%, at least 70%, at least 80%, at least 90%, or more. In some embodiments, the throughput for installing a solar module array can be increased by at least 10%, at least 20%, at least 30%, at least 40%, at least 50%, at least 60%, at least 70%, at least 80%, at least 90%, at least 100%, at least 120%, at least 150%, at least 200%, at least 300%, at least 400%, at least 500%, or more. In some embodiments, the cost for installing the solar module array can be reduced by at least 10%, at least 15%, at least 20%, at least 25%, at least 30%, at least 35%, at least 40%, at least 45%, at least 50%, at least 60%, at least 70%, at least 80%, at least 90%, or more.

While preferred embodiments of the present disclosure have been shown and described herein, it will be obvious to those skilled in the art that such embodiments are provided by way of example only. It is not intended that the disclosure be limited by the specific examples provided within the specification. While the disclosure has been described with reference to the aforementioned specification, the descriptions and illustrations of the embodiments herein are not meant to be construed in a limiting sense. Numerous variations, changes, and substitutions will now occur to those skilled in the art without departing from the disclosure. Furthermore, it shall be understood that all aspects of the disclosure are not limited to the specific depictions, configurations or relative proportions set forth herein which depend upon a variety of conditions and variables. It should be understood that various alternatives to the embodiments of the disclosure described herein may be employed in practicing the disclosure. It is therefore contemplated that the disclosure shall also cover any such alternatives, modifications, variations or equivalents. It is intended that the following claims define the scope of the disclosure and that methods and structures within the scope of these claims and their equivalents be covered thereby.

What is claimed is:

1. A solar module array comprising:
   a plurality of solar modules; and
   a plurality of posts configured to support the plurality of solar modules,
   wherein at least one solar module of the plurality of solar modules is configured to be supported by two or more posts at two or more non-corner positions along a first longitudinal side of the at least one solar module using two or more post-module interfaces, wherein the two or more post-module interfaces are capable of being placed anywhere along the first longitudinal side to allow for the two or more non-corner positions to be adjustable along the first longitudinal side.

2. The solar module array of claim 1, wherein the first longitudinal side of the at least one solar module comprises a first end and a second end, and wherein the two or more posts are located at least 1 inch away from the first end and the second end.

3. The solar module array of claim 2, wherein at least one post of the two or more posts is located between the first end and a center of the first longitudinal side, and at least one additional post of the two or more posts is located between the second end and the center of the first longitudinal side.

4. The solar module array of claim 1, wherein the at least one solar module is configured to be further supported by two or more additional posts along a second longitudinal side of the at least one solar module.

5. The solar module array of claim 4, wherein the two or more additional posts are spaced along the second longitudinal side away from a first end and a second end of the second longitudinal side.

6. The solar module array of claim 4, wherein the first longitudinal side and the second longitudinal side are opposite to each other.

7. The solar module array of claim 4, wherein the first longitudinal side and the second longitudinal side are substantially parallel to each other.

8. The solar module array of claim 1, wherein each solar module of the plurality of solar modules is configured to be supported by at least two posts located on a first side and at least two additional posts located on a second side, wherein the first side and the second side correspond to different sides of the each solar module.

9. The solar module array of claim 1, wherein at least one post of the plurality of posts is configured to support no more than two solar modules of the plurality of solar modules.

10. The solar module array of claim 1, wherein at least one post of the plurality of posts is configured to support two solar modules of the plurality of solar modules.

11. The solar module array of claim 1, wherein the two or more post-module interfaces are configured to align and contour the at least one solar module of the plurality of solar modules to a terrain on which the solar module array is constructed.

12. The solar module array of claim 1, wherein the two or more post-module interfaces are configured to be connected to the two or more posts of the plurality of posts via bolts.

13. The solar module array of claim 1, wherein the solar module array comprises a dual tilt array.

14. The solar module array of claim 13, wherein the solar module array has a ground coverage ratio of at least about 0.6.

15. The solar module array of claim 13, wherein the solar module array has a peak spacing that ranges from about 1 inch to about 18 inches.

16. The solar module array of claim 13, wherein the solar module array has a valley spacing that ranges from about 1 inch to about 18 inches.

17. The solar module array of claim 1, wherein the solar module array comprises an east-west facing dual tilt array.

18. The solar module array of claim 1, wherein each post at each non-corner position is connected to no more than two adjacent solar modules.

19. The solar module array of claim 1, wherein each post at each non-corner position is not connected to or does not interface with a solar module at a corner position.

20. The solar module array of claim 1, wherein the two or more posts are configured to support an additional solar module at another two or more non-corner positions along a first longitudinal side of the additional solar module.

21. The solar module array of claim 1, wherein the at least one solar module is not coupled to an adjacent solar module on a side that is substantially perpendicular to the first longitudinal side of the at least one solar module.

\* \* \* \* \*